(12) United States Patent
Hosier, Jr.

(10) Patent No.: US 9,998,881 B2
(45) Date of Patent: Jun. 12, 2018

(54) ONLINE SYSTEMS AND METHODS FOR ADVANCING INFORMATION ORGANIZATION SHARING AND COLLECTIVE ACTION

(71) Applicant: Gerald Douglas Hosier, Jr., Crested Butte, CO (US)

(72) Inventor: Gerald Douglas Hosier, Jr., Crested Butte, CO (US)

(73) Assignee: Doug Hosier, Boulder, CO (US)

( * ) Notice: Subject to any disclaimer, the term of this patent is extended or adjusted under 35 U.S.C. 154(b) by 336 days.

(21) Appl. No.: 15/008,121

(22) Filed: Jan. 27, 2016

(65) Prior Publication Data

US 2016/0142887 A1 May 19, 2016

Related U.S. Application Data

(63) Continuation of application No. 14/202,115, filed on Mar. 10, 2014, now Pat. No. 9,253,609.

(60) Provisional application No. 61/778,345, filed on Mar. 12, 2013.

(51) Int. Cl.
| | |
|---|---|
| *G06F 3/00* | (2006.01) |
| *H04W 4/08* | (2009.01) |
| *G06F 3/01* | (2006.01) |
| *G06F 3/0481* | (2013.01) |
| *H04L 12/58* | (2006.01) |
| *G06F 3/0484* | (2013.01) |
| *G06F 3/0488* | (2013.01) |
| *H04L 29/08* | (2006.01) |
| *H04M 1/725* | (2006.01) |
| *H04W 4/02* | (2018.01) |
| *H04W 4/18* | (2009.01) |

(52) U.S. Cl.
CPC .............. *H04W 4/08* (2013.01); *G06F 3/017* (2013.01); *G06F 3/04817* (2013.01); *G06F 3/04842* (2013.01); *G06F 3/04847* (2013.01); *G06F 3/04883* (2013.01); *H04L 51/32* (2013.01); *H04L 67/306* (2013.01); *H04M 1/72527* (2013.01); *H04W 4/022* (2013.01); *H04W 4/185* (2013.01)

(58) Field of Classification Search
CPC ................................ G06F 3/017; H04W 4/08
USPC ........................................................ 715/753
See application file for complete search history.

(56) References Cited

U.S. PATENT DOCUMENTS

| | | |
|---|---|---|
| 8,781,498 B2 | 7/2014 | Rothschild |
| 8,880,069 B2 | 11/2014 | Filipovic |
| 8,930,459 B2 | 1/2015 | Mallet |
| 9,009,231 B2 | 4/2015 | Poikselka |
| 9,055,410 B2 | 6/2015 | Deshpande |
| 9,253,609 B2 * | 2/2016 | Hosier, Jr. ............... H04W 4/08 |

(Continued)

OTHER PUBLICATIONS

Rainie et al., "Coming and Going on Facebook," Pew Research Internet Project (Feb. 5, 2013).

(Continued)

*Primary Examiner* — William Titcomb
(74) *Attorney, Agent, or Firm* — Law Offices of Gerald D. Hosier Ltd

(57) ABSTRACT

Methods and systems and mobile device interfaces for creating, joining, organizing and managing via mobile devices affinity groups in a cloud computing environment for social and business purposes.

21 Claims, 135 Drawing Sheets

Cloud Computing Environment

(56) References Cited

U.S. PATENT DOCUMENTS

| | | | | |
|---|---|---|---|---|
| 2003/0096621 A1* | 5/2003 | Jana | ................ | G08G 1/0104 |
| | | | | 455/456.1 |
| 2014/0282016 A1* | 9/2014 | Hosier, Jr. | ............ | H04W 4/08 |
| | | | | 715/733 |
| 2016/0142887 A1* | 5/2016 | Hosier, Jr. | ............ | H04W 4/08 |
| | | | | 715/753 |
| 2016/0188201 A1* | 6/2016 | Hosier, Jr. | ........... | G06Q 50/01 |
| | | | | 715/753 |
| 2017/0024091 A1* | 1/2017 | Hosier, Jr. | .......... | G06F 3/0482 |

OTHER PUBLICATIONS

Bennett, "The Dunbar Number, From the Gum of Social Networks," Bloomberg Businessweek (Jan. 10, 2013).
Ronald Coase—Wikipedia, the free encyclopedia (last modified Feb. 5, 2014).

* cited by examiner

My Profile the River (Converged Streams)

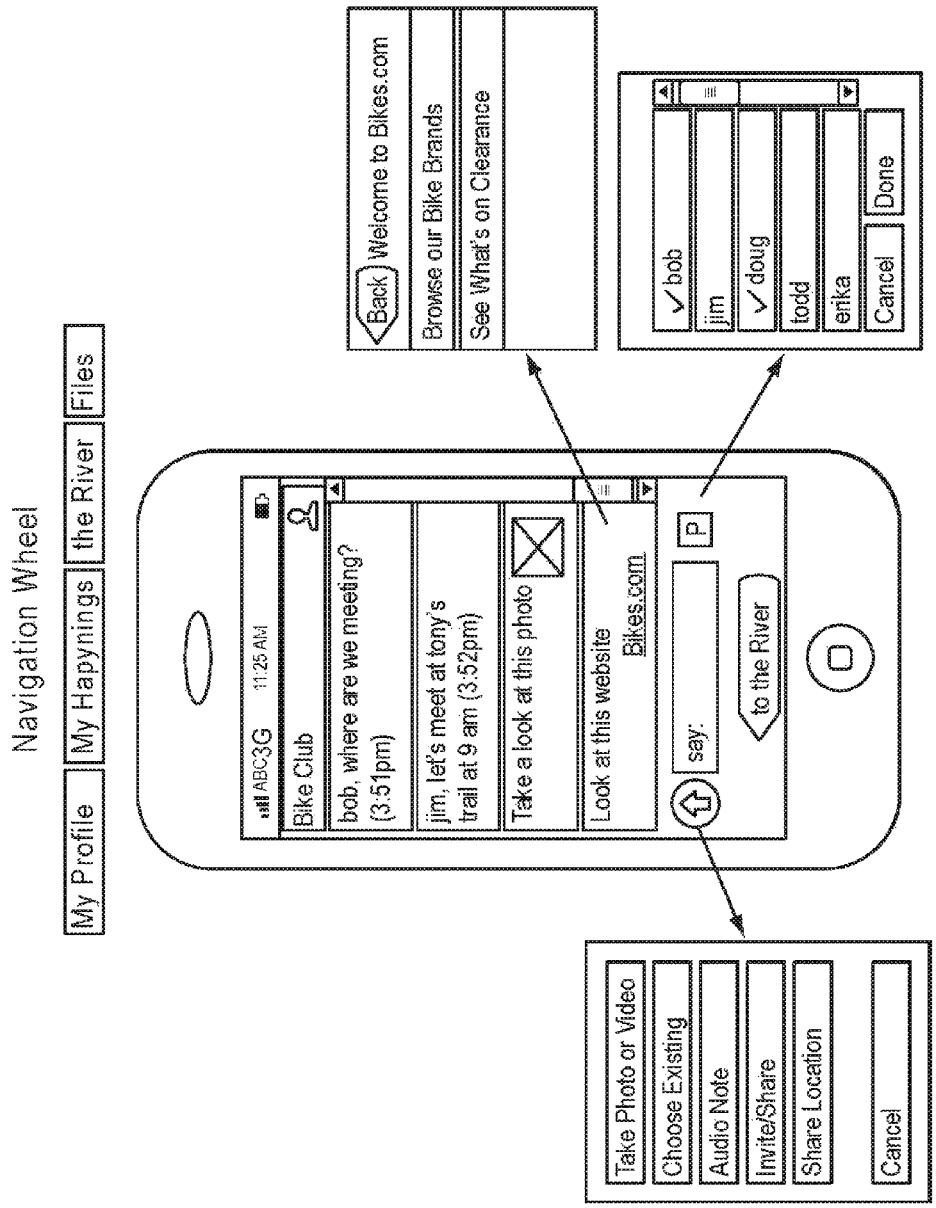

Another Member's Profile in a Hapyning

My Profile

My Profile for a Hapyning

Search

Search

Search

Advertisement

Advertisement/Offers Tab Preferences

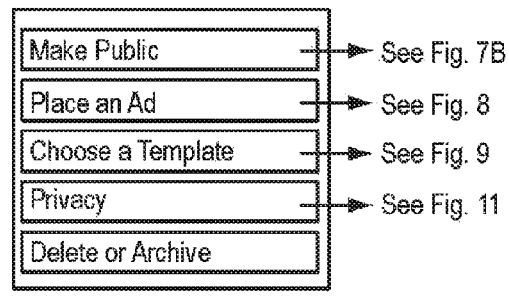
Description of a Hapyning
FIG. 7A

Public option for a Hapyning

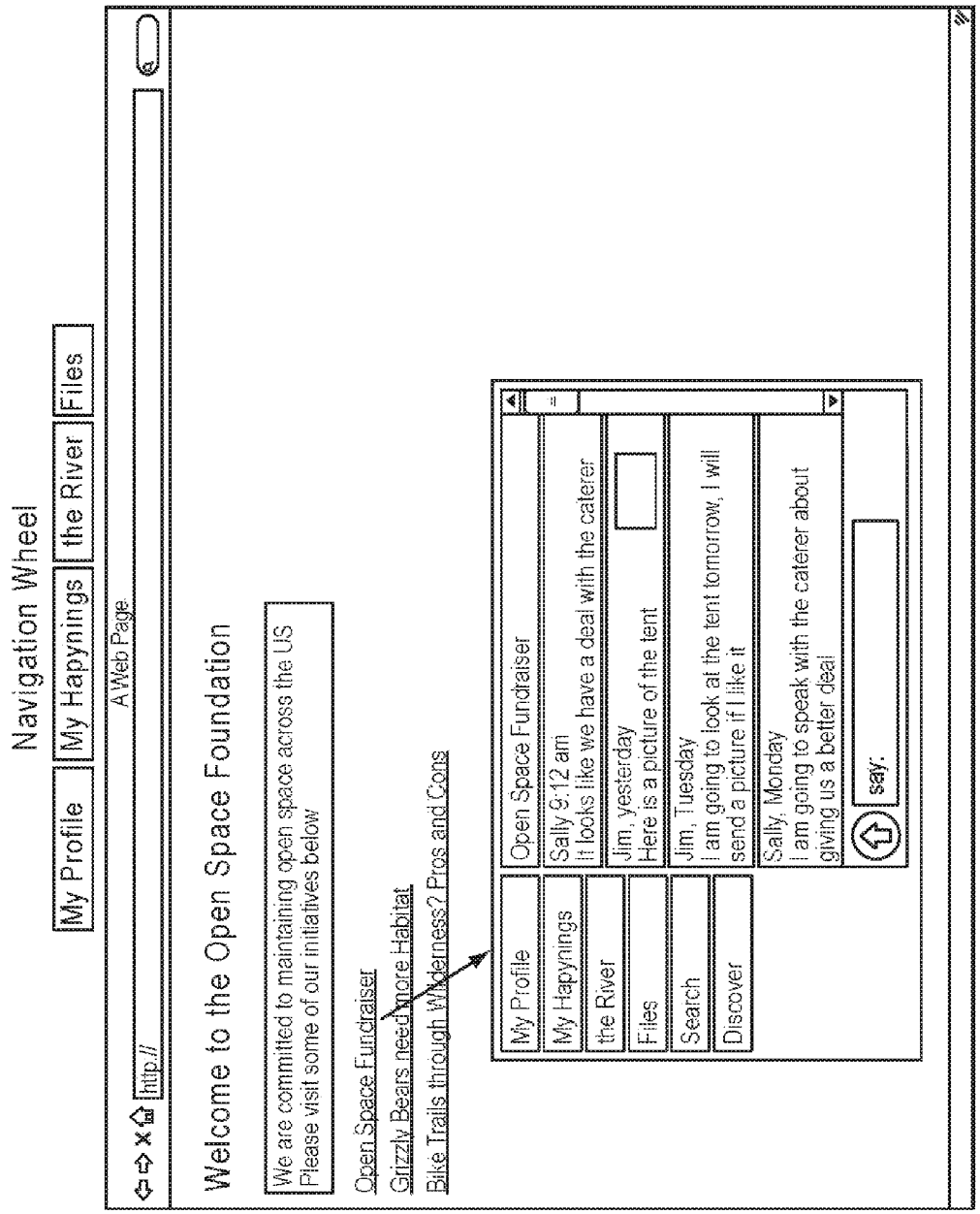
FIG. 7C Web page with embedded Hapyning

Email with embedded Hapyning

Place an Ad

Choose a Template

Hapyn Template and Aps

Privacy Management New Member Consent

Discover-Members

Privacy Settings for a Hapyning

| Event Planners Incorporated | | Manage Users and Accounts  Jim Smith  Sign Out | |
|---|---|---|---|

Dashboard  Hapynings  Projects  Expenses  Invoices  Reports  Files

Recent Discussion in Hapyn  Add

| Person | Comment | Project or Expense | Hapyning Name |
|---|---|---|---|
| Joan Kopinski | I've decided I would like a big cake | Kopinski Wedding | Kopinski Wedding |
| Sarah Smile | Tanya, can you take my Saturday shift? | Expense 12-20-2012 $500.00 | Team work schedules |
| Jane Adams | Sarah, we need draft beer for the... | Open Space Fundraiser | Open Space Fundraiser |

Recent Comments on Projects and Expenses

| Person | Project or Expense | Comment |
|---|---|---|
| Tonya Taylor | Kopinski Wedding | Julie says she wants a vegetarian caterer |
| Sherry Timms | Expense 12-20-2012 $500.00 | Does this bill seem too high? |

Projects  Add

| Start Date | Name |
|---|---|
| *Recent* | |
| 10-18-2012 | Kopinski Wedding |
| 9-18-2012 | Open Space Fundraiser |
| 8-18-2012 | Booksellers Convention |
| *Flagged* | |
| 10-18-2012 ⚑ | Kopinski Wedding |
| 9-18-2012 ⚑ | Open Space Fundraiser |

Expenses  Add

| Date | Payee/Description | Project | Amount |
|---|---|---|---|
| *Incomplete* | | | |
| 8-18-2012 | Jones Catering/ no description | Kopinski Wedding | $230.00 |
| 8-16-2012 | no payee/ no description | Kopinski Wedding | $65.00 |
| *Flagged* | | | |
| 8-16-2012 ⚑ | Outback Steakhouse/Lunch w | Bookseller's Convention | $365.00 |
| 8-14-2012 ⚑ | Hilton Hotel/Sales Trip for Convention | Open Space Fundraiser | $450.00 |

Project Awarnys: Dashboard

FIG. 12

| Event Planners Incorporated | | Manage Users and Accounts   Jim Smith   Sign Out |
|---|---|---|
| Dashboard Hapynings Projects Expenses Invoices Reports Files | | |
| *Hapyning Name* | *Last Active* | *Project or Association* |
| Kopinski Wedding | Today | Kopinski Wedding |
| Team work schedules | Yesterday | None |
| Open Space Fundraiser | 12-16-2012 | Open Space Fundraiser |

Search:    Add New   Add Existing
Members
Words           See Fig. 13B
Files

Project Awarnys: Hapynings

FIG. 13A

| Choose Project |
|---|
| ☑ Open Space Fundraiser |
| ☐ Kopinski Wedding |
| ☐ Bookseller' Convention |
| ☐ None |

| My Profile | Open Space Fundraiser |
|---|---|
| My Hapynings | Kopinski Wedding |
| the River | |
| Files | Team Work Schedules |
| Search | Rotary Club Picnic |
| Discover | |
| Add to Awarnys | Hockey Club Fundraiser |

Project Awarnys: Hapynings

FIG. 13B

Project Awarnys: Projects

*Event Planners Incorporated*

Manage Users and Accounts   Jim Smith   Sign Out

Dashboard  Hapynings  Projects  Expenses  Invoices  Reports  Files

Search/Sort by:

| Date | Payee | Members | Description Keywords | Projects |

| *Date* | *Payee/Description* | *Project* | *Amount* |
|---|---|---|---|
| 10-18-2012 | Jones Catering/lunch | Kopinski Wedding | $230.00 |
| 9-18-2012 | Applebees/lunch | Kopinski Wedding | $65.00 |
| 8-18-2012 | Outback Steakhouse/Lunch w Bill | Bookseller's Convention | $365.00 |
| 8-12-2012 | Hilton Hotel/Sales Trip | Bookseller's Convention | $450.00 |
| 7-11-2012 | Tent Rental Inc/Tent for picnic | Open Space Fundraiser | $650.00 |

See Fig. 15B

Project Awarnys: Expenses

FIG. 15A

*Event Planners Incorporated*       Manage Users and Accounts   Jim Smith   Sign Out Dashboard Hapynings Projects Expenses Invoices Reports Files

Expense                                                                     *Edit*

*Date*           *Payee/Description*            *Project*                  *Amount*
8-18-2012        Outback Steakhouse/Lunch w Bill   Bookseller's Convention    $365.00

*Expensed by: Jim smith*
*Payment Status: Paid from EPI Visa card*
*Entered by: Jim Smith 8-18-2012*
*Attachments:* outback receipt Line Items              Add a Line Item
Category       Description                                Quantity      Amount
Meals          Lunch w Bill and his two associates        4             $365.00
                                                          Total         $365.00

Flags                   Add a Flag
  🚩 please verify that this was a sales meeting    ✓
      flagged by Sarah Smiles 8-19-2012       checked by Jim Smith 8-20-2012

Comments              Add a Comment
Jim Smith         the client brought some guests so I had to pay for all of us
8-19-2012

People on this Expense   Add a Person
Jim Smith
Sarah Smiles

Associated Hapynings    Associate another Hapyning
Hapyning: Bookseller's Convention History                            See Fig. 15C
Jim Smith checked flag 8-20-2012
Jim Smith commented 8-20-2012
Sarah Smile flagged this expense 8-19-2012
Jim Smith created this expense 8-18-2012

*Save*

Project Awarnys: Expenses

FIG. 15B

Project Awarnys: Expenses

Event Planners Incorporated

Manage Users and Accounts     Jim Smith     Sign Out

Dashboard   Hapynings   Projects   Expenses   Invoices   Reports   Files

Search/Sort by:

| Date | Invoicee | Members | Description Keywords | Projects |

| Date | Status | Invoice/Description | Project | Amount |
|------|--------|---------------------|---------|--------|
| 10-18-2012 | Draft | Kopinski/ September Invoice | Kopinski Wedding | $2300.00 |
| 9-18-2012 | Unpaid | Kopinski/ August Invoice | Kopinski Wedding | $650.00 |
| 8-18-2012 | Unpaid | Booksellers Assoc./Deposit | Bookseller's Convention | $1365.00 |
| 8-12-2012 | Paid | Booksellers Assoc./Travel | Bookseller's Convention | $450.00 |
| 7-11-2012 | Paid | Open Space/ June Invoice | Open Space Fundraiser | $650.00 |

See Fig. 16B

Project Awarnys: Invoices

FIG. 16A

*Event Planners Incorporated*     Manage Users and Accounts   Jim Smith   Sign Out Dashboard  Hapynings  Projects  Expenses  Invoices  Reports  Files

Invoice                                                                                      *Edit*

| Date | Invoice/Description | Project | Amount |
|---|---|---|---|
| 8-18-2012 | Bookseller's Assoc./Deposit | Bookseller's Convention | $1365.00 |

| | |
|---|---|
| From | EPI |
| To | Bookseller's Assoc. |
| Terms | Upon Receipt |
| Sent | 8-18-2012 |
| Due | 8-25-2012 |

*Line Items*          *Add a Line Item*

| Category | Description | Quantity | Amount |
|---|---|---|---|
| Deposit | Deposit for future expenses | 1 | $1000.00 |
| Meals | Lunch at Outback Steakhouse | 4 | $365.00 |
| | | Total | $1365.00 |

*Flags*          *Add a Flag*

⚑ no flags

*Comments*          *Add a Comment*

Jim Smith          thanks for the business, look forward to a great convention
8-18-2012

*People on this Invoice*     *Add a Person*

Jim Smith
Sarah Smiles

*Associated Hapynings*     *Associate another Hapyning*
Hapyning: Bookseller's Convention

*History*                    See Fig. 16C
Invoice created 8-18-2012

*Save*

Project Awarnys: Invoices

FIG. 16B

Project Awarnys: Invoices

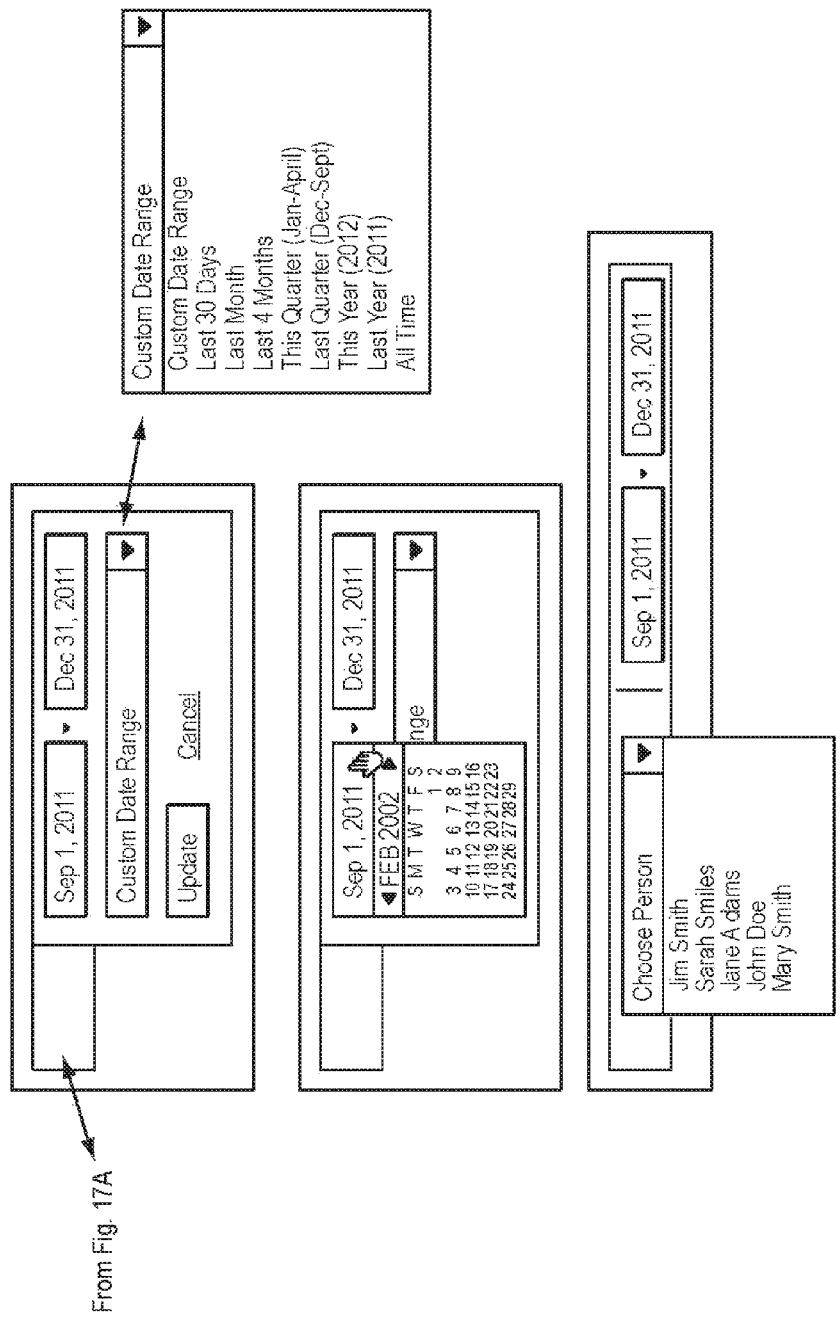

Event Planners Inc.                          Edit      New Account

Assets
Name                          Type          Balance      Actions
Bank Account                  Bank          $2,947.00    Edit
Accounts Receivable           Receivable    $1,957.00    Edit
Liability
Accounts Payable              Payable       $2,525.00    Edit Equity                                                   0 Accounts Project Awarnys: Manage Users and Accounts

FIG. 19B

Sales Calendar
FIG. 20

Deals
FIG. 21A

① New Deal

Deal Name

[                                    ]

[Add a Description                   ]

Lead

[              ]

Products (Value)

[Select a Product        ▼]

Deal Phase

[Cold                    ▼]

[Create a Deal]   Cancel

② Deal can be dragged to phase tabs over to change the status of a deal

Deals

FIG. 21B

Sales Deal Overview

① Status of a deal: Changing status will send notifications to manager(s)

② Adding Note

```
I am adding a note to the deal

[Add Note]
```

Adding Note (Expanded)

```
I am adding a note to the deal

Today  
Attach an Image

People Involved (Currently 2)   Add
[Add Note]
```

③ Expense added to deal with notes, receipts, etc.

④ New product added to deal

⑤ Shows upcoming to-do's for current deal

⑥ People who are involved on the deal. More people can be added or removed from here as well as when posting notes ⑦ Emails can be forwarded to unique email address for emails to be added to the deal activity feed ⑧ Same tab identifiers as Fig. 23

Sales Deal Overview
FIG. 22B

Sales Deal - Products
FIG. 23

Sales Deal - Add Products
FIG. 24

| Gulf Stream Jets | | Lead Detail | | | Sign Out |
|---|---|---|---|---|---|
| | Q Search for deals, leads, etc. | | New Deal | Add To-Do | |
| Deals [47] | Leads | | | | List | Map |
| Leads | | | | Add New Lead | |
| Calendar 2 Today | | | | | |
| Reports | | | | Browse by deals | |
| Activity | | | | Private Jet | |
| | Name | Company | Phone | Email | Size | | Jet Setter |
| | | | | | Fly by Night |
| | Kim Marion | | (404) 877-9922 | email | | Goldman Sacks |
| | | | See Fig. 25B | | Top Gun |
| | Phillip Carrie | | (407) 433-4455 | email | | Flight School |
| | Jim Renton | | (904) 877-9922 | email | | Fly High |
| | Kelly Buffington | | (407) 422-9455 | email | | Private Jet |
| | Dustin Waters | | (407) 433-9455 | email | | |
| | Tom Cook | | (904) 877-9922 | email | | |
| | Rebecca Cood | | (407) 433-9455 | email | | |
| | Kelly Buffington | | (407) 433-9455 | email | | |
| | Dustin Waters | | (407) 877-9922 | email | | |
| | Tom Cook | | (904) 877-9922 | email | | |

Sales Leads
FIG. 25A

Sales Leads

Sales Lead Detail
FIG. 26

Sales Lead Map View

Sales Report Overview

Sales Report Overview

Sales Reports Expenses
FIG. 29

Sales Report Expenses Map

| Deal Name | Sales Person | Date Won | Deal Value | % | |
|---|---|---|---|---|---|
| Private Jets Inc | David Ditges | Oct 22, 2011 | $33,630,100 | | 19% |
| Jet Setter | Carl Smith | Nov 11, 2011 | $22,100,250 | | 14% |
| Fly by Night | Jeff Croft | Oct 16, 2011 | $15,421,000 | | 10% |
| Goldman Sachs | David Ditges | Sep 7, 2011 | $15,412,000 | | 8% |
| Time Warner | David Ditges | Oct 22, 2011 | $12,100,250 | | 7% |
| 247 Jets | Jeff Croft | Nov 14, 2011 | $8,421,000 | | 6% |
| Fly time | Steve Jones | Nov 3, 2011 | $5,150,000 | | 6% |
| Flying High | Carl Smith | Oct 28, 2011 | $3,765,500 | | 6% |
| Jet Setter | Carl Smith | Oct 22, 2011 | $2,765,500 | | 4% |
| Fly by Night | Jeff Croft | Oct 9, 2011 | $2,345,500 | | 3% |
| Goldman Sachs | David Ditges | Sep 7, 2011 | $2,345,500 | | 2% |
| Time Warner | David Ditges | Nov 11, 2011 | $2,345,500 | | 2% |
| 247 Jets | Jeff Croft | Sep 7, 2011 | $2,345,500 | | 2% |
| Fly time | Steve Jones | Nov 21, 2011 | $2,345,500 | | 1% |
| Flying High | Carl Smith | Sep 7, 2011 | $2,345,500 | | 1% |

Sales Report Deals
FIG. 31

| Gulf Stream Jets | Q Search for deals, leads, etc. | Lead Detail | | New Deal | Add To-Do | | | Sign Out |
|---|---|---|---|---|---|---|---|---|

| Deals | 47 | Products | | Your Team ▼ | | Sep 1, 2011 ▼ – Dec 31, 2011 | List |
|---|---|---|---|---|---|---|---|
| Leads | | Overview > Products | | | | 🖶 Print 📊 Export | |

Calendar  2 Today

Reports
  Overview
  Sales
  People
  Products
  Expenses

28% Gulfstream G550 — $136,630,100
17% Astro/Gulfstream 1125 — $110,100,250
11% Learjet 25D — $209,421,100
10% Astro/Gulfstream 1125SP — $110,100,250
8% Learjet 25D — $109,421,000
Show More

| Product | Unit Price | Sold | Total | % | |
|---|---|---|---|---|---|
| Gulfstream G550 | $2,958,000 | 14 | $33,630,100 | | 23% |
| Astro/Gulfstream 1125 | $2,100,250 | 17 | $22,100,250 | | 17% |
| Learjet 25D | $5,421,000 | 12 | $15,421,000 | | 11% |
| Astro/Gulfstream 1125SP | $5,412,000 | 10 | $15,412,000 | | 10% |
| Gulfstream 119 | $2,100,250 | 11 | $12,100,250 | | 8% |
| Westwind 1 | $4,421,000 | 15 | $8,421,000 | | 7% |
| H. Beechcraft 4000 | $450,000 | 10 | $5,150,000 | | 6% |
| Learjet 51A | $765,500 | 7 | $3,765,500 | | 6% |
| MU300 | $765,500 | 12 | $2,765,500 | | 4% |
| Learjet 35A | $345,500 | 7 | $2,345,500 | | 3% |
| H. Beechcraft 125-3A-730 | $345,500 | 11 | $2,345,500 | | 2% |

Activity

Sales Reports Products
FIG. 32

Sales Reports People

Lead Detail

⇦ ⇨ ✕ ⌂   Gulf Stream Jets

Deals [47]
Leads
Calendar   2 Today
Reports
  Overview
  Sales
  People
  Products
  Expenses Activity 🔍 Search for deals, leads, etc.    [New Deal] [Add To-Do]    Sep 1, 2011 ▾ Dec 31, 2011   Sign Out

David Ditges
Overview > People > David Ditges

Sales
$33,630,100                              $5,421,345                🖨 Print  📇 Export
Rank: #1 of 32 Sales People              Largest Deal – $459,009
                                         35%                      Smallest Deal
                                         Conversion Rate          $235.00
                                                                  Average Expense

| Deals Won 10 | Deals Lost 16 | Current Deals 34 | Expenses $3,409 | Products 34 | | |
|---|---|---|---|---|---|---|
| Deal Name | Date Won | Expenses | Products | Deal Value | | % |
| Private Jets Inc | Oct 22, 2011 | $135.00 | 14 | $2,958,000 | ▨ | 19% |
| Jet Setter | Nov 11, 2011 | $45.00 | 17 | $22,100,250 | ▨ | 14% |
| Fly by Night | Oct 16, 2011 | $139.50 | 12 | $5,421,000 | ▨ | 10% |
| Goldman Sachs | Sep 7, 2011 | $34.00 | 10 | $5,412,000 | ▨ | 8% |
| Time Warner | Oct 22, 2011 | $87.00 | 11 | $2,100,250 | ▨ | 7% |
| 247 Jets | Nov 14, 2011 | $56.00 | 15 | $4,421,000 | ▨ | 7% |
| Fly time | Nov 3, 2011 | $149.50 | 10 | $450,000 | ▨ | 6% |
| Flying High | Oct 28, 2011 | $34.00 | 7 | $765,500 | ▨ | 6% |
| Jet Setter | Oct 22, 2011 | $135.00 | 12 | $765,500 | ▨ | 4% |
| Fly by Night | Oct 9, 2011 | $45,500 | 7 | $345,500 | ▨ | 3% |
| Goldman Sachs | Sep 7, 2011 | $129.00 | 11 | $345,500 | ▨ | 2% |
| Time Warner | Nov 11, 2011 | $34.00 | 6 | $45,500 | ▨ | 2% |
| 247 Jets | Sep 7, 2011 | $87.00 | 11 | $245,500 | ▨ | 2% |

Sales Reports Sales Person
FIG. 34

Sales Report Location View 1

Sales Report Location View 2

Sales Mobile Home Screan

Sales Mobile Calendar

Sales Mobile Calendar

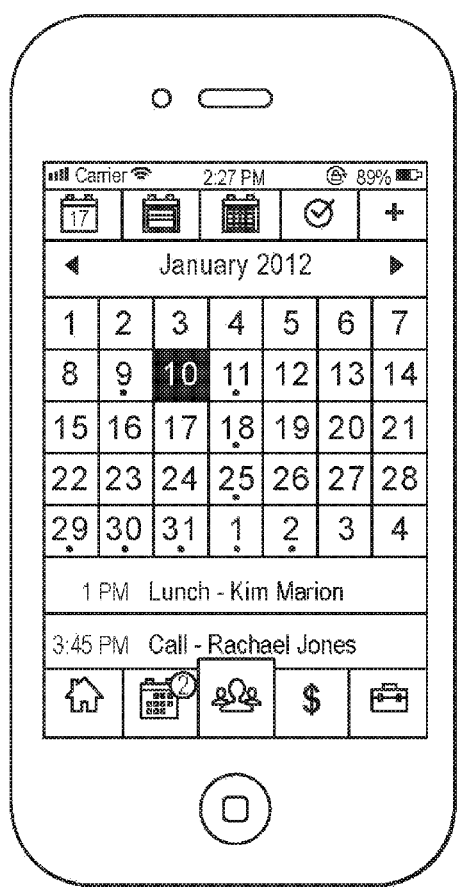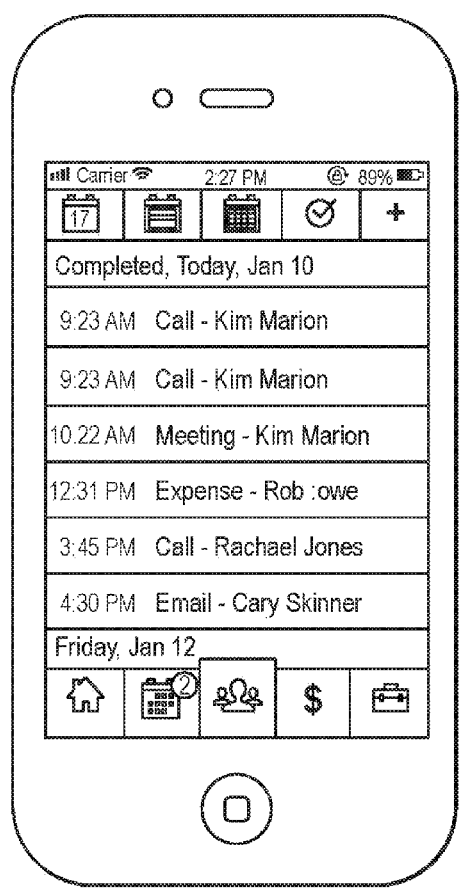
Sales Mobile Calendar
FIG. 38C
Sales Mobile Calendar
FIG. 38D Sales Mobile New Event Sales Mobile New Event

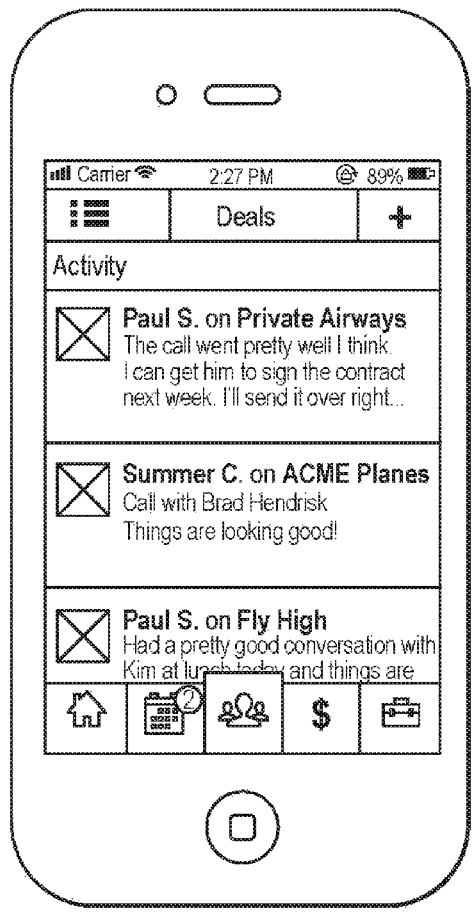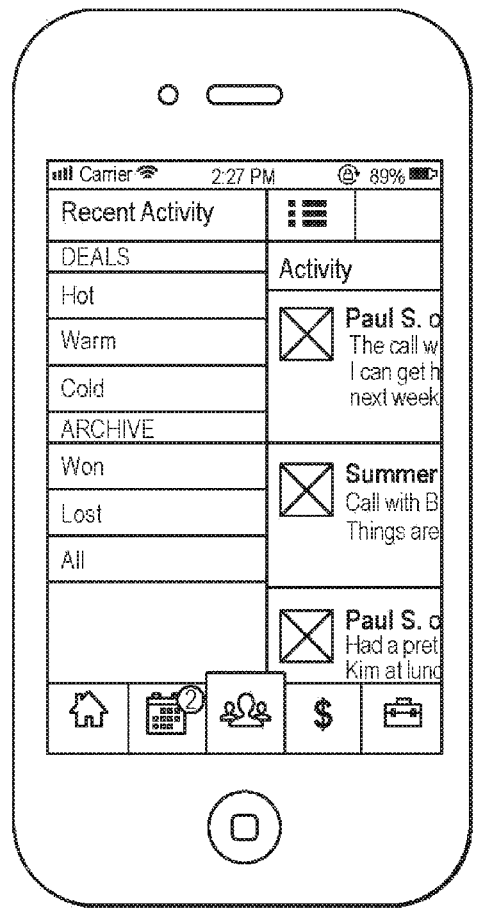
Sales Mobile Deals and Filter
FIG. 39A
Sales Mobile Deals and Filter
FIG. 39B Sales Mobile Deals and Filter Sales Mobile Deals and Filter Sales Mobile Expenses,
new Expense Sales Mobile Expenses,
new Expense Sales Mobile Expenses, new Expense

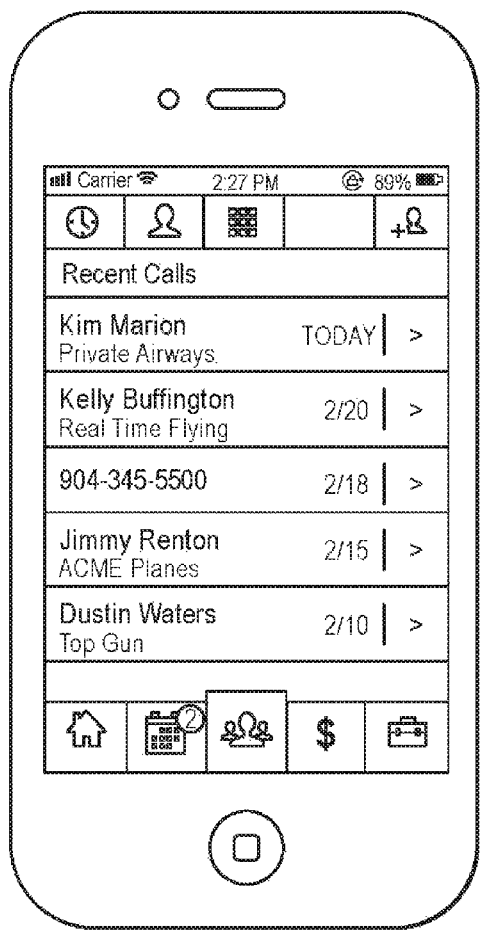 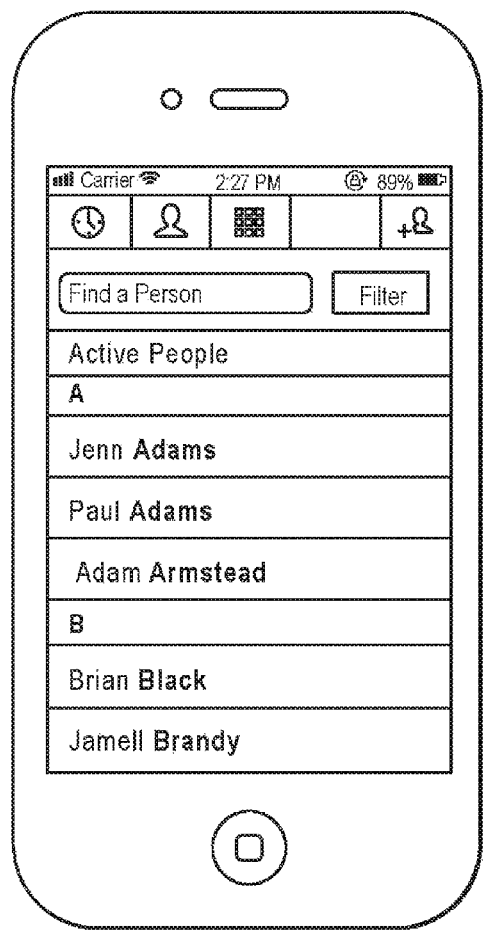
Sales Mobile People and New Lead
FIG. 41A
Sales Mobile People and New Lead
FIG. 41B Sales Mobile People
and New Lead

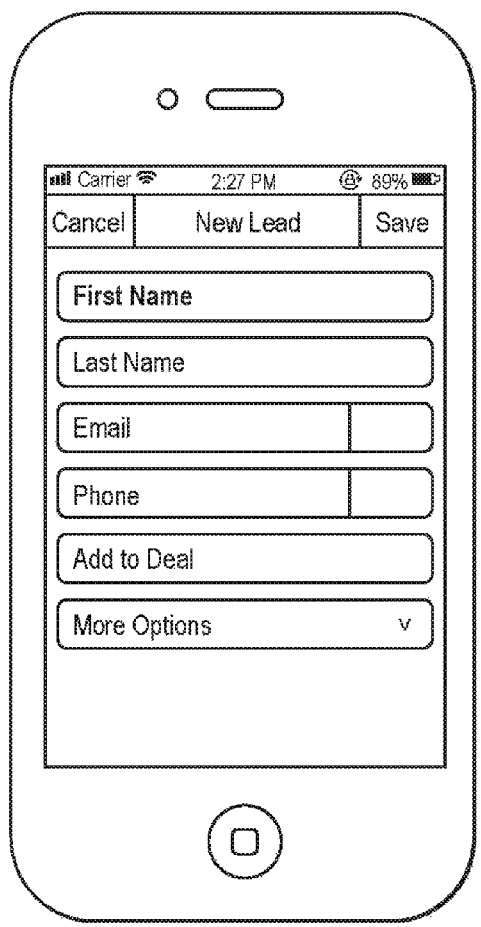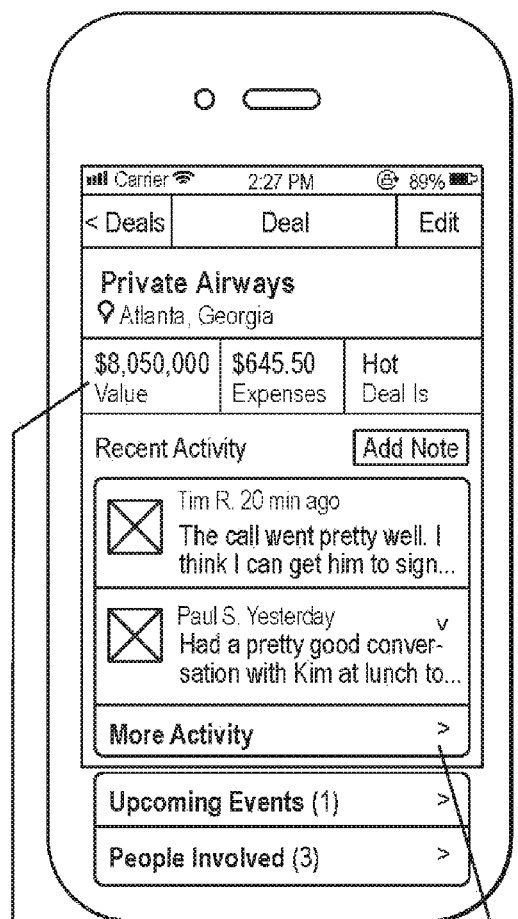
Sales Mobile People and New Lead
FIG. 41D
Sales Mobile People and New Lead
FIG. 41E

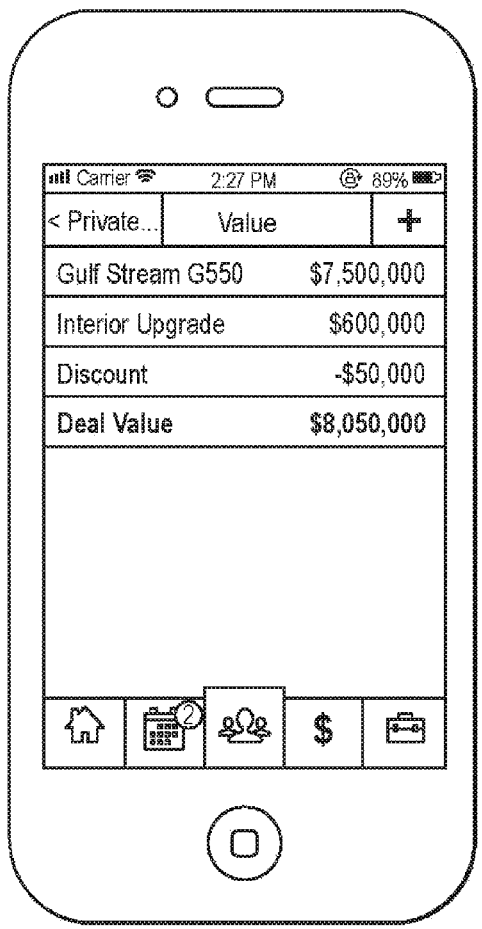 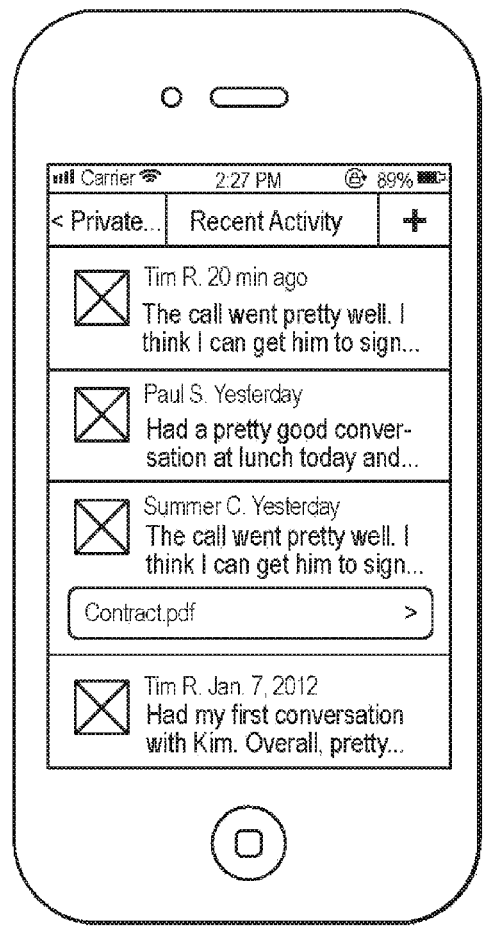
Sales Mobile People and New Lead
FIG. 41F
Sales Mobile People and New Lead
FIG. 41G

MANAGE  DOUG HOSIER  SIGN OUT

⌂ DASHBOARD  ✈ TRIPS  ✈ AIRCRAFT  ▤ EXPENSES  ▤ INVOICES

RECENT COMMENTS

| ☒ Example User | Expense 2013-02-28 165.85<br>I think this app's ready for prime time, ladies and gents. Whuddya... |
| --- | --- |
| ☒ Example User | Expense 2013-02-18 140.00<br>Who doesn't love expenses? |
| ☒ Example User | Expense 2013-02-19 125.00<br>Test |

EXPENSES                                                                      [ADD]

| DATE | PAYEE/DESCRIPTION | AMOUNT |
| --- | --- | --- |
| No pending expenses currently require attention | | |
| Flagged | | Showing 5 of 900 |
| 02/21/2013 | test3 paid to "test3" from [Visa] ▶ | $157.00 |
| 02/20/2013 | Kyle's Expense paid to "Kyle's Expense" from [Accounts Payable] ▶ | $25.00 |
| 02/19/2013 | Sample Expense paid to "Sample Expense" from [Accounts Payable] ▶ | $250.00 |
| 02/19/2013 | test2 paid to "test2" from [Visa] ▶ | $125.00 |
| 02/18/2013 | testMO paid to "testMO" from [Bank Account] ▶ | $140.00 |

TRIPS                                                                         [ADD]

| START DATE | NAME | AIRCRAFT |
| --- | --- | --- |
| Recent | | Showing 5 of 1221 |
| | Pilatus PC12[NO TRIP LEGS]-February 13 2013 | |
| 02/18/2013 | Sample Trip ▶ | N807JH (PC7) |
| 02/18/2013 | testMO | N800JH (G550) |
| 01/27/2013 | January 27 2013-Pilatus PC12-KEGE-KASE-KEGE... | N453PC (PC12) |
| 01/23/2013 | January 23 2013-G550-KEGE-KSDL-KEGE... | N800JH (G550) |
| Flagged | | Showing 5 of 102 |
| 02/18/2013 | Sample Trip ▶ | |
| 11/30/2011 | November 30 2011-Pilatus PC12-KEGE-KASE-0C02-KASE... ▶ | N453PC (PC12) |
| 07/15/2011 | July 15 2011-Pilatus PC12-KEGE-KDIA-KASE-KEGE... ▶ | N453PC (PC12) |
| 10/10/2010 | October 10 2010-G550-KEGE-KASE-KFAR-HELX-OJAM... ▶ | N800JH (G550) |
| 08/27/2010 | August 27 2010-Pilatus PC12-KEGE-KASE-0C02-KEGE... ▶ | N453PC (PC12) |

Aviation Dashboard

FIG. 42

Aviation Manage People

MANAGE   DOUG HOSIER   SIGN OUT

⌂ DASHBOARD | TRIPS | ✈ AIRCRAFT | ▦ EXPENSES | ▤ INVOICES

Categories
People

Companies           [ADD]

CGFS
HCAV
Hosier
J&D
J&E
J&J
LO
MG Aspen

External Companies

4 Winds Investments, Inc.
Gulfstream Aerospace Corporation
Lessee Enterprises

Doug Hosier

---

CGFS                                        [EDIT] [NEW ACCOUNT]

| NAME | TYPE | BALANCE | ACTIONS |
|---|---|---|---|
| Asset | | | 3 accounts |
| Bank Account | Bank | 2,875,686.97 | Edit |
| ~~Petty Cash~~ | Bank | -681.04 | Edit |
| Accounts Receivable | Receivable | -1,438.33 | Edit |
| Liability | | | 5 accounts |
| Accounts Payable | Payable | -12,639.56 | Edit |
| Fuel Burn | Payable | 912,377.83 | Edit |
| American Express | Credit Card | 82,240.72 | Edit |
| ~~Mastercard~~ | Credit Card | 578,433.84 | Edit |
| Visa | Credit Card | 407,593.91 | Edit |
| Equity | | | 0 accounts |

Hide inactive accounts

Aviation Manage Companies
FIG. 44

FIG. 45

Aviation New Account
FIG. 46

| CATEGORIES | | | ADD |
|---|---|---|---|
| CATEGORY NAME | | TYPE(S) | ACTIONS |
| Income | | | 3 categories |
| Flight time | | Income | Edit |
| Pilot time | | Income | Edit |
| Reimbursed expenses | | Income | Edit |
| Expense | | | 60 categories |
| Advertising | | Expense | Edit |
| Airline tickets | | Expense | Edit |
| Avionics | | Expense | Edit |
| Breakfast | | Expense | Edit |
| Catering | | Expense | Edit |
| Cleaning/Aircraft | | Expense | Edit |
| Cleaning/Dry | | Expense | Edit |

Aviation Manage Categories-Categories

FIG. 47A

FIG. 47B
Aviation Manage Categories-Add New Category

DASHBOARD | TRIPS | AIRCRAFT | EXPENSES | INVOICES    MANAGE  DOUG HOSIER  SIGN OUT

TRIPS                                                                    [ ADD ]   🔍

1221 TRIPS

| START DATE | NAME | AIRCRAFT |
|---|---|---|
| | Pilatus PC12[NO TRIP LEGS]-February 13 2013 | |
| 02/18/2013 | Sample Trip 🏷 | N807JH (PC7) |
| 02/18/2013 | testMO | |
| 01/27/2013 | January 27 2013-Pilatus PC12-KEGE-KASE-KEGE-January 27 2013 (Hosier) | N800JH (G550) |
| 01/23/2013 | January 27 2013-G550-KEGE-KSDL-KEGE-January 27 2013 (Hosier) | N453PC (PC12) |
| 01/23/2013 | January 27 2013-Pilatus PC12-KEGE-KASE-KEGE-January 23 2013 (Hosier) | N800JH (G550) |
| 01/10/2013 | January 10 2013-Pilatus PC12-KEGE-KASE-KEGE-January 10 2013 (J&J) | N453PC (PC12) |
| 12/20/2012 | December 20 2012-Pilatus PC12-KEGE-KASE-KEGE-December 20 2012 (LO/SIFL) | N453PC (PC12) |
| 12/19/2012 | December 20 2012-G550-KEGE-KVNY-KEGE-December 20 2012 (LO/SIFL) | N800JH (G550) |
| 12/07/2012 | December 20 2012-Pilatus PC12-KEGE-KASE-KEGE-December 07 2012 (J&J) | N453PC (PC12) |

Aviation Trip List
FIG. 48

MANAGE  DOUG HOSIER  SIGN OUT

| DASHBOARD | TRIPS | AIRCRAFT | EXPENSES | INVOICES |

DECEMBER 02 1012-PILATUS PC 12-KEGE-KASE-KEGE-DECEMBER 02 2012 (J&J)　　[ EDIT ]

See expenses related to this trip

| | |
|---|---|
| DESCRIPTION | pick up in Aspen for trip to Savannah in G550 |
| DATES | 12/02/2012 - 12/02/2012 |
| AIRCRAFT | N453PC (PC12) |
| LEGS | KEGE>KASE>KEGE |
| CREW | Gerald Hosier, Dave Farris |
| PASSENGERS | None |
| LESSEES | None |
| ATTACHMENTS | This Trips has no attachments |

No Flags

⊕ ADD A FLAG

Legs

| 1 | From | To | Aircraft/Lessee |
|---|---|---|---|
| | Eagle County Regional Airport [KEGE, EGE] 12/02/2012 | Aspen-Pitkin Co/Sardy Field [KASE, ASE] 12/02/2012 | N453PC (PC12) None |
| | Passengers None | Pilots Gerald Hosier Dave Farris | Flight Details Engine hours: 0.3 Distance: 25 nm |

| 2 | From | To | Aircraft/Lessee |
|---|---|---|---|
| | Aspen-Pitkin Co/Sardy... [KASE, ASE] 12/02/2012 | Eagle County Regional Airport [KEGE, EGE] 12/02/2012 | N453PC (PC12) None |
| | Passengers None | Pilots Gerald Hosier Dave Farris | Flight Details Engine hours: 0.3 Distance: 25 nm |

Aviation Awarnys Trip View

FIG. 49A

Aviation Awarnys Trip View

| | MANAGE DOUG HOSIER SIGN OUT |
|---|---|
| ⌂ DASHBOARD \| ⚙ TRIPS \| ✈ AIRCRAFT \| ▤ EXPENSES \| ▦ INVOICES | |
| EXPENSES for trip *01/23/2013-January 23 2013-Pilatus PC12-KEGE-KASE-KEGE-January 23 2013 (Hosier)* | [ ADD ]  🔍 |

2 EXPENSES     TOTAL $181.78

| DATE | PAYEE / DESCRIPTION | STATUS | AMOUNT | |
|---|---|---|---|---|
| 01/31/2013 | Atlantic paid to "Atlantic" from [Accounts Payable] | Accepted | $56.00 | ▣ |
| 01/23/2013 | Vail Valley Jet Center (Fuel Burn) paid to "Vail Valley Jet Center (Fuel Burn)" from [Fuel Burn] ▶ | Accepted | $127.78 | ▣ |

2 expenses     Total $181.78

Aviation Awarnys Expenses Related to a Trip

FIG. 50

Aviation Awarnys New Trip
FIG. 51

MANAGE  DOUG HOSIER  SIGN OUT

⌢ DASHBOARD | ⛢ TRIPS | ✈ AIRCRAFT | ▦ EXPENSES | ▦ INVOICES

TRIPS                                                                    ADD  ⌕

| Description |              | ☐ Trip Start Date | to | ☐ Trip End Date |
| ○ Location  |              | Aircraft          |    |                 |
| Flag Status |              | Pilot             |    |                 |
| Passenger   |              | Invoicee          |    |                 |

SEARCH

Close

Aviation Awarnys Trip Filter
FIG. 52

| | MANAGE DOUG HOSIER SIGN OUT |
|---|---|
| ⌂ DASHBOARD \| ▦ TRIPS \| ✈ AIRCRAFT \| ▦ EXPENSES \| ▦ INVOICES | |
| AIRCRAFT | ADD |

ACTIVE AIRCRAFT

| MAKE | MODEL | TAIL NUMBER |
|---|---|---|
| | All | |
| Gulfstream | G550 | N800JH |
| Gulfstream | G650 | |
| Pilatus | PC12 | N453PC |
| Pilatus | PC7 | N807JH |
| Stemme | S10 | N917BA |

INACTIVE AIRCRAFT ▶

Aviation Awarnys Active Aircraft
FIG. 53

🏠 DASHBOARD | 🔢 TRIPS | ✈ AIRCRAFT | ▤ EXPENSES | ▤ INVOICES   MANAGE  DOUG HOSIER  SIGN OUT

N807JH (PILATUS PC7)   [ EDIT ]

| | |
|---|---|
| Owned by | J&J |
| Rate | $0 / hr |
| Carrying capacity | 0 lbs |
| Fuel capacity | 0 gal |
| Serial number | 498 |
| Attachment(s) | This aircraft has no attachments |

See expenses related to this aircraft

Aviation Aircraft View

FIG. 54

MANAGE  DOUG HOSIER  SIGN OUT

⌂ DASHBOARD | ▦ TRIPS | ✈ AIRCRAFT | ▤ EXPENSES | ▤ INVOICES

NEW TRIP                                    SAVE

Owned by     [Owner ▾]
Make         [            ]
Model        [            ]
Tail number  [            ]
Serial number [           ]
Carrying capacity [     ] lbs
Fuel capacity     [     ] gal
Rate         [$     ] / hour
Attachment(s) [Choose File] No file chosen ☐ I have flight information
☐ I have purchase information
☐ I have sale information Aviation New Aircraft
FIG. 55

| DASHBOARD | TRIPS | AIRCRAFT | EXPENSES | INVOICES | | MANAGE DOUG HOSIER SIGN OUT |

EXPENSES

8683 EXPENSES | | | ADD | 🔍
TOTAL $11,783,511.53

| DATE | PAYEE / DESCRIPTION | STATUS | AMOUNT |
|---|---|---|---|
| 02/28/2013 | test adding expense invoicee after mark as complete paid to "test adding expense invoicee after mark as complete" from... | Accepted | $165.85 |
| 02/21/2013 | test3 paid to "test3" from [Visa] | Accepted | $157.00 |
| 02/20/2013 | Kyle's Expense paid to "Kyle's Expense" from [Accounts Pay... | Accepted | $25.00 |
| 02/19/2013 | test2 paid to "test2" from [Visa] | Accepted | $125.00 |
| 02/19/2013 | Sample Expense paid to "Sample Expense" from [Accounts... | Accepted | $250.00 |
| 02/18/2013 | testMO paid to "testMO" from [Bank Account] | Accepted | $140.00 |
| 02/15/2013 | Honeywell Commercial paid to "Honeywell Commercial" from... | Accepted | $1,500.00 |
| 02/13/2013 | Hertz paid to "Hertz" from [Visa] | Accepted | $161.34 |
| 02/13/2013 | Courtyard by Marriott paid to "Courtyard by Marriott" from [Visa] | Accepted | $10.92 |
| 02/13/2013 | Courtyard by Marriott paid to "Courtyard by Marriott" from [Visa] | Accepted | $344.34 |

Aviation Expenses List
FIG. 56

Aviation Expense Filter
FIG. 57

MANAGE  DOUG HOSIER  SIGN OUT

⌂ DASHBOARD | 📖 TRIPS | ✈ AIRCRAFT | 📧 EXPENSES | 📄 INVOICES

| EXPENSE | [EDIT] |

Honeywell Commercial

| | |
|---|---|
| AMOUNT | $1,500.00 |
| EXPENSED BY | Dave Farris on 02/15/2013 |
| PAYMENT STATUS | Paid from CGFS > Visa on 02/18/2013 |
| PAYEE | Honeywell Commercial |
| ENTERED BY | Example User on 02/15/2013 |
| RECEIPTS | XM Weather G550 2013.pdf |

Line Items

DETAIL                                           TOTAL $1,500.00

| CATEGORY | DESCRIPTION | QTY. | AMOUNT |
|---|---|---|---|
| N800JH (G550) | | | |
| Avionics | XM weather subscription for 550 | 1 | $1,500.00 |
| | | TOTAL | $1,500.00 |

Flags ⚑

⊕ ADD A FLAG

☐ Flagging                                       02/18/2013

People

⊕ ADD & REMOVE PEOPLE

[ Dave Farris ]    [ Example User ]

Aviation Expense View

FIG. 58A

| Comments |
|---|

Enter a comment...

⊕ ADD COMMENT

There are no comments yet.

| History (3 Items) |
|---|

🖉 02/18/2013   Example User edited this expense

• Date paid set to 2013-02-18

⚑ 02/18/2013   this expense added flag: "Flagging"

🖉 02/15/2013   Dave Farris created this expense

🗑 Delete this expense

Aviation Expense View

FIG. 58B

Aviation Expenses Attachment View
FIG. 59

MANAGE  DOUG HOSIER  SIGN OUT

| ⌂ DASHBOARD | 🛏 TRIPS | ✈ AIRCRAFT | 🖃 EXPENSES | 🗐 INVOICES |

NEW EXPENSE  [SAVE]

Payee [_____]
Expense date [▢]
Amount [$_____]
Location [◯_____]
Expensed by [Doug Hosier ▼]
Receipt(s) [Choose File] No file chosen This expense is [Paid ▼]

Account [Select an account ▼]
  used
  pay
  Date paid [▢]
  Invoicee [Select an invoicee ▼]

▤ Line Items     TOTAL $0.00

| CATEGORY | DESCRIPTION | QTY. | AMOUNT | | | 🗑 |
|---|---|---|---|---|---|---|
| [Category] | [Description] | [Qty] | [$ Amount] | ⇌ | ... | 🗑 |

TOTAL $0.00

⊕ NEW LINE ITEM

Aviation New Expense

Aviation Expense Association

DASHBOARD | TRIPS | AIRCRAFT | EXPENSES | INVOICES     MANAGE   DOUG HOSIER   SIGN OUT

INVOICES

[ADD] 🔍

586 INVOICES     TOTAL $10,234,484.43 ($-2,462.10 UNPAID)

| STATUS | DUE | FROM | TO | AMOUNT | PAID | BALANCE |
|---|---|---|---|---|---|---|
| Paid | | HCAV | Gerald Hosier | 22,100.00 | 22,100.00 | 0.00 |
| Paid | | CGFS | Gerald Hosier | 3,883.98 | 3,883.98 | 0.00 |
| Paid | | CGFS | Gerald Hosier | 7,031.19 | 7,031.19 | 0.00 |
| Paid | | CGFS | Gerald Hosier | 178.57 | 178.57 | 0.00 |
| Paid | | CGFS | Gerald Hosier | 67,672.00 | 67,672.00 | 0.00 |
| Paid | | CGFS | Gerald Hosier | 359.66 | 359.66 | 0.00 |
| Paid | | HCAV | Gerald Hosier | 118,300.00 | 118,300.00 | 0.00 |
| Paid | | HCAV | Gerald Hosier | 7,150.00 | 7,150.00 | 0.00 |
| Paid | | CGFS | Gerald Hosier | 152.73 | 152.73 | 0.00 |
| Paid | | CGFS | Gerald Hosier | 1,228.55 | 1,228.55 | 0.00 |
| Paid | | CGFS | Gerald Hosier | 179.20 | 179.20 | 0.00 |

Aviation Invoice List

FIG. 62

⌢ DASHBOARD | 🎲 TRIPS | ✈ AIRCRAFT | 🗐 EXPENSES | 🗐 INVOICES    MANAGE  DOUG HOSIER  SIGN OUT

INVOICES                                                                    🔍  ADD

[ Status       ▾ ]      [ ☐ From Date Sent ]    to    [ ☐ To Date Sent ]

[ Sent from          ▾ ]     [ Select an invoicee         ]

[ $ Amount           ▾ ]

[ Trip               ▾ ]                                    [ SEARCH ]

Close

Aviation Invoice Filter

FIG. 63

MANAGE  DOUG HOSIER  SIGN OUT

⌂ DASHBOARD | ▥ TRIPS | ✈ AIRCRAFT | ✉ EXPENSES | ⊟ INVOICES

INVOICE

| | | |
|---|---|---|
| FROM | CGFS | PAID |
| TO | Gerald Hosier | |
| DESCRIPTION | | |
| TERMS | Upon receipt | |
| SENT | 01/27/2013 | |
| DUE | 01/27/2013 | |
| AMOUNT | $7,031.19 | |

Line Items

| ITEM | CATEGORY | QUANTITY | ATTACHMENTS | CHARGE |
|---|---|---|---|---|
| 11/01/2012 - November 01 2012-G550-KEGE-KRDM-KEGE-November 01 2012 (Hosier) | | | | |
| Heidi's Brooklyn Deli<br>Expensed on 2012-11-01<br>(Catering) | Reimbursed expenses | 1 | | $2.16 |
| Butler Aircraft<br>Expensed on 2012-11-01<br>(Landing Fees) | Reimbursed expenses | 1 | | $100.00 |
| Vail Valley Jet Center<br>(Fuel Burn)<br>Expensed on 2012-11-01<br>(Fuel) | Reimbursed expenses | 1 | | $6,929.03 |

Aviation Invoice

FIG. 64A

Comments

Enter a comment...

⊕ ADD COMMENT

There are no comments yet.

History (0 Item)

There is no activity yet.

Aviation Invoice

FIG. 64B

Aviation New Invoice
FIG. 65

Dashboard

Aviation Mobile Dashboard
New Trip or Expense Form Dashboard

Trip Detail

Aviation Mobile Expense Detail (1)

Aviation Mobile Expense Detail (2)

Aviation Mobile Expense List

Aviation Mobile Expense List

Aviation Mobile Trips List

Aviation Mobile Trips List

Aviation Mobile New Expense

FIG. 72A

Aviation Mobile New Expense

FIG. 72B

Aviation Mobile New Expense

Aviation Mobile New Expense

Aviation Mobile New Expense

Aviation Mobile New Expense

Aviation Mobile New Trip

Aviation Mobile New Trip

Aviation Mobile New Trip

Aviation Mobile Settings, Profile and Edit Profile

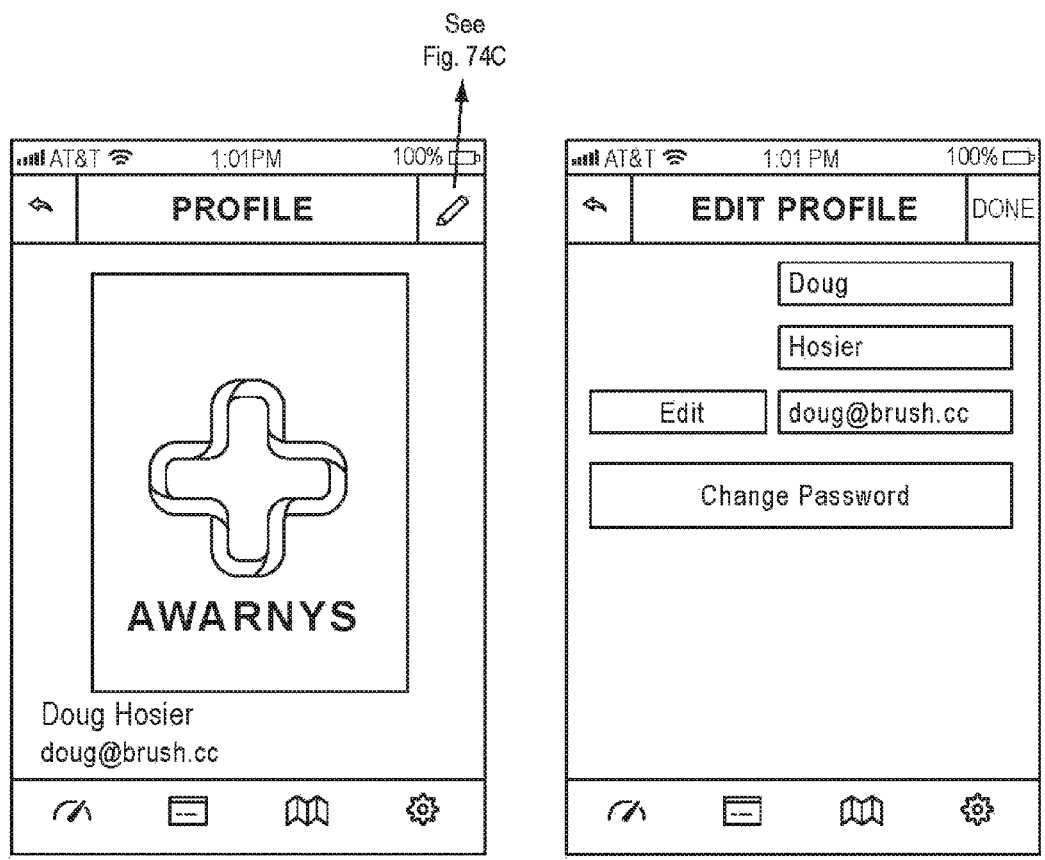

ONLINE SYSTEMS AND METHODS FOR ADVANCING INFORMATION ORGANIZATION SHARING AND COLLECTIVE ACTION

CROSS-REFERENCE TO RELATED APPLICATION

This application is a continuation of U.S. application Ser. No. 14/202,115, filed Mar. 10, 2014, which claims the benefit of the filing date under 35 U.S.C. § 119(e) of U.S. Provisional Application Ser. No. 61/778,345, filed Mar. 12, 2013. All of the above referenced Applications and Patents are herein incorporated by reference in their entirety for all purposes.

COPYRIGHT AND TRADEMARK STATEMENT

A portion of the disclosure of this patent document contains material that is subject to copyright protection. The copyright owner has no objection to the facsimile reproduction by anyone of the patent document as it appears in the Patent and Trademark Office patent records, but otherwise reserves all copyright rights. Several trademarks are identified and used in this application. All rights to such trademarks are fully reserved to the trademark owner.

FIELD OF THE INVENTION

The invention relates generally to mobile "smart" phones, tablet and other computers with communications capabilities, to "apps" stored on and useful in such devices, the processes performed by such apps, and to cloud based "software as a service" and similar platforms, methods and systems particularly suited for interaction with such devices.

BACKGROUND AND DESCRIPTION OF RELATED ART

The advent and stunning growth in popularity of "smart" mobile phones, mobile tablet computers and similar devices has led in turn to the development of hundreds of thousands of "apps," shorthand for software applications, that users may have preinstalled on their mobile devices or which users may selectively download to their devices from an internet "store" or other remote location. Many such apps perform highly targeted, specific tasks beneficial to the user. This mobile technology has, among other things, offered users the opportunity to conduct myriad business and personal activities in a timely fashion while "on the go."

Some apps are wholly resident on the user's device, but often the most useful are those that involve a user interface resident on the mobile device for enabling the local performance of certain functions as well as communication over the internet (or via cell phone systems) to other such devices and to remote computer services where, among other things, information is stored (often in relational database management systems), selectively retrieved and processor intensive activities, difficult computations and other complex functions, such as voice recognition and response, e.g. Apple's Siri program, are individually performed for thousands, even millions, of people, so-called "cloud computing." Companies, such as Akamai, Amazon, Microsoft and Google, operate enormous cloud computing facilities in diverse locations with high levels of redundancy and security to provide reliable and private computer services for individuals and businesses, small and large, simple and complex.

The combination of mobile phones, mobile tablet computers and the like with apps and cloud computing centers has created a highly customizable platform that has led to a burst of innovation, but much remains to be done to take full advantage of the opportunities offered by these technologies.

Cloud computing has allowed owners of multiple phones, tablets and computers to centralize their data so that it is concurrently and equally available on all of the user's devices, while enabling the off-loading of complex software, microprocessor intensive computations, data analysis and other demanding computer tasks and vast information storage requirements from individual devices to the cloud. With cloud computing, selectively sharing of information with any number of third-parties has also become more convenient and far more prevalent, the well-known Google docs and Google sites applications being familiar examples of ways of creating, storing and selectively sharing a wide range of information with others. There are many other familiar examples of the creating and sharing of information via the internet including the so-called "social applications," such as Facebook and Google+, that enable users to connect to their "friends" and share information with them.

While social and many other apps, particularly mobile versions, have become extremely popular and highly useful, they still suffer many shortcomings. For example, the familiar social networks are centered on people talking about themselves and personal relationships, that is, "friends," what friends "like," what friends are doing and so on. Users of social apps may receive unsolicited invitations to "friend" people that are mere acquaintances or less. Many "friends" post banal or inane activities focused on themselves, or matters of interest to only a few within their circle of friends, yet all such posts are typically made equally available to all "friends," whether the information is wanted or not. A recent study of social media by the Pew Research Center's Internet and American Life Project supports these conclusions. See Rainie et al., "Coming and Going on Facebook," Pew Research Internet Project (Feb. 5, 2013) available at http://www.pewinternet.org/2013/02/05/coming-and-going-on-facebook/.

Not all "friends" are equal in stature, nor are all "friend" associations of a similar kind; family relationships are far different than neighborhood friends, bike club, business, hobby or rotary club "friends," and so on. In short, irrelevant information and too much information, that is, information overload, are common problems with such social networks, particularly when sharing is on matters of fleeting, trivial or no interest to most of one's "friends," plus friends change over time for many reasons.

The social network "friend" model fails to recognize that there are many important and highly useful interactions between individuals who are not "friends" in the traditional sense and, indeed, who may not even know one another. Common affinities of various kinds create different, but significant interpersonal bonds or relationships, like stamp collecting, piloting aircraft, college fraternity alumni groups and endless more. Further, in the social network "friend" model, as the number of "friends" increases, the number and complexity of a person's relationships grows geometrically. Facebook allows users to have up to 5000 friends. This has mind boggling implications since a group of five people has a total of 10 bilateral relationships between its members; a group of 20 has 190; and a group of 50 has 1,225. This has led evolutionary anthropologists to posit 150 people as the upper limit of "friends" for human beings, the so-called "Dunbar Number," named after famed primatologist and evolutionary psychologist, Robin Dunbar. Friend based social networks are struggling, so far with little success, to cope with these realities. See Bennett, "The Dunbar Number, From the Guru of Social Networks," Bloomberg Businessweek (Jan. 10, 2013) available at http://www.businessweek.com/printer/articles/90538-the-dunbar-number-from-the-guru-of-social-networks The social network business model (and that of many other internet companies) is to offer free services while covertly gathering and utilizing personal information of individual users, including even their location at the moment, to direct commercial advertising to them, often whether they wish it or not. Profiles of individuals, their interests, etc. are constructed by intercepting and aggregating the user's personal information obtained from the user's interaction with the company's often free internet services. Such collection and commercial use of personal information has created substantial controversy and prompted legislative efforts to curb such use and protect individual privacy. There is an inherent tension between the business model of the "friend" based social networks, and the desires of their members or users.

This inherent tension likewise exists between users and many other internet business models. For example, Google, and other search engines, offer free search and other free or low cost internet services, which are supported by advertising income. Google relies on user search requests as a proxy for what advertising the user might find of interest, although many searches are not motivated by discovering something to purchase. Over time, ever more detailed profiles of individuals are constructed and stored in an attempt to target advertising more effectively, but there is no telling how this personal information ultimately may be used or disclosed to the detriment of the individual. Paid advertisements are displayed with each search request, whether wanted or not, and often prioritized by which advertiser pays the most, rather than by a user interest criteria. In some search models, the search results even include paid ads as prioritized search responses.

Countless other web businesses also rely on gathering, storing and utilizing personal information of users to advance their commercial or other goals. Not surprisingly, such advertising models are also typically inefficient as often only a low percentage of people doing searches or taking other actions actually clicks on the displayed ads, and even fewer follow through with purchases. The inefficiency is overcome by the low cost of delivering ads, but the invasion of privacy and the intrusiveness to many, to reach a few actual customers, remains.

Current internet business models are also relatively inefficient in providing prospective customers purchase price discounts and in reaching individuals most likely to respond to such discounts with a purchase. Businesses often rely on offering "discounts" to incentivize purchases or to serve as "loss leaders" prompting increased customer traffic that hopefully leads to the sale of profitable goods or services.

Groupon, currently the most popular of the internet electronic discount coupon models, exemplifies such inefficiencies. Groupon offers "deal of the day" discounts on goods and services in the many local markets it serves. Groupon typically telephones local merchants (an expensive practice) to solicit their interest in offering discounts, insisting that the merchant offer prospective customers deep discounts and on substantial quantities of goods or services to make it worthwhile for Groupon to get involved, and requiring that the merchant typically share with Groupon 50% of the discounted sale amount. Thus, a $100 item may be discounted to $50, which the merchant splits equally with Groupon thereby leaving the merchant with $25, a large loss on each sale that can only be recouped if the discounts lead to the development of a broad and loyal customer base at normal pricing. However, as many merchants have publicly reported, the deep discounts frequently result in one time purchases and a devaluation of the merchant's products or services in the eyes of existing customers.

Intermediaries such as Groupon make discount advertising very expensive and relatively inflexible for local merchants. Groupon needs significant lead time for offers and blasts its discount of the day emails in blunderbuss fashion to its broad email list for the relevant geographic area. Recipients often take advantage of the deep discount without becoming loyal repeat customers, which is counterproductive for the merchant. The Groupon model is also not flexible enough to enable, for example, a small restaurant to offer on a Sunday a discount for a Monday evening dinner to the first 20 persons who accept the offer, thereby to potentially fill the restaurant on an otherwise slow evening. The reader will recognize countless other examples where easy to execute, short lead time advertising (that can be quickly changed or discontinued, limited to certain days, hours or numbers of people and so on) serves the interests of the merchant, but is inconsistent with the business models of companies such as Groupon. There is an unmet need for an internet discount model that eliminates expensive intermediaries, enables last minute discounts to be offered and enables the merchants themselves to quickly and easily tailor special deals or discounts to align with their best interests and to reach their desired target audiences far more effectively and far less intrusively than current technologies permit.

There is also an unmet need for more efficient internet based "customer loyalty" and other programs that assist businesses in building loyal and repeat customers. For example, rather than give big discounts to attract new customers, it is often more effective for merchants to grant recurring discounts or the like to existing, repeat customers to reward them for their loyalty and to incentivize their continued loyalty. The major airlines have had success with loyalty programs that reward "frequent flyers" with free flights, but there is presently no satisfactory, low cost way, particularly for small local businesses, to provide internet based loyalty programs that are easy to create and administer, and are effective without being intrusive.

In those apps designed for business use or personal use (e.g., to aid in keeping one organized or the like), the input of information and its transmittal to the appropriate person or group, and its later retrieval as a coherent whole is often cumbersome and inconvenient, particularly where many communications and various attachments may be involved. The popular email programs have this deficiency. Also, many apps have become so targeted that users must jump from one app to another to handle the everyday "business of life," particularly for a person on the go who is engaged in purposeful activity. For example, there are apps for reminders, tasks, notes, calendars, messages (chat, phone, etc.), photos, videos, financial records (e.g., billing invoices and expense records), contacts and so on. The user may have to jump from app to app to utilize the respective functions of each app, even though the user is really dealing with different constituents of the same event or activity, such as salesman keeping track of all he does, and is to do, and with whom in relation to various customers, vendors, his travel expenses, his fellow salespeople and business management. Salesforce.com offers a proprietary model that offers some help, but not a wholly satisfactory solution.

It is often required that one return to and separately search multiple apps simply to retrieve, use and/or share information related to a single event or transaction or to a series of related events and transactions. Even where some logically related information may be stored in a single app, the constituent elements may not be associated. In other words, information that is logically linked and important for an individual or organization to easily access and analyze as linked information becomes balkanized in separate apps or is not linked, even when resident within a single app. Such information is difficult and time consuming to retrieve and to logically re-link in a useful manner. The memory of the user, coupled possibly with individual app search functions, may be the only way to resurrect and associate such information.

For example, even a one person business, such as a lone electrician, may find it helpful to utilize all of the above mentioned apps in relation to one job for one customer from a first call through later communications and meetings, to sending photos or videos of recommended lighting fixtures and their installation, receipt and recordal of customer approvals, expenses incurred, invoicing, payment and sharing of other documentation, like product operating and warranty documents. The next time the electrician gets a call from the same customer for a new job or repairs on the old job, it can be extremely helpful to readily have at hand in a logically organized fashion all of the information from the prior job. In the paper world, the electrician would manually search the customer file, as unsatisfactory as that might be, but in the internet world, he might have an even more difficult task to resurrect pertinent customer information, where the information was generated and electronically recorded "on the go" with one or more mobile devices using multiple web apps.

The inability for the user to easily create, communicate and manage information on a mobile device and to easily resurrect logically associated information is to the great detriment of the individual as well as to the group and, for example, to business management that is unable to timely track organizational activity or recognize important patterns, trends or the like available from the aggregate data, particularly aggregate data available for display, preferably in real time, in a visually informative way, so-called "data visualization." Noted researchers and statisticians, such as Hans Rosling, have demonstrated the extraordinary usefulness of the now well-known techniques of data visualization in making sense out of voluminous and complex data, if the relevant data can be conveniently accessed.

The new, cloud based, mobile app world also offers new opportunities and poses new challenges for materially improving collective action among individuals that are geographically disbursed, yet able to easily communicate and share information through their mobile devices. Collective action is the pursuit of a goal or set of goals by more than one person. It is a term which has formulations and theories in many areas of the social sciences. Much of life, business and personal, inevitably involves collective action. Thus, improving the effectiveness of collective action is important to society.

Much of the science underlying collective action emanates from the work of noted economist, Ronald Coase (http://en.wikipedia.org/wiki/Ronald_Coase). Coase is a British-born American economist and Nobel laureate whose 1937 article "The Nature of the Firm" introduced the concept of transaction costs to explain the nature and limits of firms. In the article, Coase describes how the transaction costs of managing a group impose upper and lower limits on the effectiveness of the group. The lower limit is set where the transaction costs of managing the group are greater than the benefits of the group's goals. This is referred to as the Coasean floor. The upper limit is set where the added benefit of more members is not offset by the transaction cost of managing them or the group becomes so large and complex that they become unmanageable. This is referred to as the Coasean ceiling.

Generally speaking goals that are below the Coasean floor or above the Coasean ceiling "do not get done" or are imposed by governments which make subjective determinations about what goals are deserving, and pay for the transaction costs through tax revenue. These determinations may be influenced by political or other factors and may introduce an inefficiency or distortion with regard to the allocation of resources. The Coasean limits have significant consequences with regard to how society functions. Many worthwhile activities, some with profound consequences, are not undertaken due to the transaction costs involved in organizing and managing groups. In this regard, there are many non-business and semi-business activities beneficial to society where the only reward is personal satisfaction or recognition (status). Providing a low cost (both economic and convenient) platform for these groups to assemble, communicate, share information and otherwise efficiently engage in a manner that advances collective action can open up new areas of endeavor for self-creating and other groups to benefit themselves and society.

Incremental improvements in transaction costs and the consequent improvement in efficiency are consistently pursued by good management and may lower the Coasean floor and raise the Coasean ceiling. However, if transaction costs are reduced and information management improved by an order of magnitude or more, rather than incrementally, the effect is transformative, like a quantum leap. An effective collapse of the Coasean floor and removal of the Coasean ceiling brings within the scope of collective action activities and goals which cannot be practically attained through incremental improvement. There is an opportunity in the digital mobile world, yet unrealized, to materially lower the Coasean floor and materially raise the Coasean ceiling for collective action.

Among the factors important to effective collective action are accountability, i.e., knowing that pertinent records exist and that consequences may ensue from failing to do what should be done, and recognition, i.e., receiving credit for doing things that advance the collective goal, even if such things are not within a person's expected responsibilities, and even if they may demand significant effort or may not be in the self-interest of the individual, but are important to the team. Accountability is advanced by creating and retaining a trail of accountability, i.e., reliable, contemporaneously created records of an individual's pertinent activities easily accessible in real time to team leaders and other members of the team. Effective collective action also requires, among other things, timely communications between all or some members of the group, as appropriate to the situation, the timely sharing of information (including provision of aggregated and analyzed information for group management), and the easy accessibility of reference materials to all needing them in support of the group goals.

SUMMARY OF THE INVENTION AND ITS OBJECTIVES

An objective of the present invention is to provide new, highly versatile and user friendly mobile internet apps and related cloud based platforms that easily scale and provide wide ranging functionality while overcoming the various shortcomings of the prior art including the prior art above described.

It is a objective of the invention to provide new and improved ways for online communities to be formed and to engage without burdening participants.

It is a further invention objective to provide a new and improved social networking model based on user affinities and interests, rather than on the historical model of user "friends."

Another invention objective is provide to new and highly useful ways for creating, recording, organizing, managing, controlling, retrieving, sharing, manipulating and visualizing of many distinct types of online data originating from diverse sources and from diverse individuals and for the selective sharing of such data in various forms, individually or in the aggregate, even in real time, among geographically dispersed individuals who may have an interest or need to receive all or differing parts of the data.

A further object of the invention is to provide new ways of forming, structuring and managing online communities, small and large, in ways to enhance ease of use, to uniquely empower each individual user and to facilitate communication, collective action, accountability and credit among members of an online group or community, be it a family, a small or large group with common interests or goals, or a business, profit or non-profit, with one or thousands of employees.

A further objective of the invention is to facilitate disintermediation in the advertising and commercial marketing of goods and services, that is, the elimination of middlemen, who often contribute little and charge a lot.

An additional objective of the invention is provide new, highly cost efficient ways for businesses and individuals to conduct their own online commercial or other business promotion and advertising including spur of the moment marketing and advertising. The invention enables direct commercial or other advertising by individuals as well as small and large businesses in ways that are both non-intrusive to, and protective of the personal privacy of, the prospective customer, but which makes accessible to the prospective customer those goods and services in which he or she has expressed an interest.

It is an objective of the invention to enable businesses, small and large, local or national, to quickly and easily create, at low cost, online "discount" programs for incentivizing customer purchases and which enable the limiting or conditioning of the discounts according to virtually any criteria deemed by the merchant to be most effective in achieving the merchant's business objectives. The invention also enables advertising charges to be based on the commercial transactions consummated and in proportion to the dollar amount spent or other measure of the transaction value.

It is an object of the invention to provide new ways for creating and administering online, app based "customer loyalty" programs that allow businesses to reward their best customers, i.e., those making regular purchases.

It is an objective of the invention to provide new ways to receive, create and manage data and users' access to it in a way that facilitates spontaneous as well as deliberate formation of distributed groups around a common interest.

An objective of the invention is to deliver new kinds of social and enterprise sharing, interaction and collective action as well as new, highly efficient and non-intrusive models for users to easily discover and monitor groups, enterprises, goods, services, information or activities of interest and, reciprocally, for enterprises and individuals to more effectively access and engage interested and relevant users for commercial, nonprofit or other reasons.

Another object of the invention is to enable users to preserve their privacy, e.g., maintain their anonymity or restrict their identity, to any degree they choose, while at the same time enjoying all of the benefits of accessibility to relevant and pre-selected merchant advertising. Users are provided the opportunity to seek out and/or selectively receive information, commercial advertisements, special business offers and virtually anything of interest or relevance to them.

Per the invention, commercial users, be they individuals, small or large businesses, profit or non-profit, are provided the opportunity to reach relevant potential members or customers without first having to discover their personal identity or email address, and without having to engage in objectionable spam email.

Another object of the invention is to democratize advertising by giving individuals and businesses, large or small, the ability to directly reach relevant potential customers cost effectively and in a way most beneficial to the business and the potential customer.

It is an objective of the invention to provide apps and cloud based platforms that facilitate not only the objectives of each individual user, but facilitate as well collective action and accountability among members of an online group or community, be it a family, a small or large group with common interests or goals, or a business, profit or non-profit, with one or tens of thousands of employees.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings, in which:

FIGS. 3A and 3B are exemplary smartphone wireframe diagrams depicting an enhancement to the first invention embodiment, specifically an improvement relating to the creation, organization and management of related events, activities or the like;

FIGS. 7A and 7B are exemplary smartphone wireframe diagrams depicting additional modifications and enhancements to the first invention embodiment including those relating to make public, place an advertisement, choose templates, user privacy and archive/delete;

FIGS. 7C and 7D schematically depict how the first invention embodiment may be embedded in other applications, for example, web pages and emails as shown in the respective figures;

FIG. 12 is an exemplary wireframe diagram depicted on a tablet computer of a first selectable dashboard page for a second embodiment of the invention, specifically an embodiment having particular utility in the management of projects;

FIG. 13A is an exemplary wireframe diagram depicted on a tablet computer of an optional, but highly useful, second selectable page for such project related second invention embodiment, which second page takes advantage of the features of the first invention embodiment;

FIG. 13B is a diagrammatic depiction of certain exemplary submenu screens selectable from the page of FIG. 13A;

FIG. 15A is an exemplary wireframe diagram depicted on a tablet computer of a fourth selectable "expenses" page of the second invention embodiment;

FIGS. 15B and 15C are diagrammatic depictions of certain submenu screens selectable from the expenses page of FIG. 15A;

FIG. 16A is an exemplary wireframe diagram depicted on a tablet computer of a fifth selectable "invoices" page of the second invention embodiment;

FIGS. 16B and 16C are diagrammatic depictions of certain submenu screens selectable from the expenses page of FIG. 16A;

FIGS. 17A and 17B are, respectively, an exemplary wireframe diagram depicted on a tablet computer of a sixth selectable "reports" page and related submenu screens of the second invention embodiment;

FIGS. 19A and 19B are exemplary wireframe diagrams depicted on a tablet computer of, respectively, the manage users and manage accounts screens of the second embodiment of the invention;

FIGS. 21A and 21B show an exemplary wireframe diagram depicted on a tablet computer of a sales deal overview page and a search screen for the third invention embodiment;

FIGS. 22A and 22B are, respectively, an exemplary wireframe diagram depicted on a tablet computer of a sales deal page for the third invention embodiment and explanatory notations for certain aspects of FIG. 22A;

FIG. 23 is an exemplary wireframe diagram depicted on a tablet computer of a sales deal-products page for the third invention embodiment;

FIG. 24 is an exemplary wireframe diagram depicted on a tablet computer of a sales deal-add products page for the third invention embodiment;

FIGS. 25A and 25B are, respectively, an exemplary wireframe diagram depicted on a tablet computer of a sales leads page for the third invention embodiment and a detailed view of a portion of FIG. 25A;

FIG. 26 is an exemplary wireframe diagram depicted on a tablet computer of a sales deal detail page for the third invention embodiment;

FIG. 29 is an exemplary wireframe diagram depicted on a tablet computer of a sales reports expenses page for the third invention embodiment;

FIG. 31 is an exemplary wireframe diagram depicted on a tablet computer of a sales reports deals page for the third invention embodiment;

FIG. 32 is an exemplary wireframe diagram depicted on a tablet computer of a sales reports products page for the third invention embodiment;

FIG. 34 is an exemplary wireframe diagram depicted on a tablet computer of a sales reports sales person page for the third invention embodiment;

FIGS. 38A through 38F are exemplary wireframe diagrams of the mobile phone version of the third invention embodiment depicting, respectively, four different calendar view screens plus new events screens;

FIGS. 39A through 39D are exemplary wireframe diagrams of the mobile phone version of the third invention embodiment depicting, respectively, a rolling log of sales deals, a sales leads filter, new deal and recent deal activity screens;

FIGS. 41A through 41G are exemplary wireframe diagrams of the mobile phone version of the third invention embodiment depicting, respectively, a recent calls screen, a contacts screen, an individual contact screen populated with information, a new lead screen, a deals screen, a deal value screen and deal activity screen;

FIG. 42 is an exemplary wireframe diagram depicted on a tablet computer of a first selectable dashboard page for a fourth embodiment of the invention, specifically an embodiment having particular utility in the management of aircraft;

FIG. 44 is an exemplary wireframe diagram depicted on a tablet computer of a manage companies screen of the fourth invention embodiment;

Figure 45:
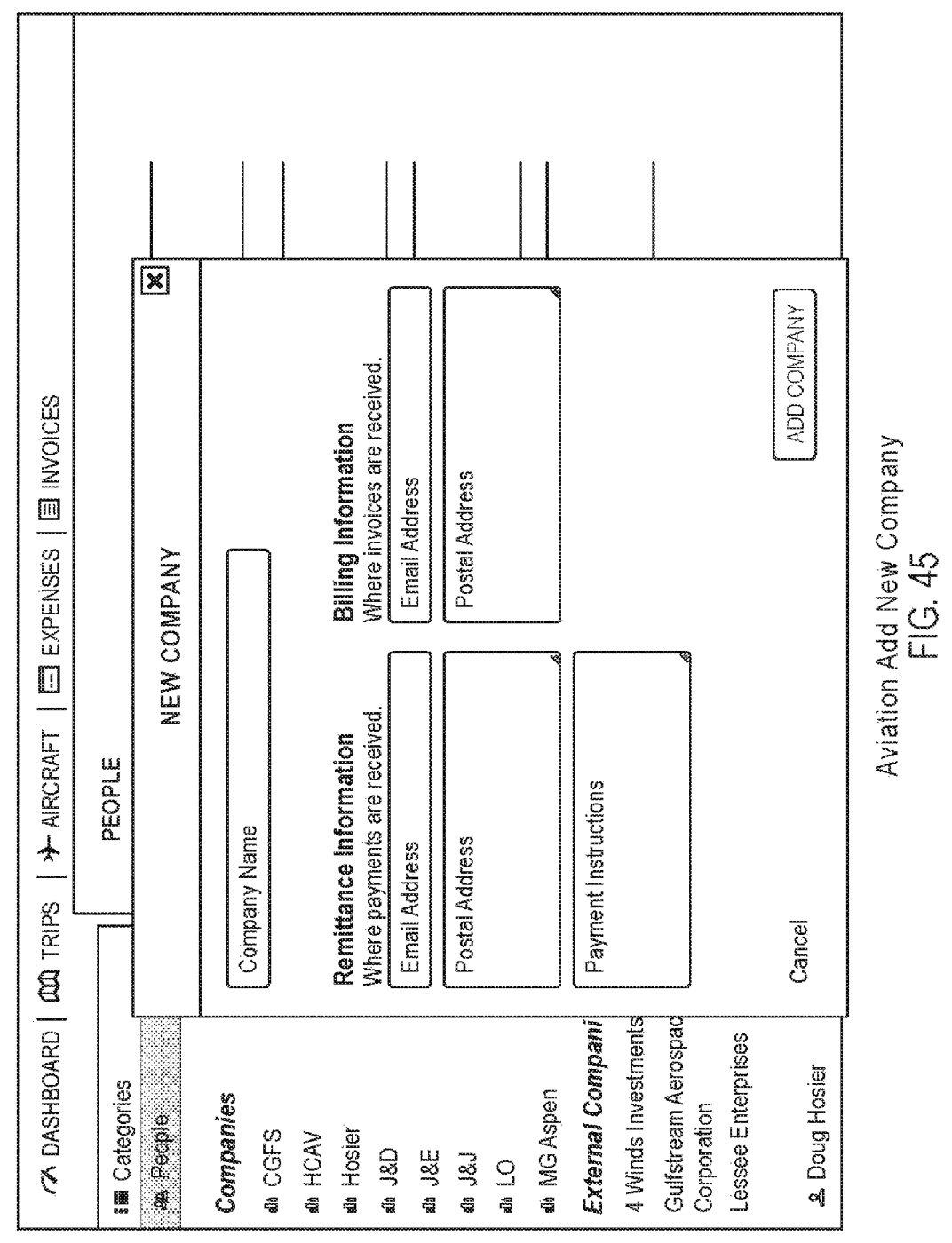

FIG. 45 is an exemplary wireframe diagram depicted on a tablet computer of an add new company screen of the fourth invention embodiment;

Figure 46:
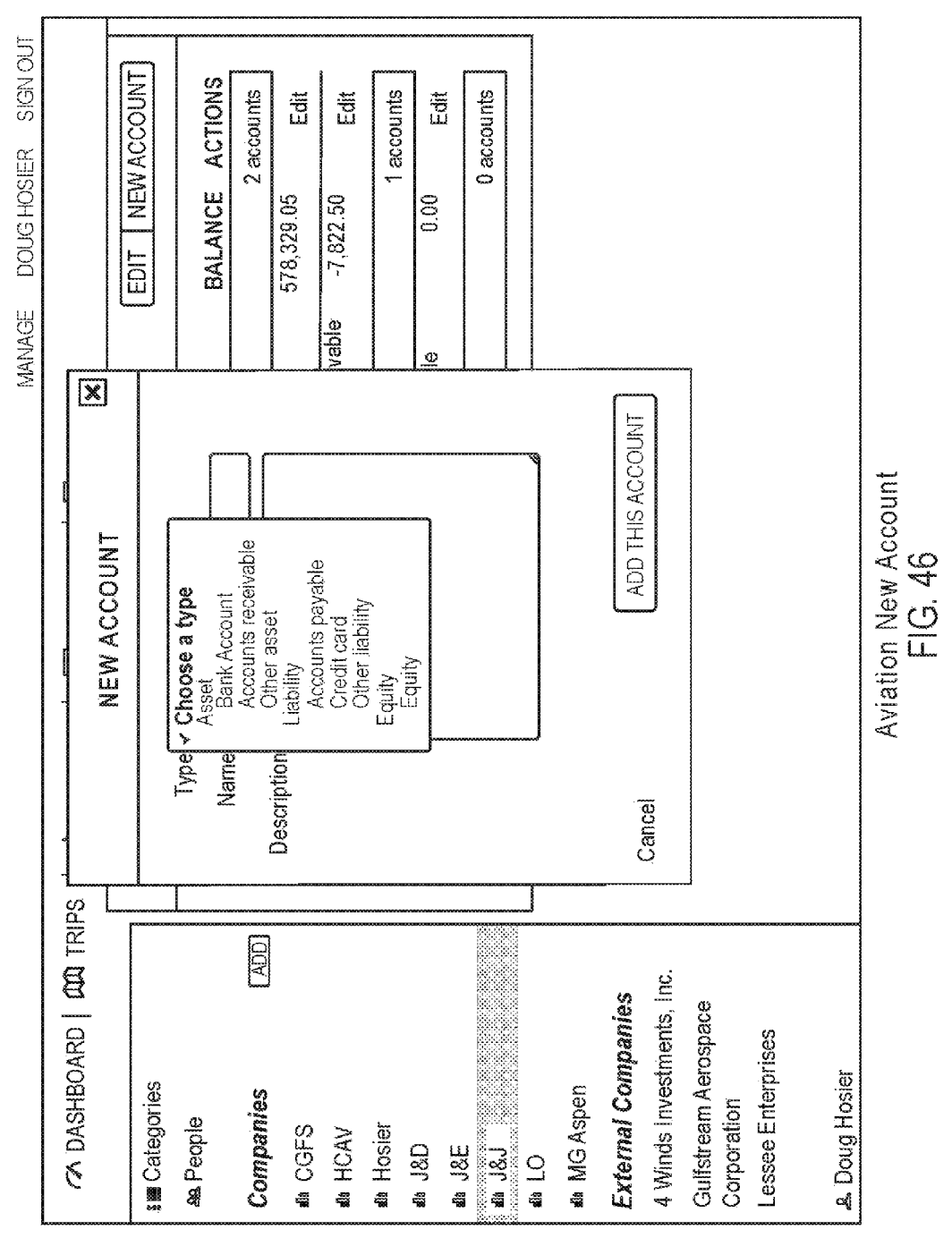

FIG. 46 is an exemplary wireframe diagram depicted on a tablet computer of a new account screen of the fourth invention embodiment;

FIGS. 47A and 47B are, respectively, an exemplary wireframe diagram depicted on a tablet computer of a manage categories (expenses and income) of the fourth invention embodiment and a modal for the new category selection of FIG. 47A;

FIG. 48 is an exemplary wireframe diagram depicted on a tablet computer of a aircraft trips list screen of the fourth invention embodiment;

FIGS. 49A and 49B are, respectively, the top and the bottom portions of a scrollable screen of an exemplary wireframe diagram depicted on a tablet computer of an individual aircraft trip screen of the fourth invention embodiment;

FIG. 50 is an exemplary wireframe diagram depicted on a tablet computer of expenses related to an aircraft trip screen of the fourth invention embodiment;

Figure 51:
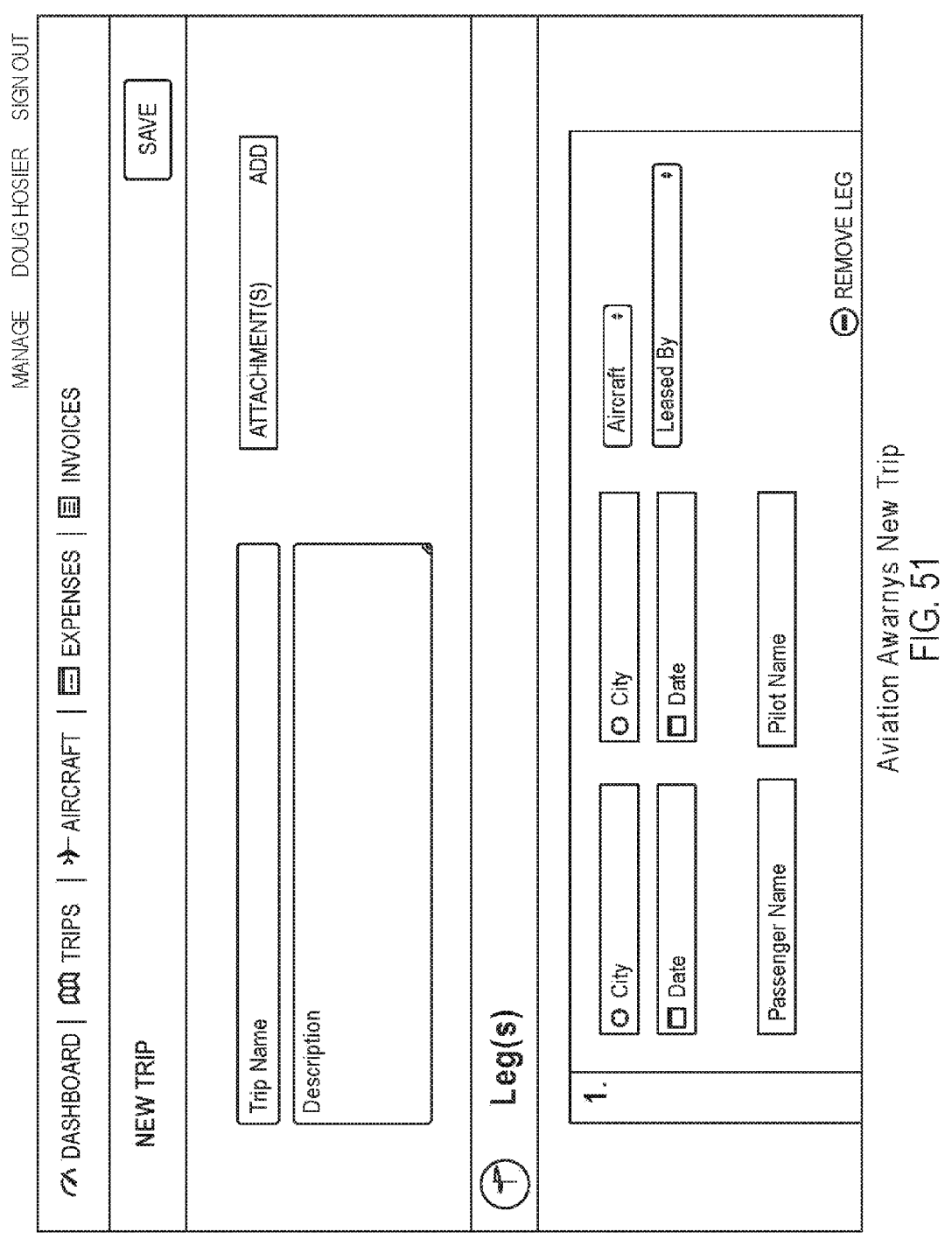

FIG. 51 is an exemplary wireframe diagram depicted on a tablet computer of a new aircraft trip screen of the fourth invention embodiment;

FIG. 52 is an exemplary wireframe diagram depicted on a tablet computer of a trip filter or search screen of the fourth invention embodiment;

FIG. 53 is an exemplary wireframe diagram depicted on a tablet computer of an active aircraft listing screen of the fourth invention embodiment;

FIG. 54 is an exemplary wire frame diagram depicted on a tablet computer of a selected aviation aircraft view of the fourth embodiment of the invention;

FIG. 55 is an exemplary wireframe diagram depicted on a tablet computer of a screen for adding of new aircraft of the fourth invention embodiment;

FIG. 56 is an exemplary wireframe diagram depicted on a tablet computer of the expenses list screen of the fourth invention embodiment;

Figure 57:
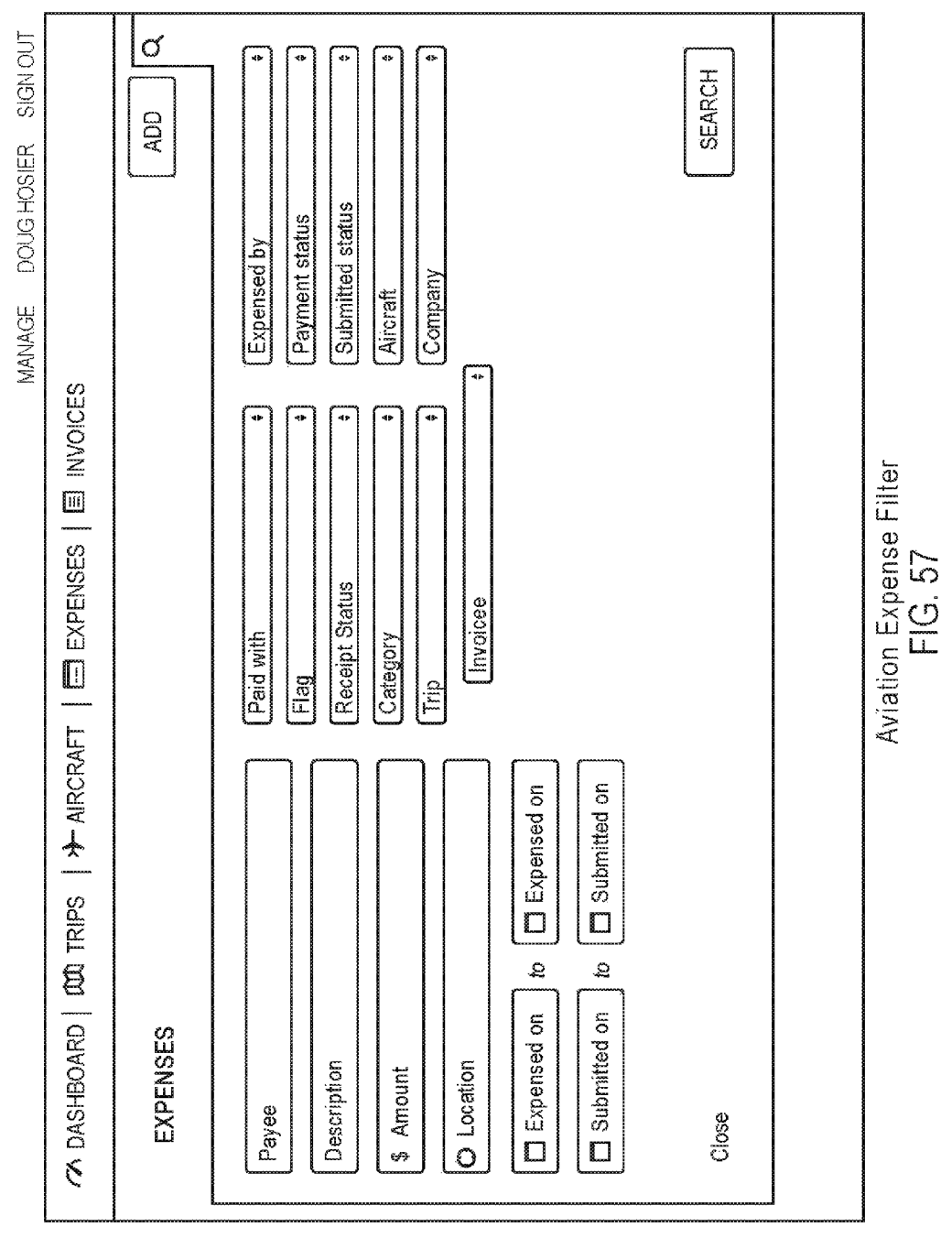

FIG. 57 is an exemplary wireframe diagram depicted on a tablet computer of an expense filter or expense search screen of the fourth invention embodiment;

FIGS. 58A and 58B are, respectively, the top and bottom portions of a scrollable screen of an exemplary wireframe diagram depicted on a tablet computer of an individual expense screen of the fourth invention embodiment;

Figure 59:
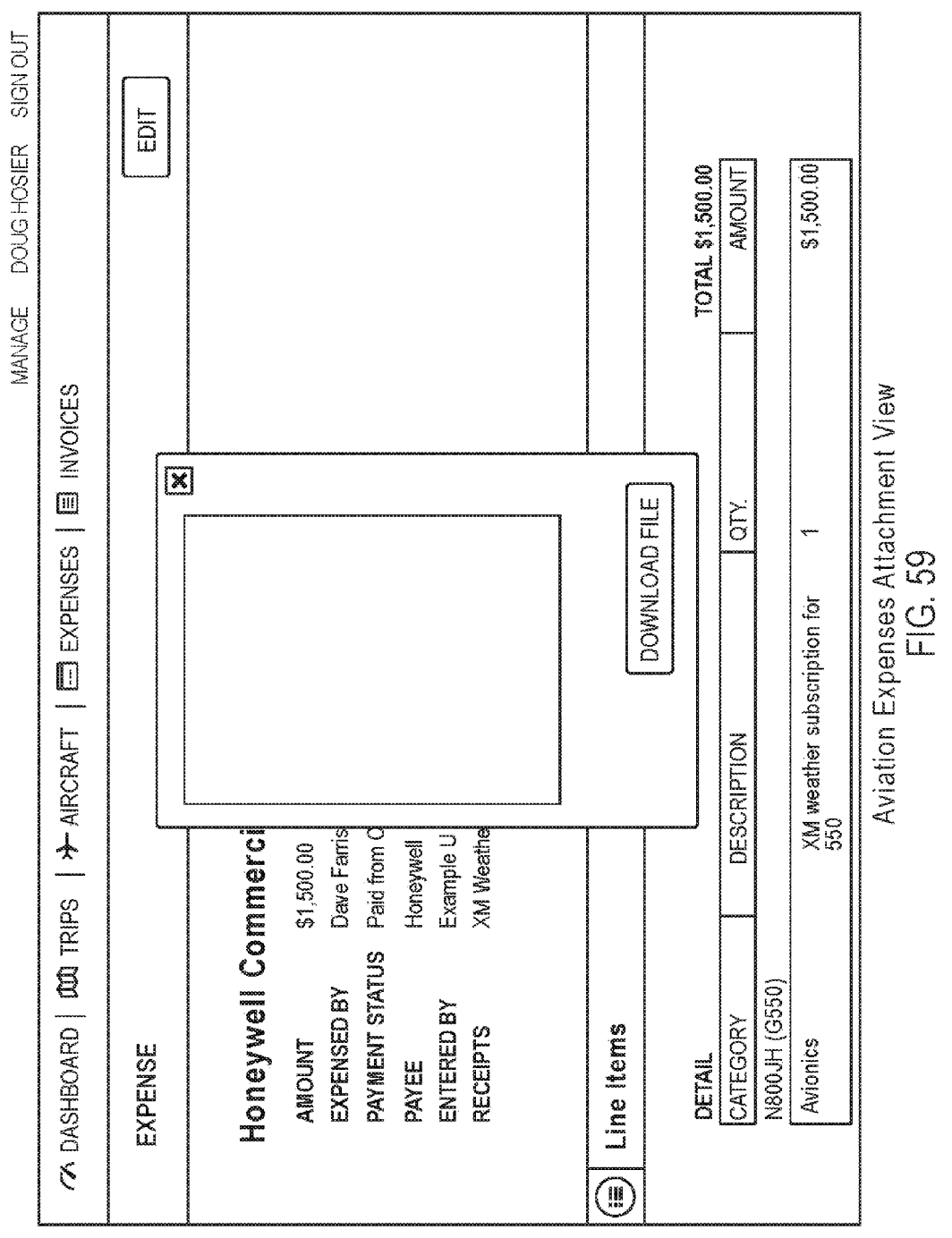

FIG. 59 is an exemplary wireframe diagram depicted on a tablet computer of expenses attachment screen of the fourth invention embodiment;

FIG. 60 is an exemplary wireframe diagram depicted on a tablet computer of a new expense screen of the fourth invention embodiment;

Figure 61:
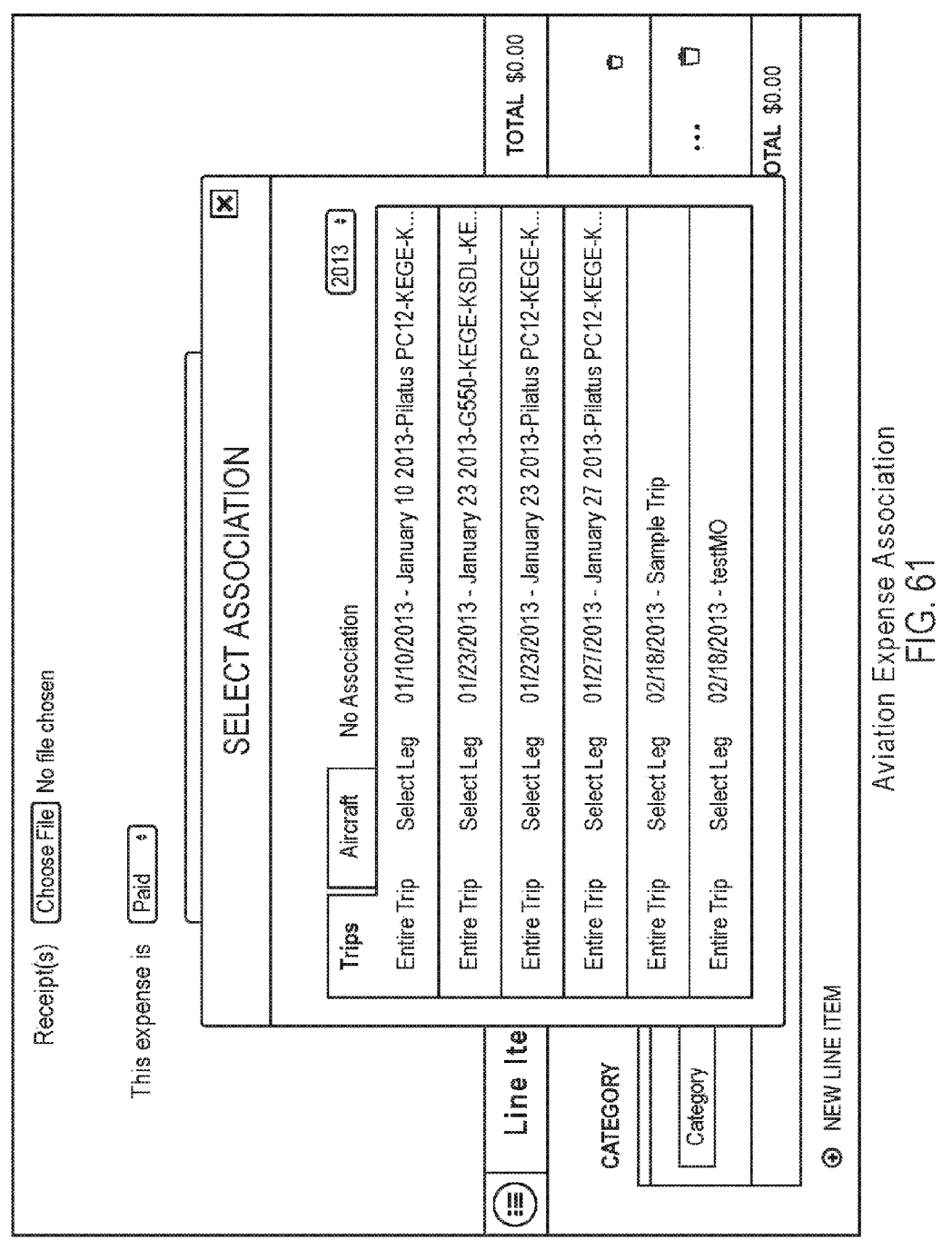

FIG. 61 is an exemplary wireframe diagram depicted on a tablet computer of an expense association (aircraft or trip) screen of the fourth invention embodiment;

FIG. 62 is an exemplary wireframe diagram depicted on a tablet computer of an invoice list screen of the fourth invention embodiment;

FIG. 63 is an exemplary wireframe diagram depicted on a tablet computer of an invoice filter or search screen of the fourth invention embodiment;

FIGS. 64A and 64B are, respectively, of an exemplary wireframe diagram depicted on a tablet computer of an exemplary invoice screen of the fourth invention embodiment;

FIG. 65 is an exemplary wireframe diagram depicted on a tablet computer of a new invoice screen of the fourth invention embodiment;

FIG. 74B is a user profile page and FIG. 74C is an edit profile page.

DETAILED DESCRIPTION OF THE INVENTION

The following description is presented to enable any person skilled in the art to make and use the embodiments, and is provided in the context of particular applications and their requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the inventive principles and features disclosed herein.

Figure 1:
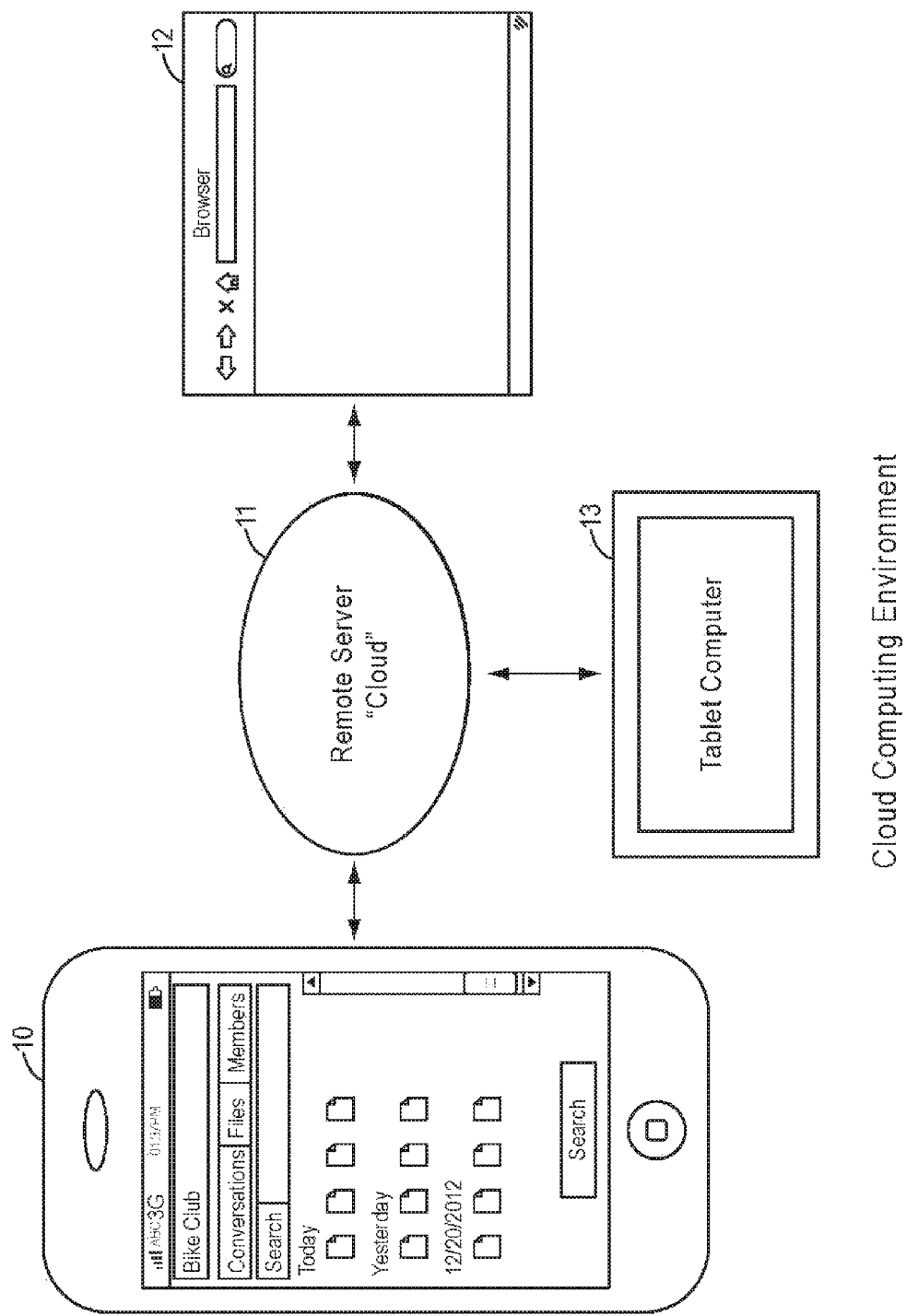
FIG. 1 is a diagrammatic depiction of a conventional cloud computing environment comprising a remote or cloud computing center and any number of app enabled mobile smart phones, mobile tablet computers, laptop and desktop computers or the like that are able to communicate wirelessly with one another and with the cloud computing center.

FIG. 1 depicts the now familiar cloud computing environment comprising a cloud computing center 11 that communicates, bilaterally and wirelessly, with a large number of geographically dispersed computing/communication devices that may include many smartphones, exemplified in the drawing by the single mobile smartphone 10 (e.g., iPhones, Android phones, etc.), conventional and well-known desktop and portable laptop computers, denoted schematically by the single browser or app window 12, and any number of mobile tablet computers, illustrated schematically by the single tablet computer 13 (e.g., iPads, Android based tablets, the Microsoft "Surface" tablet, etc.), and the like (collectively "devices"). The devices communicate with one another through the computing center, or directly with one another, in well-known fashion. Tens of thousands and even hundreds of thousands or more of such devices may connect to cloud computing centers as common users of software apps, applications, widgets and/or templates of many different kinds (collectively "apps"). The computing centers host the controlling programs for each such app in a manner well understood in the art. Such centers are also able to store vast amounts of user and other data. At least a portion of such data is often stored in relational databases of well-known design to enable selective retrieval and selective use of the stored information pertinent to a particular app.

The cloud computing center has powerful processing capabilities to execute software programs hosted at the computing center including those associated with a particular mobile app to perform any number of computer tasks, such as retrieval of a user's stored data for transmittal to and selective display on the user's device, word processing, spreadsheet and presentation programs, complex computational and data handling functions, voice recognition/voice response and analysis of complex data for purposes of data visualization, to name just a few of the currently well-known computing center capabilities available to app developers. Each app resident on a mobile device provides an interface to the user, some local functionality and an interface to the controlling programs for that app at the computer center as well as host programs for the app and other resources at the computing center. This now familiar and ever improving cloud and app architecture enables the easily scalable, efficient and low cost off-loading of vast data storage, processor intensive, complex computational and other functions from individual devices to remote cloud computing centers, such as those operated by Amazon, Akamai, Apple, Microsoft, Google and many other companies.

It has become commonplace for individual devices, particularly mobile devices, to use downloaded "apps" to interface with the user and the computing center, with the local app performing more or less functions locally depending on the particular situation. Those skilled in the art will recognize that there are hundreds of thousands of such apps already in existence based on the iPhone, Android and other mobile platforms. The basic architecture and basic functions above described, the basic rules of app and controlling programs design and their implementation in a cloud environment as well as the many functions that can be performed on demand at the computing in response to a user's interactions with a mobile app are well understood by those skilled in the art.

The present invention relies on and makes use of the known and continually advancing app and cloud computing environment above described to bring new and important user functionality to mobile and other computing devices. The unique architecture and structure of the invention enables provision of continually advancing functionality as mobile devices and cloud computing technology further evolves. In other words, the power and utility of the invention grows with the inevitable technological advances in smart phones, utilitarian apps, tablets and cloud computing centers, rather than trending toward obsolescence.

Figure 2A:
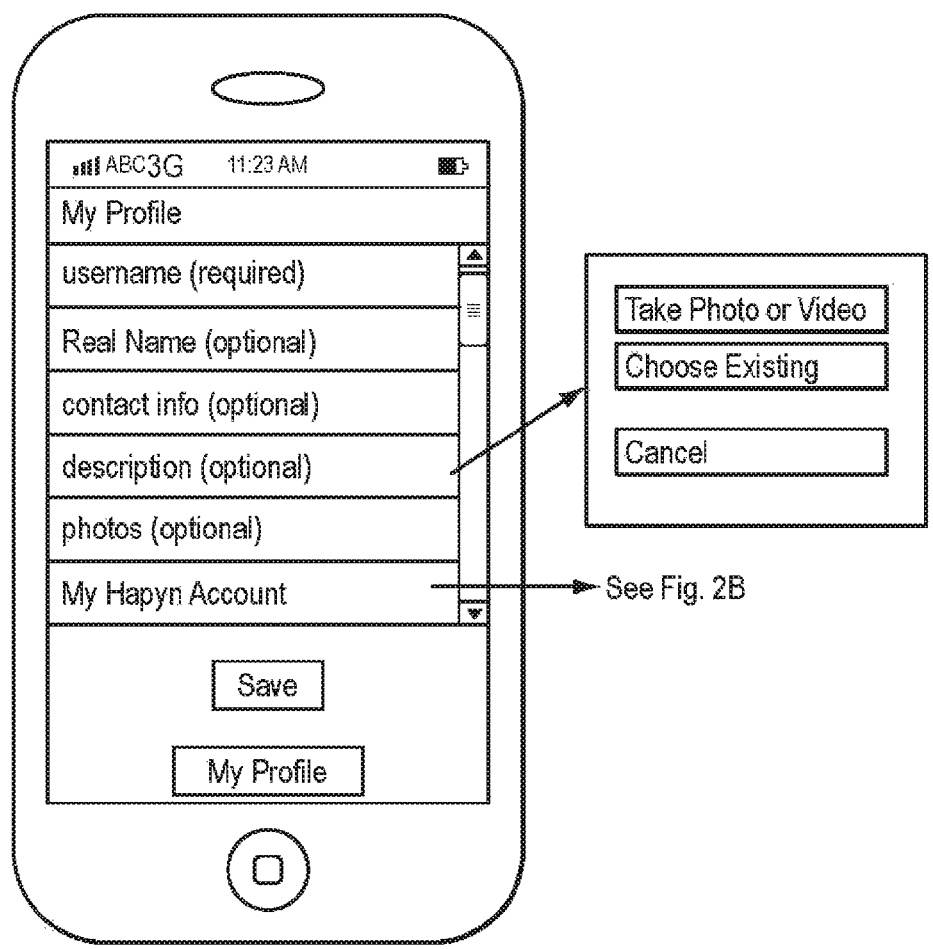
FIGS. 2A through 2O are representative smartphone wireframe diagrams depicting the format, structure and mode of operation of a first embodiment of the invention as well as certain embodiment variations and improvements.

FIGS. 2A-2O depict a series of wireframe diagrams displayed on a conventional smart mobile phone, such as an iPhone or Android phone. The FIG. 2 wireframes serve to illustrate one preferred embodiment of the present invention (and certain alternative and optional features) in the context of a smartphone, it being understood that the invention is also applicable for use on a mobile tablet, laptop or other computer. The wireframes shown in this disclosure depict the kinds of information displayed to the user, the range of user functions available, the relative priorities for functions, the rules for displaying certain kinds of information, and the effect of different scenarios on the display. The wireframes connect the underlying conceptual structure or information architecture to the surface or visual design of the mobile app or website.

The FIG. 2 embodiment is of particular utility in the organizing any of a wide range of human endeavor, business and personal, profit and nonprofit, around interests, events or activities, and things (living and nonliving), that is, virtually anything, herein collectively termed "tracked objects." For instance, stamp collecting is one of a virtually unlimited number of interests around which people might organize, even if they are not close friends, "friends" at all in any traditional sense, and even if they do not know one another. It is the interest or common affinity, i.e., tracked object, that connects them, not their personal relationships. This is in contrast to, for example, organizing around people talking about themselves or to or with "friends," as is common practice in the familiar social applications, such as Facebook and Google+. This tracked object based organizational structure of the invention yields many benefits, as will be seen.

Other than for an immediate or mid-range circle of family and friends, people typically associate with others for special purposes via common interests, events, clubs, condo or homeowners' associations, work or charitable projects, professional associations, sports and so on, which are the tracked objects in the present system. Some tracked objects may be permanent and unvarying, like family, some may be transitory, like planning a wedding and others may be fleeting, such as coordinating a weekend bike ride, or a neighborhood picnic with individuals assembled only for that purpose. Yet other tracked objects, like fraternities, sororities, hobbies (flying model planes, stamp collecting, etc.), club memberships, professional associations, workgroups within companies and so on may be long term interests involving significant numbers of people (even in certain cases people with whom the user is not personally acquainted). Further, tracked objects may be of a kind that the user only wants to passively observe or participate in sporadically. In short, the number and identity of people linked as users to each tracked object will vary markedly according to the nature of the tracked object, the nature of the users, the nature of the content and so on. The possibilities are virtually limitless thereby making it useful for a person to interact in aggregate with potentially hundreds or thousands of people, as long as the interaction can be done in ways that are beneficial and not burdensome.

In one form of the invention, the architecture comprises three primary elements: users, content and tracked objects. Rules, in the form of software that interacts with the hardware and firmware of the mobile device and the cloud computing center (including host programs at the center), govern the properties of the three elements and how they relate to one another and the functions performed. Permissions within the system manage access to content. Individual users or administrators establish permissions thereby controlling who may participate with respect to each tracked object and the limits of their participation, if any. This has many benefits as will be seen. The filing or archiving structure for content may be haystack style, non-hierarchical or may take other forms, the important thing being that information is conveniently available to all authorized users for a tracked object.

The three primary elements establish an organizational core structure that is useable, or customizable, by individual users, user groups or app developers (in more complex cases) thereby to apply to tracked objects of any kind, all with user defined boundaries in terms of participants and other pertinent criteria.

The invention empowers individuals, facilitates interaction between individuals, and facilitates interaction within and between groups in important ways not heretofore accomplished. The invention has utility in all aspects of human endeavor. The invention further enables new forms of commercial marketing and advertising and other desirable activities without compromising personal privacy and without the objectionable intrusiveness all too common in the prior art. The invention is designed to enable use of and interaction with other commercially available apps common to smart phones, like the built in cameras, and other utilitarian apps prevalent in modern smart phones and mobile tablets. The invention easily incorporates and take full advantage of such utilitarian capabilities without the user having to exit the app of the invention and enter another app, and without requiring a user or app developer to "re-invent the wheel" simply to add well-known, but highly useful functionality to complement the invention.

The trademark or servicemark HAPYN$^{SM}$ (happen) is used herein to identify the overall invention of the FIG. 2 embodiment (and its variants later described), while the service mark "HAPYNING$^{SM}$" (happening) refers to a user defined tracked object. Users may create and/or participate in any number of individual HAPYNINGS$^{SM}$, either related or unrelated to one another. In the FIG. 2 embodiment, there is one tracked object for each Hapyning, and that single tracked object has associated with it content and permissioned users.

Referring now more particularly to FIG. 2, this invention embodiment enables the user to easily select any one of four primary user pages via a navigation wheel. The navigation wheel, shown schematically above FIG. 2A and shown as well on the other FIG. 2 drawing pages, includes the page selections: My Profile, My Hapynings$^{SM}$, the River$^{SM}$, and My Files. These navigation selections may be at the base of each screen in this embodiment so that the user may conveniently "swipe" to the left or right to move the desired page onto the mobile phone viewing screen.

More or different page selections may be included on the navigation wheel as long as they are made in a manner consistent with the teachings of the present invention. Indeed, as described later herein, the invention contemplates further pages for the navigation screen thereby to enable a progressively increasing range of important functions within the single tracked object architecture. One other invention embodiment to be described is based on the single tracked object architecture while yet further invention embodiments to be described have more than one tracked object.

The navigation wheel in the FIG. 2 embodiment is conveniently located at the bottom of the mobile phone screen, the user laterally "swiping" the navigation wheel in either direction with a swiping gesture to selectively center any desired one of the four page selections at the bottom of the screen. The user may quickly (and with one hand) move among the four pages via the navigation wheel.

In FIG. 2A, the "My Profile" page has been selected by the user, as indicated both by the navigation wheel block "My Profile" at the bottom of the page and by the title in the page header. To begin use of the app, the user must have a minimum identity or profile, shown by the "username (required)" designation. Additional information about the user may be required to join the app (see Account Settings screen) or required as part of the profile available to other users, but in FIG. 2A additional information is shown as optional. Text blocks for username, real name, contact information, remarks and so on (any number of additional blocks may be included on the profile page as desired) is entered by tapping on the appropriate block which brings up a text entry box and keyboard, as is conventional in the art. The user may directly enter text via the keyboard or, alternatively, may use any of the well-known dictation apps or phone features, such as the iPhone Siri function, to enter text. It will be understood that text composition or other functions required to be performed may be controlled by voice or other commands.

Tapping on the "contact info" box may, as an option, bring up the user's contact info for direct incorporation into the profile or for editing, as desired. If the user taps on the "photos (optional)" box, a modal window appears (as shown at the end of the arrow running from this box), allowing the user to select (by a tapping gesture) "take photo or video" (via existing functionality embodied in conventional smart phones and tablets), "choose existing" which opens the existing photo/video (and document) library of the user associated with any of the familiar photo/video and text programs and cloud storage sites incorporated as standard on conventional smartphones. The photo/video library or subset thereof may also be stored locally on the phone or tablet and accessed there, all as is well-known to those skilled in the art. If the user decides after review to not add photo or video content to the user's profile, tapping the "cancel" box returns the user to the My Profile screen.

After entering an initial profile, the user may, of course, periodically edit the My Profile page to add or delete information excepting only the information required as a condition of access to the system. In the present embodiment, all persons permissioned by the user to participate in a user created Hapyning<sup>SM</sup> will be given access to the user's profile. Only other members of the Hapyn<sup>SM</sup> ecosystem may join a Hapyning<sup>SM</sup> and only if invited to do so by the tracked object creator or others, if any, authorized to extend invitations to join (all in a manner to be described). A non-member of Hapyn may receive an invitation (via email, text, etc.) and may join the Hapyning to which they were invited, but only after properly enrolling in the Hapyn<sup>SM</sup> ecosystem and accepting the invitation for the individual Hapyning from within the system.

The creator of a Hapyning may, for example, add new members at any time and may delete members from an existing Hapyning or cancel or limit the time for acceptance of an invitation, all to be described in greater detail later herein. The terms of privacy for a Hapyning may, however, preclude the addition of new members without the consent of all and/or without a vote, majority or unanimous, if the privacy rules so provide. Because of the closed nature of the system, any desired ground rules may be established for joining (such as detailed profile) the Hapyn ecosystem, individual Hapynings and for continued membership or the like in the ecosystem (by the system operator) and for the individual Hapynings (by the Hapyning creator), as will be understood by those of skill in the art. Thus, the invention provides an environment where standards and good practices can be a part of the fabric of the overall ecosystem, and an environment where creators of individual tracked objects can establish and enforce their own standards and practices, as long as they are not in conflict with the ecosystem rules. The Hapynings are, unless deliberately made public in a manner to be described, private to the participants and are not discoverable via a web search or the like.

In the FIG. 2A illustration, a user has only one user created profile and that profile is available for all of the participants in any Hapyning<sup>SM</sup> the user creates or chooses to join. However, as will be later shown, the invention may also grant users the ability to create different personal profiles for different Hapynings' regardless of whether the user created the Hapyning<sup>SM</sup> or is asked to join a Hapyning<sup>SM</sup> created by another person. In any event, once a user has completed his or her profile, or completed editing thereof, and is satisfied with the profile content, the user taps the "Save" box to preserve the profile information.

Figure 2B:
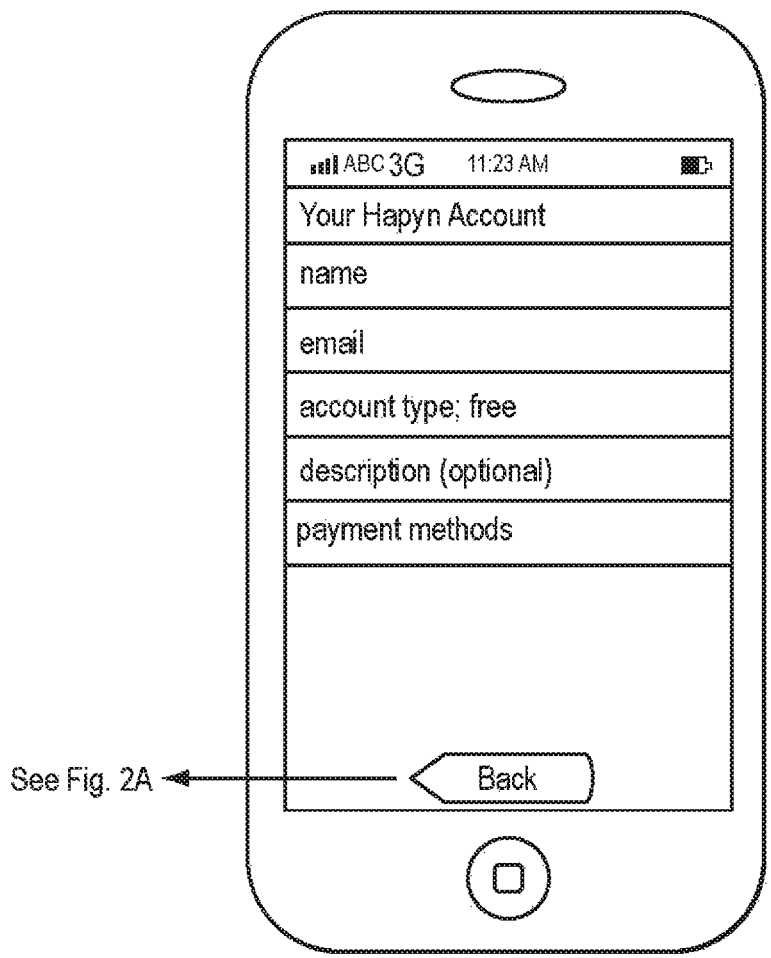

In the FIG. 2A—My Profile page, tapping the lowermost box, "My Hapyn<sup>SM</sup> Account," takes the user to the FIG. 2B screen "Hapyn Account Settings." The account settings may include any number of required or optional information blocks, as determined by the operator of the Hapyn ecosystem. In the present example, there are blocks for the user's real name, email address, selection of account type (e.g., free or various premium account levels) and an upgrade block for viewing and selecting among any number of upgrade features which add to the functionality of the system. This block may have provision for entry of credit card related information or the like to enable payment to the system operator for the provision of service and/or service upgrades, and for user authorized financial transactions with any vendor chosen by the user. Likewise, the account settings window may provide for the enablement (or disablement) of any number of free system features or any number of discretionary features.

As shown in the FIG. 2B example, there is also a "payment methods" block that may allow the user to select among any of a large number of commercially available methods for making payments to (and receiving payments from) third parties, such as those operated by PayPal, Google Wallet, Stripe, various banks and credit card companies, and so on. There are many such payment systems available and many yet evolving toward widespread commercialization including those utilizing near field communications. The present invention is flexible enough to enable its use with any payment method (or payment receipt method) currently available from a mobile device or any anticipated to be developed in the future for use on mobile devices. The invention is agnostic to, but easily made compatible with, any payment system.

Once the account settings are selected and saved, the user taps the "Back" button to return to the My Profile Page. The Account Settings window could be a separate window on the navigation wheel, but there are advantages to minimizing the number of selections from the navigation wheel, such as ease of use, particularly for a page such as account settings which is typically accessed rather infrequently. Alternatively, Account Settings could be on the navigation wheel in place of My Profile, and profile information included as one of the account settings. Of course, either way, the Account Settings information is private and is not made available to people accessing the user's profile information.

Figure 2C:
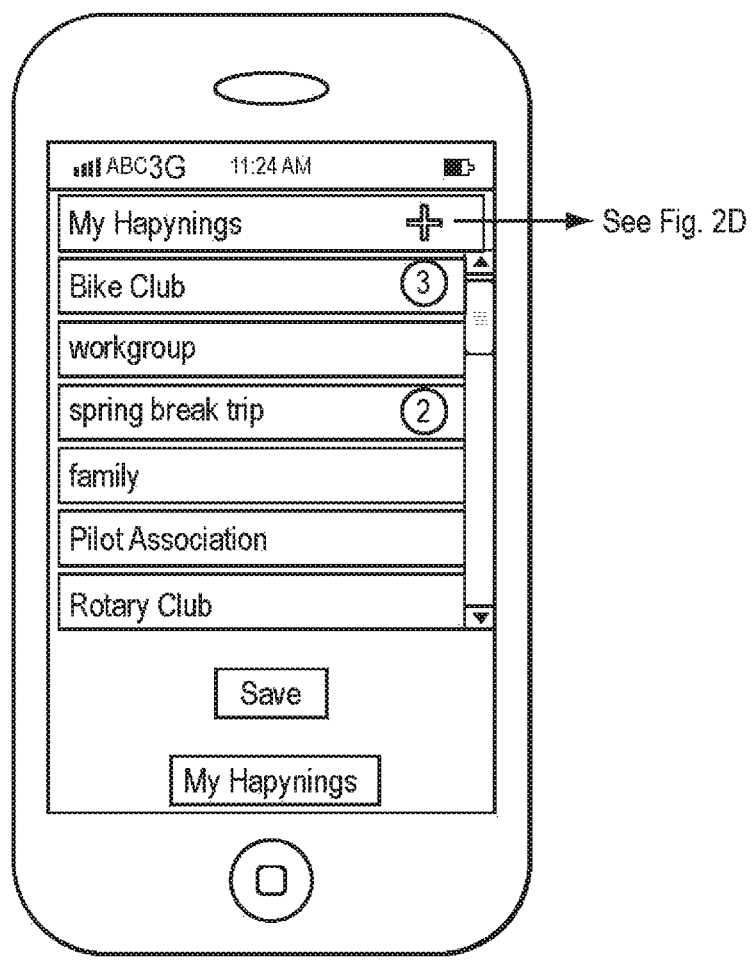

Referring now to FIG. 2C, it is seen that the user has selected the "My Hapynings<sup>SM</sup>" page via the navigation wheel, as shown at the bottom of the FIG. 2A screen. This page lists the user's previously created and currently active Hapynings<sup>SM</sup> in separate, tap sensitive blocks on the page, here Bike Club, Workgroup, Spring Break Trip, Family, Pilot Association and Rotary Club. The reader will understand that the number and kinds of tracked objects, i.e., Hapynings, is limited only by the imagination of the user. If a Hapyning becomes inactive or irrelevant for any reason, such as group planning for an event that either did not occur or has occurred, the Hapyning may be archived or deleted, as the user chooses (as will be later described in further detail in connection with FIG. 7A).

Figure 2D:
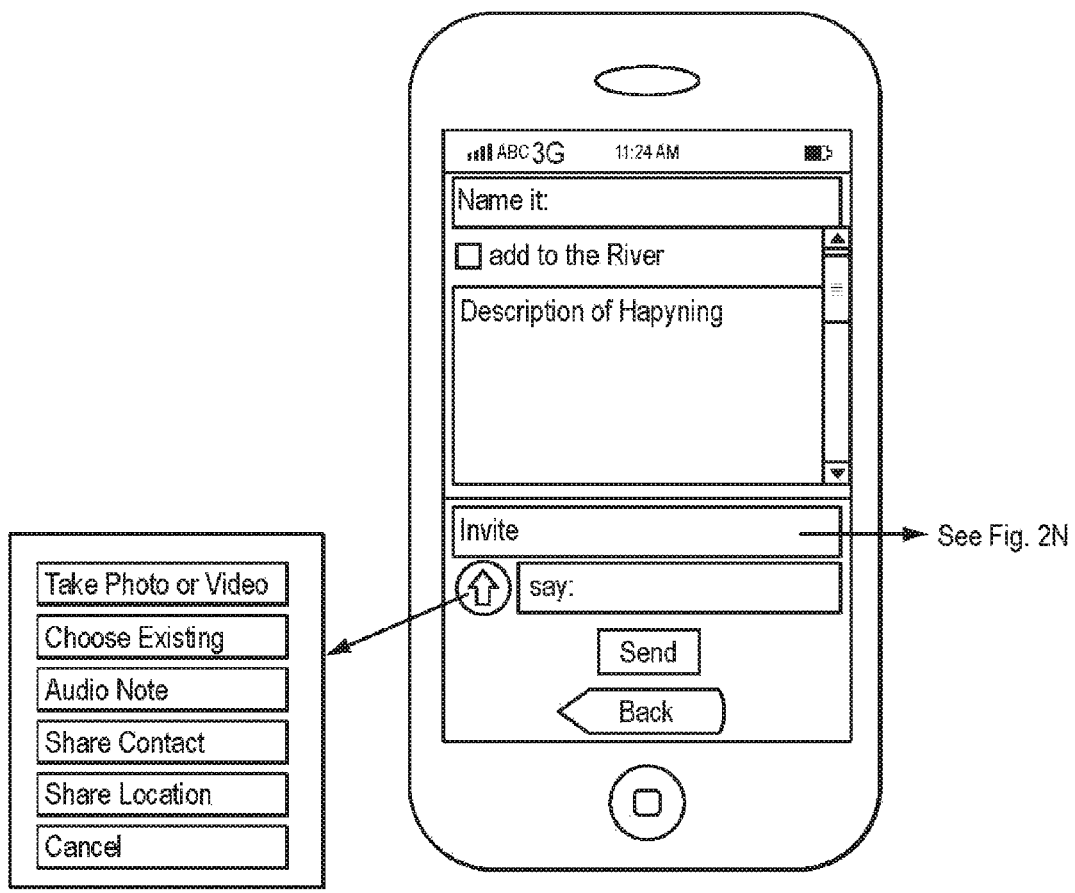

If it is desired to create a new Hapyning<sup>SM</sup>, i.e., tracked object, the user taps the + sign at the top right of the FIG. 2C screen thereby to open the "New Hapynings" screen shown in FIG. 2D at the end of the horizontal arrow running from the + sign to FIG. 2D. The user selects a name for the new tracked object and may, if desired, provide a more detailed description in the block provided. These entries are made by tapping on the screen to bring up a keyboard or a dictation device as previously described. Between these blocks is a checkbox adjacent the phrase "add to the River." The consequences of checking or not checking this box will be explained momentarily.

The Invite block of FIG. 2D allows the user to invite one or more people to the newly created Hapyning. This may be done in any number of well-known ways consistent with the present invention, including pulling up the user's pre-stored contact list from which individual names and contact selections are made. The user may also determine not to invite anyone to the newly created Hapyning in which case the user is the only one who may access it and as well the only person able to add content to it. Similar to the Twitter ground rules, the creator may limit the number of words or characters in each communication to promote thoughtful, concise writing by the participants.

The "say" block in FIG. 2D allows a user to accompany the Hapyning invitation with a text message, greeting or any other content desired including web links and websites. Tapping on the fat vertical arrow to the left of the "say" box opens the modal shown at the end of the downwardly angled black arrow. Selectively tapping on the individual boxes within the modal allows the user to attach a new photo or video, an existing photo or video, an audio note, share contact information, share the immediate and/or continuing location of the user and/or some preselected location, or cancel the selection by tapping on the "cancel" block. The modal or submenu screen may include more or less selection options than those shown consistent with the teachings of the present invention.

When the user is satisfied with the content placed in the newly created Hapyning, the "send" button is tapped to transmit the invitations with the included content to the individuals invited. The recipients either accept or decline the invitation to join the Hapyning. Those that join will be included in all future communications for the Hapyning and may themselves participate in the same way and to the same degree as the creator, unless the privileges of recipients are constrained by the creator. Typically, only the creator is granted the authority to invite new members (and those the creator authorizes) or delete existing members.

Those that affirmatively decline will be permanently excluded unless re-invited. The creator is notified of those that accept, those that decline and those that have yet to respond. The invitations may be configured to expire if no response or acceptance is received within a specified time. These features are not shown as being available in the simplified "New Hapyning" screen depicted in FIG. 2D, but implementations of these features will be illustrated and discussed in detail later herein in connection with a modified version of the "New Hapyning" screen.

Returning to FIG. 2C, the circles enclosing the numerals 3 and 2 are shown adjacent, respectively, the Bike Club and the Spring Break Trip Hapynings. These circled numerals denote the number of new, unread messages in the respective Hapynings. The absence of a circle adjacent a Hapyning name indicates that there are no unread messages in that Hapyning. The aggregation and display of the number of unread messages uses familiar technology already employed in many apps (as, e.g., in the Iphone, the number of apps having updates available, the number of unread telephone or other messages, etc.) thereby not requiring further explanation here for those skilled in the art.

The user visits a particular Hapyning or tracked object by tapping on its named block in the My Hapynings window FIG. 2C, which opens the Hapyning to reveal the chronologically ordered "stream" of communications within the Hapyning, as shown in FIG. 2F for the Bike Club. The most recent, i.e. the unread, messages in a newly opened Hapyning appear in chronological sequence at the top of the stream. All prior messages likewise appear in chronological sequence, but the stream messages may be re-ordered as desired by dragging and dropping them above or below other messages, as is familiar technology to those skilled in the art. Thus, the user is able to easily identify the new, unread messages, yet read them in the context of prior messages as well as group the messages that are important and push to the bottom, archive or delete those messages of no lasting importance. If desired, individual messages in the stream may be highlighted to distinguish them from inconsequential communications in the stream and/or unimportant messages may be removed from the stream and archived by swiping them off in a manner similar to that earlier described for removing messages from the River. These later capabilities are based on well-known technology familiar to those skilled in the art.

Messages may contain any number of attachments of various kinds as previously described in connection with FIG. 2D. The user may respond to a communication by text and/or by doing any other of the things permitted, such as those previously shown and described in connection with the modal adjacent FIG. 2D. The modal opened by tapping the fat vertical arrow in FIG. 2F may be the same as that opened by tapping the fat vertical arrow in FIG. 2D. The options for message content are shown in the modal and were earlier explained in detail. Messages may also contain links to websites, for example, the "Bikes.com" website shown in the lowermost message in the FIG. 2F screen. Tapping on the link opens the website of the Hapyning creator shown at the end of the arrow extending from the Bikes.com message link in the FIG. 2F screen. As shown in FIG. 2F, tapping the website link in the message received from the Hapyning creator/website owner may direct the user to new or special interest website content, here shown, by way of example, as "Browse our Bike Brands" and "See What's on Clearance." After viewing the site, the user may close the window by tapping the "Back" icon shown and return to the stream of the Hapyning. This creates a seamless experience of viewing websites within the context of a Hapyning and may be a way of notifying followers of the Bikes.com Hapyning of special news, events, discount sales, and a virtually unlimited range of information that is helpful in binding followers of Hapynings more tightly to the organization and its website. The user returns to the Bikes.com message stream by tapping "Back" on the website, as shown in FIG. 2F, thereby making it easy for a user to navigate to a website where useful information may be seen or a desired action may be taken, yet quickly and easily return to the stream. Web links and other destinations may be contained in the body of communications and be accessed in a like or similar manner as those for websites.

All members of the Bike Club automatically receive any new message and associated attachments sent by any other member, unless a user wishes to limit distribution of a new message to a selected subset of members. Limited message distribution is accomplished by tapping the capital P box (for private) at the bottom right of the FIG. 2F screen. Tapping the private message box brings up a modal, as shown to the right of the capital P box, listing all of the current members of the Bike Club. The user selects the members to receive the "private" message by tapping on the desired user names, which places a checkmark adjacent each chosen name to denote that member as a recipient of the private message.

In FIG. 2F, Bob and Doug are designated as recipients for the private message to the exclusion of members Jim, Todd and Erika. Further member names, if any, are revealed by scrolling the screen and are selected for receipt of the private message or not in the same manner as described. There may be any number of members of a Hapyning as determined by any desired criteria, such as a free or premium account. When all recipients of a private message have been designated, the user taps the "done" button; if the user determines not to send a private message, the button "cancel" is tapped. Tapping either the done or cancel buttons closes the private message modal.

The user may also access a complete list of Bike Club Hapyning members by tapping the head icon at the far right of the Bike Club header at the top of the FIG. 2F screen. The full consequences of tapping the head icon button will be explained later herein in connection with FIG. 2I. Tapping the Hapyning name "Bike Club" at the top of the FIG. 2F screen opens the description for the Bike Club Hapyning and any related information, as will be later and more fully described in connection with FIG. 2H-2I. The body of the FIG. 2F screen shows what is termed herein a "stream" of communications within the Bike Club Hapyning. Each message contains the name of the sender and the date and time the message was sent as well as the content in text form and/or any attachments, such as photos, videos, etc. In the case of private messages, the private recipients are also identified and the message is highlighted as "private." All responses to a private message only go to those originally designated to receive the first private message. The user exits the private communications mode by tapping on the P box and unchecking all names previously checked. The requirement to engage in an affirmative action to leave the private mode helps to assure that messages intended as private are not inadvertently sent to all members of the Hapying.

The user is able to quickly and easily scroll chronologically through the stream by use of a conventional scrolling action (as schematically indicated by the right side scroll bar) thereby to scan sequentially all communications and attachments in the Hapyning. One of the settings for a particular Hapyning or for all Hapynings may cause messages in excess of a specified number of days old, or in excess of a certain quantity, or the like to be archived. The archived messages may be accessed by scrolling to the end of the visible messages in, for example, the Bike Club and continuing to scroll which brings up a predetermined number of archived messages, with continued scrolling revealing progressively more archived messages, in a manner and using technology well-known in the art. The system may also be configured via settings to automatically archive Hapynings that have been inactive for a specified period of time.

New, unread messages for all or any chosen ones of a user's Hapynings are displayed and updated in real time in the page herein called the "River," which is selected from the navigation wheel. River is a proprietary service mark identifying the converged new messages from the streams of the individual Hapynings. A user may choose whether or not to include new messages for a Hapyning in the River. This is done by checking (or not checking) the box "add to the River" in FIG. 2D. The River screen allows a user to readily identify (and read fully in the case of short messages) new messages from all the Hapynings that the user has opted to include in the River page. New messages are those that arrive subsequent to the time that the user has last visited the stream of the Hapyning.

The River page is one of the four pages accessed from the navigation wheel in the FIG. 2 embodiment. In FIG. 2E, the River page has been selected by the user. Three new message panels are shown in the FIG. 2E River page; further new messages, if any, for additional Hapynings included in the River are accessed by scrolling the page via the conventional scroll slider shown on the right side of the page. The user may include any number of Hapynings in the River, as desired, and may add and delete Hapynings from the River at any time simply by checking or unchecking the "add to River box" shown in FIG. 2D; the same functionality is available from an existing Hapyning. New messages for Hapynings not included in the River are accessed by going to the My Hapynings page, FIG. 2C, which lists all of the user's Hapynings and visually identifies the number of new messages, if any, within each Hapyning, all as previously described.

Figure 2E:
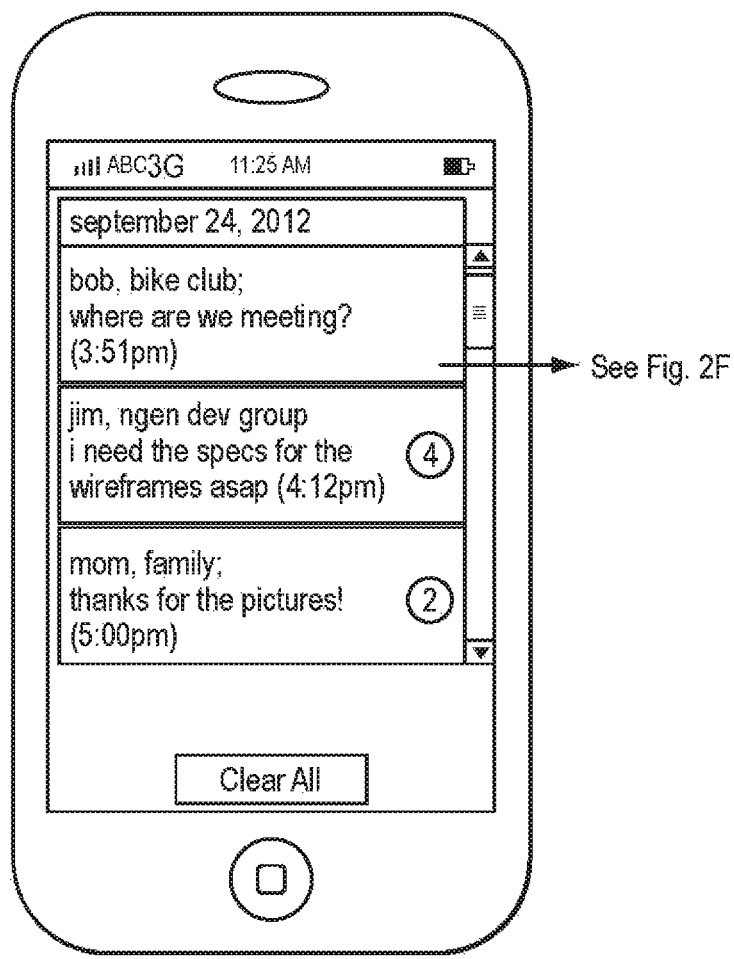

As seen in the River page FIG. 2E, each Hapyning panel shows the name of the Hapyning, the author of the message, its content (or the first several lines if a long message), and the date and time received. For example, the top panel indicates that Bob sent a Bike Club message "where are we meeting?" at 3:51 pm on Sep. 24, 2012. The other panels are similarly formatted. Attachments, if any, for each message are indicated, but are not viewed in the River view. Tapping on a message block in the River takes the user directly to the associated Hapyning. For example, tapping on the new message for the Bike Club Hapyning in the River of FIG. 2E takes the user directly to the stream for the Bike Club, as shown in FIG. 2F. Individual messages in the stream carry appropriate icons representing visually the nature of the attachments, schematically depicted in FIG. 2F by the box with a cross in it associated with the message "Take a look at this photo of me." Attachments and the full stream of a particular Hapyning also may be accessed by selecting the My Hapynings page, as previously described.

The River page FIG. 2E has various design features that serve the convenience of the user. First, a user may selectively remove any new message from the River page by a simple swiping gesture that reveals a "remove" button which the user then taps (or not) to remove the message from the River. This action is similar to that currently used in smartphones to delete phone messages or the like. Removing a message from the River does not remove the message from the Hapyning. In other words, the next time the user goes to the Hapyning for which a new message was removed from the River, the Hapyning will still contain the full stream of messages and attachments for that Hapyning.

The ability to quickly and easily remove messages from the River enables the user to, for example, hastily scan the River messages, decide whether or not to go to the associated Hapyning (by tapping on the message in the River) there to read the message in context (and perhaps view message attachments) and possibly formulate a message reply. Alternatively, the user may just quickly scan the message on the River page and "swipe" it off the River page thereby to retain on the River page only unread messages and/or messages that the user desires for one reason or another to retain in the River after reading (perhaps as a convenient reminder that some action needs to be promptly taken with respect to the subject matter of the retained message).

Second, if there are multiple new messages for a Hapyning included in the River, only the first message (or a few lines thereof) will be shown. The total number of new messages for that Hapyning will be indicated by a numeral in a red circle, a technology that is familiar to those skilled in the art and readily understood by users of mobile technology. For example, in the second panel of the FIG. 2E page, there is a numeral 4 within a red circle and in the third panel the numeral 2 within a red circle. These indicate that there are four and two additional new messages in, respectively, the ngen dev group and the family Hapynings. The additional new messages for the respective Hapynings are accessed in full by tapping on its associated panel in the River page, which takes the user to the page for the particular Hapyning. This is depicted schematically by the horizontal arrow extending between the Bike Club panel in FIG. 2E and the Hapyning stream for the Bike Club in FIG. 2F, where the new message is shown. Alternatively, the user may simply read the visible portion of the new message(s) in the River page and make a mental note that there are more messages to be read later (from within the Hapyning), and then "swipe" that message to initiate its removal from the River.

The River page above described allows a user to quickly and easily keep his or her finger on the pulse of the most immediate messages in all (or any desired ones) of the user's Hapynings, even if the total number of Hapynings is very high, say 50 or more, and may involve in aggregate hundreds of people in respect of a myriad of different activities, interests, things or the like. In this regard, if the user visits the River page with reasonable frequency (and removes messages read), it is unlikely that, on each new review of the River page, there will be new messages in any but a fraction of the total Hapynings being followed thereby making it particularly quick and easy for a user to stay abreast of the goings on in many Hapynings with a minimum of effort. The invention enables a user to engage in and/or timely monitor many distinct activities within a single app thereby enabling a user to manage the "everyday business of life" with exceptional convenience. The user knows that each message in a Hapyning relates to the subject matter of the Hapyning, as opposed to the random kinds of communications issued by, for example, Facebook users to their "friends," many of whom may have absolutely no interest in receiving the content of the communication. Of course, as earlier described, the user may at any time select the My Hapyning page FIG. 2C to view in summary form all of the Hapynings and the number of new messages in each that has not yet been read from the Hapyning itself, even though the messages may have been presented in and "swiped off" the River page.

Thus, the River page enables a user to quickly identify new messages, timely acquire any important new information and/or initiate a prompt response if needed and/or move on to the next new message in the River. The summary Hapynings page, by contrast, allows a user in a more reflective moment to review the status of all Hapynings, whether included in the River page or not, and decide which Hapyning(s) to visit, either to read new messages, review part of or the total flow of communications, to read or view attachments earlier sent and/or to respond by a short text message or by a more fulsome message that may include photos, videos, links to web pages, websites and articles, etc.

Figure 2G:
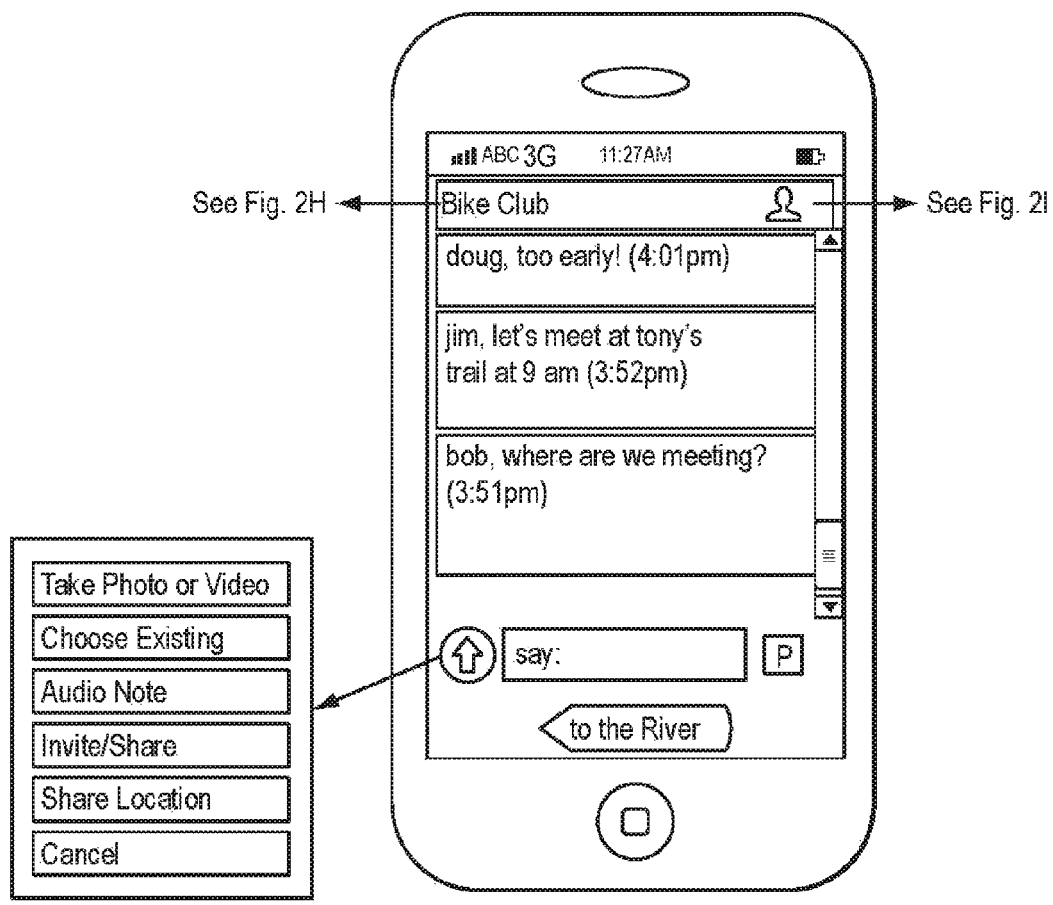

Additional features of the present embodiment, some already explained in part, may be appreciated more fully by reference to FIGS. 2G-J. FIG. 2G shows the "stream" of messages within the exemplary Bike Club Hapyning. Tapping on the Hapyning title "Bike Club" at the top of the FIG. 2G takes the user to the screen of FIG. 2H which contains the detailed description of the Bike Club Hapyning that was made by the creator of the Bike Club Hapyning. The description itself may contain photos, videos, web links and websites or the like. The creator of the Hapyning (or any other authorized person) may edit the description by swiping the description panel which causes an edit or delete button to appear. Tapping on the edit button causes a keyboard and cursor to pop up to allow editing as desired. All of these actions use well established technology which has the additional advantage of being familiar to users of many popular mobile applications. Use of familiar conventions and practices in navigating mobile apps assures that the user is able to here intuitively navigate through the various pages and modals with ease.

The description page also allows the user to add or delete the Bike Club Hapyning from the River by checking or unchecking the "Add to River" box. The creator may authorize other Bike Club members to send invites to the Bike Club Hapyning by checking the box "other members can invite." If this box is not checked, then only the Hapyning creator can send invitations to join the Hapyning.

In any event, new invitations are sent by tapping on the "Invite" box and then proceeding as earlier explained in connection with FIG. 2D. The steps for, from time to time, inviting new members to an existing Hapyning (and the procedure for accompanying the invitation with text and one or more attachments) is the same as that followed at the time of creation of the Hapyning. Further aspects of the Invite feature will be later described in connection with FIGS. 2N, 5D and 7A.

Figure 2H:
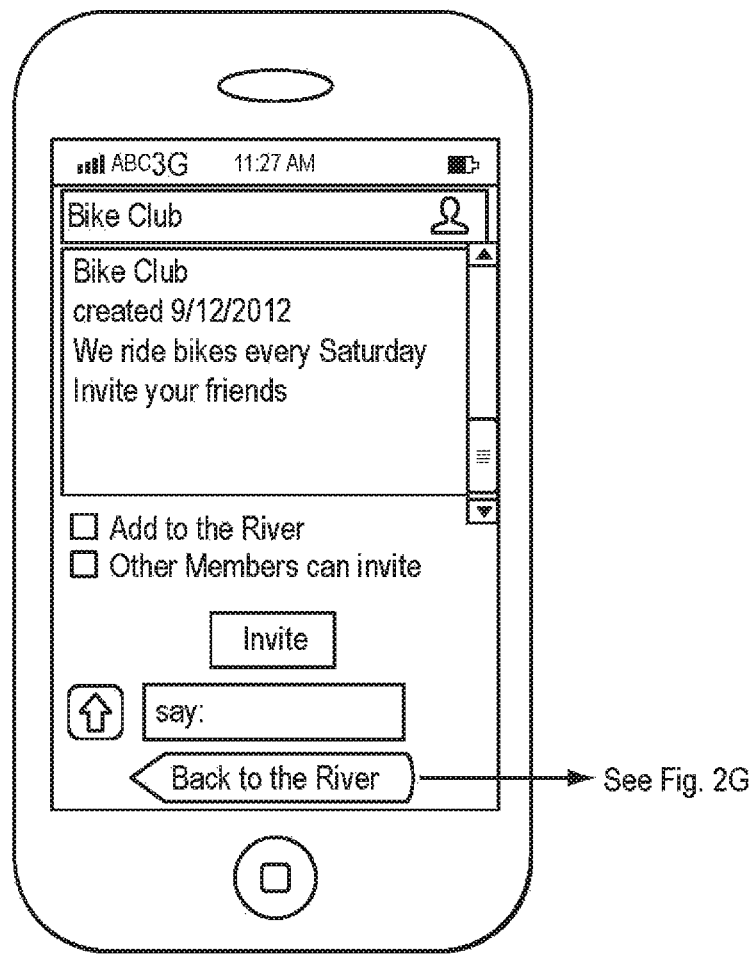

The user returns to the conversation stream by tapping on the block "back to the stream" at the bottom of the FIG. 2H screen, which takes the user back to the FIG. 2G screen. From the Bike Club stream in FIG. 2G, the user may return to the River page by tapping on the block "to the River" at the bottom of the FIG. 2G screen.

Figure 2I:
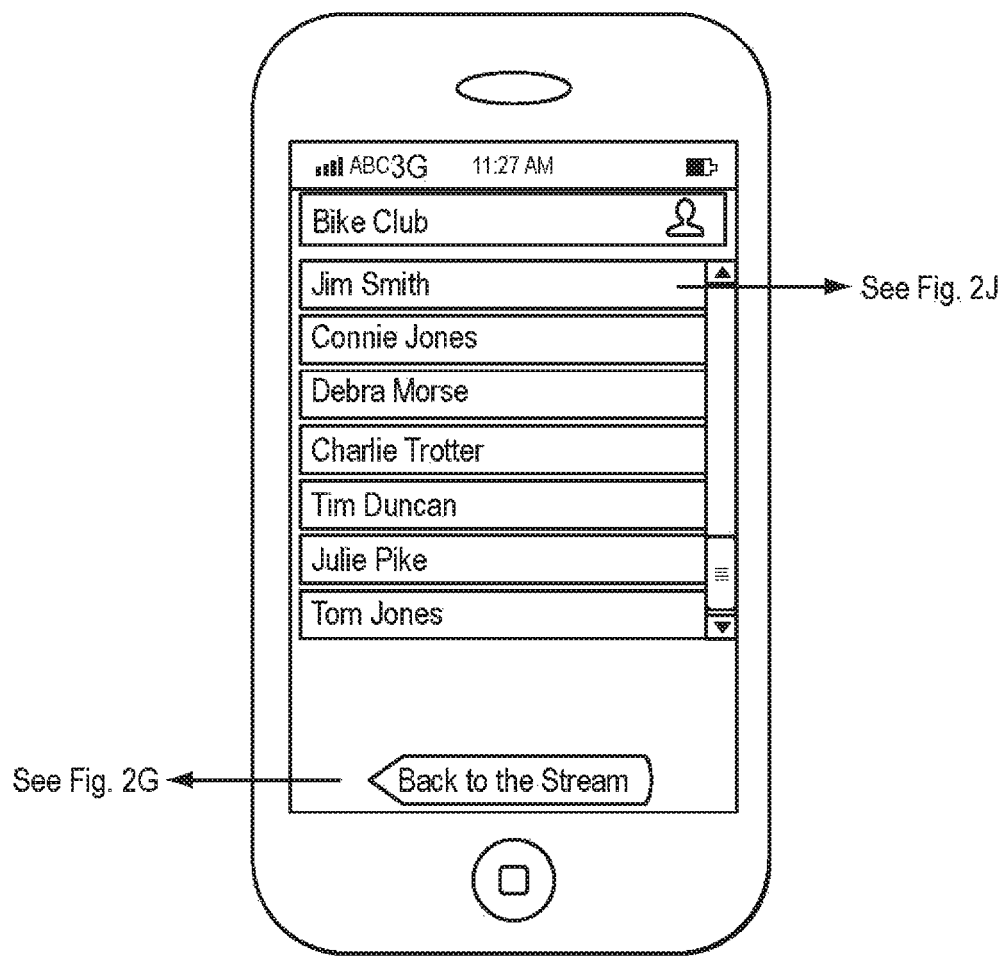
Figure 2J:
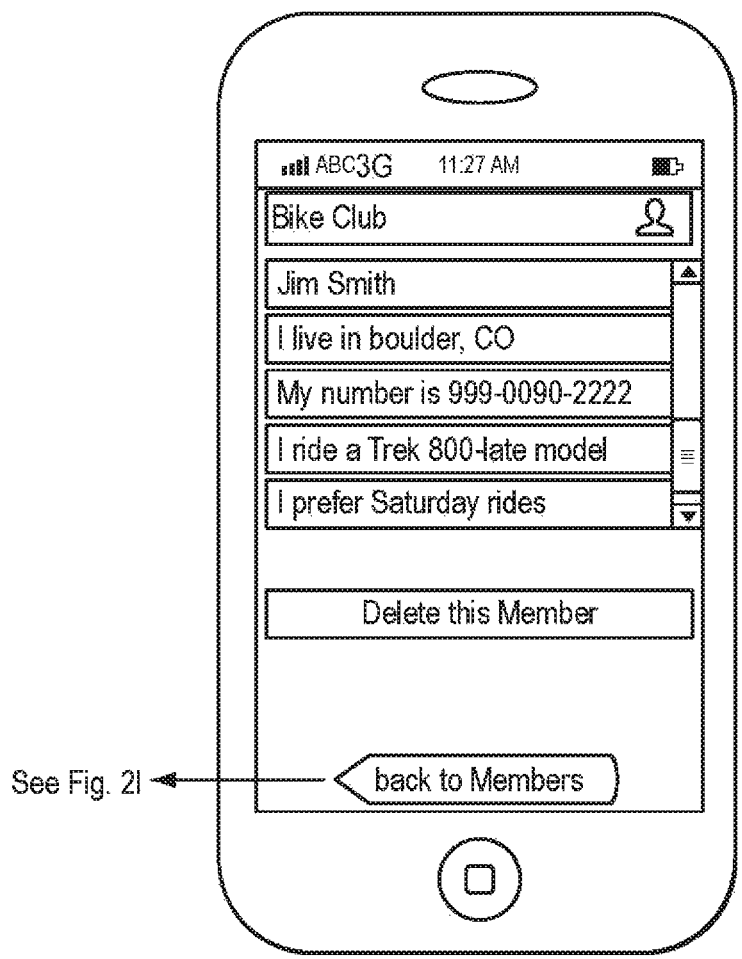

A screen listing the names of all members of a Hapyning is accessed from the FIG. 2G screen by tapping on the head and shoulders icon located in the upper right screen corner thereby taking the user to the Members of a Hapyning screen FIG. 2I. If there are more members than fits on a single screen, the user may scroll the page in conventional fashion (as denoted by the slider bar) to reveal all of the names. The name of each member is in a separate block or box on the FIG. 2I screen. Tapping on a single name block in FIG. 2I takes the user to the profile screen for that member, as shown in FIG. 2J. The user can access every other member's profile in like fashion. The creator of the Hapyning is given the option on each member's profile screen to delete the member from the Hapyning by tapping the block "delete this member." The delete option is preferably given only to the creator of the Hapyning or to a properly authorized administrator.

The user returns to the FIG. 2I screen by tapping on the "back to Members" block at the bottom of the FIG. 2J screen. As described, the FIG. 2 embodiment of the invention (with some or all of its optional features shown in the drawings and described herein) is designed to allow the user to easily, quickly and intuitively navigate between the four pages identified on the navigation wheel, and as well between the various screens and modals accessible from each page.

Figure 2K:
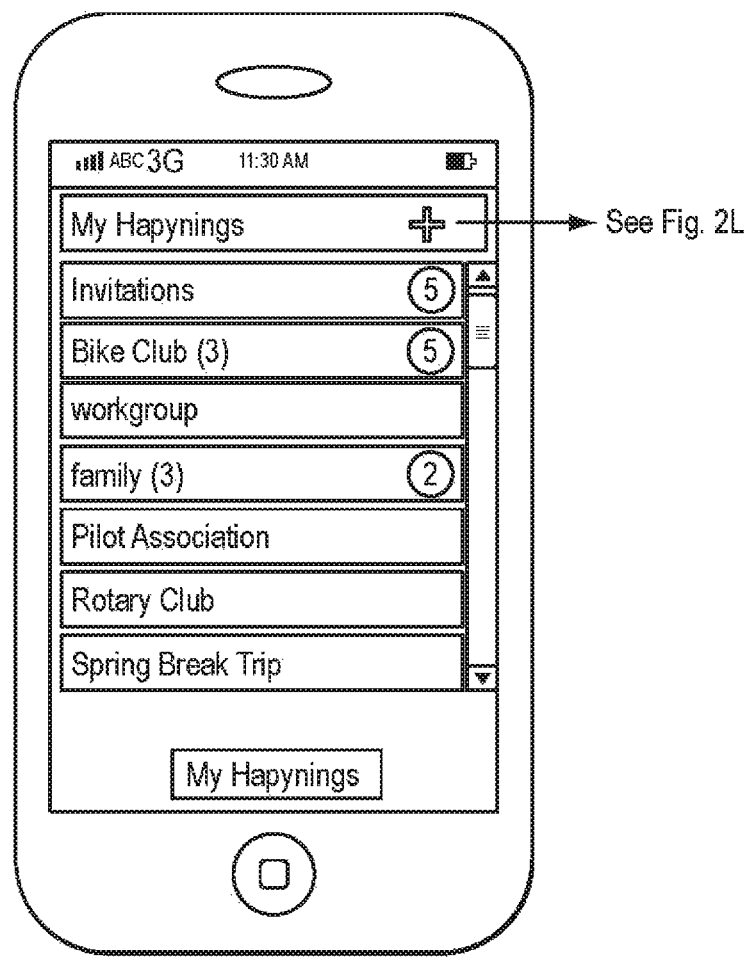

Attention is now directed to FIGS. 2K-2N. The My Hapynings page shown in FIG. 2K—Invitations Alert is similar to the FIG. 2C—My Hapynings page, except that in FIG. 2K there is an "Invitations" block or panel depicted directly below the My Hapynings header. The Invitations block appears only when the user has as yet unanswered invitations to join one or more Hapynings. In FIG. 2K, the user has five unanswered invitations as denoted by the numeral 5 in the red circle in the invitations block.

Figure 2L:
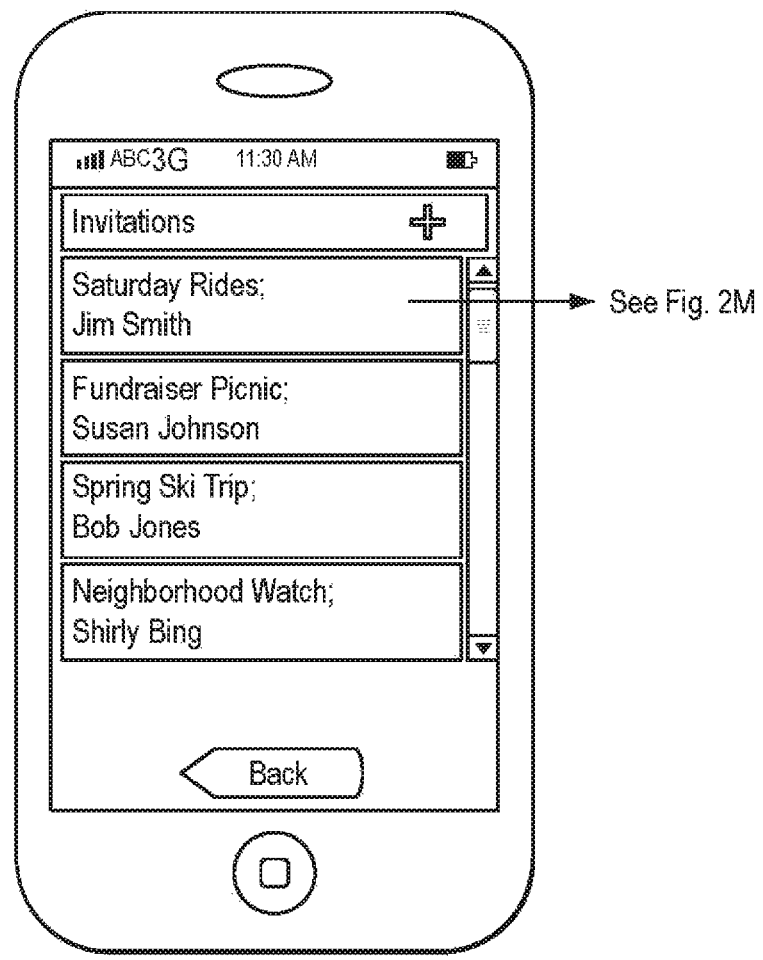
Figure 2M:

Tapping on the invitations block opens the List of Invitations window shown in FIG. 2L. Four of the five unanswered invitations are shown in FIG. 2L; the fifth is made visible by scrolling the invitations page in conventional fashion. Each invitation block in FIG. 2L identifies the name of the Hapyning and who is sending the invitation. For example, the first invitation in FIG. 2L indicates that Jim Smith is inviting the user to join the Saturday Rides Hapyning; the invitation may also indicate the date and time received. Tapping or touching the Saturday Rides block takes the user to the received invitation window shown in FIG. 2M. In this window, there is a Saturday Rides header identifying the Hapyning, immediately below which is a description of the Hapyning. The user accepts or declines the invitation by touching either the Accept box or the Decline box shown in FIG. 2M. If the invitation is accepted, the user may add the new Hapyning to his River page by touching the checkbox for "add to the River." The user is provided the further option in FIG. 2M of responding to the invitation with a text message and/or attachments in the same way as previously described in connection with the composition and sending of a normal message within a Hapyning as shown in FIG. 2F. The Back buttons at the bottom of the FIGS. 2M and 2L screens allows the user to return to the prior page or screen.

Figure 2N:
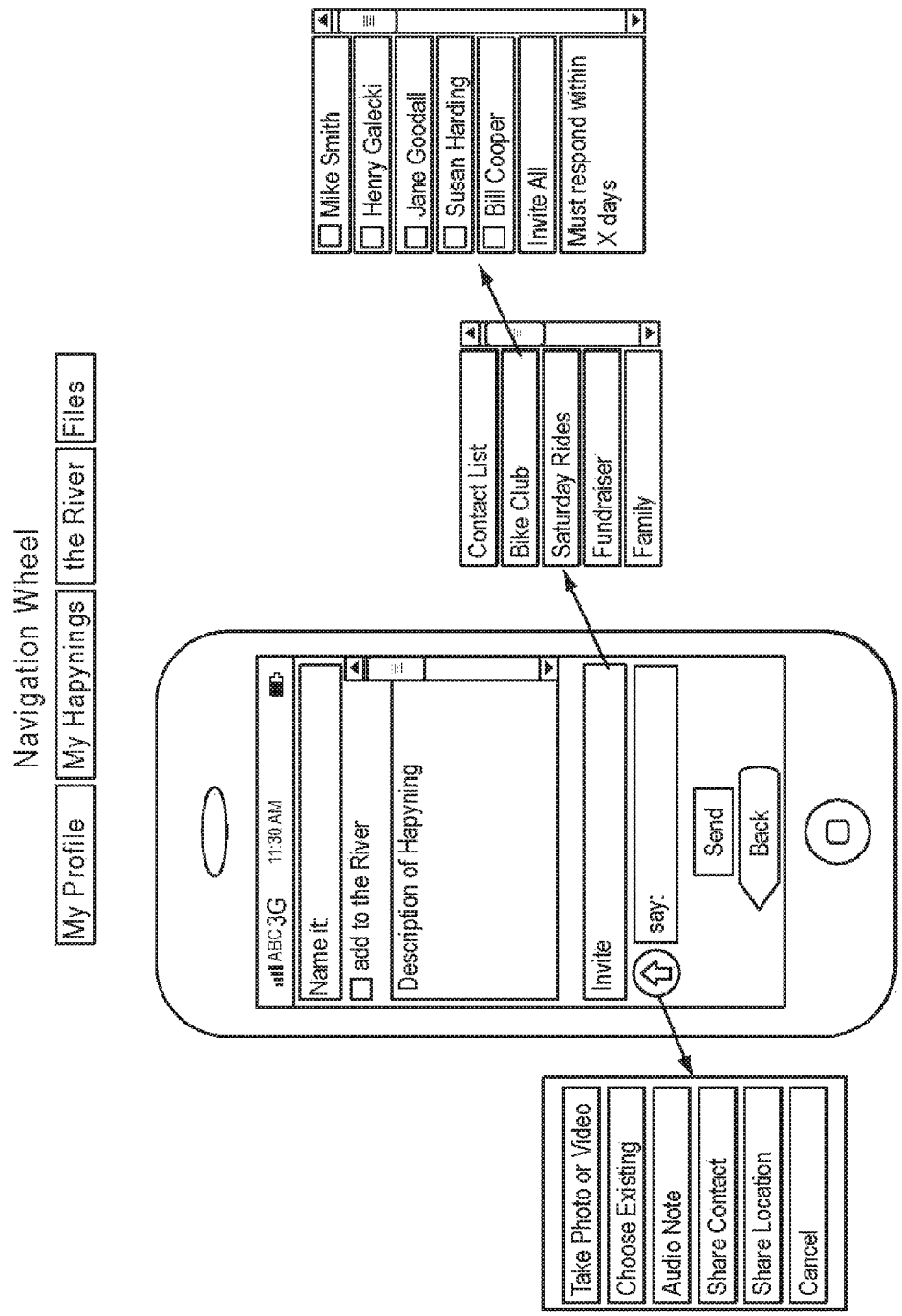

FIG. 2N is similar to FIG. 2D except that FIG. 2N includes further features not shown in FIG. 2D which has the potential to simplify the invitation process. Specifically, when the user taps on the "invite" block in FIG. 2N, a modal appears which in the top block offers the user the ability to invite persons from the user's "Contact List," the same as previously described in connection with FIG. 2D. However, the modal window in this modified embodiment also presents the user with a complete listing of the user's existing Hapynings, namely, Bike Club, Saturday Rides and so on. If the user taps, for example, on the Bike Club block all of the members of the Bike Club Hapyning are listed, each with a checkbox next to their name as shown in the drawing. The user may selectively invite members from the Bike Club to the new Hapyning by tapping the checkbox adjacent a person's name or may invite all of them by tapping the "Invite All" block.

Immediately below the Invite All block is a block that provides the user with the ability to set a time limit for acceptance of the invitation. Tapping on the "x" brings up a numbers keyboard allowing the user to specify a day time limit for joining the Hapyning following which the invitation expires and does not allow the invitee into the Hapyning, absent a new invitation. The user may elect not to place a time limit on the invitation in which case an invitee may join the Hapyning at any time during its existence as an active Hapyning. If the Hapyning is archived or deleted before the invitee attempts to accept the invitation, the invitee is not allowed into the Hapyning. The creator (and others if authorized) receives notice of each new member accepting, declining or dropping out of a Hapyning.

Attention is now directed to FIG. 2O. As earlier described, a user may access message attachments sent at various times in a Hapyning by scrolling through that Hapyning and identifying and opening each attachment in the context of the message with which it was sent. Alternatively, as shown in FIG. 2O, the user may select the Files page via the navigation wheel to reveal, as thumbnails or as a listing (or otherwise), all of the attachments in the Hapyning. As noted in FIG. 2O by the touch sensitive blocks labelled All, Images, Videos and Doc's, the user may individually select and segregate attachments by these (or any desired additional) criteria for ease of reference. Preferably, the attachments each carry descriptive titles enabling the user to see a description of the attachment without opening it. The attachments may also open in preview mode by touching a particular attachment, a feature well-known to the art.

If desired, there may be a button in an unobstructive spot on the screen of an opened attachment allowing the user to directly access the message that accompanied the attachment to avoid the necessity for the user having to directly view the Hapyning stream and search for the message that accompanied the attachment. This feature is shown by the screen to the upper right of FIG. 2O, which was opened by tapping on a particular message in the FIG. 2O screen. Tapping on the "show message" block immediately below the opened file opens the message to which the File was attached. The message (and the sequential flow of messages in the stream) may provide needed or helpful context for the attachment, such as where and when a photo was taken and the names of the persons in the photo. Alternatively, the instruction to open the message accompanying an attachment may be accessed by providing a check box at the bottom of the FILES page which, only if checked, enables access to messages accompanying attachments.

Tapping the + sign to the right of the Docs block in FIG. 2O opens the modal or submenu shown to the immediate right of the + sign. This modal allows the user to take a photo or video, make an audio note, or choose an existing file of any kind for addition directly to the files for a Hapyning.

The Files page for each individual Hapyning permits a user to directly access the Files page of any other Hapyning. Specifically, as shown in FIG. 2O, tapping on the name (Bike Club) of the Hapyning at the top of the Files page opens a submenu listing all of the other user's Hapynings. Tapping on the desired Hapyning in the submenu takes the user directly to the Files page of the selected Hapyning. In other words, the user may directly switch between Hapynings in the File mode.

FIG. 3 discloses important features that may be included in any of the embodiments of the invention, among other things, a way to create, logically and easily group and manage related Hapynings. In this regard, a single Hapyning, such as the "Bike Club" may involve many different albeit related activities, events and the like—some transitory, some long term, some involving only a subset of the Bike Club membership, some involving club management, some involving a host of other matters, and some, but not all of which, a user may desire to include in the River page. The invention enables a user to interact with many different tracked objects (including related objects) with ease and in a highly organized fashion, without the user having to engage in any filing of messages or documents or any other inconvenient or burdensome tasks.

The organizers or managers of the Bike Club as creators of the Hapyning determine how to separate different aspects of Bike Club activity for the benefit of the Club and its members by creating related, but separate Bike Club Hapynings. Some members may not even subscribe to certain of the related Hapynings. If the Bike Club has a website, a direct link to it may also be accessed from within each Hapyning (as earlier described in connection with FIG. 2F), and without the necessity to enter the usual password and username as the user is already authorized through membership in the Bike Club Hapyning, a significant convenience. This important feature promotes greater interaction between an organization and its members and makes the organization website much more likely to be visited with frequency.

Members timely receive messages in the Bike Club Hapynings, such as discussion forums, to which they have subscribed with the messages conveniently grouped by activity. The messages, or the Hapynings themselves, may offer timely links to important information at the organization website or elsewhere. Those skilled in the art will recognize that the invention has applicability to any kind of organization, profit or nonprofit, as well as any other kind of group activity. Organizations which have websites will find the invention to be greatly to their advantage as the invention will heighten the relevance and utility of the website for all concerned.

Figure 3A:
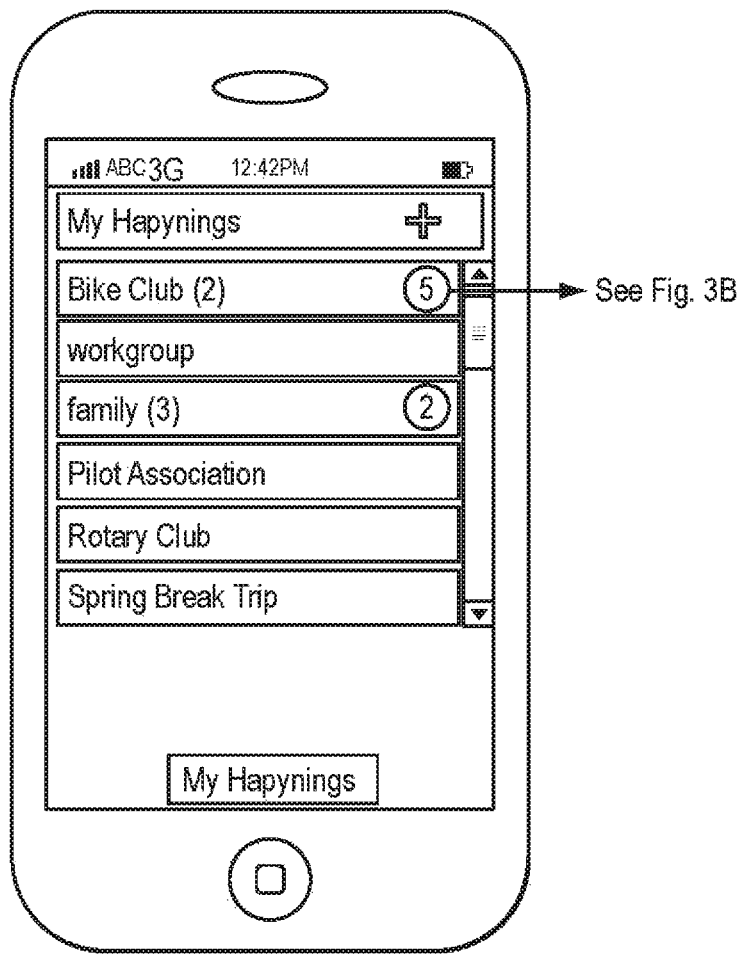
Figure 3B:
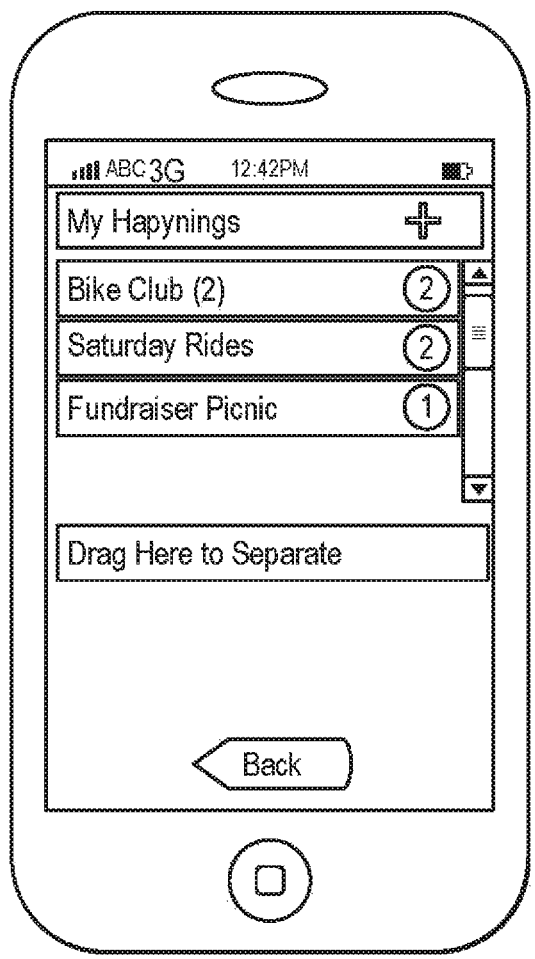

FIG. 3A shows a My Hapynings page in the modified embodiment (as selected by the user via the navigation wheel). The numeral 2 in parentheses immediately adjacent "Bike Club" and the 3 in parentheses next to "Family" indicates that these Hapynings have, respectively, two and three related Hapynings. How those related Hapynings came to be will presently be explained.

In FIG. 3A, the numerals 5 and 2 in the red circles at the right sides of, respectively, the Bike Club and Family blocks denote that Bike Club and its related Hapynings have a grand total of five new messages, while Family and its related Hapynings have a total two new messages. Tapping on the exemplary Bike Club block takes the user to the Related Hapynings screen, FIG. 3B, where Bike Club and its two related Hapynings are shown in separate blocks or boxes, namely, Bike Club, Saturday Rides and Fundraiser Picnic. Note in FIG. 3B that the "(2)" adjacent Bike Club has been carried over from FIG. 3A and that this number corresponds in number to the related Hapynings boxes immediately below. The numerals 2, 2 and 1 in red circles in these respective blocks depict the number of new messages in each of the related Hapynings for a grand total of 5 messages, as shown in FIG. 3A, for the three related Hapynings. The user can access the messages in each of these related Hapynings by tapping on the particular Hapyning block, which takes the user to the chronological "stream" for that Hapyning.

Note that Bike Club and Family are denoted in FIG. 3A as the marquee Hapynings for their respective groups of related Hapynings. The user may easily change which of the related Hapynings is given the marquee status. Specifically, in FIG. 3B, the user may drag to the top of the related Hapynings list either of the two Bike Club related Hapynings (Saturday Rides or Fundraiser Picnic) and that Hapyning will then become the marquee Hapyning. The user may also easily separate related Hapynings into unrelated Hapynings by dragging the Hapyning that is desired to be made unrelated to the "Drag Here to Separate" Box. Thus, the user may easily relate and unrelate any number of Hapynings in any way desired through use of gestures that are commonly understood.

Referring to FIG. 3A, unrelated Hapynings are made related Hapynings by the familiar practice (for the creation of folders) of "dragging and dropping" one Hapyning into another Hapyning for which it is desired to create a related status. For example, if in FIG. 3A, the Spring Break Trip is dragged to and dropped into Rotary Club, the two Hapynings will be designated related with Rotary Club having the marquee status. Any number of Hapynings may be designated as related in the way just described, and the related status may be reversed at any time as described in connection with FIG. 3B.

The names of Hapynings may be created (or changed) to show their related status and to identify which of the related Hapynings has marquee status. For example, in FIG. 3B, the names of the two Bike Club related Hapynings could be changed to Bike Club/Saturday Rides and Bike Club/Fundraiser Picnic so that both the related status and the marquee Hapyning in the group are readily apparent from the titles alone. Tapping the "back" button at the bottom of FIG. 3B screen takes the user back to the main My Hapynings page, FIG. 3A, from which the user may take such other actions as there desired, or the user may "swipe" the My Hapynings block at the bottom of the page to move to another of the navigation wheel pages.

Figure 4A:
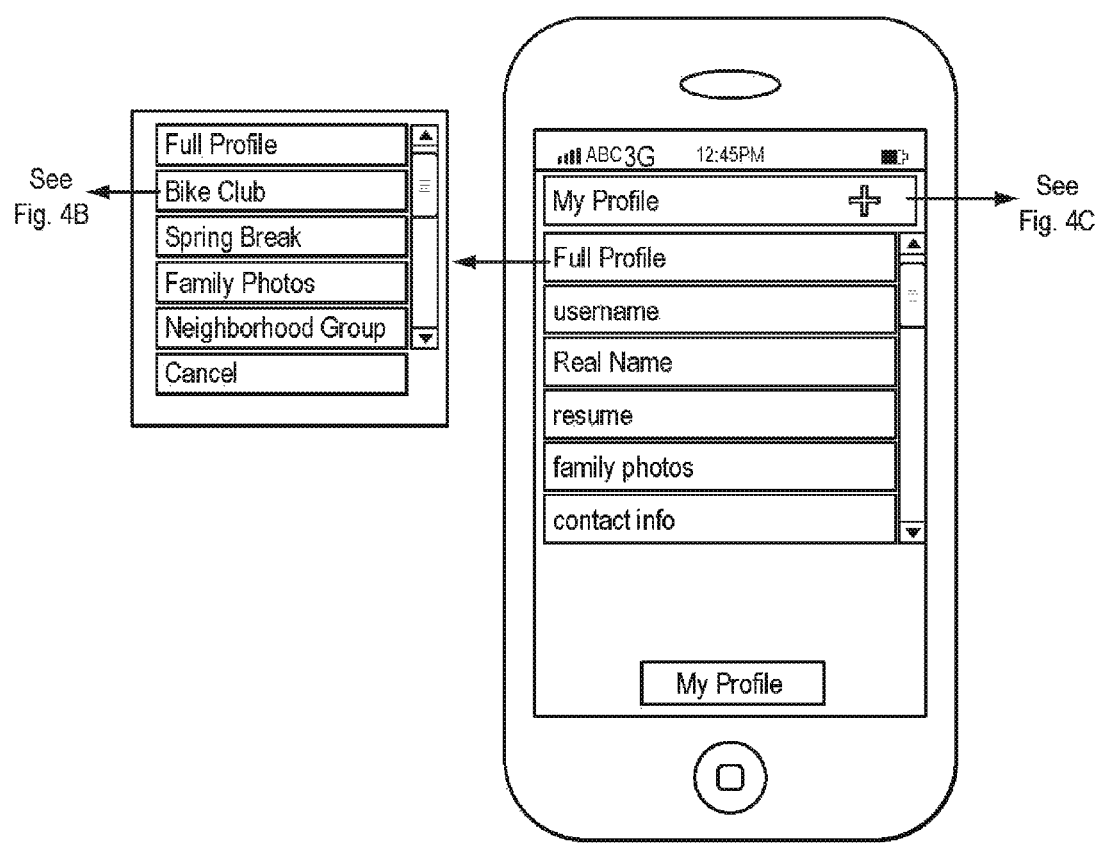
FIGS. 4A, through 4C are exemplary smartphone wireframe diagrams depicting another enhancement to the first invention embodiment, specifically an improvement relating to user profiles.
Figure 4B:
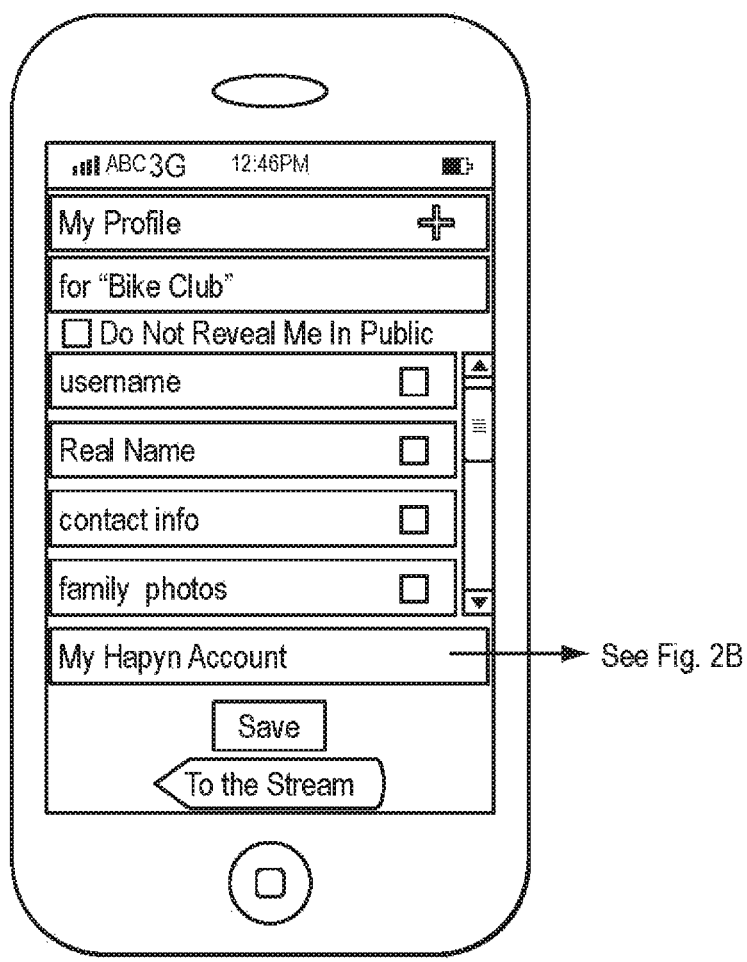

Attention is now directed to the drawings of FIG. 4 which shows an embodiment modification and improvement by which a user may quickly and easily create and manage new and different profiles for each individual Hapyning, i.e., each tracked object. More specifically, in FIG. 4A, the My Profile page has been selected from the navigation wheel. Unlike the profile page shown in FIG. 2A, the FIG. 4A profile page has a header My Profile below which there is a Full Profile block followed by a series of individually named blocks. Aside from one or more base profile elements required for participation in the Hapyning ecosystem, such as username, all of the individual profile elements are named and their content composed by the user and are wholly separate from one another. In FIG. 4A, the user has already added profile elements identified by the descriptions real name, resume, family photos and contact information.

Figure 4C:
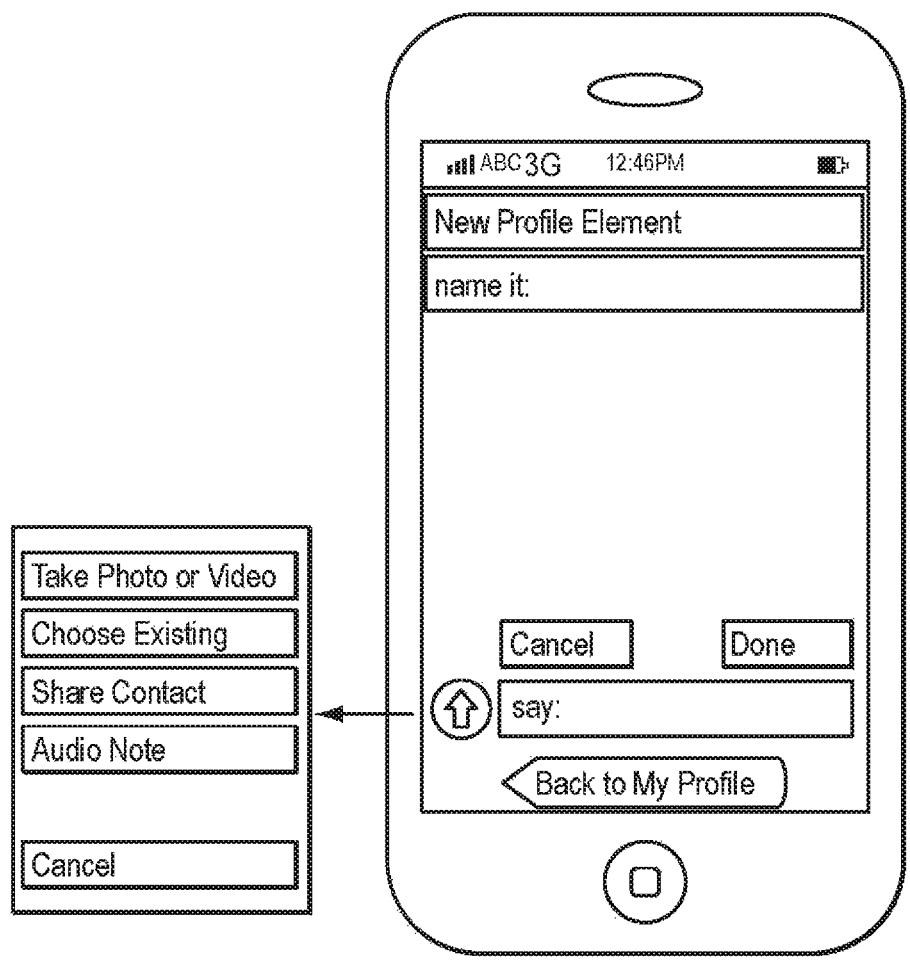

The user may add any number of additional profile elements by tapping the + sign at the right side of the My Profile header in FIG. 4A, thereby opening the new profile element screen FIG. 4C. As there shown, the user can name the new profile element, add text, add photos, videos, etc. in the manner previously described in the context of the earlier profile page, but in this embodiment there are any number of individually created profile elements that in the aggregate constitute the "Full Profile" shown in the block in FIG. 4A.

The content of the individual elements of the Full Profile may be viewed by tapping on the separate and individually named profile element blocks shown in FIG. 4A. The profile elements may be edited, modified or deleted at any time by the user. Any number of elements may be included in the Full Profile; elements not visible in FIG. 4A may be viewed by using the scroll bar.

Tapping on the Full Profile block in FIG. 4A opens the screen or modal shown at the end of the arrow immediately to the left of the Full Profile block. This modal lists in scrollable fashion all of the tracked objects, i.e., Hapynings, that the user earlier created. By tapping, for example, on Bike Club, the user is taken to the screen of FIG. 4B on which is listed in separate blocks all of the elements making up the user's Full Profile. Each profile element block has a checkbox; tapping on the checkbox places a checkmark in the box while tapping a second time removes the check mark. Only elements checked are part of the profile for the particular Hapyning, here Bike Club. Tapping "save" preserves the boxes checked and tapping "to the stream" at the bottom of the screen takes the user back to the stream for the Bike Club. The user may at any time re-visit this screen to change the profile elements visible for a particular Hapyning. The profile elements feature is highly beneficial since users may wish for obvious reasons to present a different personal profile to members of their aviation club than they do, for example, to the members of their church choir, their office work group, their rugby team or their family.

Attention is now directed to the drawings of FIG. 5 which show an embodiment modification and improvement by which a user may keyword search the user's Hapynings. The principles of search are, of course, well-known, as is the technology for constructing and using a search function. The invention contributes to search a highly convenient, uncluttered and quick way on mobile devices to selectively search the streams, files and members, i.e., all of the content, in any or all of the user's Hapynings.

Figure 5A:
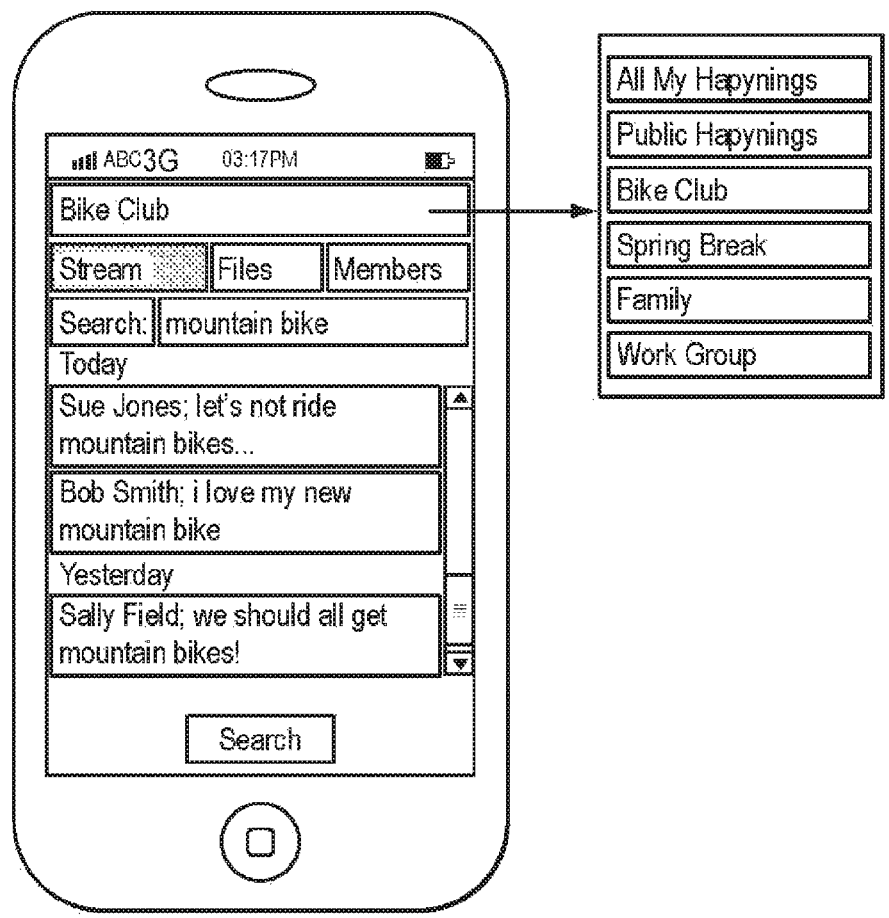
FIGS. 5A through 5D are exemplary smartphone wireframe diagrams depicting a further enhancement of the first invention embodiment, specifically an improvement relating to search.
Figure 5B:
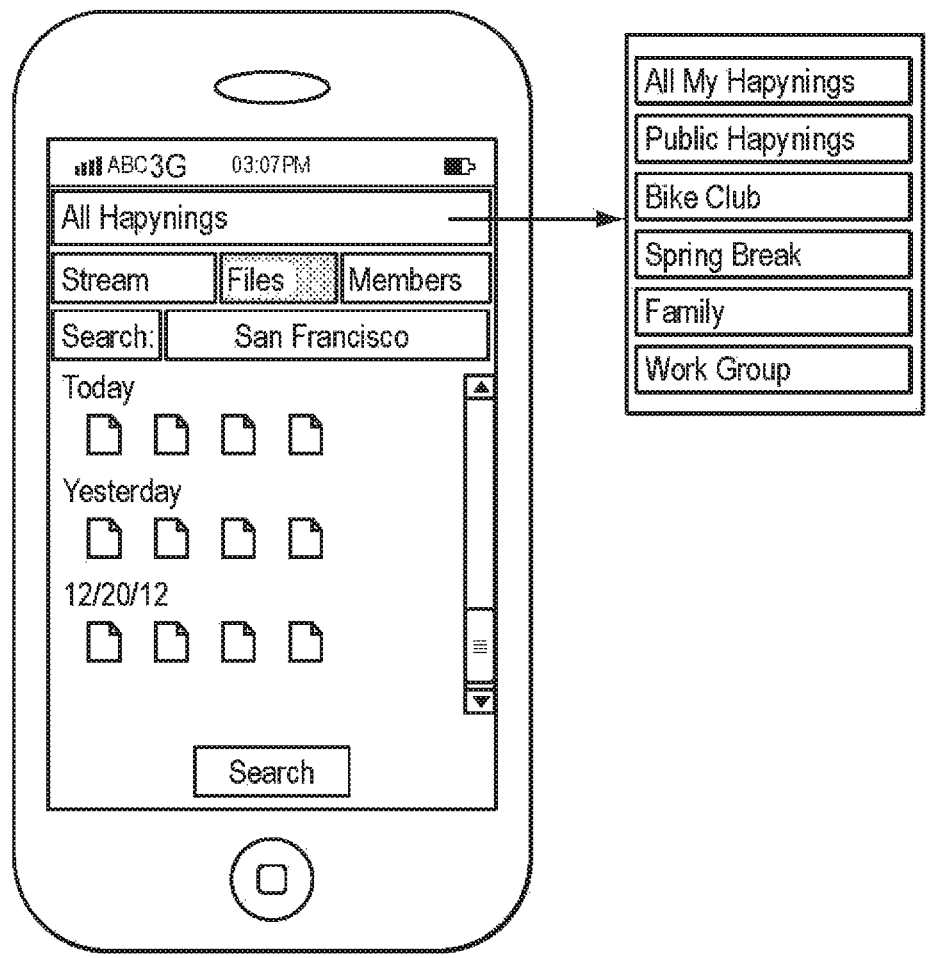
Figure 5C:
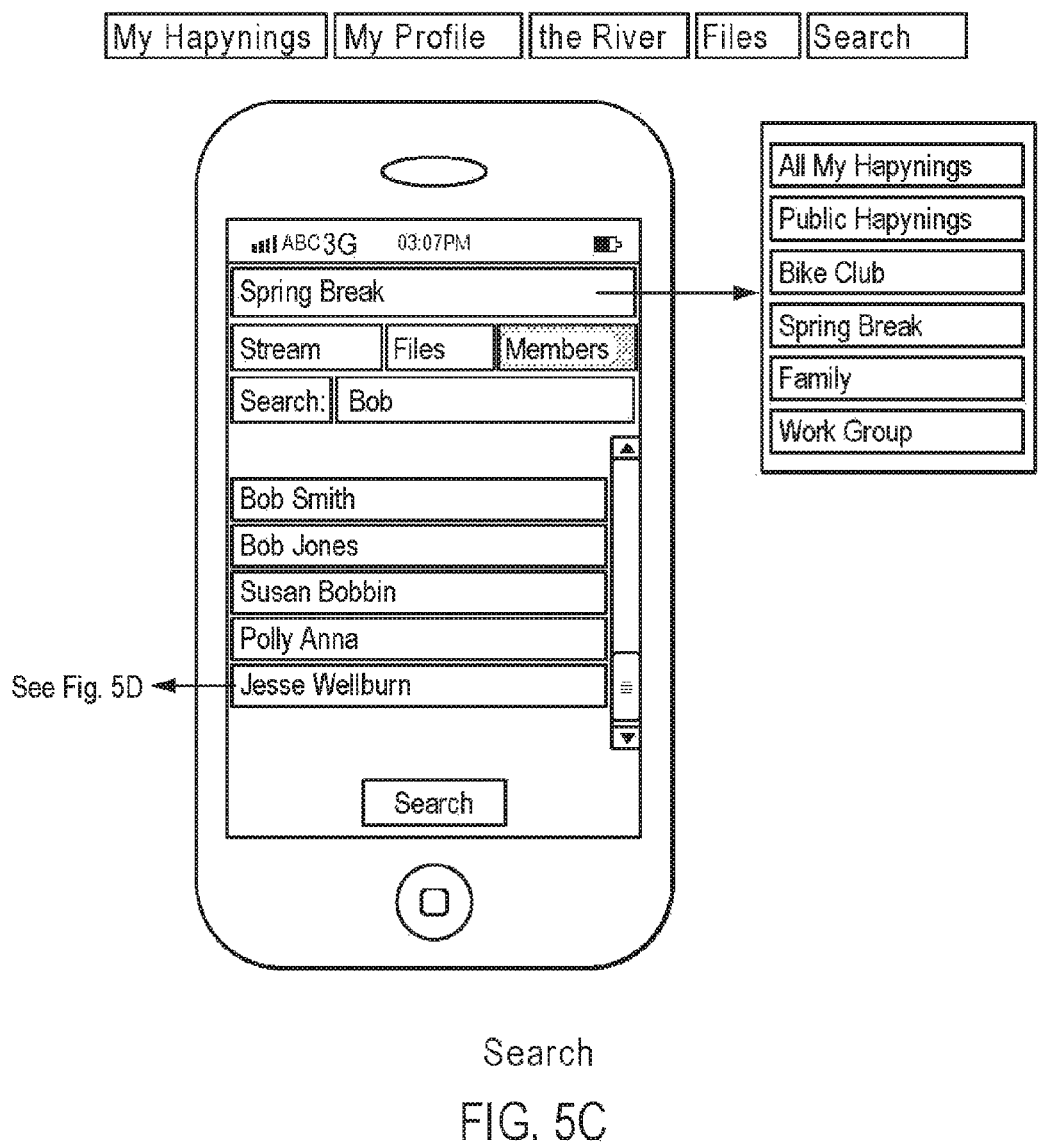

To the above end, the navigation wheel shown in FIG. 5 is provided with an added destination or page, termed "Search." In each of the FIGS. 5A-5C, the "Search" page has been selected by the user; these three figures show various search features of the invention that enable the user to perform a keyword search in any selected one or all of the user's Hapynings with the search results automatically being returned separately for the Stream, Files and Members.

Selection of the Hapyning(s) to be searched is made by tapping the uppermost block in FIG. 5A which opens a modal listing in separate tap sensitive blocks "all My Hapynings" and each of the user's individual Hapynings, as shown. Tapping the desired box causes the corresponding term to be entered at the top of the screen, here Bike Club as the single Hapyning to be searched. The word(s) or phrase to be searched is entered into the search box, here the term "mountain bike."

Below the search box in FIG. 5A, there are in a single line three touch sensitive boxes named Stream, Files and Members. The block "Stream" is highlighted to denote that the user has tapped this block thereby to call up on the lower part of the screen every Bike Club communication in which the search term is found. Scrolling the screen in familiar fashion brings up all the additional communications, if any, in which the search term is found in Bike Club. Tapping on a particular communication returned by the search takes the user to the place in the Bike Club stream where the search term was used so that the user may view the term in context. The user returns to the FIG. 5A screen by tapping a "back" button at the bottom of the stream page.

In FIG. 5B, the user has chosen to search All Hapynings for the term "San Francisco" and to select for display all Files having the search term. The Files returned, as shown below the search box, may be displayed in chronological or other order and, if desired, the files may be further segregated by type, such as documents, photos and videos, using well-known technology thereby to enable the user to further narrow the search. The search function for Files is obviously enhanced if the individual files were earlier given highly descriptive titles and/or pertinent word tags, as is often the existing practice in connection with photos or videos.

Figure 5D:
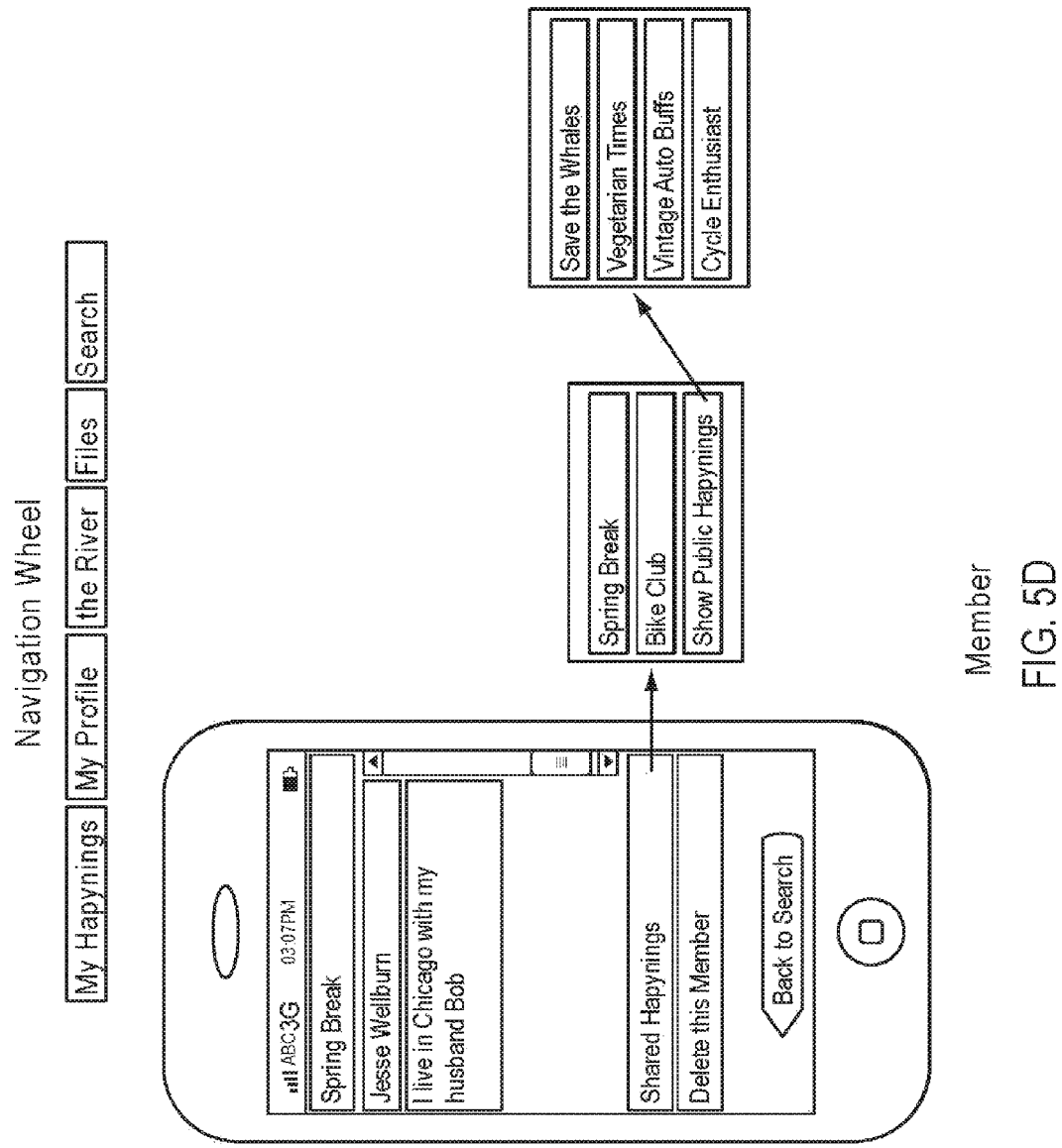

In FIG. 5C, the user has chosen to search "Spring Break" for the term "bob" and to select for display Members information where the search term is found. The member information returned, shown below the search box, includes two members having the name "Bob," one member where "bob" is part of her name and two members that appear not to include the term. Tapping on an exemplary one of these two names, Jessie Welburn, takes the user to that member's profile for the Hapyning, as shown in FIG. 5D, where the search term is found. In short, the search returns not only member names that use the selected search term, but as well all member profiles containing the search term.

The FIG. 5D screen provides the user with the option to delete the member from the Spring Break Hapyning, assuming that the user was the creator of the Hapyning or is otherwise authorized to delete members. The delete option will not be shown as a choice for other members. A second option, provided to all members of the Hapyning, is "Shared Hapynings." Tapping on this block takes the user to a modal listing all of the Hapynings that the user and the member, Jessie Welburn, have in common, as shown in FIG. 5D. Specifically, the modal lists two private Hapynings in common, Spring Break and Bike Club. Private Hapynings are those in which only the individually authorized members of the Hapyning have access. Thus, the search would not show all of Jessie Welburn's Hapynings, but only those in common with the member.

The FIG. 5D modal also has a selection for "Show Public Hapynings" that the user and selected member have in common. Public Hapynings, presently to be explained in detail, are those in which the creator has authorized the public at large to see the Hapyning, and perhaps (as the creator determines) to participate in it or make comments. Hapynings would be made public where, for example, the creator decides that the Hapyning is a matter of significant public interest and likely to obtain a broad following and, to the extent that the creator authorizes, significant public participation. The Hapyning creators either may be talented persons that wish to share their knowledge or expertise with other individuals and organizations, formal or informal, profit or non-profit, that wish to attract a participation and following (as Save the Whales), collectors (as vintage car buffs, watch collectors, etc.) and innumerable others as those skilled in the art will appreciate. The creators may also be celebrities that wish to attract a following to themselves as the tracked object, and easily share what they wish to share and control the terms of participation of followers in their Hapyning.

Public Hapynings are discoverable from any appropriate public resource, such as a Google search engine, and in other ways presently to be described in connection with FIG. 10. On joining a public Hapyning a user has the option of making their name and profile visible to the public or not (assuming the creator has not made identity and/or profile a prerequisite of joining the public Hapyning). The user may join a public Hapyning, perhaps only to follow and not comment, without making the user's identity visible (if authorized by the creator). The conditions for joining a public Hapyning are those set by the creator, and may include any of a variety of user established terms and conditions offered as options within the system, as will be understood by those skilled in the art.

The Public Hapynings which the user and Jessie Welburn have in common are, as shown in the second modal of FIG. 5D, Save the Whales, Vegetarian Times, Vintage Auto Buffs and Cycle Enthusiast. There may also be a selection for "semi-public" to enable the creator to share a Hapyning with everyone in the Hapyn ecosystem, but not make it visible to or discoverable by the public at large. Of course, any person could discover the "semi-public" Hapyning by joining Hapyn and doing a keyword search in the manner previously described.

Attention is now directed to FIG. 6 which shows a further modification and improvement of the invention that allows a user to selectively receive advertisements, discount offers and other solicitations, if desired. As will be seen, the advertising feature of the invention provides substantial and long desired benefits to both users and advertisers, not found or able as a practical matter to be implemented in connection with other forms of internet based commercial (or nonprofit) marketing or advertising.

Figure 6A:
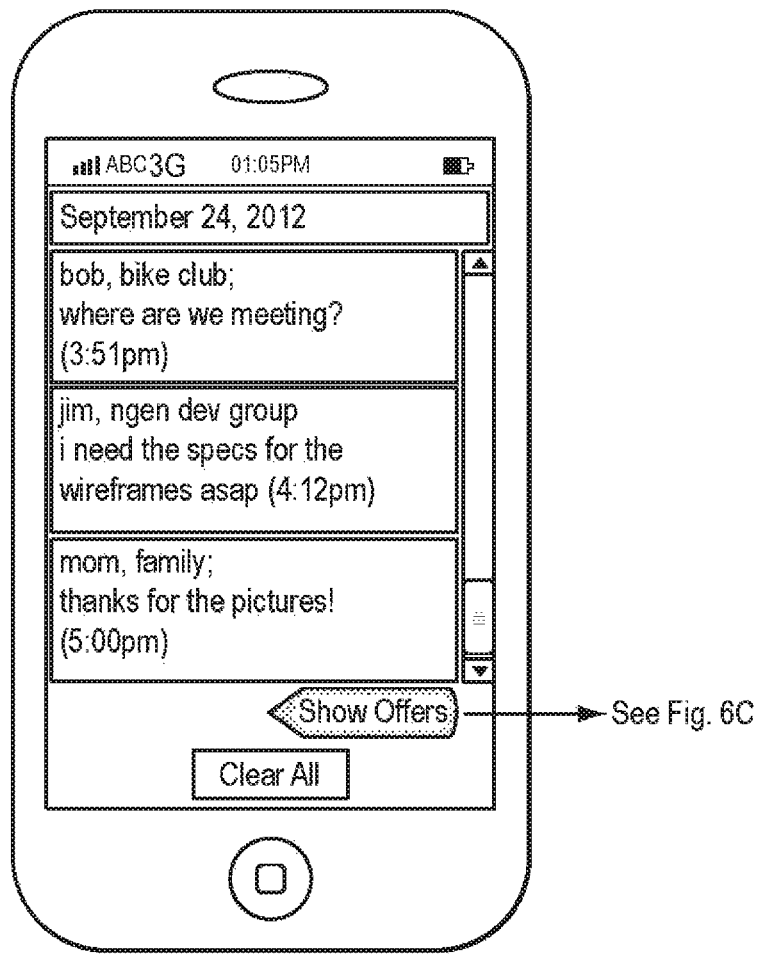
FIGS. 6A through 6E are exemplary wireframe diagrams illustrating yet another enhancement to the first invention embodiment, specifically an improvement relating to marketing and advertising.
Figure 6B:
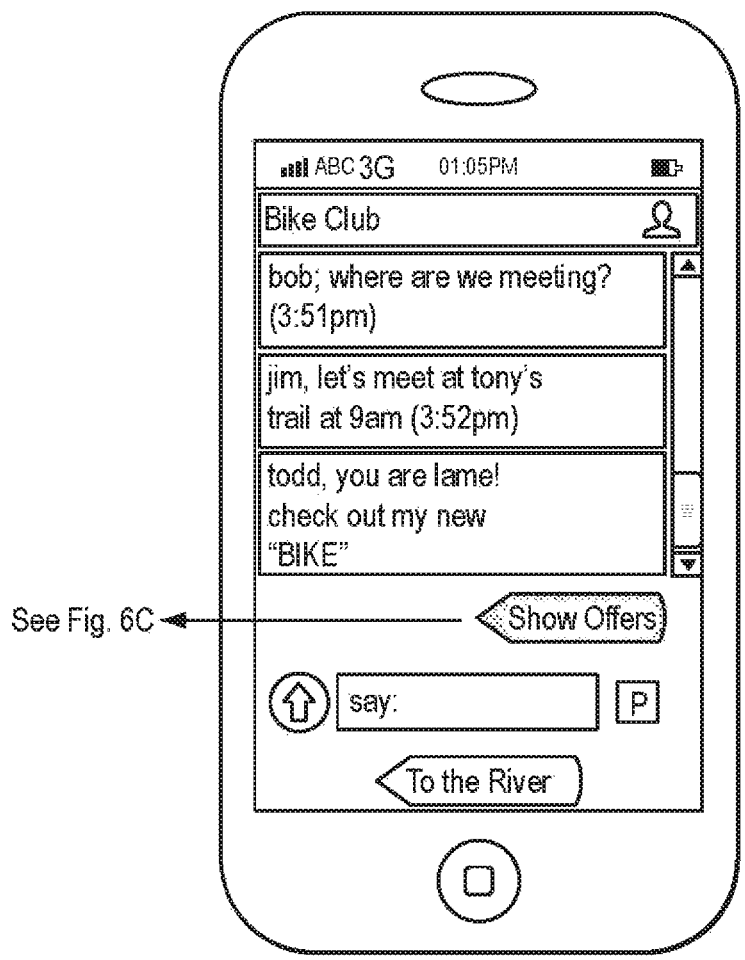

Referring to FIG. 6A, a highlighted tab "Show Offers" is depicted at the bottom of a user's normal River page, the River page having been earlier described in detail in connection with FIG. 2. The "Show Offers" tab is also displayed on the streams of each of the user's individual Hapynings as shown in FIG. 6B. The offers tab for an individual Hapyning only shows offers relevant to the content of that Hapyning while the "Show Offers" tab in the River reveals offers pertinent to any Hapyning included in the River.

The user may opt to have the "Show Offers" tab displayed or not displayed and may set terms and conditions on the offers within account settings and elsewhere as will be explained. Even with the Show Offers tab displayed the user may choose to ignore it. This feature assures that the user does not encounter advertising unless it is desired, unlike popular search engines and other web based services that assault the user with advertising whether desired or not. The user may also determine whether or not to provide demographic and other data (but not information having the potential to reveal personal identity) of a kind known to be useful in better targeting offers to consumers, that is, making the "Show Offers" page more likely to display offers of interest to the user and to not display offers not of interest. The decision whether or not to display the "Show Offers" page, and whether or not to provide demographic and other relevant data or the like, may be made by, for example, checking or not checking appropriate boxes of a form located in the user's profile page or account settings. If desired, users may opt to have advertisements and discount offers shown for some Hapynings and not for others.

Figure 6C:
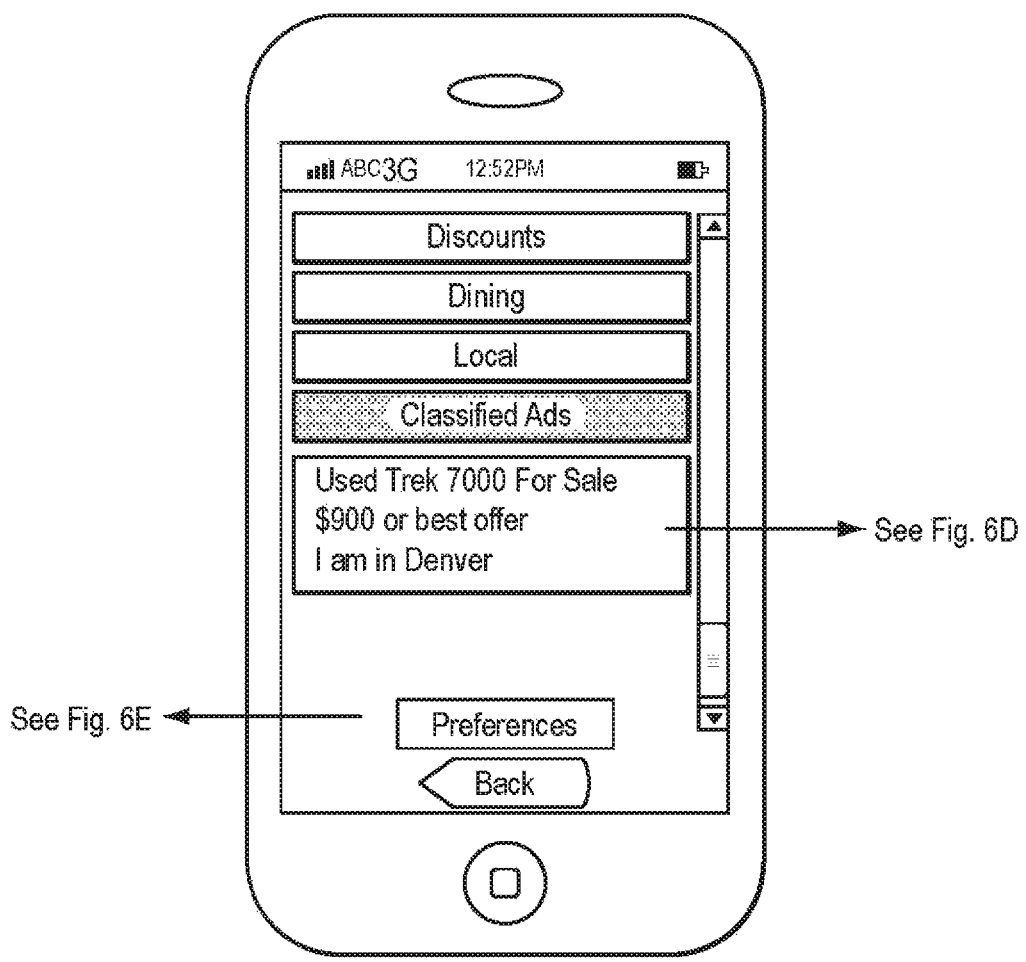

Tapping on the "Show Offers" tab in either of FIGS. 6A—The River or FIG. 6B—Single Hapyn Stream takes the user to the Advertisements/Offers Tab of FIG. 6C where the user may look to ads that fall into any of a number of pre-selected categories, for example, Discounts, Dining, Local and Classified Ads as shown in FIG. 6C. If the screen of FIG. 6C is reached by tapping on the show offers tab in the River screen of FIG. 6A, the ad categories displayed will be those applicable to all Hapynings displayed in the River and the individual ads shown in each category will be those applicable to all Hapynings in the River. On the other hand, if the FIG. 6C screen is accessed by tapping on the show offers tab of an individual Hapyning, here the single Hapyning stream for Bike Club shown in FIG. 6B, the user will only see in FIG. 6C those ad categories and ads relevant to that Hapyning. The ads in each category may originate from individuals, organizations and businesses of all kinds provided that they are members of the Hapyn ecosystem and comply with the online constraints for advertising; indeed, an ad cannot be put into the system unless the online rules and constraints are followed. Unlike search ads, this assures a consistency in format and presentation by making advertising and the like subject to the online, automated rules of the Hapyn ecosystem. How the advertising categories shown in FIG. 6C are selected, how individuals ads are composed and how they reach the user will be described later.

Advertisements and discount offers or the like reach the user's FIG. 6C screen based on words in the conversational or other content of individual Hapynings that are used as keywords to target ads. The use of keywords to target advertising is familiar to those skilled in the art and is used in virtually all of the websites and apps that present ads including as prominent examples Facebook and Google. Since the advertising is directed to a Hapyning rather than to an individual and since all members of a non-public Hapyning are not visible or disclosed, the anonymity of the individual user is preserved relative to the advertiser, yet highly targeted ads and offers can be directed to users based on the content of a Hapyning.

The invention allows advertisers to directly compose their own ads or offers (even on the spur of the moment), to tailor the reach of the ads according to various criteria as will be seen, and to directly broadcast ads into the blind, but in a manner calculated to reach relevant Hapynings. The invention enables the elimination of middlemen, that is, enables disintermediation of the interaction between advertiser and prospective customer. However, if desired, the invention enables the system operator to become a highly efficient, automated intermediary between parties to a transaction as will be recognized by those skilled in the art. The system also allows existing platforms such as Trip Advisor or Open Table to link into the advertising tab and automatically integrate their offerings for, in this case, restaurants and hotels and airline reservations into the offerings in the tab. Activity or transactions on these platforms which originated from the system would be trackable so that revenue could be derived in this manner.

Potentially relevant ads and offers are made available to the user without the necessity of the user making, for example, a search on Google, with all the negatives that entails, or for that matter taking any overt action. The conversations and other content within Hapynings developed in normal course provide, from the user's standpoint, a "passive" search. As will be appreciated, even though the system is efficient in targeting ads, there is an element of serendipity in ads attracted which can make it highly enticing for a user to open the offers tab.

The user may also attract ads of a particular kind by deliberately placing keywords in a Hapyning. For example, if a group has formed a Hapyning to plan a ski trip to Jackson Hole, the users likely will use words in the normal course of their Hapyning that will attract pertinent ads, but they can also deliberately include specific words and phrases that increase the probability of relevant ads being delivered, such as "Jackson Hole hotel" or "discount ski rentals." Users may also "double tap" on words in a Hapyning to highlight them so that they are given special prominence as keywords. In FIG. 6B, the word "BIKE" has been double tapped causing it to be presented in bold, all caps.

The user also decides whether or not to receive ads or offers at all, what types of ads or offers to receive and whether and to what extent to disclose demographic and other non-personal information. The system of the invention matches keywords and other information from advertisements to keywords and other information in Hapynings to direct advertising and offers. The system does not compile for advertising or other commercial purposes unique personal profiles of individuals using the Hapyn system. The connection is between advertiser and the Hapyning, not between advertiser and individuals. The advertiser also does not receive any particularized information about the Hapyning, as will be seen.

Figure 6D:
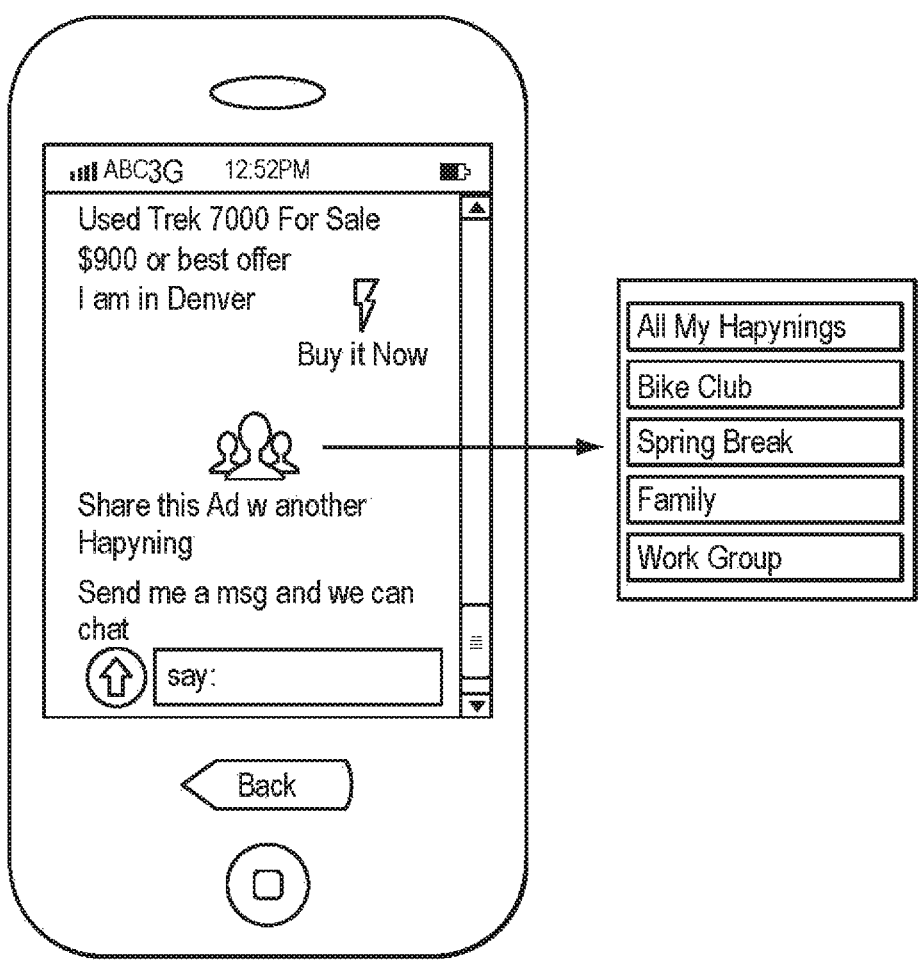

If the user taps on a particular ad category in FIG. 6C, here the highlighted Classified ads block, the user is taken to the screen FIG. 6D which provides a full display of any pertinent classified ads, any attachments, such as photos, and how to respond to them as well as certain additional user options. Presumptively, since the FIG. 6D ad shows a bike for sale, the user most likely reached this ad by tapping show offers in the Bike Club Hapyning stream of FIG. 6B with the bike ad being found in the classified ads category of FIG. 6C. FIG. 6D includes the ability to scroll a long ad. There is also a "buy it now" feature or the like, well-known to those skilled in the art, that allows a user to execute a transaction with one click using payment information from the Account Settings. As those skilled in the art will understand, there are many alternative ways to handle online financial transactions in a manner consistent with the teachings of the present invention. Executing purchases and other financial transactions directly from an offer or ad is efficient for the parties to a transaction and has additional useful purposes for the parties and the system operator, as will be seen.

In the middle of the FIG. 6D screen, there is a multiple head icon below which is the notation "share this Ad with another Hapyning." The user shares the ad by tapping on the head icon which opens the modal or screen at the end of the arrow to the right of screen FIG. 6D. The modal lists "All My Hapynings" as well as each individual Hapyning. Tapping on the desired block allows the user to send the ad or a link to it to members of any selected Hapyning or to all Hapynings. Ads may be preformatted as the classified ad shown with a buy now feature, etc. or they be freeform ads wholly created by the user, such as in those cases where individuals are selling one off items or the like. The user may respond to the ad with a message that is composed in the FIG. 6C "Say" block in a manner earlier described for messages in general. User responses to ads are sent only to the person that placed the ad, not to other members of the Hapyning, unless such distribution is desired. In other words, all communications between the two parties are normally private. The creator of the ad may conduct numerous private conversations with the persons responding to the ad.

Figure 6E:
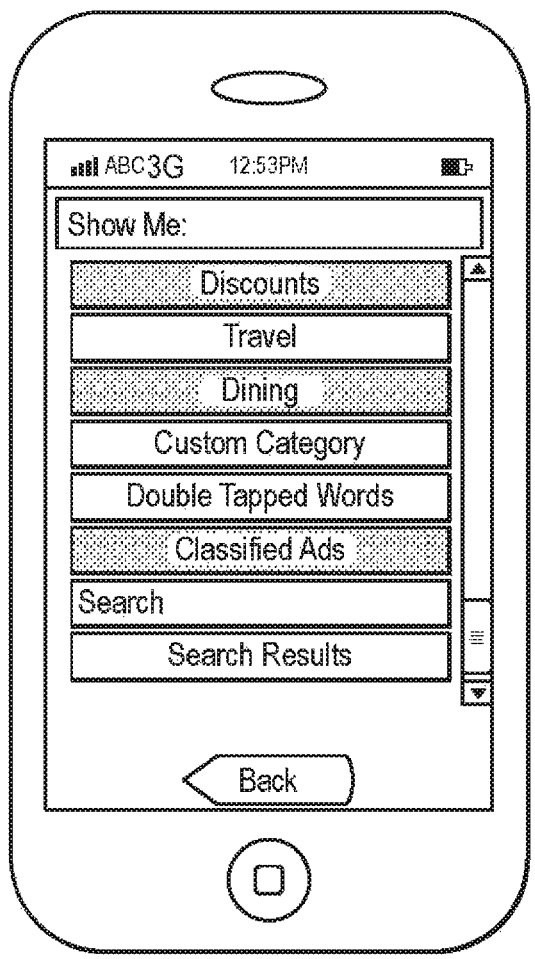

Note that there is a preferences block at the bottom of the FIG. 6C screen. Tapping on preferences takes the user to the advertisements/offers tab preferences screen of FIG. 6E. The user may scroll through a list of ad categories available and select to receive ads only from those categories of interest. In FIG. 6E, the user has double tapped certain category blocks to highlight them, namely, discounts, dining and classified ads. The user will receive ads only from those highlighted categories. As shown, the user may also select to receive ads based on words that were highlighted by double tapping them in a Hapyning stream thereby to elevate those words to particular importance in attracting relevant ads.

The user may also create one or more custom categories within the preferences pages that better target the user's interests by tapping on the "Custom Category" block shown and putting in the custom terms. The user may also make a keyword search of existing ads in the Hapyn ecosystem by use of the search function shown in FIG. 6D to see if any are responsive to the user's targeted search, such as "Yetti ASR 7 Mountain Bike."

The user may also tap on "search results" at the bottom of the page which accesses search engine results, from Google or the like, based on the automatic population of the search function with keywords from the Hapynings. In other words, the user does not have to leave Hapyn to do a Google search or populate the search box with keywords. Rather, by tapping on "search results" in the FIG. 6E screen, the user receives the Google or other search engine results automatically, based on the keywords the user has already employed in the selected Hapyning and which are automatically used by the system to execute a Google search when the "search results" block is tapped by the user. While this feature may have occasional use, the clutter of a public keyword search is obviated by the "walled garden" environment provided by the invention including the members requirements and the system rules governing how ads, offers or the like are handled.

Google searches typically produce an enormous number of responses in part because of the public scope of the search. Also, advertisers within public search engines have learned to game the system so that commercial responses are received for many things having little, if anything, to do with the search. In short, for better or worse, Google searches are comprehensive, but they often lead to burdening the user with enormous clutter so that the user must spend considerable time searching through the search results, and backing out of many to find desired information. As will be apparent to those skilled in the art, the present invention minimizes clutter.

Figure 8:
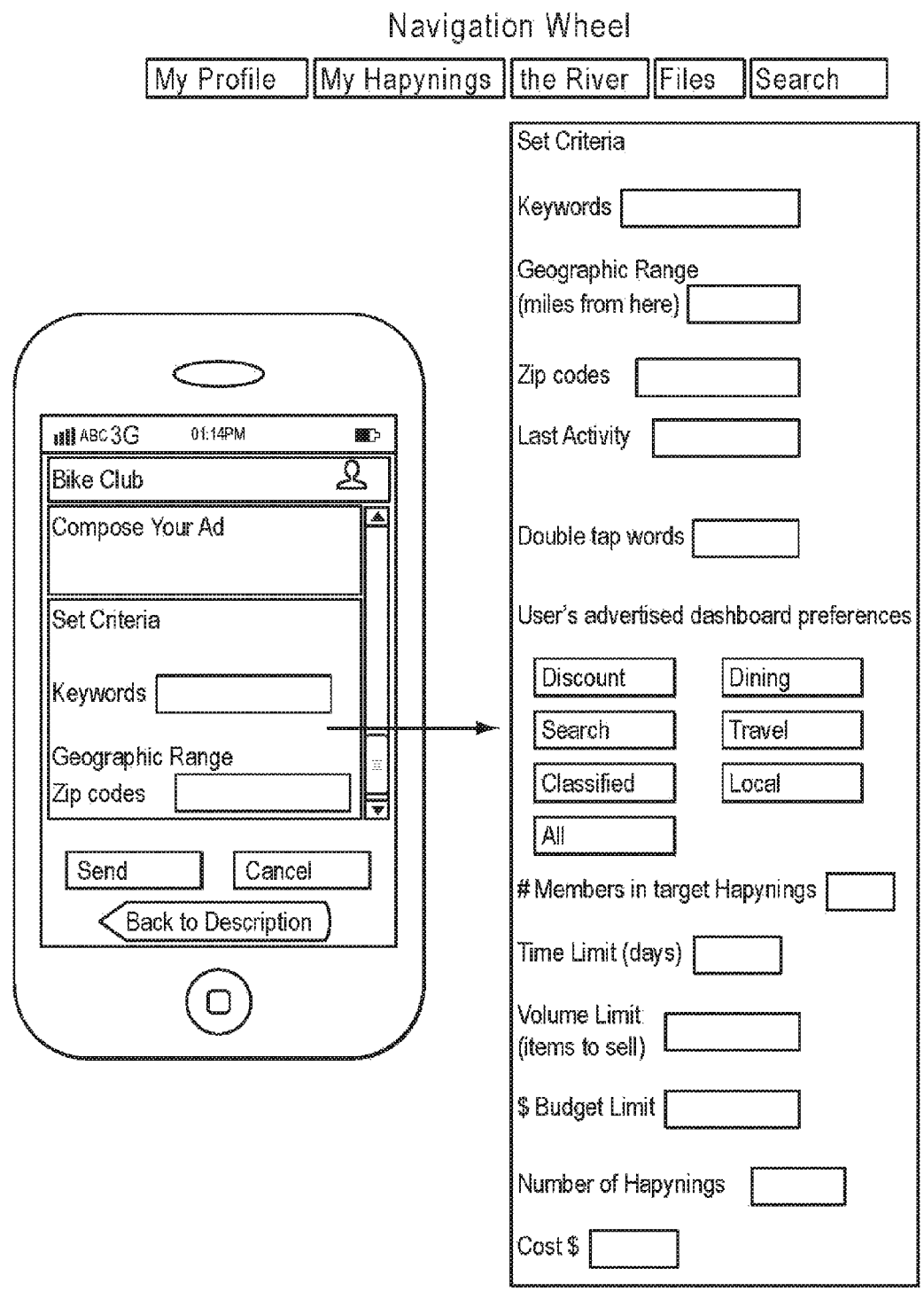
FIG. 8 is an exemplary wireframe diagram depicting yet another modification and enhancement to the first invention embodiment, specifically an exemplary embodiment of the place an advertisement feature of the invention.

The functions depicted in FIG. 6E and FIG. 8, presently to be explained, work together to allow users to find one another based on their stated preferences and those seeking to find others with matching preferences, for example, a person looking for a particular bike and one seeking to sell that kind of bike. This is done without either party losing privacy unless they decide to enter into a direct sale/purchase transaction. By contrast, current advertising techniques follow a user's browser histories across all areas and mine and collect personal information that the user may not wish to share. In the present invention, a common interest is "negotiated" via a preference indication and a neutral ground is provided in the form of the Hapyning which indicates users' preferences and interests (in the context of the Hapyning) without revealing further personal information or preferences which would allow advertisers to assemble a profile of that individual.

FIG. 7A shows a "description of a Hapyning screen" that may be in all respects like that earlier shown in FIG. 2H except that in the modified embodiment of FIG. 7 there is an additional touch sensitive block labelled "Options." Touching the Options block takes the user to the modal at the end of the arrow to the right of FIG. 7A which offers the user the options to make the Hapyning public, Place an Ad, Choose a Template and Delete or Archive, plus a Privacy option, to be discussed later. Additional options may be provided if desired. For example, there may be a choice to make public only within the Hapyn ecosystem, while excluding the public at large.

Figure 7B:
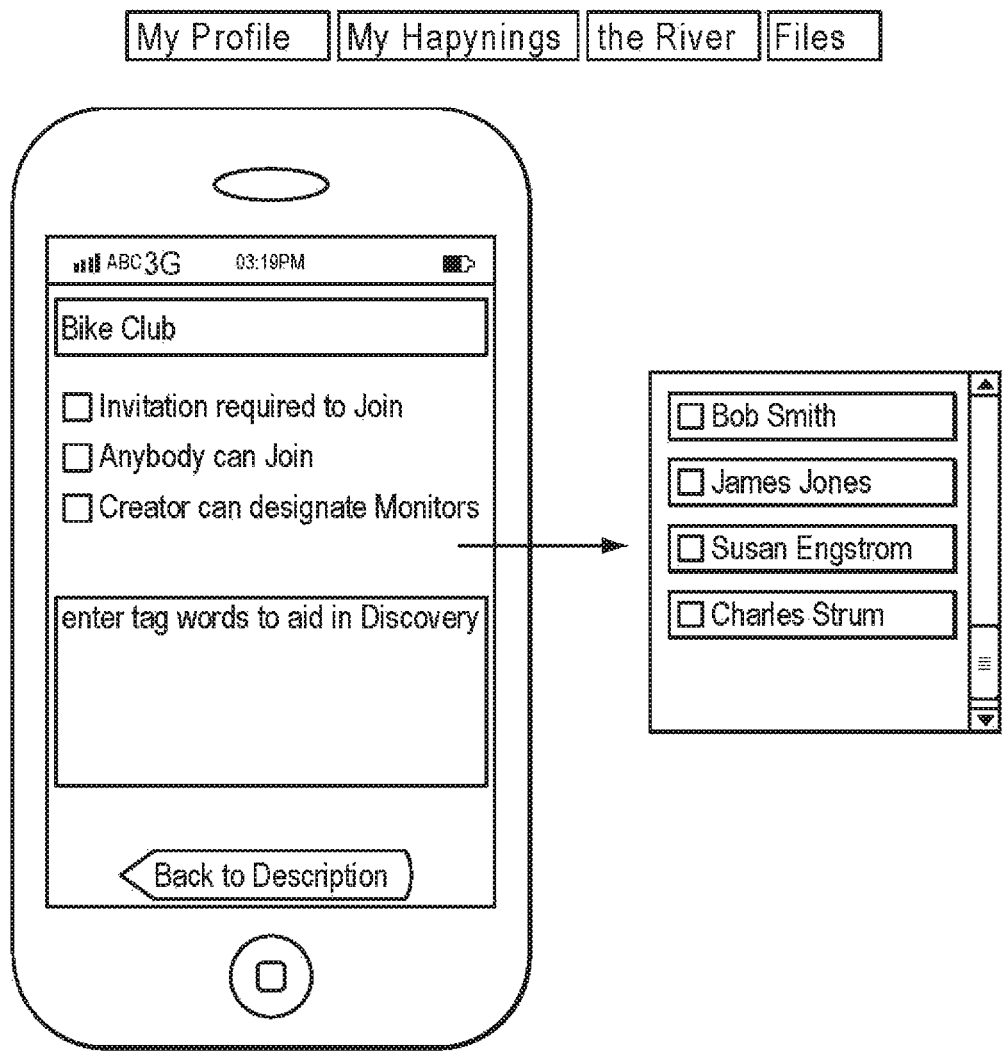

Tapping the Make Public block takes the user to the screen shown in FIG. 7B, where the user may place terms and conditions on the public Hapyning. For example, the first checkbox offers the ability to require an invitation to join the conversation or comment on the Hapyning to be made public. Specifically, by checking the uppermost box, only those invited to join the Hapyning may participate in it, even though the public at large is able to search for, find and observe the Hapyning conversations and other content via a browser or the like. Checking the second box enables any member of the public to join and participate in the Hapyning. The lowermost box offers the user the ability to designate monitors for the public Hapyning from the user's contact list or the like. While the Hapyning creator can always delete members of a Hapyning including a public Hapyning, this option allows the user to designate other trusted members as "monitors" with the same authority as the creator to delete objectionable content or disruptive members. Those skilled in the art will appreciate that other terms and conditions for public Hapynings may be designated as appropriate or desired.

Figure 7D:

Attention is now directed to FIGS. 7C and 7D. FIG. 7C depicts a browser window as displayed on a tablet or laptop computer in which window has been selected a web page for a person or organization, here the Open Space Foundation. Of course, instead of a browser window, the website may be accessed through an app, if one has been created for the website. The names of three different Hapynings are shown in blue on the Foundation web page to denote that the names are hyperlinks to respective Hapynings, or are otherwise embedded in the website for direct user access. Here the user has clicked or tapped on the Open Space Fundraiser Hapyning thereby to open it within the website. This enables properly permissioned visitors to the website to easily access and directly participate in Hapynings associated with the website. Of course, these Hapynings may also be accessed through the respective Hapynings themselves as earlier described. Hapynings embedded in websites may, among other things, serve as discussion and informational forums on topics of interest to some or all members of the organization.

FIG. 2F earlier explained shows a Hapyning with a link to a web page to enable a Hapyning user to conveniently access web pages associated with various Hapynings. This cross availability of personal or organizational web pages and associated Hapynings provides a kind of user/member interactivity including interactivity with websites not heretofore available. The website may contain historical and reference information that is changed with relative infrequency, a fact that deters routine visits to the website, absent a frequent need for such historical or reference information. By contrast, website associated Hapynings promote convenient and continued involvement of individuals with organizations and their websites. For example, a university alumni association, an aircraft owners' and pilots' association and innumerable other entities desiring to actively engage members can far more effectively do so by means of the invention than through the creation of only a website.

The Hapynings may provide ongoing user forums and other member interactivity as well as ways for websites to signal interested persons or members to visit the website, such as to see some updated information. In general, websites are inconvenient to visit even if bookmarked, and bookmarking is itself an impediment to easy access to a website. Organizations with websites are not visited as often as the organizations might like because of the inconvenience of navigating there and because users have no convenient way of knowing when and to what extent websites may have been updated with new and useful information. The present invention promotes timely, unobtrusive and pertinent communications via the invention and thus more intimate involvement of members with organizations and their websites.

FIG. 7D shows a Hapyning that has been embedded in an email thereby to allow creators of Hapynings to bring Hapynings to the attention of email users. The Hapyning may be accessed directly from the email, assuming that the Hapyning is public or that the email recipient is otherwise authorized. The embedded Hapynings function in the same fashion as the earlier described with standalone Hapynings. Once accessed through the email, the email recipient may choose (or not) to join the Hapyning, if authorized. Thus, the invention provides a functionality and usefulness not found in email or websites, yet has a compatibility with both email and websites.

FIG. 8 depicts one way in which a user may place an ad. The user reaches this screen by first tapping on the "place an ad" box in the FIG. 7A modal. The user may compose the content of the ad including photo attachments or the like as in sending a message within Hapyn. The user may also set a number of criteria for the advertisement by scrolling through the full "Set Criteria" screen as shown in full to the right of the wireframe diagram. Some sample criteria are shown but any number of criteria may be employed consistent with the teachings of the present invention. Keywords are words that most aptly describe the goods or services being advertised. The user can make the keywords/phrases more or less specific as desired. For example, the keyword "bike" likely would cause the ad to reach many more Hapynings than the specifically worded phrase "Orbea road bike." Another criteria is geographic range (miles from the ad creator's location) so that the ad is targeted only to Hapynings having one or more users within the specified distance. Alternatively, or complementary to geographic range, the user may select zip codes as the criteria for the areas reached by the ad. The specified zip code(s) may be the area in which the user resides or may target any number of zip codes arrayed around the country as the user selects.

The FIG. 8 set criteria form allows the user via the box "Last Activity" to only target those existing Hapynings that were actively used by its members within the last twenty days or whatever. This helps to assure that the advertiser is not targeting potentially infrequently accessed or dormant Hapynings. By checking the "# of Members in Target Hapynings" box, the advertiser may also specify a minimum number of Hapyning members as the only kind of Hapynings to which the advertisement will be directed. For example, a hotel may only wish to offer discounts if four rooms are reserved so its ads might only be directed to Hapynings having four or more members based on the premise that Hapynings mentioning hotels in Jackson Hole and having four or more members are the most likely candidates for the discount and that ads directed to Hapynings with fewer members could be an inefficient use of advertising dollars. The user may also set a time limit for the ad to run. Where goods are involved or services are delivered in units, the advertiser may set a minimum or maximum number of units for sale following which the ad will be discontinued. The user may also set a budget limit for advertising such that the ad is discontinued when the budget is met.

The advertiser can specify the targeting of double-tapped words, as explained earlier in connection with FIG. 6B. The criteria, "user's advertising dashboard preferences" allows the user to place the advertisement in one or more of several categories so as to only reach prospective customers that have chosen to receive ads in the designated categories, like Dining or Discount.

Setting the various FIG. 8 criteria leads to an identification of existing Hapynings that meet the criteria, that is, the system does a search thereby to populate the "number of Hapynings" box with the number of existing Hapynings meeting the set criteria. The "cost $" box also will be automatically populated to specify the cost to run the ad to the identified number of existing Hapynings. Thus, if the advertiser sets broad criteria only to discover that far too many Hapynings are being targeted at a cost in excess of the budget, the advertiser may narrow the criteria to come within the budget or within the maximum number of Hapynings the advertiser may wish to reach. The cost of reaching the targeted number of existing Hapynings is calculated by the system so as to specify a dollar cost in the bottom ad criteria window. Thus, an advertiser can know in advance what it will cost to advertise to the already existing Hapynings meeting the specified criteria.

If the cost to advertise to the existing Hapynings exceeds the budget, the user can narrow the criteria to bring cost within the budget. Alternatively, if the cost is below the budget, the ad will reach qualifying Hapynings that are created after the ad is released up to the time that the specified budget is spent or the time limit specified for the running of the ad, whichever occurs first. From the description, those of ordinary skill will understand that there are many other or alternative criteria that may be used for the placement of ads. For example, the advertiser may be offering a significant discount and the members of a Hapyning may only wish to see ads offering substantial discounts. The system enables the user to target just those people looking for a discount. The system may incorporate, for instance, the ability of a restaurant owner to target only Hapyning members within a specified distance from the restaurant that are monitoring "restaurant Hapynings" offering discounts. The offer may terminate when a specified number of people respond favorably to the offer or in response to other predetermined criteria.

Figure 9A:
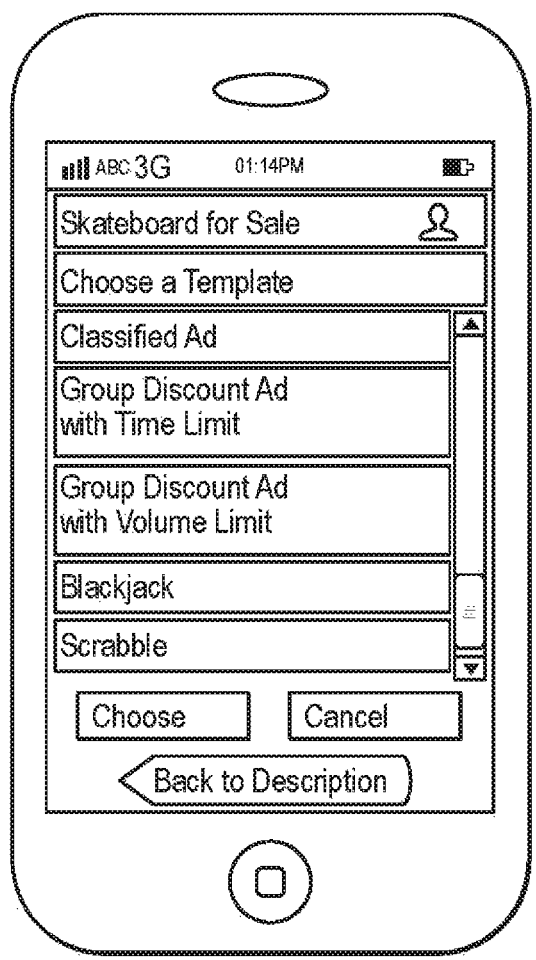
FIGS. 9A through 9E depict exemplary embodiments of further modifications and enhancements of the first invention embodiment including those relating to templates, apps, widgets and an online store.

The FIG. 7A modal allows a user to select the additional option, "Choose a Template." Choosing this option takes the user to the screen shown in FIG. 9A which offers the user a wide range of template options. These templates which may include apps and applications made available to users for access and/or selective download by tapping on the desired template(s). These templates, apps and applications may be of many different kinds to suit many different purposes, a few examples of which are depicted in the wireframe mobile phone diagram of FIG. 9A to format ads and play games. Many more examples are shown on a browser or the like, FIG. 9B, accessed via a laptop or desktop computer, a tablet computer or less desirably (only because of small screen size) mobile smart phones.

As shown in FIG. 9A, the user may be offered any of a wide range of templates, apps and applications, such as those preformatted and particularly suited for running different kinds ads, those for offering group discounts, those for games and so on. A discount offer form may allow the advertiser to select various other criteria on the offer and to present the offer in an attractive preformatted design. Use of these forms, as will be seen, enables users to also set criteria on the kinds of ads they wish to receive in their Offers Tab, for example, only discount offers from businesses within their zip code. The use of such templates provides a consistency in ad structures, content and categorization which is beneficial in electronically matching sellers and prospective purchasers.

The templates are formatted in all ways to best serve the interests of both buyer and seller. The walled garden of the Hapyn ecosystem, the establishment of categories and other criteria, and the use of thoughtfully formatted forms, among other things, minimizes the prospect that users receive ads of little or no relevance and that advertisers advertise to people having no interest in receiving their ad, results detrimental to all concerned. Moreover, in the present invention, the user becomes a participant in helping to best target ads to the user and is induced to do so by the fact of the controlled environment created by the invention, that ads of higher than normal relevance will be attracted, the identity of the user is maintained secret to preserve privacy and avoid receipt of unwanted ads, and that the user only need see ads when and within categories that the user is interested in seeing thereby avoiding the indiscriminate ad assaults and invasions of privacy so typical with online activity.

Figure 9B:
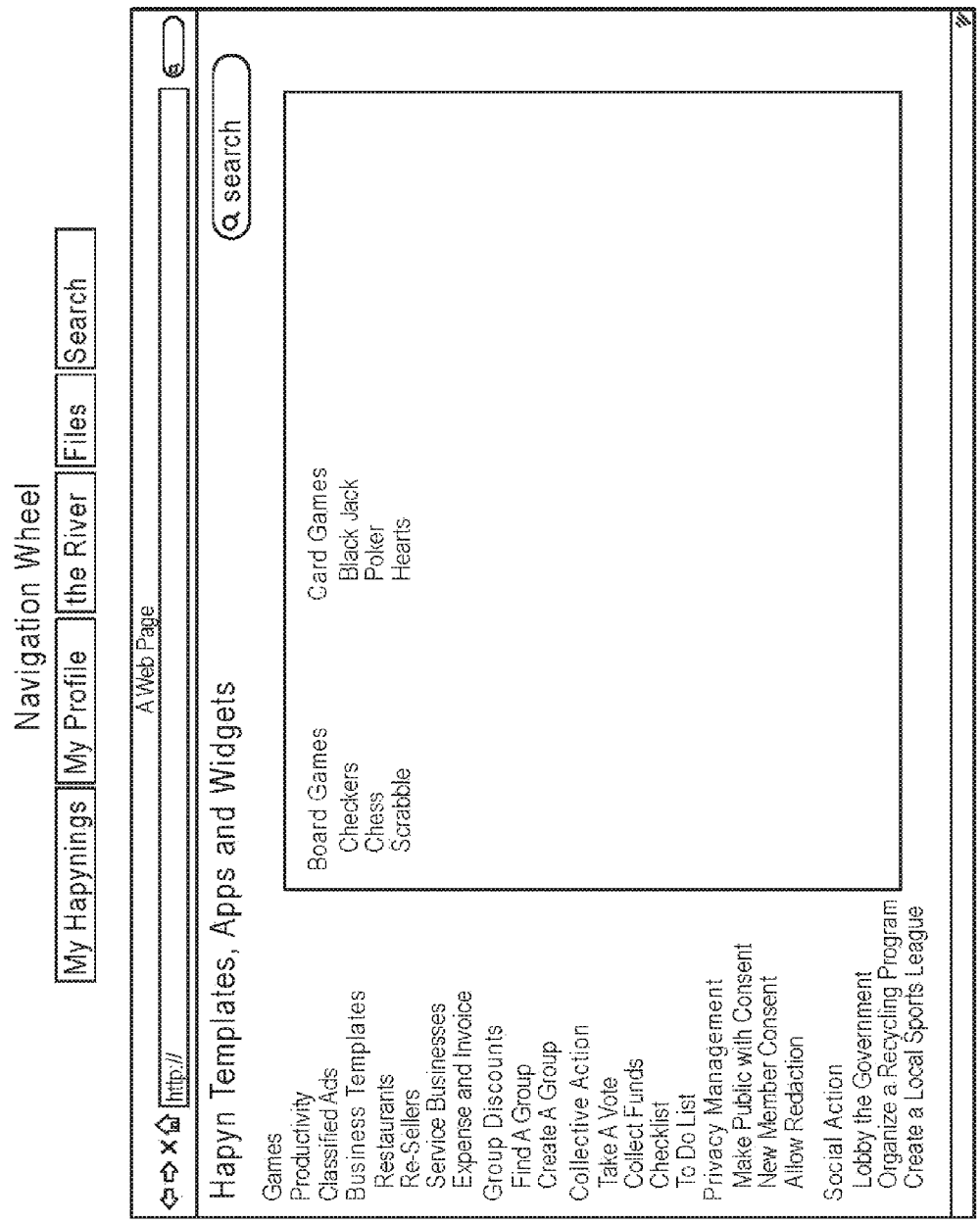

Further examples of templates, apps, widgets and applications accessible to users are shown in the browser window of FIG. 9B as being available from the online "Hapyn Store for Templates, Apps and Widgets." In FIG. 9B, "games" has been selected by the user which opens a listing of the various game options offered for download and play. Any multiple player game is a candidate for inclusion in the online store, but games involving moves, like chess, word or card games, are particularly suited for inclusion in the online store, as opposed to continuous action games or single user games. A user may create a Games Hapyning on his or her mobile device with any number of related games Hapynings thereby to play various games with various people and to receive instant notice of all moves in all games via the user's River and to see in which games moves have been made by tapping on the Games icon in the River, as previously described. The templates, widgets and apps may be download in whole or in part and may be resident in whole or in part on the cloud computer facility of the system operator along with host programs for the app, template or the like resident at the computer center, as appropriate to the particular app or template. Templates may take virtually any form useful to individuals and group members.

It will be recognized by those skilled in the art that the template and app categories shown in the browser window FIG. 9B are only a few of the many that may have substantial utility. Some templates may be offered free while others may be single charge or subscription based. Some templates and apps may originate with the operator of the Hapyn system while others may be created by independent developers who are authorized to offer their templates, apps, widgets and applications from within the Hapyn ecosystem, much like what is done in the Apple online store. Social action apps and templates, like those referenced as examples in FIG. 9B, may include guidelines, checklists and so on commonly used by similar organizations thereby to facilitate the efficient forming and management of new groups.

Figure 9C:
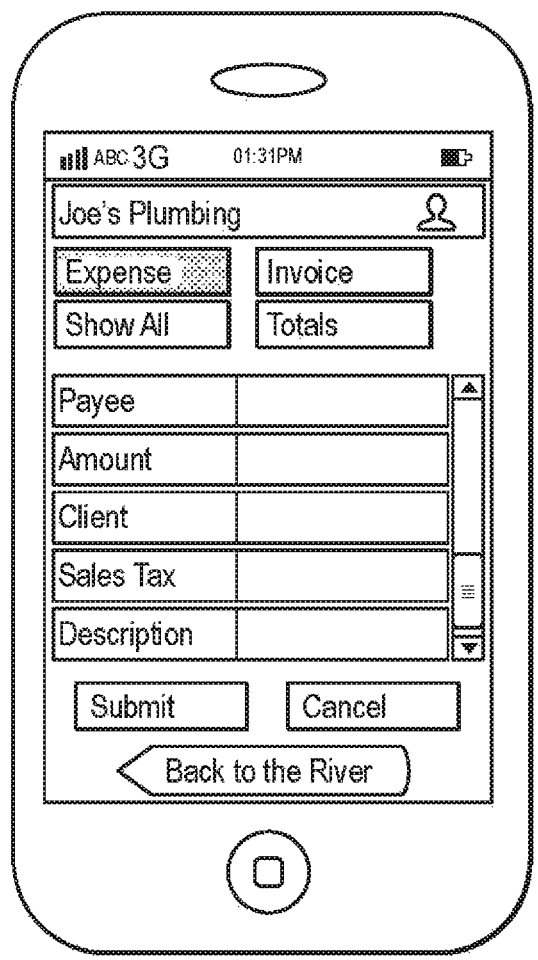

FIG. 9C depicts an exemplary expense/invoice template for which the user has already created an associated Hapyning, called "Joe's Plumbing." In the example, pre-formatted forms appear when the user taps the expense or invoice buttons. In FIG. 9C, the user has tapped the expense button, as denoted by the highlighting, thereby to present the user with an expense form having separate boxes for entry of information, such as those identifying the payee, the amount in dollars, the client, if any, sales tax and description of the expense. Expenses may indicate an association with an invoice or vice versa. Text or numerical entries are made in the separate boxes as appropriate and in the manner earlier described. Of course, there may be more or fewer boxes to be filled in on the expense form as appropriate to the situation. Tapping the invoice button displays a typical invoice form (or a special invoice form designed to meet particular user needs) that may be captioned with the name of the business, the date and other information standard for invoices issued by the business. When the required information is entered in the appropriate form, the user taps "Submit" to store the information. If required boxes are not completed, the system may provide the user visual notice and/or only allowing saving of the expense or invoice form as a draft. The invoice and expense boxes may provide for attachments so that receipts or other pertinent documents, photos of purchase receipts or the like may be associated with the particular entry, invoice or expense.

The various boxes on the invoice form are populated in like manner to those for the expense form. In the present case, information entered in the boxes for any number of individual expense and invoice forms is appropriately stored at the cloud computing center in well-known manner such that the data for individual expense and invoice forms may be called up by the user individually or collectively, for example, in spreadsheets that may be sorted in a variety of ways beneficial to the user(s) and their bookkeeper or accountant. Tapping on the Show All buttons in the expense and invoice forms will show all invoices and expenses, either separately or in summarized form, as appropriate. Tapping on the Totals buttons will show totals for invoices and expenses. Of course, consistent with the invention, the information may be sorted, aggregated and/or presented in any way appropriate, even on a mobile device, preferably an Ipad like device where significant screen area is helpful to see all of the information.

In the invoice/expense example, the templates may be resident on the mobile device and able to accept information for local storage if the user does not have wireless or other access to the mobile computing center. When the mobile device is able to access the remote computing center, the data earlier entered is transmitted for storage there according to the specific invoice/expense boxes in which the data was entered. A host program at the computing center associated with the invoice/expense forms on the mobile device handles the data as appropriate in accordance with long established business and accounting practices. Because the entries for each data field are discrete and labelled, the data can be accessed and used effectively by other programs hosted at the cloud computing center, such as accounting spreadsheets, general or special purpose ledgers or a data visualization program able to organize and present voluminous data in a visually informative way, so-called data visualization, as is well-known to the art.

Joe's Plumbing may be a one person or multiple plumber business. The creator of the Joe's Plumbing Hapyning, may authorize other plumber employees to access the Hapyning so that they can contribute their invoices and expenses to the same Hapyning in a manner to separately identify the person entering the expense and creating the invoice. The business bookkeeper and/or tax accountant may also have access to the Hapyning. The client may given access to his or her invoices and the expenses on the job via a Hapyning for that client. Separate but related Hapynings may be created for the same or different clients or customers.

From the foregoing, it will be evident that individuals are able to timely enter expenses related to a work project or job in an orderly way and create draft or final invoices/expenses on their mobile devices "on the fly" as jobs are in progress or after completed. The information is entered once and thereafter is available in any number of required mixed or matched formats, such as totals relating to multiple jobs for a single client, sales taxes collected for payment to the state, and quarterly or more frequent accounting or tax filings and year end tax filings. Whomever receives a check or wire transfer for payment of an invoice can enter payment information into the system so that accounts paid and accounts payable ledgers are easily assembled by a simple sorting of paid and payable invoices. Credit card expenses can be easily matched to system entries via electronic download of the credit card transactions, as previously discussed. As will be evident to those skilled in the art, the invention may be used to account for expenses and sharing of expenses in any Hapyning event.

Figure 9D:
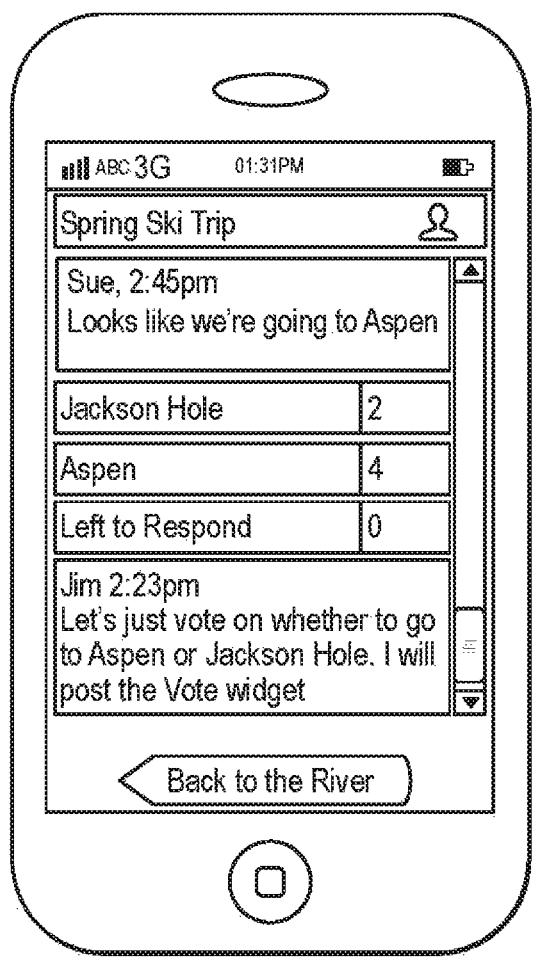

FIG. 9D shows an exemplary widget that may downloaded into Hapyning to allow the members to conduct voting in an organized way. In this example, one or more members decided it useful to take a vote on some matter, here which destination to visit for a ski trip. Member responses are depicted within the widget, such as shown in FIG. 9D, for all members to see. More complex forms of voting widgets may be employed to facilitate group decision making, such as blind ballot voting, deadline to vote or "all members must agree" for the vote to be binding.

Figure 9E:
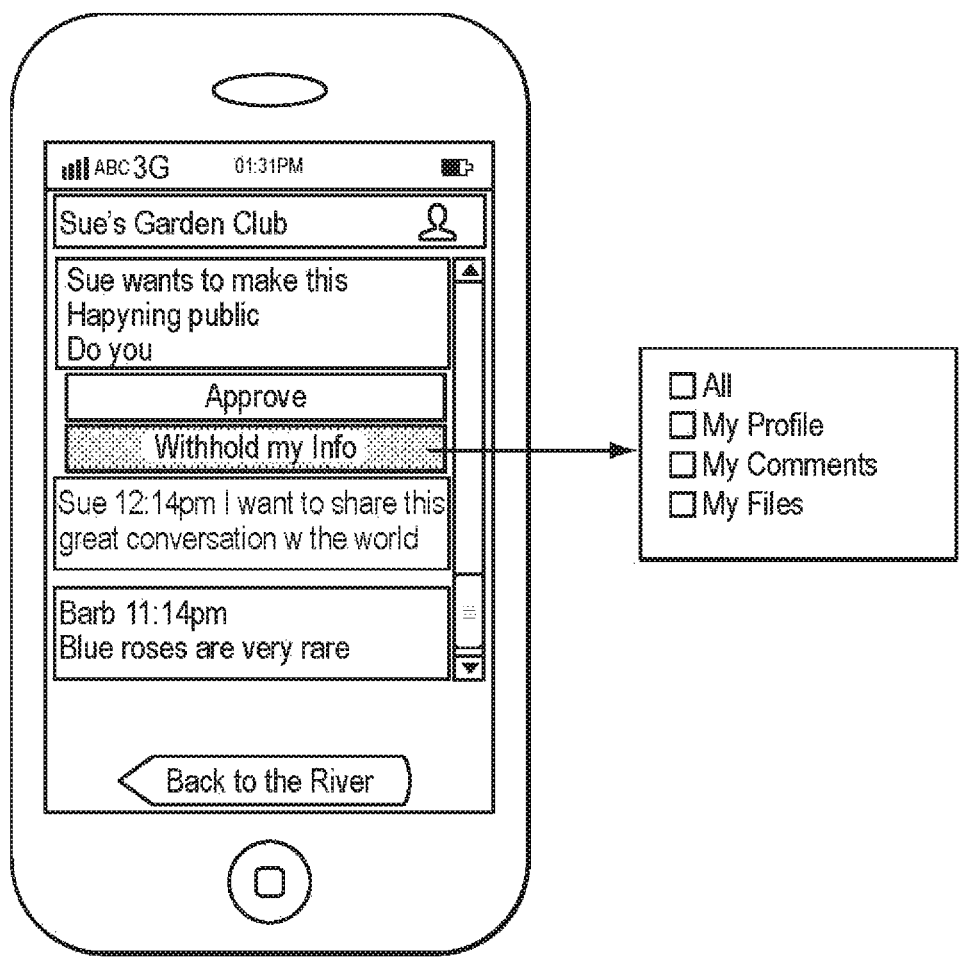

FIG. 9E depicts an example of a privacy management app or widget that may downloaded from the privacy management section of the app store in FIG. 9B. In this example, Sue wants to make her originally private Hapyning public, but members joined with the understanding that the group and all of their activity in it was private to the members so approval of members must be obtained. Sue goes to the Hapyning description page FIG. 7A choose a template, selects and drops the privacy management app into the stream which communicates the form and the member options to each member for each member to decide what, if any, information they consent to be made public. The user may consent to the making of the Haypning and all of the user's communications, files and profile public by tapping "approve." Alternatively, the user may, as shown in FIG. 9E tap the "Withhold my Info" button which brings up the modal to the right of the figure which provides the user with the options of withholding all of the member's information from the public Hapying, only profile information, only comments and only Files. Obviously, the member may check two of the foregoing boxes to withhold Files and the member profile while allowing the members stream communications, without attribution, to be made public.

FIG. 9B also has a section for Business Templates. The templates, apps, widgets and/or applications available under this header may include any of a wide range of utilities valuable to support private and/or public Hapynings of virtually any business. Using a restaurant business as an example, visitors to the restaurant Hapynings may be offered the opportunity to make reservations and receive confirmation or other response, to become approved for making electronic payments for purchases, receive and accept discount dinner offers with, for instance, a minimum prepayment to be credited against the meal or retained by the restaurant if the user is a no show. There may be loyalty program apps which keeps track of how many times the user visits the restaurant and the amounts spent, with discounts to be offered based on amounts spent or number of visits. The user might also see a menu and preselect what is to be ordered, for example, in the case of large groups or special orders. Options for templates and so on may be offered to help run virtually every aspect of the restaurant's business. Generic and customized options may be offered to suit any kind of business or organization as appropriate.

Referring now to FIG. 10, it will be seen that the navigation wheel has been provided with an added destination or page, identified by the word "Discover," which is a proprietary service mark of the applicant. As will be noted, the screens and modals accessible in Discover, FIGS. 10A-D, are organized and operate in a manner essentially the same as the Search function for private Hapynings, as shown in the corresponding FIGS. 5A-5D, except that Discover is a search feature for Hapynings that have been made public, that is, accessible to the world at large, or semi-public, that is, accessible to every member of the Hapyn ecosystem but not to the world at large (collectively referred to below as "public" for the convenience of the reader). Hapynings are made public by tapping on the "Make Public" button shown in FIG. 7A—Description of a Hapyning. The creator may make a Hapyning public at the time the Hapyning is created, and at any time thereafter, provided the members of the initially private Hapyning concur.

Figure 10A:
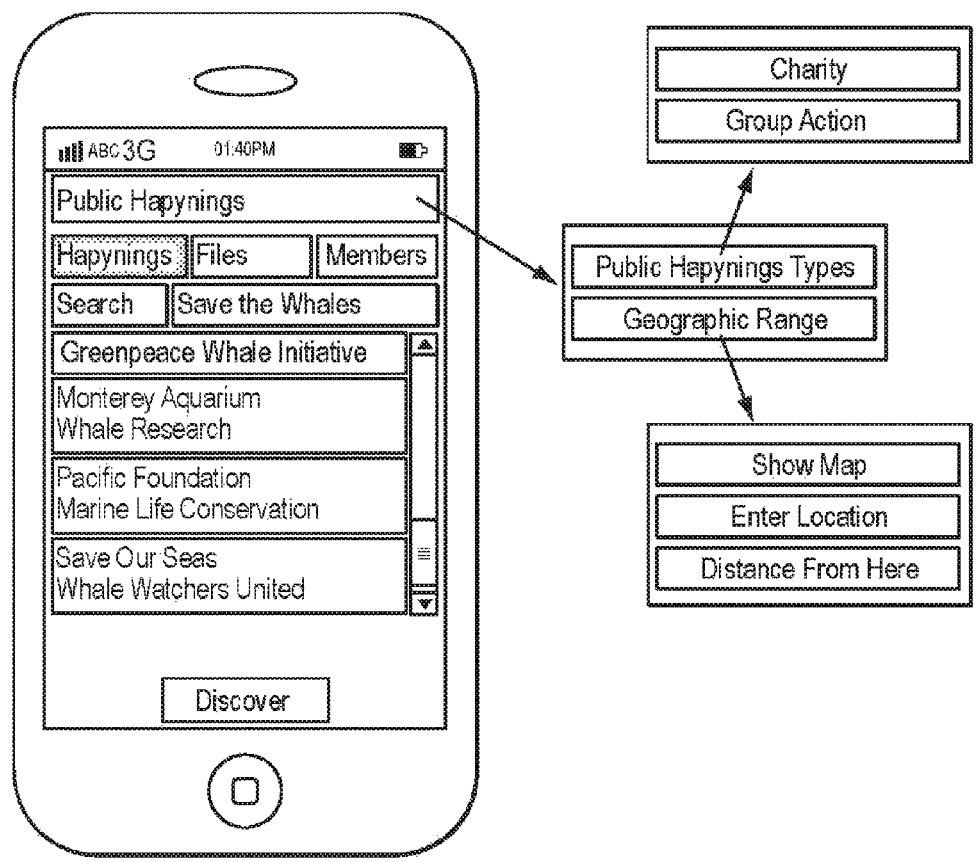
FIGS. 10A through 10D are exemplary smartphone wireframe diagrams depicting a further enhancement of the first invention embodiment, specifically an improvement relating to search of those events, activities or the like that have been made public or semi-public.
Figure 10B:
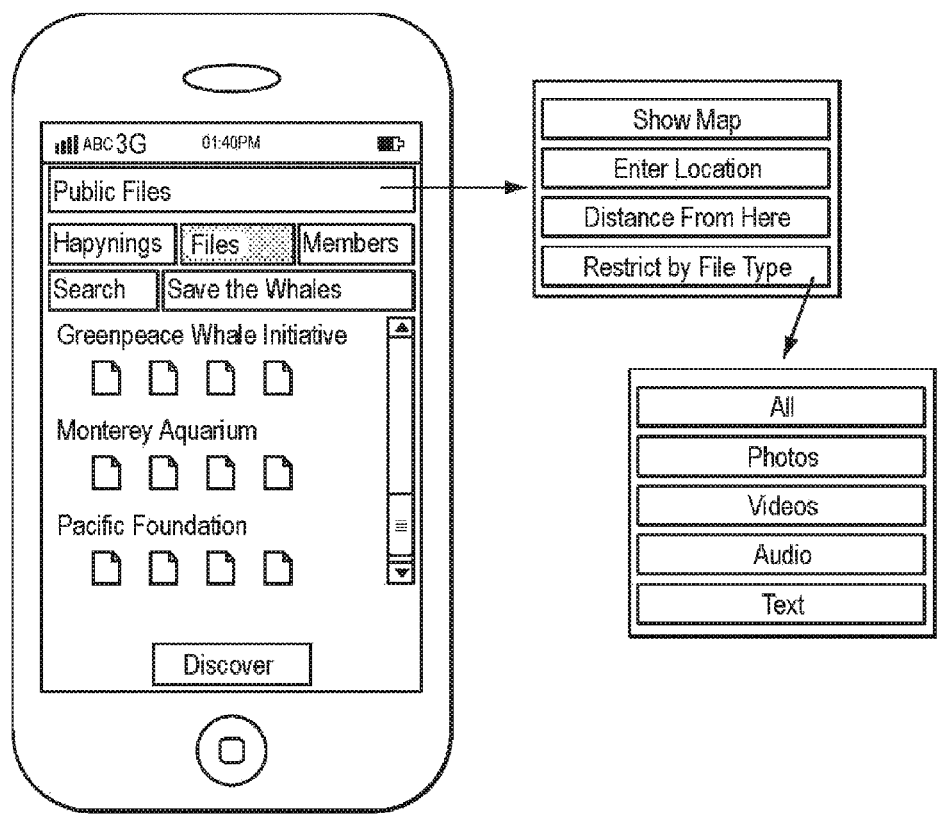
Figure 10C:
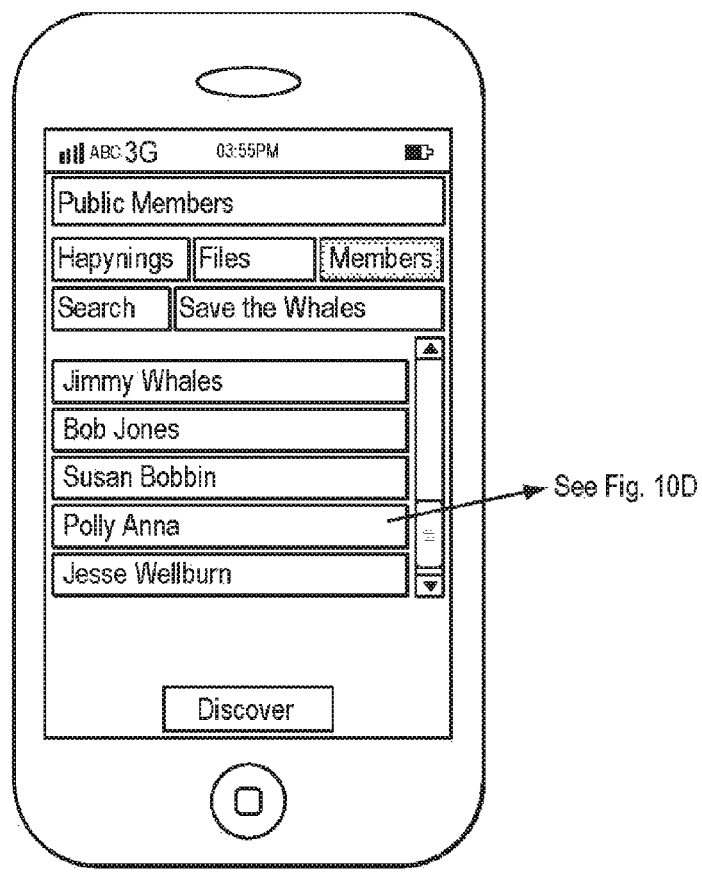

As shown in FIGS. 10A-C, the "Discover" page has been selected by the user from the navigation wheel as shown at the bottom of each screen. This action results in the search function being applicable only to Hapynings that their creators have made public. To visibly reflect this fact, the uppermost block in FIG. 10A is titled "Public Hapynings." Entry of keywords in the search box, here "Save the Whales" returns results only for Hapynings that are public and use the keywords either in the Hapyning name or any other search text or tags that accompany the Public Hapyning. In this regard, the creators of the public Hapynings may add descriptive tags in order to facilitate the discovery of their Hapynings by search engines.

In FIG. 10A, the "Hapynings" button has been highlighted by the user so the search results shown are those relating to the Public Hapynings identified in the lower portion of the screen. The public search may be narrowed by tapping on the "Public Hapynings" block at the top of the screen to open the modal shown at the end of the arrow to the immediate right. Various criteria may be specified in the modal, exemplified here by the choices public Hapyning types and Geographic Range. Tapping on Public Hapynings types takes the user to a second modal, which here specifies by way of example, charity and group action. Tapping on the "Geographic Range" block opens another modal with the three choices shown. Various other criteria may be used within the modals to narrow the descriptive word search. This allows the user to meaningfully restrict the scope of the search thereby to discover only the most relevant responses. This is aided by the fact that the creator of the public Hapyning sets it up in a manner to slot it in the appropriate search categories that match those available to the searcher. Again the organized, rules based environment of the invention provides advantages not found in the unrestricted search world.

Referring to FIGS. 10B-10C, the Files and Public Members for the Public Hapynings search results are shown. Tapping the Files header in FIG. 10B, opens a modal that allows the user to selectively narrow the search results for Files as shown. Tapping on the "Restrict by File Type" modal opens a sub-menu that allows the user to restrict the Files to particular file types as shown, namely, show map, enter location, distance from here and restrict by file type. Tapping the latter button, opens a sub-menu allowing the user to select all files, only photos, only videos, only audio and only text; of course, more than one of these choices may be selected. In the example, photos and videos have been selected for search. Note also that the search results for Files as shown in the FIG. 10B screen are returned separately for each public Hapyning.

Figure 10D:
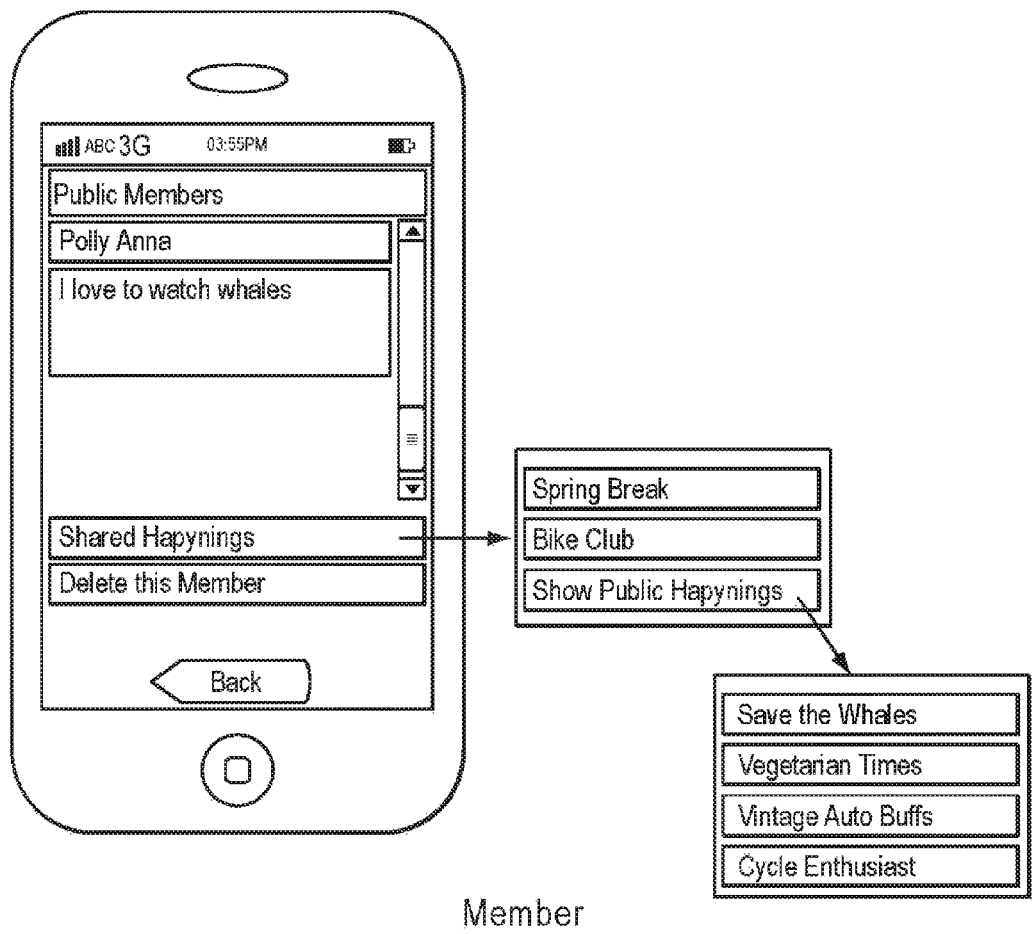

FIGS. 10C-10D show, in a manner essentially identically to the earlier described FIGS. 5C-5D, the search returns for those members of the public Hapynings that have allowed their identities to be made public, how the profiles of such members are accessed and how shared Hapynings are identified, both public and private, here two private Hapynings and four public Hapyning as shown in the modals of FIG. 10D.

Public Hapynings are also discoverable from any appropriate public resource, such as a Google search engine. On joining a public Hapyning a user has the option of making their name and profile visible to the public or not (assuming the creator has not made identity and/or profile a prerequisite of joining the public Hapyning). The user may join a public Hapyning, perhaps only to follow and not comment, without making the user's identity visible (if authorized by the creator). The conditions for joining a public Hapyning are those set by the creator, and may include any of a variety of user established terms and conditions offered as options within the system, as will be understood by those skilled in the art. The first modal and its submenu to the right of FIG. 10D shows the private Hapynings the members have in common while tapping on the show public Hapynings button takes the user to a listing of the public Hapynings which the user has in common with the member searched.

Figure 11:
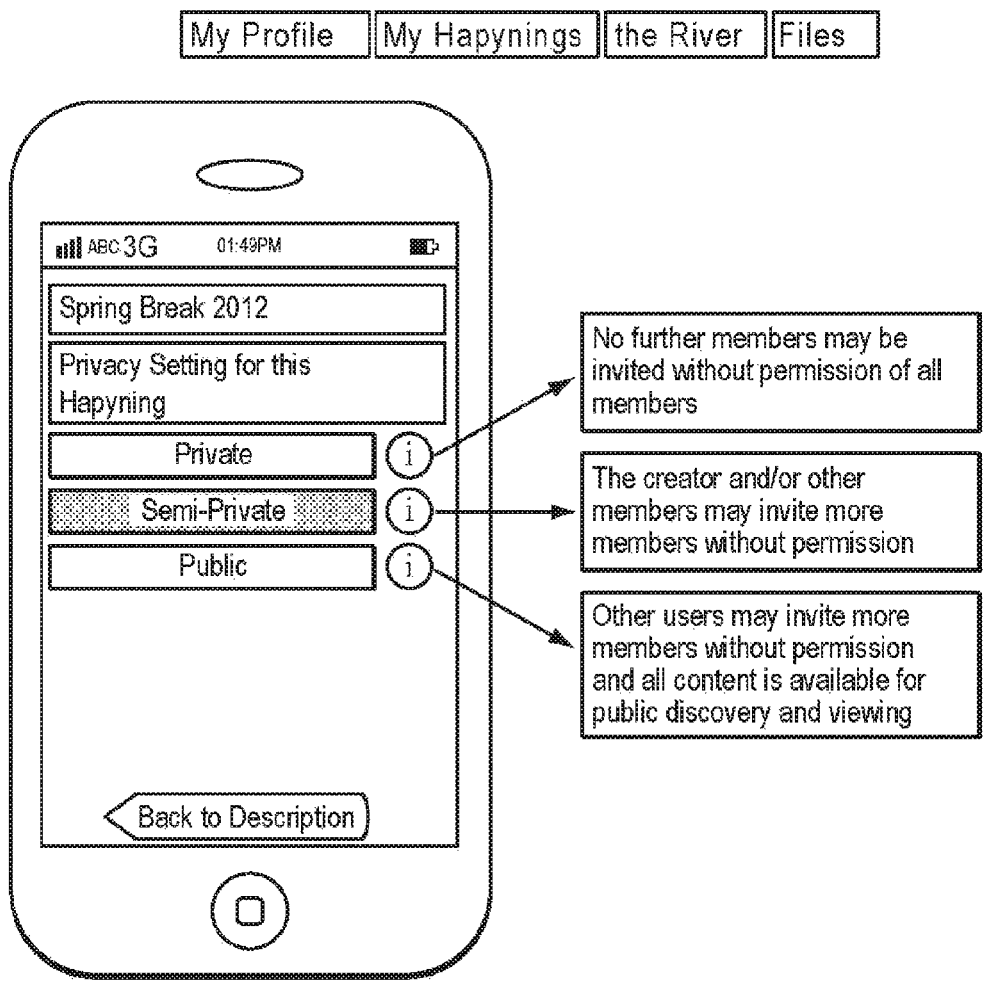
FIG. 11 is an exemplary smartphone wireframe diagram depicting yet another modification and enhancement to the first invention embodiment, specifically an improvement relating to user privacy.

Reference is now made to FIG. 11 which shows how privacy settings may be established for a Hapyning. The FIG. 11 screen is reached by choosing the "Privacy Settings" option in FIG. 7A. The privacy settings screen allows the user to establish a privacy policy for each Hapyning individually (or for all private Hapynings) and allows for users invited into the Hapyning to see the privacy policy before accepting the invitation to join. Knowing the privacy policy, may prompt the user to decline the invitation, or limit or otherwise inform their contributions or participation if they do accept the invitation. The privacy settings may nominally default to a norm of accepted behavior so that users will only need to check privacy settings for which they are alerted that there is a deviation from these norms. For example, in reference to FIG. 11, this notice may come in the form of a red highlighting of the privacy settings for the Spring Break 2012. No highlighting may indicate the default norms while yellow or some other color may denote more restrictive privacy settings. The user is thus visually alerted as to whether the private settings are the norm, or looser or more restrictive than the norm. In all events, the user make tap on the screen to view the privacy settings for the particular Hapyning.

The privacy setting options shown in FIG. 11 are the rather simple selections of private, semi-private and public, with semi-private having been selected for this Hapyning as denoted by the highlighting. Private here means that no further members may be invited to join without the consent of all members. Semi-private here means that the creator and designated others or all members may invite further members without advance consent of any members. Public here means, as shown, that other users may invite more members without permission and that all content is available for public discovery and viewing. There may also be an option for making the Hapyning discoverable to anyone in the Hapyn ecosystem via search, but not discoverable by the public at large.

Those of ordinary skill will recognize that privacy settings may have different and additional criteria as a generic base line and that the selection of privacy apps or the like from the app store may provide more complex privacy options desired by certain groups. Thus, the ordinary user is not burdened with complex options that impede easy use of the system, but the power or special needs user has the option of selecting templates, apps, widgets and applications suitable to the user's needs. This applies to other features of the system, that is, base line simplicity suitable for the needs of the average user with greater sophistication available through the selection of appropriate templates, apps, widgets and applications or the like from the online store.

Attention is now directed to a second and materially different embodiment of the invention shown in FIGS. 12 through 19 of the drawings. Like the first invention embodiment described above, the second invention embodiment is organized around the three primary architectural elements: tracked objects, selectively permissioned users and content, with content and permissions being associated with tracked objects. In other words, different tracked objects may have associated with them different content and different user permissions.

Here, like with the first embodiment, rules, in the form of software that interacts with the hardware and firmware of the mobile device and the cloud computing center (including host programs at the center), govern the properties of the three elements and how they relate to one another and the functions performed. In the second embodiment, the rules and interactions cooperate to provide materially different functionality from that of the disclosed first embodiment. The invention provides a base platform that is adaptable to many different applications, all without any fundamental change in the platform architecture, namely, one or more types of tracked objects about which there is associated content selectively available to permissioned users.

In the second embodiment to be described, the governing relationships and functions cooperate to provide a unique and user efficient environment for multiple persons to coordinate and cooperate in the effective implementation and managing of projects of myriad kinds. This includes not only the management of the project work activities, but as well the efficient recording, management and invoicing of the project related expenses and the provision for other financial information and records sufficient to provide a complete double entry accounting ledger.

The second embodiment further includes highly useful management reporting features and as well a comprehensive and easily accessible audit trail. The invention enables a small (or large) business with people in diverse locations to have enterprise software that is both powerful and ease to use. With the second invention embodiment, not only are expenses entered and tracked, as is routine in the art, but additionally expenses are tracked to their origin, that is, all discussions, documents, photos, etc that led to the making of an expenditure, such as who authorized the expenditure and who approved it, geotagged receipt photos and so on, are seen simply by clicking or tapping on the expense and drilling down.

As will be seen, the invention assists each member of the multiple person team in the accurate and reliable execution of their individual responsibilities. The invention also provides an environment conducive for collaboration and for providing a trail of accountability and as well the giving of credit and recognition important to effective collective action. The user's normal activity in proper execution of assigned responsibilities inherently creates a comprehensive accountability trail. Thus, the system provides an ambient accountability, that is, an environment of accountability without the user or managers having to actively undertake any special responsibilities. All of the information needed for detailed accountability by dates, times, documentation, actions, persons and so on is part of the information originally entered and such information is readily accessible to management if and when needed to conduct individual item checks or a complete audit. The system also may include triggers or set points to bring up for review by an administrator all expenses that exceed predetermined limits as well as items that do not meet predetermined standards, for example, expenditures in unauthorized locations or expenditures of unauthorized types. In this way, the system itself alerts administrators and managers of anything out of the ordinary without the necessity to continually monitor individuals for compliance with the preset standards.

Since the user knows that the information on his every action is in the system and cannot, once submitted, be changed by the user and furthermore is easily accessible to administrators and management without the need to contact the user (and without the user's knowledge), there is created an environment of accountability, that is, users are strongly incentivized to do the right thing without the prodding of management because they know that the full, accurate story on each expense and other matter is available in the system and that they are the ones who made the entries attributable to them. Indeed, system features do not allow users to convert draft expenses to final expense submissions unless all of the required information is provided, nor to generate invoices that do not include or otherwise account for all project expenses and in which all required blocks in the invoice are filled in. In short, the problem of partial or incomplete expense and other submissions are obviated by the invention.

The second embodiment easily scales to the handling of complex projects, multiple related projects and as well to the handling of many independent and unrelated projects. Projects typically are business related activities involving ongoing and significant expenses, invoicing, etc. by multiple people with a need for collaboration and monitoring, but may include as well any activity involving multiple people and a significant number of financial expenses or the like where there is a need for the capabilities offered by the invention, such as charitable projects.

Referring now to FIG. 12, there is shown a diagrammatic depiction of an exemplary "dashboard" page depicted on a tablet computer or the like. Similar to the navigation wheel of the first embodiment, this embodiment includes a navigation bar across the top of the dashboard page (and all other pages) to enable convenient navigation from any identified page in the bar to any other of the seven listed pages in the navigation bar simply by tapping or clicking on the navigation header corresponding to the desired destination. Here the navigation bar pages are identified as Dashboard, Hapynings, Projects, Expenses, Invoices, Reports and Files. These pages and the sub-menus and screens to which they connect and interact will be explained below.

"Dashboard" in the navigation bar in FIG. 12 may be shown in red or other prominent color to indicate that the user has selected (by tapping or clicking on the word) the dashboard page as shown. The dashboard page provides users with an overview of current activity across their organization and brings to the forefront items that require action such as incomplete expense drafts and comments that require attention or response. In other words, the dashboard provides the individual user a single page destination where the user is able to see in one place many, if not all, of the most recent and typically the most pressing matters requiring the user's attention. The user may directly initiate from the dashboard page actions to deal with these matters. The dashboard is effectively an information and task triage page for the user, that is, although the information and tasks visible in each dashboard box may also be found in the separate pages accessible from the navigation bar, the dashboard efficiently presents the high priority, pending matters in a summary, organized fashion. When the user appropriately deals with a matter, it is removed from the dashboard.

The dashboards and other pages seen by each of the multiple users of the system, even those working on the same project, may and usually do contain different information which reflects the differing duties and responsibilities of the individual users. Users with limited permissions see only expenses, projects, comments and flagged items that are associated with projects to which they are permissioned. In short, users only see what they need to see, do or consider and are not distracted by information that is not relevant to their responsibilities. Indeed, certain pages, such as invoices and reports, may not be visible to users with limited permissions and correspondingly limited duties. If the dashboard is accessed from a mobile phone screen, even a user permissioned to create, for example, invoices and reports typically might not have such functionality available on the mobile phone since the small screen size can make such functions difficult or impractical to perform and therefore not useful to display.

One or more administrators or principals sets permissions that control what individual users see in the system including what information beyond the user's own inputs are seen by that person. For efficiency and security, the user typically is only given access to information that the user inputs to the system and such other information as needed for the individual users to handle their respective responsibilities. Persons with oversight responsibilities and/or managers and principals may be given greater or even total access to the system information, but only highly select individuals have authority to change information earlier input. Even where such authority to change is granted, the system does not delete information, but rather keeps a detailed audit trail of all changes, using technology that is well understood in the art and that is employed, for example, in Google documents. If desired, changes also may be reviewed by or may require the approval of multiple senior people.

The administrator typically has access to all of the information available to all of the users within the administrator's scope of responsibility. There may be a hierarchy of administrators, such that a first level administrator sees only the information from individual users within her administrative control, while the next level sees the information available to all of the first level administrators and so on. Such permissioning is typically handled in the account settings to which only the appropriate administrators, managers or principals have access in varying degrees of access as appropriate to the situation. Clicking or tapping on the "Manage Users and Accounts" header at the upper right of the dashboard and other pages to be discussed takes the authorized user to screens where users and accounts information may be viewed and changed as appropriate, all as will be explained in connection with later figures. The adjacent header "Jim Smith" is likewise clickable to reveal the profile of this user, which may be changed or updated as appropriate in conventional fashion and in a manner similar to that described in connection with the first invention embodiment.

As seen in FIG. 12, there is a header "Event Planners Incorporated" below which there are four separate windows on the dashboard page, identified as Recent Discussions in Hapyn, Recent Comments on Projects and Expenses, Projects (by name) and Expenses. The header identifies the client, that is, the account holder for this Project Awarnys account, here "Event Planners Incorporated." Many projects for this account holder may be managed from this single account.

Each of the four dashboard windows contains most if not all of the most immediate and pressing matters needing attention of a user in each of the identified areas. As will be seen, the dashboard not only prompts the user on what needs attention, but as well enables the user to directly take the needed action and thereby remove the item from the associated dashboard window. If an item is not acted upon in the manner required by the system rules, it will remain in the user's dashboard window until properly resolved or completed.

As will be explained, the first embodiment of the invention, with or without some or all of the enhancements and improvements earlier described, is embedded in or otherwise accessible from within the second embodiment of the invention shown in FIGS. 12-19 and presently to be described in detail in connection with these figures. The "Recent Discussions in Hapyn" box in FIG. 12 is in effect the River page for all of those Hapynings associated with the projects in which the user is involved. For each recent discussion listed, there is identified the person that created the Hapyning, the comment made, the project or expense with which it is associated and the Hapyning name. Recent discussions from three Hapynings associated with the user's projects are visible in the FIG. 12 Hapyn box; further discussions, if any, may be scrolled into the box as denoted by the scroll bar on the right side of the box. All of the other blocks or boxes on the dashboard page likewise allow scrolling to progressively present items not visible in the limited area of the viewing windows.

The user may delete any comment in the River to remove it from the dashboard box, but that comment will remain in the stream of the individual Hapyning, as earlier described in connection with the first invention embodiment. The user may open the Hapyning associated with any comment by tapping or clicking on the line for that comment in the dashboard box. Such action takes the user to the place in the Hapyning where the identified comment was made so the user may review it in context and, if desired, make a responsive comment. More specifically, tapping or clicking on the Hapyn line "I've decided I would like a big cake," which is identified as being found in the Hapyning and project named "Kopinski wedding" takes the user to that line in the Kopinski wedding Hapyning, all in a manner as previously explained in connection with the first invention embodiment. In particular, tapping or clicking on the foregoing line opens a Hapyn modal like that shown in FIG. 13B from which the user can view the comment in context and take any of the actions available from the modal, all as previously described. As will be seen, the user returns to the dashboard after taking appropriate action with the item in the Hapyning discussion; return to the dashboard is accomplished by tapping on "Dashboard" in the navigation bar.

The user also may create a new Hapyning directly from the dashboard by clicking or tapping on the word "Add" and then proceeding as earlier described in connection with the first invention embodiment and as will be further explained in connection with FIG. 13. As will be seen, all such Hapynings as exist or the user may create or join with respect to projects in which the user is involved become imbedded in and accessible from the dashboard and certain other of the pages shown in FIGS. 12-19.

The second dashboard scroll box titled "Recent Comments on Projects and Expenses" brings to the fore the most recent of such comments which have not been acted upon by the user. The person making the comment, the project or expense with which it is associated and the comment itself is set forth in the dashboard and the date, if desired, all as seen in FIG. 12. As will be seen with respect to FIGS. 13-19, these same comments are also found on the projects and expense pages associated with the identified project or expense. Clicking or tapping on the comment line takes the user to the specific comment in the projects page or expenses page where a response or other appropriate action may be taken and from which pages the user may immediately return to the dashboard page by clicking on "dashboard" in the navigation bar.

The third dashboard scroll box entitled "Projects" lists the recent active projects as well as those projects that have been flagged as needing some action. Again, clicking on the line for a particular project takes the user to the identified project on the project page from which the appropriate action is taken, and from which dashboard in the navigation bar is tapped to return to the dashboard. The item acted upon is now removed from the dashboard and the user turns to the next projects item requiring action. The user may add a new project directly from the dashboard by clicking on the word "Add" to the right of the word "Projects." This takes the user to a new projects form on the projects page, as will presently be described.

The fourth dashboard scroll box titled "Expenses" lists "incomplete" expenses, that is, those expenses for which all of the required information has yet to be provided and "flagged" expenses, that is, those expenses which may be completely filled out, but with respect to which someone has raised a question as denoted by the flag. The flag needs to be cleared by satisfying whatever condition prompted the expense to be flagged. Again, clicking or tapping on an expense line takes the user to the expense page for the identified expense. The needed action is taken, as will be explained in connection with later figures, following which the user returns to the dashboard page in the manner above described.

The user may also add a new expense directly from the dashboard page by clicking on the highlighted word "Add" to the right of the word "Expenses." This action takes the user to a new expense form on the expense page where the user fills in all of the required information, as presently will be explained, following which the user returns to the dashboard to deal with the next expense item.

Attention is now directed to FIG. 13. FIG. 13A depicts the Hapynings page which is accessed by the user tapping the Hapynings header in the navigation bar, which may be shown in red or otherwise highlighted to denote that the user is on the Hapynings page. All of the individual pages in the navigation bar are accessed in similar fashion. The Hapynings page contains a single scroll box which lists all of the existing Hapynings associated with those projects to which the user is permissioned. As seen in FIG. 13A, each line in the box lists the Hapyning name, the date it was last active and the project with which it is associated and such other information as may be desired. The FIG. 13 page allows the user to search existing Hapynings by search words, members or files, to open Hapynings and read and respond, i.e., interact, with them, to create a new Hapyning, or to pull an existing Hapyning of which they are a member into the Projects platform of the second invention embodiment so that it may be associated with an expense or project.

Clicking or tapping on the line of a particular Hapyning opens it and from which the user may take any or all of the actions previously described in connection with the first embodiment. The user may also reach a specific Hapyning directly from the dashboard page by clicking on the line item for that Hapyning. The words "Add New" and "Add Existing" at the lower right of the FIG. 13A page allows the user to create a new Hapyning and associate it with a project and/or to add one or more existing Hapynings to a project.

In FIG. 13A, the user has tapped on "Add Existing" which opens a modal or screen of FIG. 13B. As denoted by the highlighting, the user has tapped the "My Hapynings" block which opens in the block to the right a list of existing Hapynings in which the user is already a member. As denoted by the highlighting on "Open Space Fundraiser," the user has selected that Hapyning for association with an existing project. The user then clicks on the "Add to Awarnys" box to open the "Choose Project" screen where the user has chosen by a checkmark to associate the "Open Space Fundraiser" Hapyning with the project of like name. That Hapyning is shown as the third Hapyning in the listing of Hapynings in FIG. 13A. A new Hapyning is added and associated with a project in similar fashion. Thus, the system allows users to associate activity in a Hapyning with an expense or project in much the same way that a document may be attached to an expense or project.

As seen in FIG. 13B, the user may not only associate a Hapyning with a particular project but may also take any or all of the steps with respect to that Hapyning as previously described in connection with the first invention embodiment. The embedding of the optional Hapyn functionality in the second embodiment being described allows running conversations to take place between the user and other persons that may or may not be permissioned for access to the projects. This can be highly useful, for example, when the user desires to obtain some information from a non-permissioned party, such as a vendor with regard to a charged expense, etc. or a client, such as to obtain approval from the Kopinski wedding client for an expenditure. These communications, as will be seen, may be bookmarked or effectively attached to an expenditure or the like to provide supporting documentation that is visible to anyone viewing the expense and questioning who authorized it or why something else was done. The need to search for the supporting documentation is eliminated.

Figure 14A:
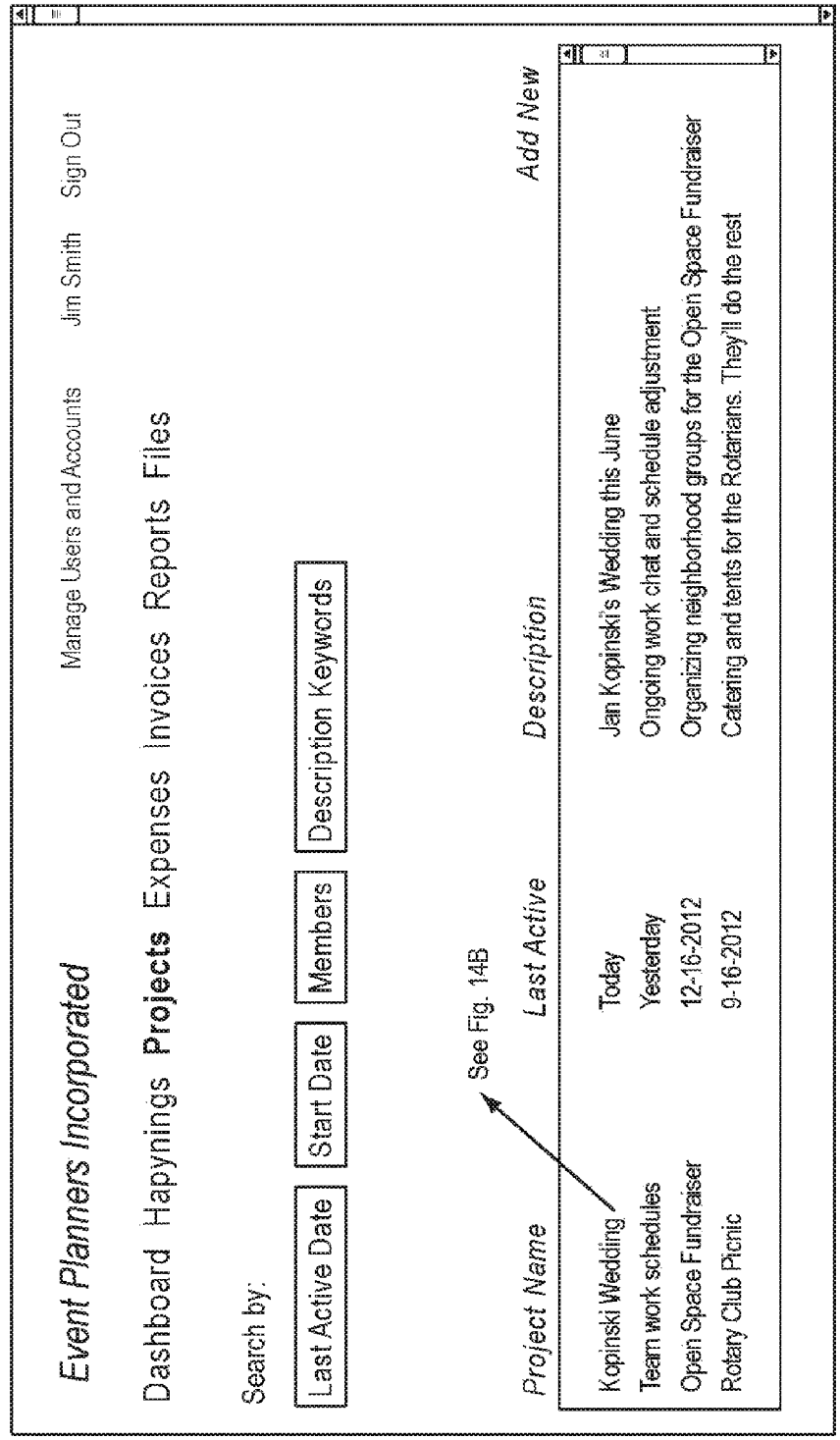
FIG. 14A is an exemplary wireframe diagram depicted on a tablet computer of a third selectable "projects" page of the second invention embodiment.

FIG. 14 depicts in wireframe form the projects page and certain modals or screens accessible from the projects page. Of course, the user may also access a specific project directly from the dashboard page. Turning specifically to FIG. 14A, the word "Projects" is highlighted to denote that the user is on this page; as with all other pages, all of the destinations are shown in the navigation bar so that the user may conveniently jump to any other destination simply by clicking on the appropriate word in the navigation bar. The "Manage Users and Accounts," the user name and a sign out link are likewise included on all pages for the convenience of the user.

The scrollable viewing box of FIG. 14A lists all of the projects assigned to this user or to which the user is otherwise permissioned, for example, as an administrator. Each project is listed by name, date last active and description. The user may search the projects by last active date, start date, members, and keywords by entering the search information in the search blocks shown. The search can access projects that are archived as well as those that are presently active. A new project may be created on the project page by clicking on the "Add New" words to the above right of the project viewing window in FIG. 14A. This will present to the user a form like that of FIG. 14B but the form will be blank and the user will add the appropriate information; the elements of the FIG. 14B form will presently be explained.

Figure 14B:
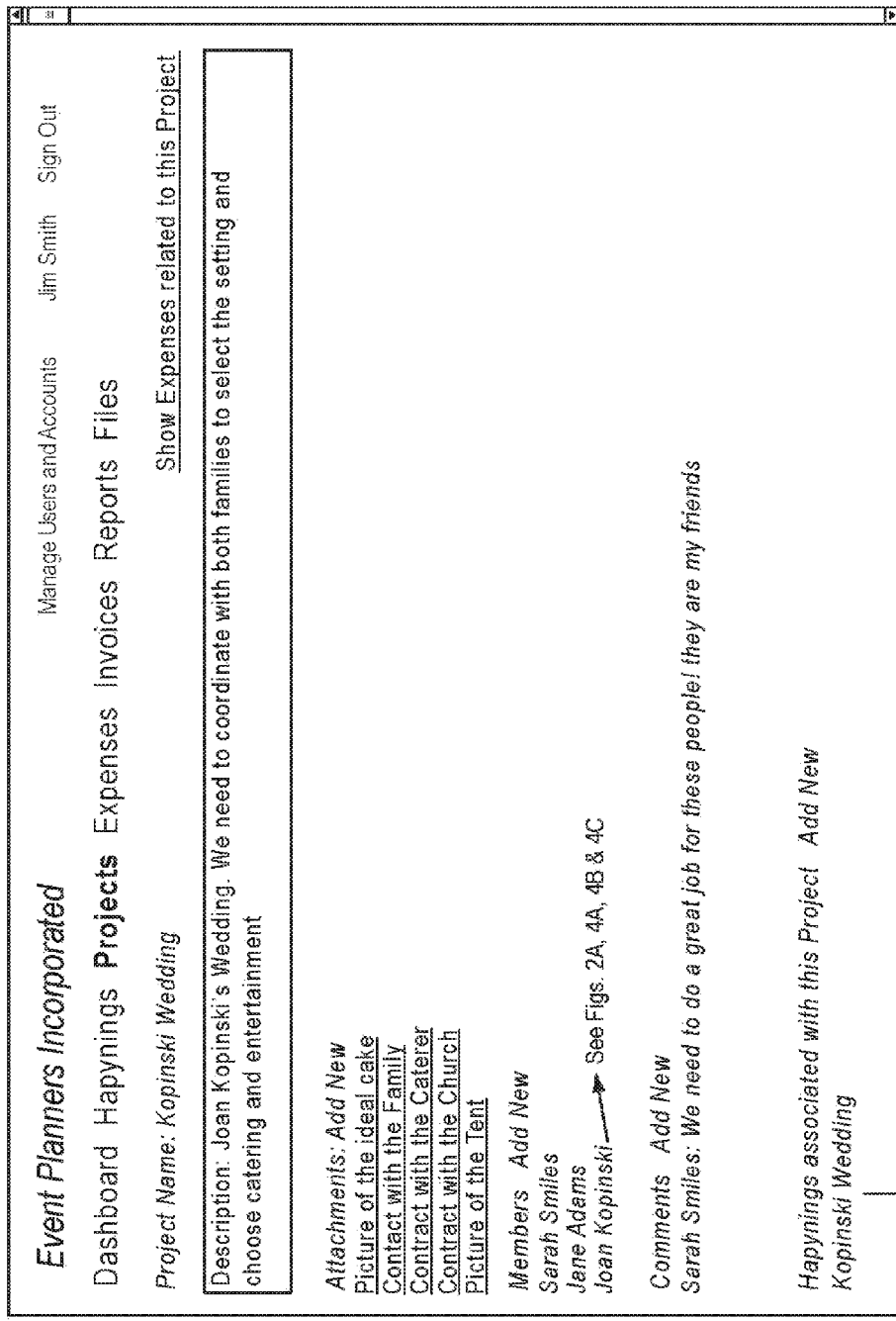
FIGS. 14B and 14C are diagrammatic depictions of certain submenu screens selectable from the projects page of FIG. 14A.

Tapping or clicking on a project line in FIG. 14A opens the modal shown in FIG. 14B which is basically identical in format to the header portion of FIG. 14A except that the search boxes and listing of projects is replaced by the detailed information for the selected project. Specifically, there is the description of the project, which is entered at the time the project is newly created and which may be amended from time to time, if needed. To the above right of the description box, there is a hyperlink to "Show Expenses related to this Project." While such expenses can also be accessed from the Expenses page to be discussed, this link provides the user with convenient direct access to such expenses. If the user clicked on the Add for new project in the dashboard window of FIG. 12 or the Add New in FIG. 14A, the user would see the same screen as shown in FIG. 14B except all of the filled in items in the form of FIG. 14B would be blank. The user would then fill in the required spaces to create a new project that would be listed on the projects page.

All of the project related files or attachments are listed as hyperlinks below the description block, followed by the names of the project members and a comments block. Clicking on any of the files will take the user directly to that file while clicking on a member name takes the user to the personal profile of that member. The profile function works in the same way as described in connection with the first invention embodiment. Profiles may be fixed or they may be uniquely created for each project. Comments may be entered in the comments section by any of the members for all other permissioned members to see. New attachments, new members and new comments are added to the respective sections of the FIG. 14B screen by tapping on the "Add New" link adjacent the respective items.

Figure 14C:
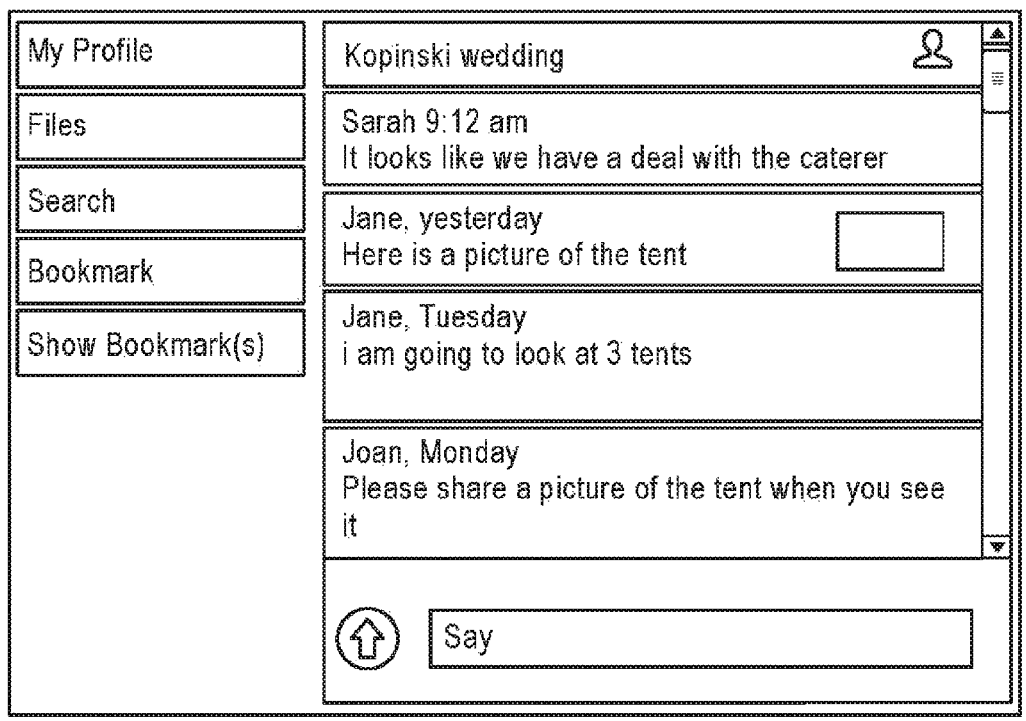

In the lower left of FIG. 14B, there is a header "Hapynings associated with this Project;" here there is only one such Hapyning, called "Kopinski Wedding," the same name as used to identify the project. Hapynings may or may not be named the same or similarly to a project name at the discretion of the Hapyning creator. Tapping on the identified Hapyning in FIG. 14B opens the Hapyning associated with the project, as shown in FIG. 14C. Specifically, tapping on the Hapyning opens that Hapyning to the place in the stream that was visible when the association with the project was made. To make the association, the user scrolls to the part of the conversation in the stream that is relevant to the project or expense and then makes the association by tapping on the Bookmark box. When the Hapyning is opened at another time from the Project or Expenses page for reference, it will open to that place in the stream. If there are multiple such Hapyning bookmarks associated with a project, the user taps the "Show Bookmarks" box to reveal a modal listing all of the prior bookmarks. The user may then view any or all of the bookmarks in the context of the Hapyning discussion. This allows the user to quickly and easily reference a sentence or exchange in a Hapyning that otherwise may be difficult or time consuming to find, or which the user might not otherwise recall as having occurred.

Attention is directed to FIG. 15, the Expenses page. As shown in FIG. 15A, the format for this page is similar to those of earlier pages in terms of the headers, navigation bar, search boxes and viewing window that here lists all of the properly completed expenses for all of the projects in chronological sequence. Expenses that are flagged or which are incomplete are shown only on the dashboard page. Once those expenses are completed they show up in the expenses scroll box of FIG. 15A. Expenses for a particular project are separately identified and aggregated on this page by doing a search by project name.

Tapping on a specific expense line item in FIG. 15A, here the third line item, opens the detailed screen of FIG. 15B which contains all of the pertinent information for the listed expense. If the user clicked on the Add for new expense in the dashboard window of FIG. 12, the user would see the same screen as shown in FIG. 15B except all of the filled in items in the form of FIG. 15B would be blank. The user would then proceed to fill in all of the required items. In FIG. 15B, there is listed on the top expense line the date the expense was incurred, the payee and description of the expense, the project with which the expense is associated and the amount. The expense page further requires, as shown, information for expensed by, payment status, entered by and date and attachments, here a photo of the receipt from the outback steakhouse. Where a given expense may involve several individual items or when it is otherwise appropriate to further explain the expense, the line item block is filled out as appropriate. For example, if a hotel expense is for multiple days and includes multiple meals with various people, it may be policy to separately identify the constituent elements making up the total expense in the Line Items section. The line items will aggregate to the total expense entered above. Below the Line Items is a section for flagged items. Here an administrator or fellow project member may have a question or comment requiring response before the expense is fully cleared. Here there is a request that the user verify that the expense was relative to a sales meeting. There is an indication of who placed the flag, Sarah Smiles, and the date it was placed. It is shown that this flag was checked as correct by the user, Jim Smith, on the date stated.

Many banks and credit card companies provide electronic links to user accounts allowing the download of transaction information in real time or with very minimal delay. Additionally, vendors such as Yodlee, bundle transaction information from virtually all banks and credit cards and in a format convenient to the user. Thus, a user with multiple credit or other bank cards may receive the information in one place. The system of the invention takes such transaction information and pre-populates Expense forms for each transaction and saves them as drafts on the user's dashboard so that the user may complete the expense form by adding a description, attachments such as receipts and by breaking the expense into line items and so on. Thus, by paying all project expenses with a credit or other bank card, the user is assured that no expense will be inadvertently overlooked as it is directly entered into the user's dashboard page as a draft expense through coordinating with a service such as Yodlee.

There next follows in FIG. 15B a Comments section for the expense, a listing of the people on this expense and Associated Hapynings. Finally, there is a History section that lists the date of creation of the expense, flags, comments and checking or removal of flags so that the user can conveniently see the history of such items for the expense. For each of the sections of Line Items, Flags, Comments, People and Associated Hapynings there is an "Add" icon that, when tapped, enables the user to create new line items, new flags, new comments, add a person and associate another Hapyning.

Figure 15C:
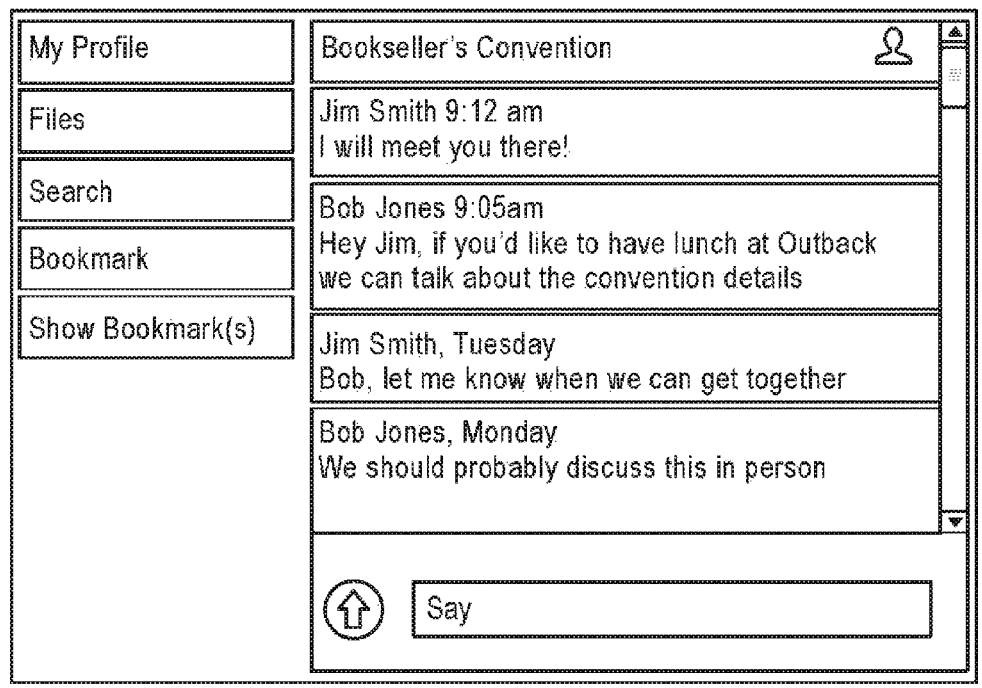

In FIG. 15B, the user has tapped on the associated Bookseller's Convention Hapyning thereby to open the modal or screen shown in FIG. 15C. As seen from the figure, there is conversation between Jim Smith and Bob Jones regarding a personal lunch meeting that ultimately resulted in the Outback Steakhouse expense. By tapping on the Bookmark box in FIG. 15C, the user places a marker at the relevant point in the Hapyning conversation that documents what prompted the lunch meeting and lunch expense. The system allows users to bookmark various places with associated Hapynings that are relevant to an expense so that they may be easily and quickly located, should the need arise. Tapping on the Show Bookmarks box in FIG. 15C allows a user to progressively move from bookmark to bookmark if there is more than one related to the particular expense.

Turning now to FIG. 16, it is seen in FIG. 16A that the user has selected Invoices from the navigation bar, causing Invoice to be highlighted and the Invoice page to be displayed. Similar to the navigation bar pages earlier discussed, the invoice page has a search/sort function that allows the user to search/sort by date, invoicee, members, keywords and project name. The Invoices page may be managed by the user, an administrator or bookkeeper or accountant, as determined by the organization. The user may or may not see invoices beyond drafts, again as determined by the system permissions established by the organization using the system, here Event Planners Incorporated.

The invoice window has columns for date, invoice status, invoicee/description, project, and amount. Each of these columns is sortable in conventional fashion thereby to allow the user to sort by date, status (draft invoice, unpaid invoice and paid invoice), invoicee/description, project and invoice amount. Thus, with a simple sort, the user may, for example, bring to the top of the stack all draft invoices needing attention. Clicking or tapping on a particular invoice line brings up that invoice in a screen of the kind shown in FIG. 16B, here the unpaid invoice for the project Bookseller's Convention.

Figure 16C:
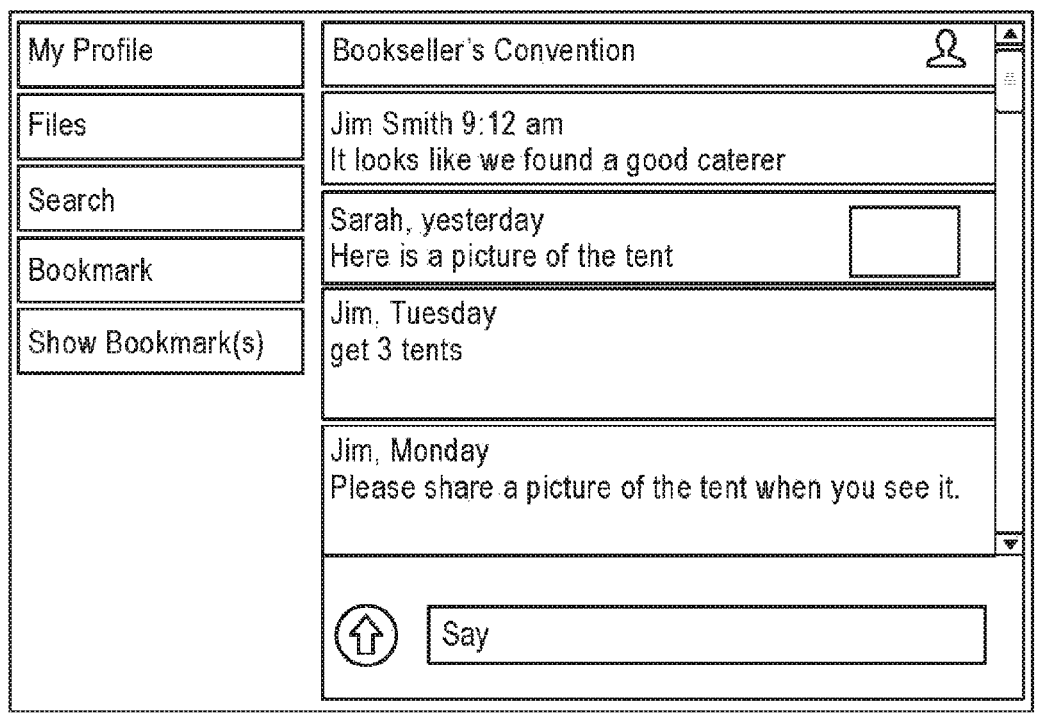

Draft invoices are automatically created from expenses entered for a particular project. Thus the invoicee/description, project, amount, the from, to, terms, sent, due and line items breaking down the expense into its constituents are all pre-populated in the invoice as a draft. The user responsible for handling invoices is able to quickly review the pre-populated sections for accuracy (and/or decisions whether to bill certain expenses) and then reviews the invoice for flags, comments, persons and Hapynings, tapping Add where necessary to add or remove a flag, add a comment, add a person, associate another Hapyning. When the invoice is completed and approved, the user taps "Save" in the lower right of the invoice draft. The completed and approved invoice is transmitted to the client via email, as an attachment to a Hapyning having as members the client and the Event Planners employee (typically the person who created the invoice), or by other means as desired. The invoice date is automatically populated as the date the invoice is transmitted to the client. Typically, an administrator, bookkeeper or accountant manages at least the paid and unpaid invoices, entering payment when made and perhaps sending reminders on unpaid invoices aged beyond a certain time. If the client makes payment electronically to an approved bank of the invoicer, and a service like PayPal or Stripe is used to handle such payments, the payment and amount may be automatically populated into the unpaid invoice As with expenses, the user may associate a Hapyning with an invoice and bookmark the Hapyning at places pertinent to matters related to the invoice. In the present situation, the user has tapped on the highlighted "Booksellers Convention" phrase thereby to open the selected Hapyning, Bookseller's Convention, as shown in FIG. 16C. The user may bookmark a selected conversation in this Hapyning to the invoice if desired, all in a manner previously described.

Figure 17A:
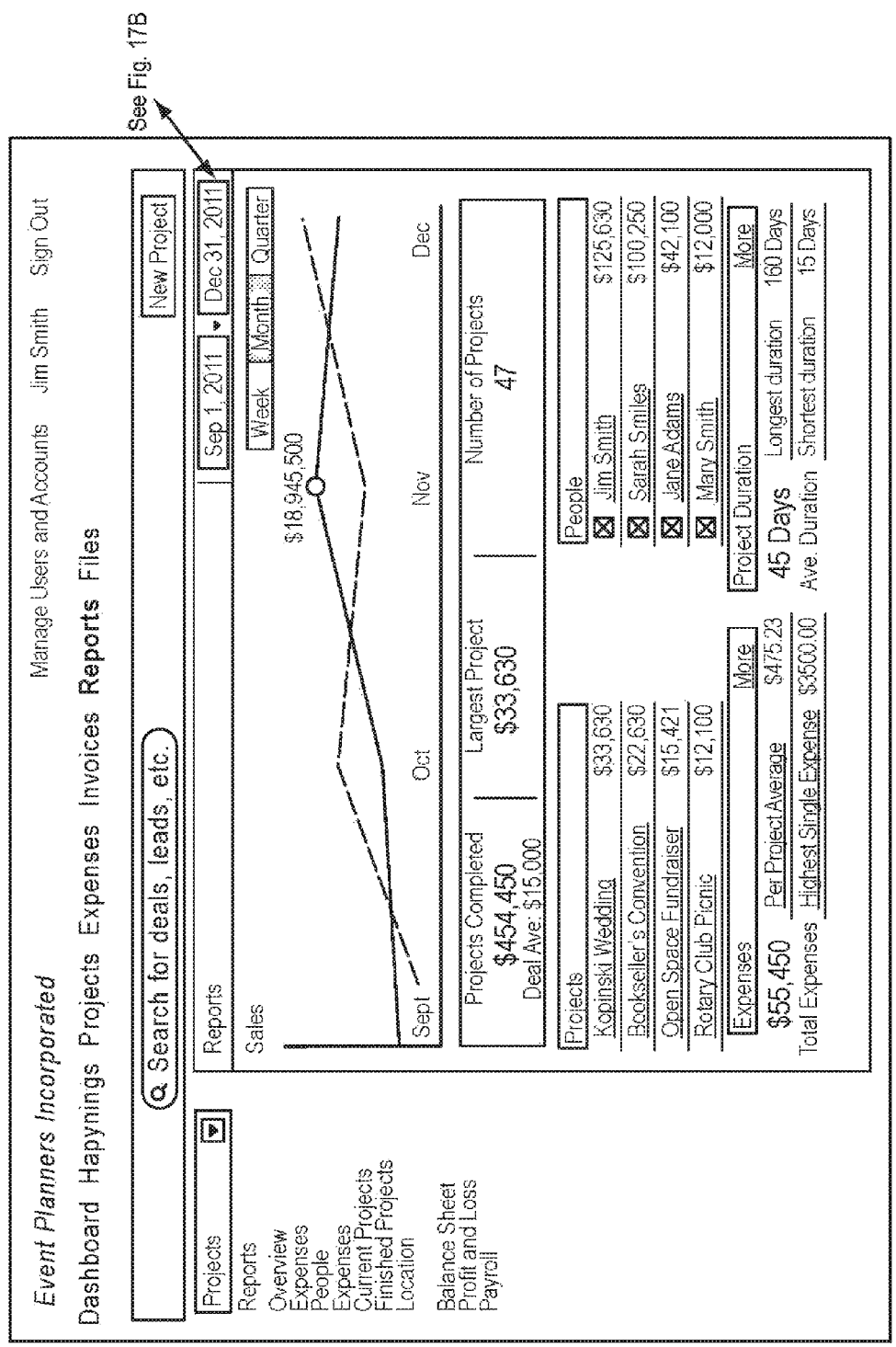

Reference is now made to FIGS. 17A and 17B which, like the other drawings, depicts in wireframe form another page, Reports, that has been selected in the navigation bar, as shown by the highlighted Reports header in the navigation bar. The data accumulated in handling all aspects of the projects managed by the present invention is stored in a conventional database management system or relational database such that it can be resurrected and mixed and matched in a variety of ways to generate reports useful in monitoring and managing a business, including visualization of data which is often a highly informative presentation.

FIGS. 17A and 17B depict an exemplary report format page and associated modals that illustrate the kind of information that may be selectively displayed. As shown, the user is able to select a date range for the report as shown at the upper right of the figure, either as a predetermined date range, like last 30 days, last quarter and so on or a custom range as selectable via the calendar depicted to the right of the figure. The report page may also focus on performance of individual employees or groups of employees. In short, the system easily provides reports by date range, by person, by Projects or any combination of these and other criteria. Standard kinds of reports available by simply clicking on a word or phrase are shown at the left side of the figure, namely, Overview, Expenses, People and so on.

An example of data visualization is the sales in dollar volume versus time as shown by the chart in FIG. 17A. This exemplary report also provides, in summary form, the dollar volume of projects completed, the revenue produced by the largest project, the number of projects handled in the time frame being reviewed, the project names and amounts in a scrollable window and the people involved. The Reports page in the present example also displays expenses incurred in total, per project average, highest single expense along with project duration including average duration, longest and shortest duration. In summary, if data is originally input into the system that data may be assembled in ways highly informative for business management including the standard reports of balance sheet, profit and loss and payroll that are automatically assembled and displayed simply by clicking on the report name in the left column of FIG. 17.

Additional reports may include the amount of business attributable to each employee, how active each user is on the system, how long they take to convert draft expenses to final expenses or respond to collaboration requests, such as flags, and how they participate in the company's Hapynings. These reports bring to the surface much of the activity that is usually inaccessible to management, i.e., which employees are truly participating in the company culture and collaborating constructively with others. While, in the abstract, the generation of myriad kinds of reports from information stored in a relational database is well-known, the present invention creates an environment that captures data of a kind that is often not captured by enterprise systems and thus makes possible reporting that is more informative, particularly with respect to effective participation of employees in a desired corporate culture.

Figure 18:
FIG. 18 is an exemplary wireframe diagram depicted on a tablet computer of a seventh selectable "files" page and related submenu screens of the second invention embodiment.

Attention is now directed to FIG. 18 which depicts the Files page as having been selected by the user from the navigation bar thereby to present the user with a page that provides a simple and highly effective way to access relevant files for the projects being managed. Specifically, as shown, files can be selectively searched by All, Images, Videos and Documents simply by clicking on the desired search criteria, here documents as shown by that word in red in FIG. 18. The search can also be made by keyword in the description or meta tags for any file, a date range, files added by a particular project member or employee, a particular project and those involving a particular Hapyning. In FIG. 18, the search for documents in the specified date range revealed two documents meeting the criteria as shown at the bottom of the page, namely, Rotary Club Contract and Employment Contract. These files may be directly opened from this page simply by clicking or tapping on them. New files may be added from this page by clicking on the Add+ word at the top of the page.

Figure 19A:
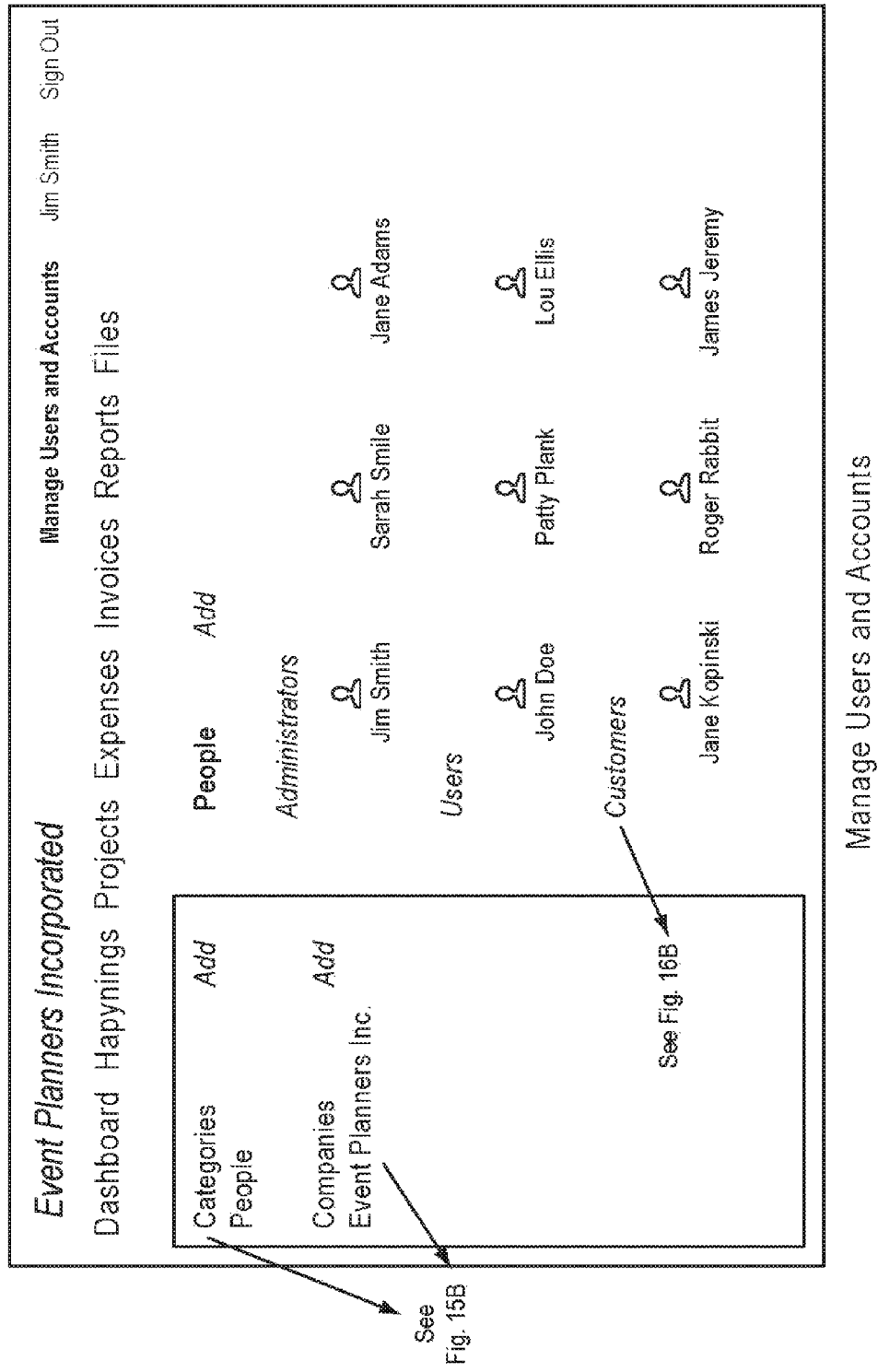

FIG. 19 shows the management screens available to the user when the "Manage User and Accounts" header has been tapped. Most if not all of the selections or settings available in FIG. 19 are reserved to authorized administrators and/or business principals. Specifically, tapping or clicking on the foregoing phrase, which is present on all pages, presents the authorized user with the page of FIG. 19A. In this exemplary figure, the user has tapped on People at the upper left of the page as denoted by the highlighting of this word in bold and by the main portion of the page which lists under People, Administrators, Users and Customers. An authorized person may add, as denoted by the word "Add" at the top of the page, any appropriate number of additional administrators, additional users and additional customers, and likewise may delete same from the system in the sense that they are no longer permissioned in the case of users and administrators and no longer considered customers for future matters, but the prior history of all such persons and their involvement in the system is retained. New customers are automatically add to the customer page when they are input as an invoicee, as shown in FIG. 16B.

As shown in the left column of FIG. 19A, there is a selection for Categories which allows the authorized user to add expense categories which display in the drop down menus on the expense page, FIG. 15B. Some organizations operate through multiple companies. As shown in the left hand column, there is a selection for companies; in the present case only one company, Event Planners, Inc. exists. Additional companies may be added by clicking or tapping on the word "Add" adjacent the Companies header. Clicking on the Event Planners opens the screen shown in FIG. 19B where a company accountant can provide a full balance sheet for each company composed partly of information from the system and partly from information input by the accountant, such as bank accounts. The system is able to account for payments between related companies that are needed for tax purposes, but still provide the kind of business management information that is independent of companies or extends across companies, for example, total sales and total expenses incurred by all companies. This structure allows the day to day business operations to be kept in a conventional double entry accounting system along with information derived from separate sources, such as liabilities and assets, not part of day to day operations. All of the business operations have drill down details as earlier explained that are not available with conventional bookkeeping or accounting systems, such as Quicken or Quickbooks.

Reference is now made to FIGS. 20-41 which illustrates a third embodiment of the invention, specifically an embodiment that has particular utility for salespersons in carrying out their responsibilities and as well important value to sales managers and senior company officials in managing sales organizations. This third embodiment, unlike the first and second embodiments earlier described, has two types of tracked objects. In the sales example, sales leads (people) and sales deals are the tracked objects; the sales embodiment has content associated with the tracked objects that is available in varying degrees to appropriately permissioned persons.

In the sales embodiment, there are screens primarily accessible on and as a practical matter only conveniently usable from the relatively large displays of a tablet or other computer (FIGS. 20-36) and those accessible on tablet display, but also easily accessible from and usable on the small screen displays of mobile phones or the like (FIGS. 37-41). The small mobile phone displays are sufficient and particularly handy for a salesperson on the go as all needed information for the sales person and all needed inputs to the system can be made from the small mobile device. However, additional information particularly useful to management such as reports on salespersons and the sales organization are more conveniently viewed on the larger screens of a tablet or other computer, FIGS. 20-36.

As will be seen, this third embodiment is structured so that a salesperson can, and should be required to conduct all company business from within this mobile app. If the salesperson conducts otherwise recordable and significant business activity outside of the app, the absence of substantial activity will be visible to management and may cause the salesperson to fall in prestige, fail to receive proper recognition and credit for work done and/or receive a reprimand from management. Information sufficient for detailed, real time monitoring of widely dispersed salespeople and their progress in generating sales is achieved simply by the salesperson doing their job in normal course and causing to be entered into the system information beneficial to the salesperson for efficient performance of the sales duties.

Attention is directed first to FIGS. 37-41, the mobile phone version of the third embodiment which is used by individual salespersons in the field to manage their own activities and to generate information highly useful to their regional and national managers and to senior management of the company for real time monitoring of the progress of the sales organization and to evaluate and compare individual salespersons, regional sales groups, etc. with respect to, among other things, sales performance in converting leads to deals and in managing sales expenses. Also, for obvious reasons, manufacturing and manufacturing planning groups are greatly aided by having real time information on sales and prospective sales.

Further, with a disciplined structure for the app, as exists in this third embodiment, all important information uniquely known by individual salespersons must be input into the system thereby to provide the company with deep institutional knowledge that can be captured by the organization and by a new salesperson should any member of the sales team for any reason leave the organization. Moreover, since the institutional information is kept in the cloud and fully under the control of the organization, rather than on a personal computer or the like of an individual, a departing or disloyal salesperson may be de-permissioned and denied access to the company information, including that information generated by the salesperson, on a moments notice.

Figure 37:
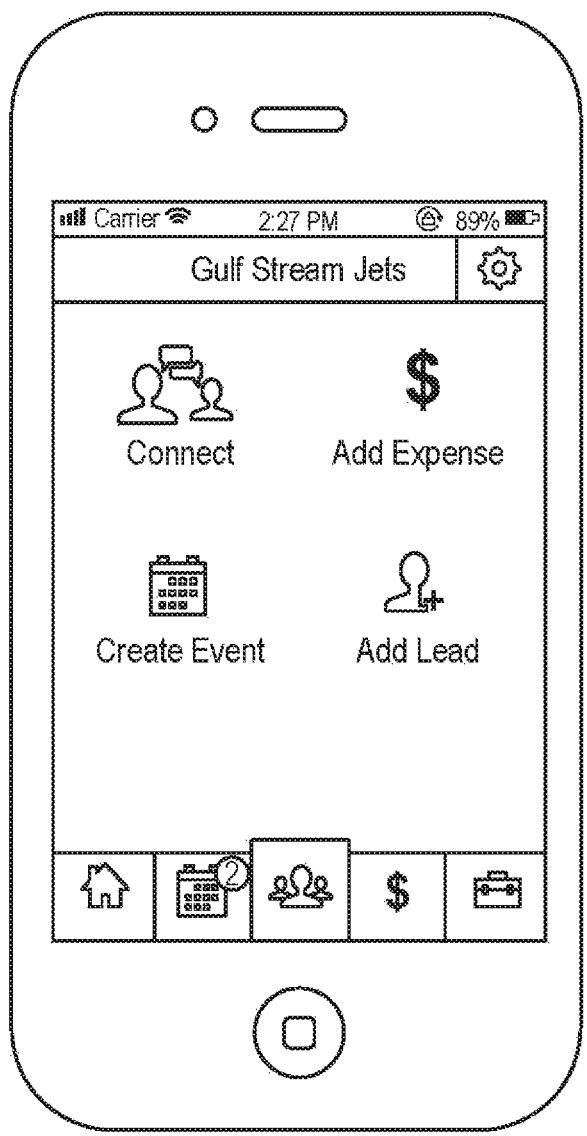
FIG. 37 is an exemplary wireframe diagram of the home page of a mobile phone version of the third invention embodiment depicting the actions and navigation steps available to the user from the home page.

FIG. 37 is a wireframe diagram showing the home page of the mobile phone version of the third embodiment of the invention shown in exemplary form as an embodiment for the management of a company sales organization. Specifically, in FIG. 37, there are five user selectable screens shown at the bottom of the page, namely, home, calendar, people, expenses and deals. The circled numeral 2 adjacent the calendar icon indicates that there are two pending appointments. Here the home screen has been selected to reveal a homepage with four separately selectable icons, Connect, Create Event, Add Expense and Add Lead. The top portion of the home screen is a banner with the company name and a selectable gear symbol for access to settings which may include the profile of the user and system account information.

Figure 38A:
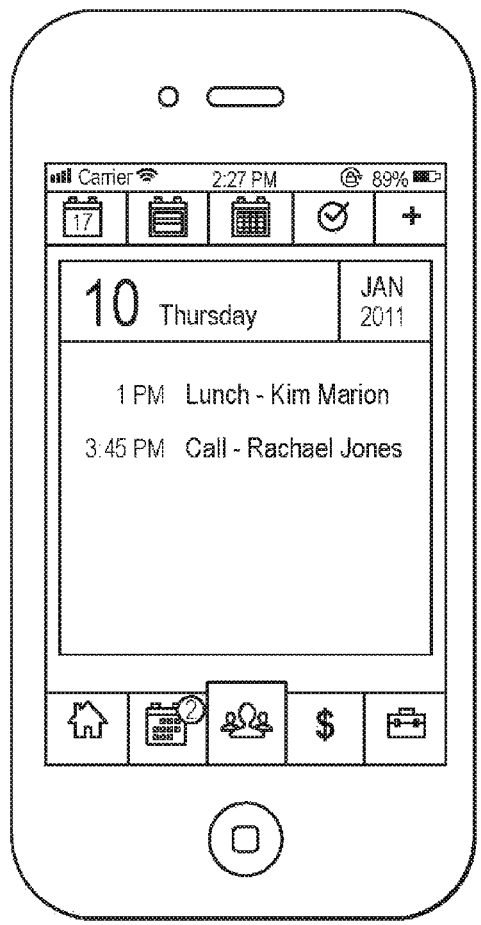
Figure 38B:
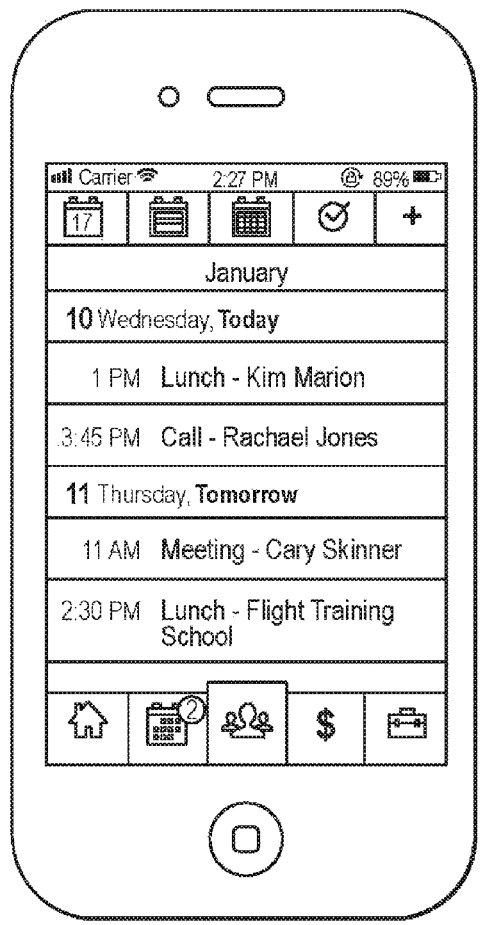

Clicking on the calendar icon at the bottom of the page takes the user to the first of four individually selectable calendar screens, FIGS. 38A-38D. The first screen, FIG. 38A shows the user's pre-scheduled appointments or activities for the day. At the top of this calendar screen are four more tap selectable icons, two for calendar, another a checkmark and the fourth a + to denote adding of a calendar event. FIGS. 38B and 38C show, respectively the week and month views of the calendar. These aspects of the calendar itself and the display format for events is conventional for calendars and thus poses no learning curve for the user. FIG. 38D shows the checkmark at the top of the screen having been selected thereby to display on the main portion of the screen all activities the user has checked off as completed for the day. This page is scrollable to reveal a chronological sequence of completed events and activities. Each completed item is tap sensitive to take the user to the calendared event and related activity and people involved.

Figure 38E:
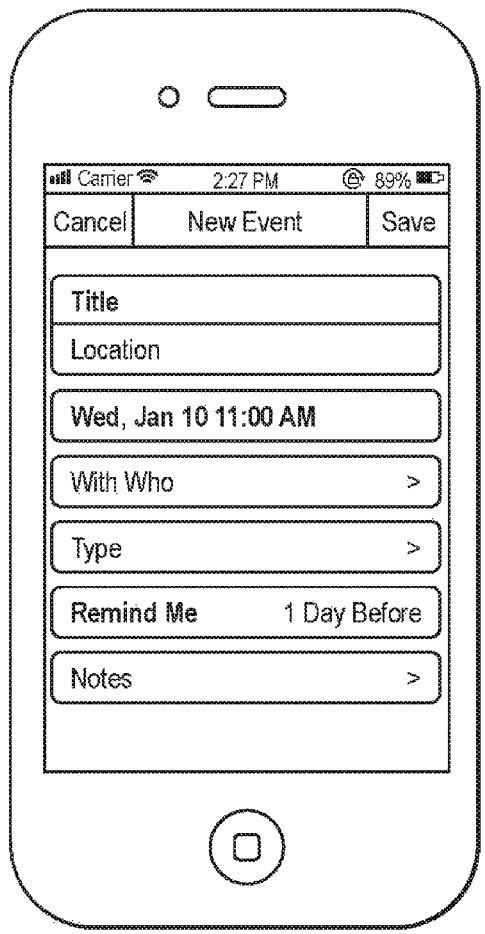

FIG. 38E shows the blank new event screen that comes up on tapping the + symbol at the right side of the header in any of the screens FIGS. 38A-D. This screen allows the user to populate the event with the information pertinent to a potential sale. The new event screen of FIG. 38E may also be reached by tapping on the Create Event block in the home screen, FIG. 37.

Figure 38F:
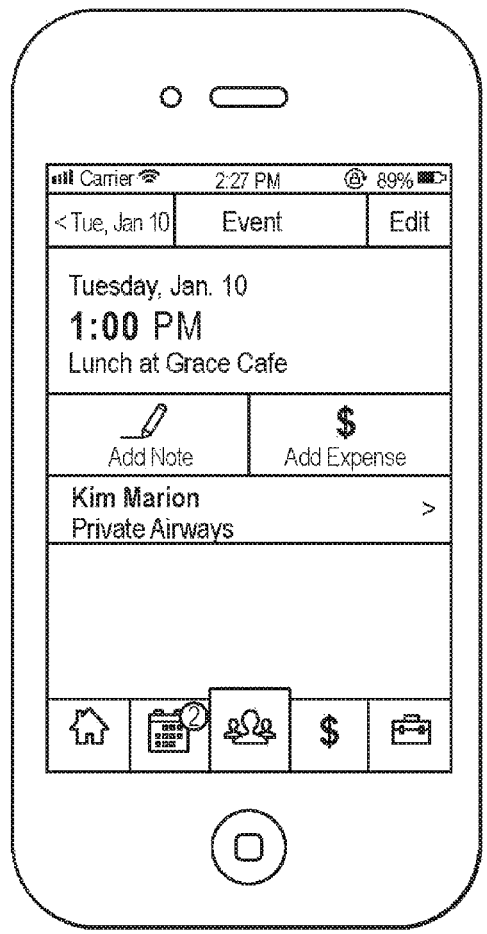

An example of the populated new event screen is shown as FIG. 38F, which is reached when the blank screen is filled out and the Save block tapped. The event is shown as a 1:00 PM lunch meeting at the Grace Cafe on Tues January 10 with Kim Marion. Kim Marion was earlier identified as a sales lead and her contact and other pertinent information input into the system, as will presently be explained. The user is conveniently able to add a note, add a new expense or go to Kim Marion's contact page directly from the calendar page. The new expense screen is also reached by tapping on Add Expense in the home screen, FIG. 37. Tapping on the Edit block at the upper right of the screen enables the user to edit the calendared event screen. Tapping on the name of the lead in the calendared event, Kim Marion, will take the user to her contact page presently to be described.

FIGS. 39A-39E are wireframes of screens reachable by tapping on the Deals block displayed at the bottom of all screens. Tapping on Deals first takes the user to the Deals screen shown in FIG. 39A. This screen is a scrollable, rolling log of the user's activity in the system with respect to deals. The log is presented in chronological sequence. As shown, there are individuals who are leads for named deals, but the activity may start off with a person as a lead and no specific sales deals in the offing. Eventually, however, persons as leads become associated with deals, prospective and executed, unless the lead went nowhere. There may be multiple individuals as leads for a deal and multiple deals associated with one person as the lead, or some combination of both.

Tapping on the multi-line block in the upper left corner of the FIG. 39A screen opens the screen of FIG. 39B. The user can assign a status to pending deals of hot, warm and cold, and archive deals that have run their course as won, lost and all. Of course, each organization will have its own way of assigning deals status. This information is helpful to the salesperson that has many leads and among that information useful to management in getting a gauge on the likelihood of a sale being consummated, for which products, in what time frame and in how many units. Complete deals can also be analyzed to determine in real time who is doing what in terms of getting positive results; this information may help management identify best sales practices so that the success of one person can be used to instruct others in how to handle leads in a way most likely to achieve sales.

Figure 39C:
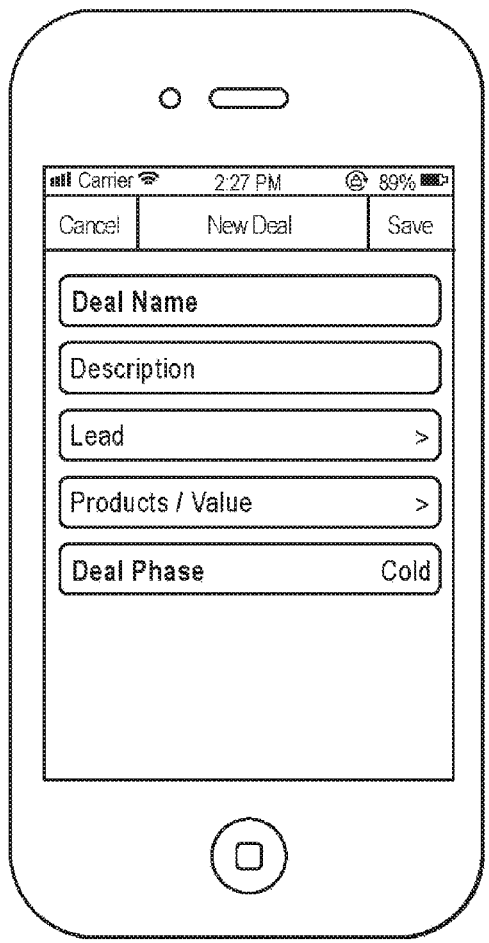
Figure 39D:

FIG. 39C is a new deal page that is reached by tapping the + symbol in the upper right corner of FIG. 39A. This page requires entry of a deal name, deal description, name of lead(s), products value and deal phase or status. Tapping on the Save block in the upper right corner of the screen saves the information entered and adds a prospective deal to the salesperson's roster.

The FIG. 39A screen is analogous to the River screen in the first embodiment of the invention except here the deal activity log is continuous and not able to be deleted. System entered activity on deals comes rolling in on the FIG. 39A screen as a continuum in chronological order, and not by specific deal. The user can access what is, again by analogy to the first embodiment, the stream of activity in a specific deal by tapping on a deal activity in FIG. 39A which takes the user to the screen of FIG. 39D. This screen is a rolling log of activity in the specific deal, namely, the Private Airways deal. Attachments to these activities may be made as desired, such as the pdf contract attachment shown.

Figure 40A:
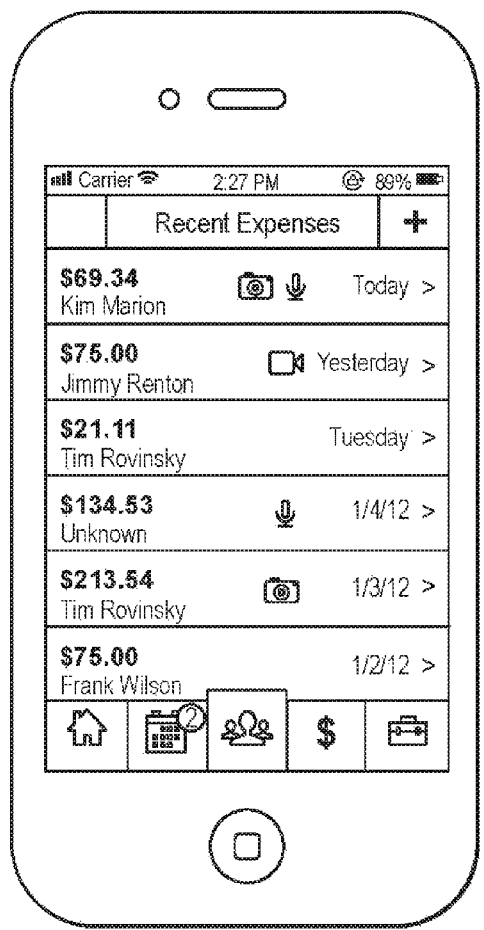
FIGS. 40A through 40C are exemplary wireframe diagrams of the mobile phone version of the third invention embodiment depicting, respectively, recent expenses, expense and new expense screens.
Figure 40B:
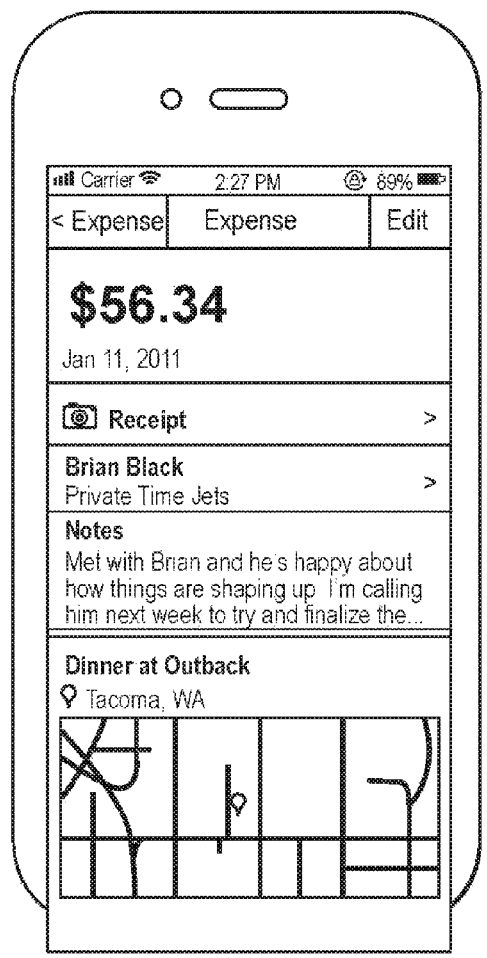
Figure 40C:
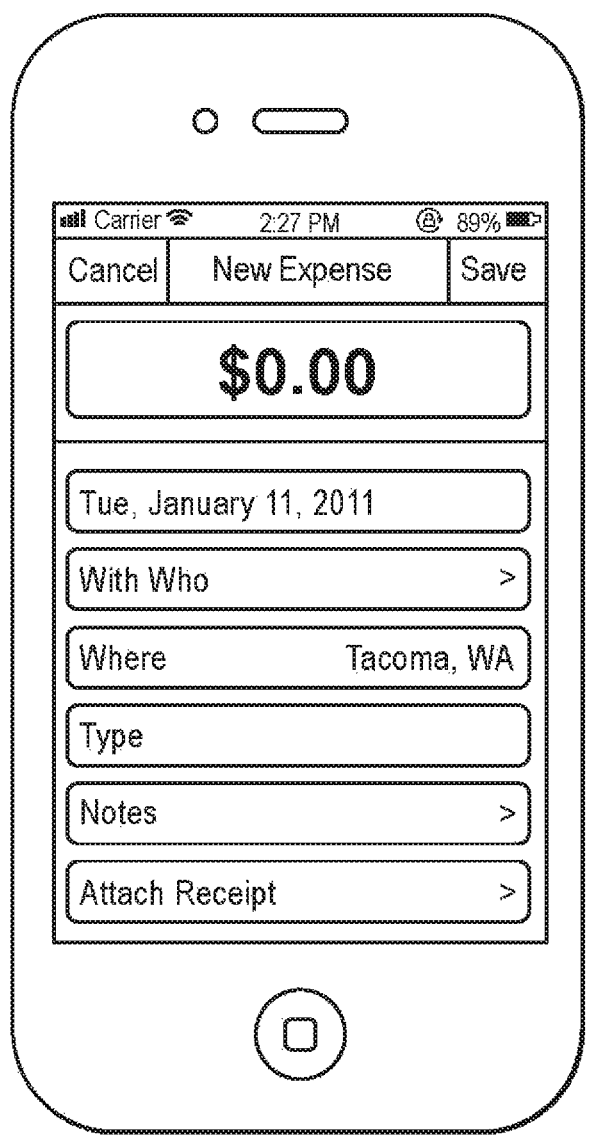

FIG. 40 shows how expenses are handled in this embodiment. In this regard, the screen of FIG. 40A is reached by tapping on the "$ expense" block at the bottom of the screen. This screen displays a log of expenses in summary form and in chronological order. The screen identifies the amount, the person involved and by the icons shown whether there is a photo, video, audio or document attachment to the expense. Tapping on a specific expense item in FIG. 40A takes the user to the detailed expense screen shown in FIG. 40B. In this screen, the amount of the expense is shown in bold at the top of the screen and the date it was incurred. Proceeding down the screen, there is an indication of a receipt in the form of a photo, as denoted by the photo icon. Tapping on the receipt line takes the user to the image of one or more receipts supporting the expenditure. These receipts are created without leaving this app by using the capabilities of modern mobile phones to take photos and videos, store documents and record audio.

The receipt may be composed of multiple items in the form of documents, photos, videos and the like. Since images are geotagged in modern mobile phones there is provided at the bottom of this screen a Google type map of the location at which the expense was incurred. The expense form also includes the identity of the lead and the associated deal, here Brian Black and Private Time Jets. There is also a space for the user to write a note which is done in conventional fashion by tapping on the Notes block which brings up a keyboard, as is the convention in modern smart phones. Tapping on the name associated with the expense, here Brian Black, takes the user to a contact screen for that person. This feature will be further explained in connection with FIG. 41C. A new expense is entered into the system either by tapping on the + symbol at the top of FIG. 40A or by tapping on the "Add Expense" block on the home page shown in FIG. 37. The new expense screen has a number of expense typical fields all of which must be filled in to properly record the expense and gain its acceptance by the system as a completed expense item, as opposed to an incomplete draft.

Attention is now directed to FIG. 41. The screen of FIG. 41A is reached either by tapping on the Connect block on the homepage of FIG. 37 or by tapping on the People icon displayed on the bottom of all screens. At top of the FIG. 41A-B screens are respectively a head symbol, a phone pad symbol and the + symbol with a person icon. Tapping on the people icon takes the user to the screen of FIG. 41B which lists in conventional contact list format all of the people who are individuals identified as leads or are otherwise relevant to the pursuit of sales leads. It is preferred that this contact list be maintained separately from a personal contact list since the system logs all information entered by the salesperson. In short, this app is designed for the use by the salesperson in the conduct of all business, but is not for personal or other use that would clutter the system with non-work related information.

Figure 41C:
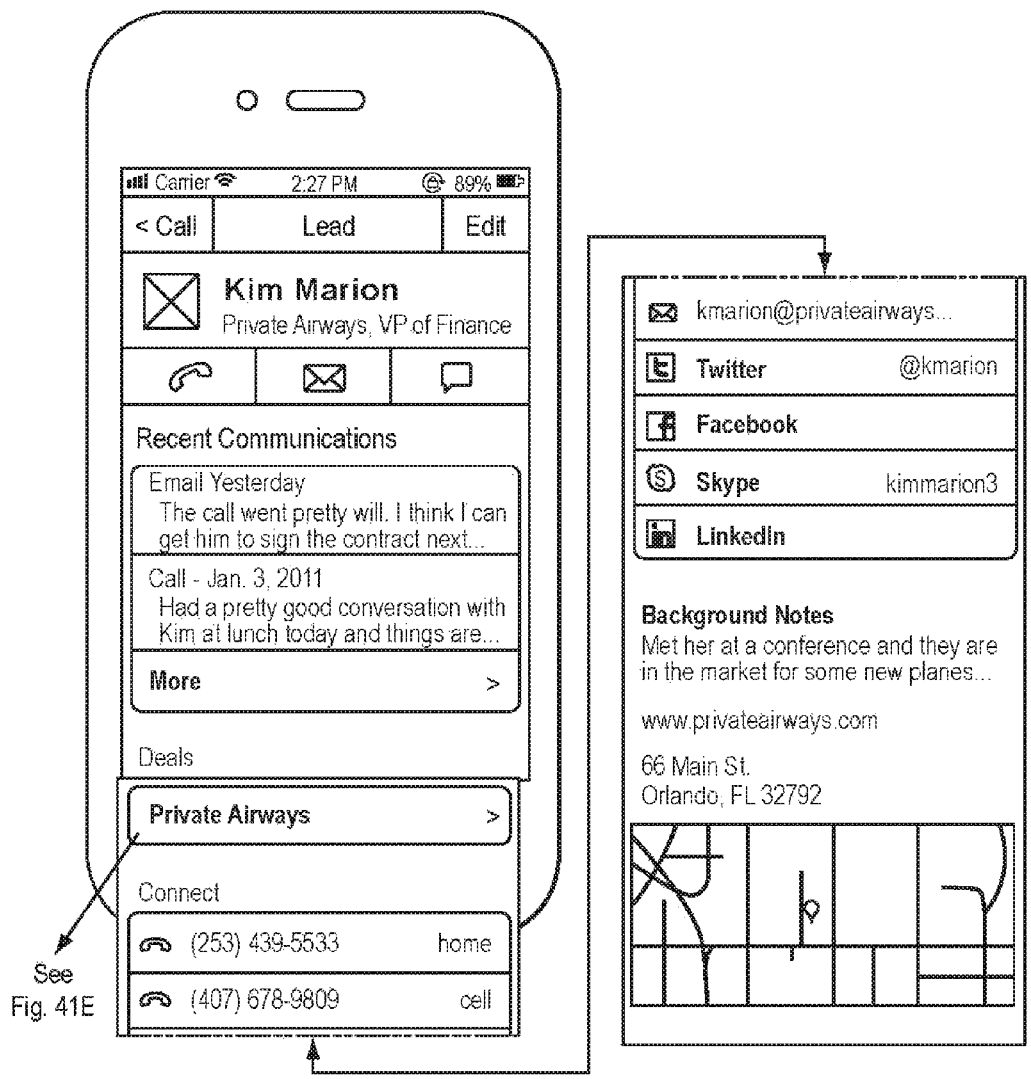

The FIG. 41A screen displays a summary listing of recent calls and other communications with the individuals identified. These individuals are among those that the user previously entered as sales leads and perhaps also associated with a deal. Since the most recent communications are a barometer of future communications in consummating a deal, this page provides the salesperson with a quick way of finding all relevant information on the lead and perhaps initiating another communication. This is done by simply clicking on the person's name in FIG. 41A which takes the user to the screen of FIG. 41C. This is the kind of screen a user also would see by clicking on a name in FIG. 41B. Specifically, as shown in FIG. 41C, the name and perhaps a photo of the lead is displayed at the top of the screen. Below that are three boxes in a horizontal row with, respectively, telephone, email and text message icons. Tapping on these icons brings up, respectively, a screen with all of the telephone numbers for the lead which may be called directly from the screen, an email form pre-populated with the to and from information and an introductory greeting and the user's signature and a text message window prepopulated with the lead's text address.

Below the foregoing row of boxes is a recent communications window which chronologically lists recent telephone calls, emails and text message communications with the lead. The "more" block opens a window for reviewing further of such communications. Next is the Deals information listing the name of the deal, here Private Airways. Next is all of the contact information for the lead including Twitter address, Facebook page, Skype number and LinkedIn identification. Finally, there are places for background notes on the lead, a relevant website, address and Google like map showing the location of the address. In short, instead of having to find information about the lead from a multiplicity of sources and a multiplicity of specialized apps, all of the information relevant the lead is conveniently accessible in one location. This invention embodiment is structured so that the user does not need to leave the app to perform any or all of the tasks required or helpful in handling the sales responsibilities.

New sales leads may be entered from multiple places within the app, specifically by tapping on the Add a Lead block on the homepage of FIG. 37 or by tapping on the + symbol and person icon shown in the upper right corner of each of FIGS. 41A-41B and 41F and G. The information that may be entered for the new lead at the outset and as communications progress is all of that shown in the lead screen depicted in FIG. 41C. Tapping on the Private Airways deal block in FIG. 41C takes the user to the screen of FIG. 41E. This screen shows the potential value of the sales deal, aggregate expenses incurred to date in pursuing the deal and the deal status, in this case "Hot." Tapping on the deal value takes the user to the screen of FIG. 41F where particulars on the deal and its constituent elements in determining the deal value are set forth, having been previously entered by the user. Tapping on the adjacent expenses block in FIG. 41E will take the user to a screen which itemizes all of the previously entered expenses assigned to the Private Airways deal. The screens of FIGS. 41C and 41E may be edited by the user by tapping on the edit block in the upper right corner of each of these screens, another conventional practice in smartphone apps such that the user can feel familiar with many of the actions required in this app based on experience with other apps that likewise tend to adapt standard practices and protocols.

The Private Airways deal screen of FIG. 41E also shows recent activity on the deal with the ability of the user to add notes. More activity is viewable by tapping on the "More Activity" block which takes the user to the scrollable FIG. 41G screen where the history of activity may be conveniently reviewed. Attachments of all forms, video, photo, document, video and voice recording, may accompany activities as appropriate. In FIG. 41G a pdf of the proposed contract is attached.

Figure 20:
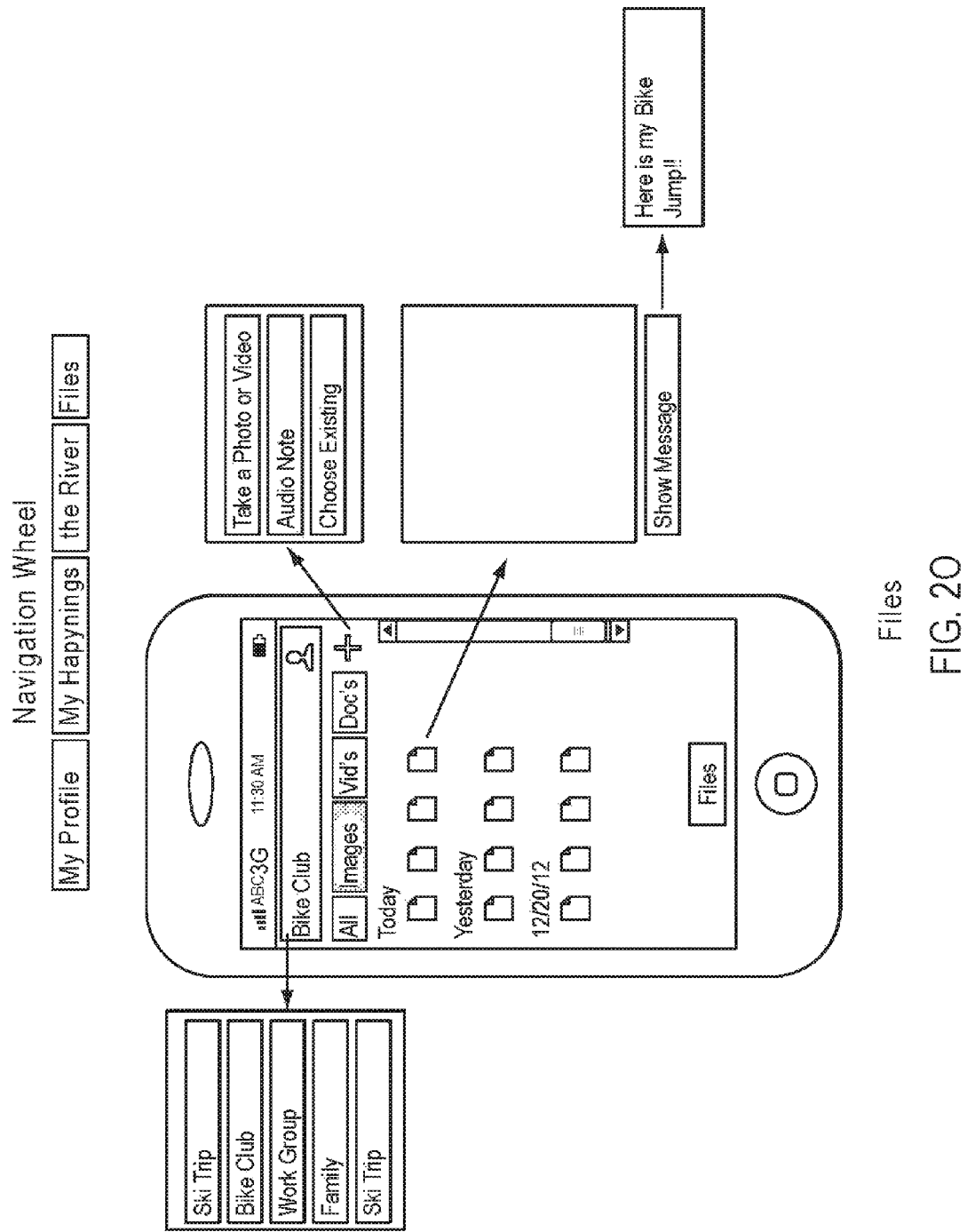
FIG. 20 is an exemplary wireframe diagram depicted on a tablet computer of a sales calendar page for a third embodiment of the invention, specifically an embodiment having particular utility in the management of sales projects and sales organizations.

Attention is now directed to FIGS. 20-36, which are exemplary sales app screens most easily accessible from tablet computers or the like and most useful to sales administrators, sales managers and senior management in keeping real time tabs on sales activity being generated by salespersons in the field. FIG. 20 is a sales related calendar which aggregates calendar information from individual salespersons into a single calendar display. There may be calendars that allow individual salespersons to see not only their activity but that of fellow salespeople with whom, for example, schedule coordination is useful. The calendars may also aggregate information from regional sales and/or national sales, the regional calendars being visible to the regional sales managers and the national calendar being visible to the head of national sales and other senior company management. The information viewable on the screens of FIGS. 20-36 is predominantly, if not entirely, derived from information input or otherwise generated by the individual salespersons and independent sales representatives for the company.

The FIG. 20 calendar is a conventional electronic calendar which is structured to receive all or any filtered portion of the calendar information for multiple salespersons such as the salespersons within a region or the national sales team. This calendar typically would be viewable only be appropriately permissioned individuals, such as regional and national sales managers and senior management. The FIG. 20 screen, like those of the other FIGS. 21-36, may be viewed in a browser window as shown or as a dedicated app.

The FIG. 20 calendar is displayed as a consequence of the user having tapped or clicked on the Calendar selection in the left hand panel of the display, which includes the additional selections: Deals, Leads, Reports and Activity. This panel is the user's navigation bar for selective viewing of the aggregated information. In FIG. 20, the calendar is populated by the calendar entries of those persons involved in "All Active Deals" as indicated in the window in the upper right corner of the screen. This box contains a drop down menu that allows the user to selectively view the aggregated salesperson calendars with respect to all or any select subset of deals. The calendar includes a conventional calendar search box at the top of the screen. To the right of the search box are tap sensitive New Deal and Add To Do boxes that allow the user to add new deals and "to dos" to the calendar, if desired. In the center of the FIG. 20 screen, there is shown a conventional pop-up modal to allow the user to add an item to the calendar.

Figure 21A:
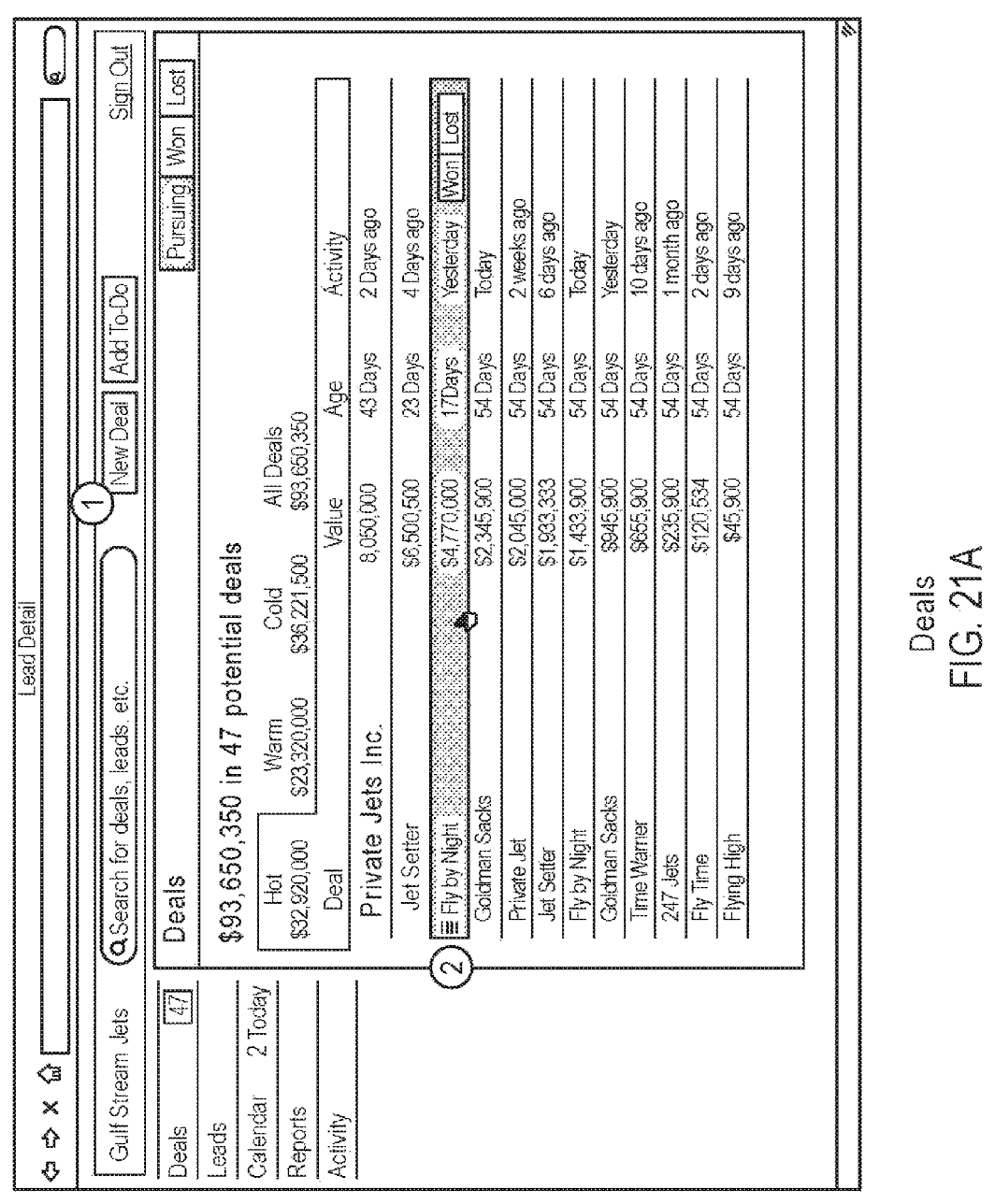

The FIGS. 21A and 21B screens are reached by the user having selected Deals in the left navigation bar. The screen of FIG. 21A shows the aggregated potential deal information input by the individual salespersons, here $93,650,350 in 47 potential deals. The user has selected the tab Hot deals under which is listed the dollar value of all potential hot deals if converted to sales, namely, $32,920,000. The user may also select tabs showing only deals the salespersons have designated "Warm" or "Cold" or the user may select the All Deals tab. At the top right of the page, the user has selected to look at deals the organization is "pursuing," as denoted by the blue highlighting on the word. The user may also select to view only those deals that have been either won or lost, meaning deals that have gone under contract or were awarded to competitors or the like. Under the selected tab Hot, there are shown all of the individual potential deals that have been designated as hot by the individual salespersons whose activities are aggregated for display. Information from which salespersons are aggregated on the screen is a function of permissions set by administrators. The search function of FIG. 21B allows the user to filter the deals seen on this report page, for example, by individual salespersons, regionals sales or the like.

Figure 22A:
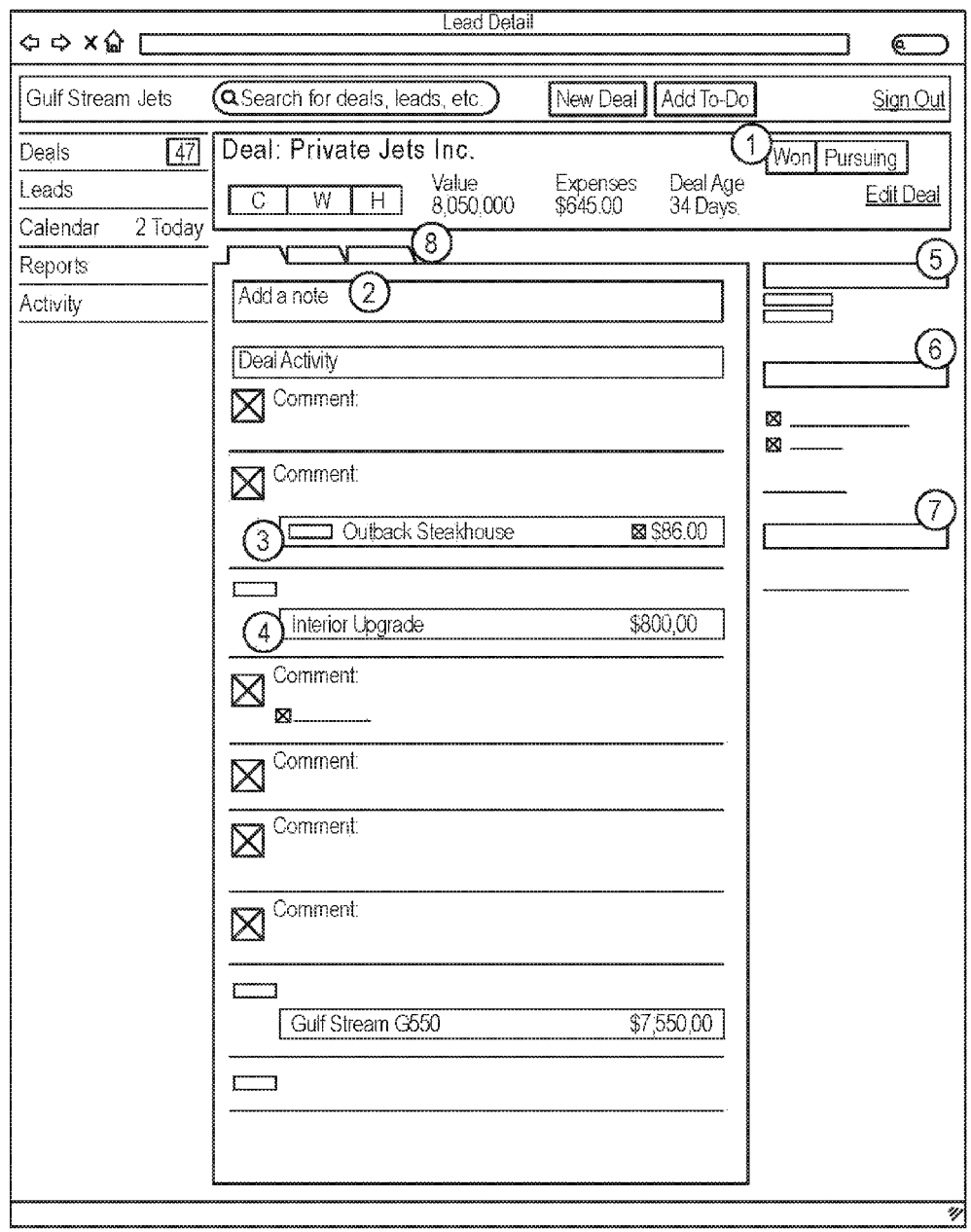

Clicking on an individual deal listed under the Hot Deals tab in FIG. 20, such as Private Jets Inc, takes the user to the screen of FIG. 22A, which are accompanied in the drawings by the explanatory notes of FIG. 22B. This screen provides all of the informational detail on this potential deal. At the top of the screen is the deal name, Private Jets Inc and in the row below which are the boxes hot, warm and cold, followed by the potential value of the deal, the expenses incurred to date in pursuit of the deal and the deal age, meaning the number of days since the in charge salesperson designated Private Jets Inc as a potential deal. There are three selectable tabs in the body of this screen, namely, Overview which has been selected by the user, and Value and Expenses. Under the header "deal activity" in the "Overview" tab, there is the stream of all of the activity of the salesperson in pursuit of this deal, namely, all of the activity entered by the salesperson's on his or her mobile phone, as earlier described.

In the FIG. 22A screen (as explained in accompanying notes 1-7 of FIG. 22B), there is also displayed on the right side upcoming to-do's, the to do's for the week, persons involved in the deal and a forward this email feature (see notes of FIG. 22B). The people involved in the deal are those working for the company ("your team") and the person at the client, Kim Marion. Emails that the user desires to put into the stream of a deal are forwarded to a special email address as shown so that the email directly populates into the stream using technology well-known to the art. Note 3 is intended to read "expense added to deal with notes, receipts, etc." Note 6 is intended to read "people who are involved in the deal. More people can be added or removed from here." Note 7 is intended to read "emails can be forwarded to unique email address for emails to be added to the deal activity block."

Figure 23:
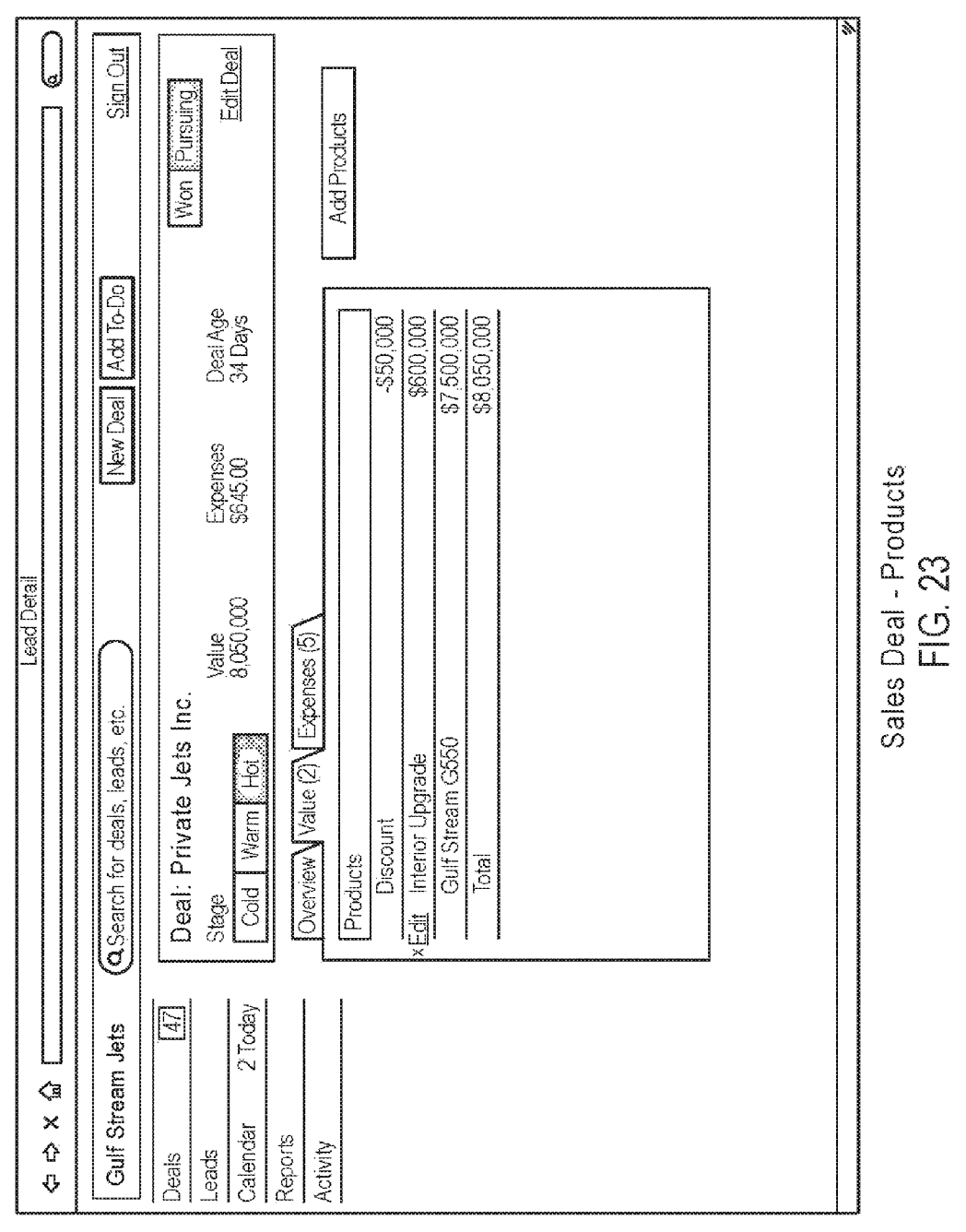

Selecting the "Value," tab in FIG. 22A (shown as the second of the three index tabs, respectively, "Overview", "Value" and "Expenses" immediately above the "Add a note" window, the tabs being left blank in the drawing to avoid clutter), takes the user to the screen of FIG. 23 which provides the dollar value of the sale, any discounts made and the products being sold. In FIG. 23, the user is preparing to edit the interior upgrade item. This screen, like the FIG. 22A includes a summary block at the top of the page listing the deal, its status, its value, expenses incurred to date in pursuit of the deal and the deal age.

Figure 24:
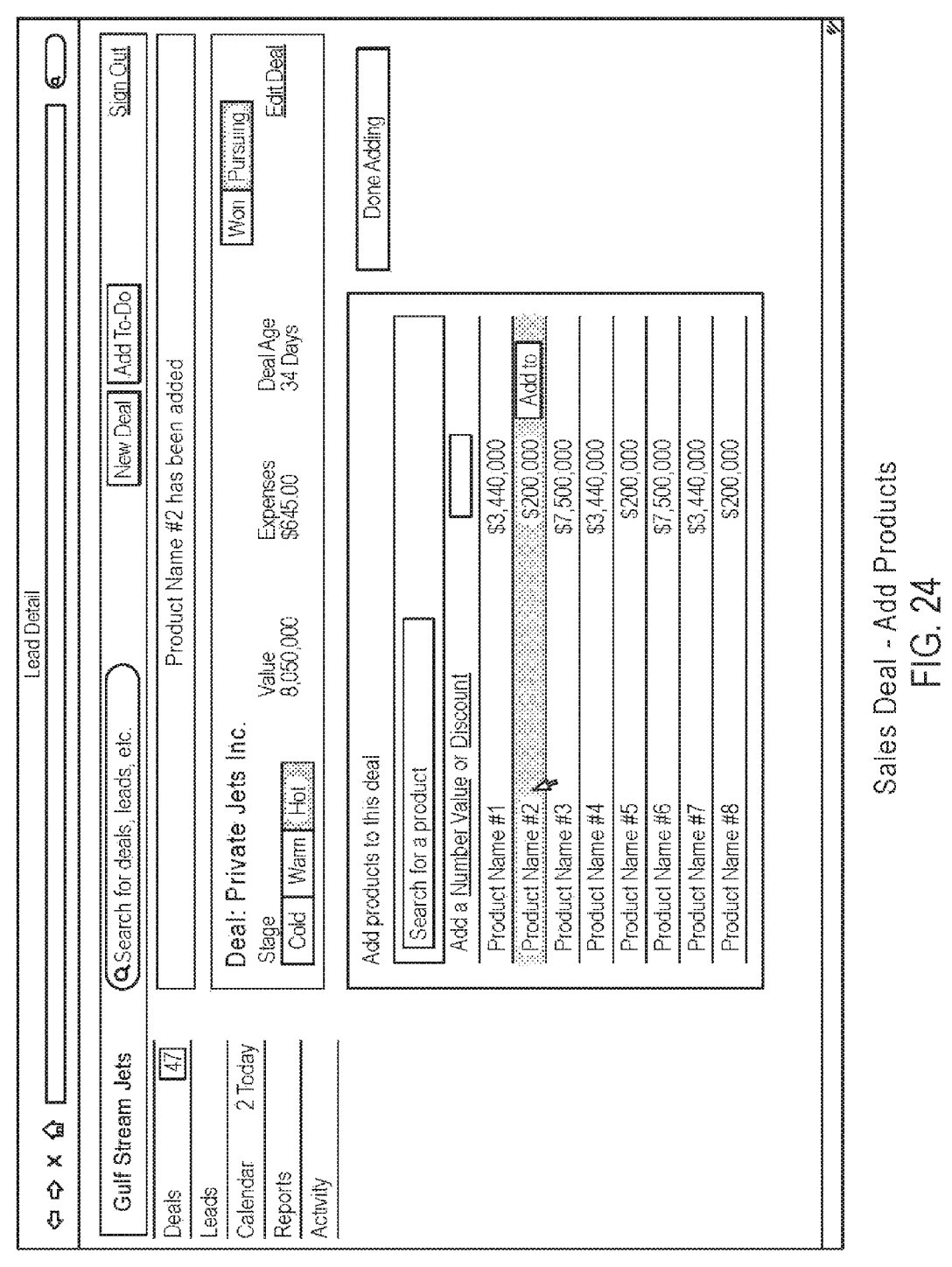

Tapping on the Expenses tab in FIG. 23, takes the user to the screen of FIG. 24. FIG. 23 has an "Add Products" block which is clickable or tappable to enable the user to add products to the deal. In FIG. 24, the user has added various products to the deal. When completed, tapping the box "Done Adding" saves the products added to the deal.

Figure 25B:
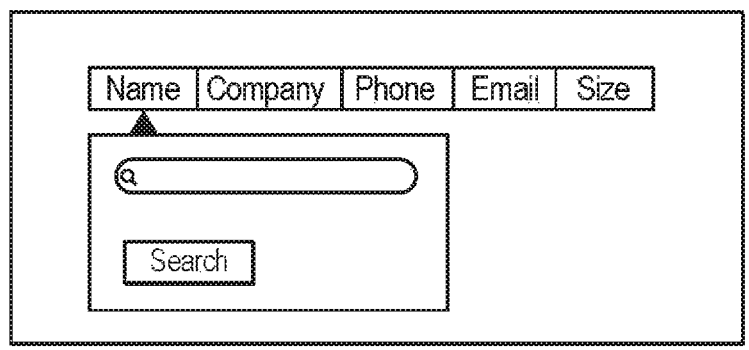

Tapping on Leads in the navigation bar, takes the user to the screen of FIG. 25A. Again, the sales leads visible on this page are aggregated from the individual leads of each salesperson for the region or whatever. These leads may be filtered by name, company, phone, email, state and whatever alternate or additional criteria is desired, by clicking on one of the boxes and putting in an appropriate search term; the modal FIG. 25B associated with the FIG. 25A screen shows that the user has selected company which presents a search window for company. The search function is obviously most useful when there may be hundreds or thousands of leads attributable to many salespeople. By clicking on the Add New Lead box in the upper right of the screen, the user may directly enter a new lead. The user may also browse the leads (one of the tracked objects) by deals (the second tracked object) simply by clicking on the desired one of the deals in the drop down menu shown. In other words, by selecting a specific deal in the drop down menu, the user will see on the body of the screen all leads (people) associated with the selected deal.

Figure 26:
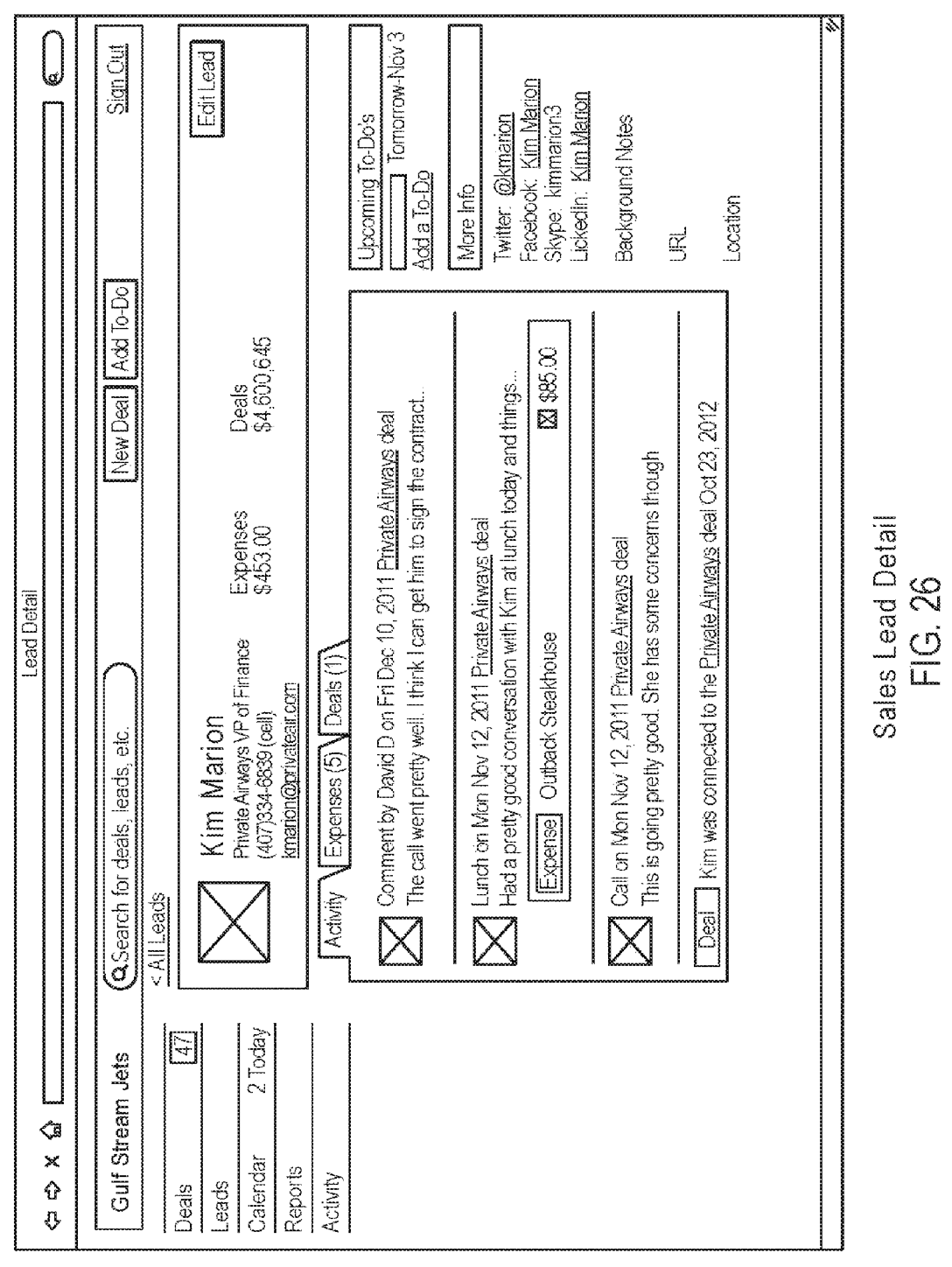

If the user taps on the name of a particular lead, say Kim Marion, in the screen of FIG. 25, the user is taken to the screen of FIG. 26. This figure shows in detail all information pertinent to the lead, Kim Marion. A summary block at the top of the screen provides a photo of the person (optional), the name, contact information, the expenses incurred to date in pursuit of a deal via this lead, and the value of the deals being pursued through this lead. The body of the page present three selectable tabs, the first of which, "Activity," has been selected by the user. Activity presents in chronological order the stream of activity the assigned salesperson has had with this lead. As previously explained, the activity information is entered by the assigned salesperson on a mobile phone, preferably in real or near real time while on the go. The right margin of the screen sets forth Twitter, Facebook, Skype and LinkedIn information for Kim Marion, some background notes on her, a URL to a pertinent website and a location map, again as earlier entered by the assigned salesperson and as earlier discussed in connection with the mobile phone screens.

Figure 27:
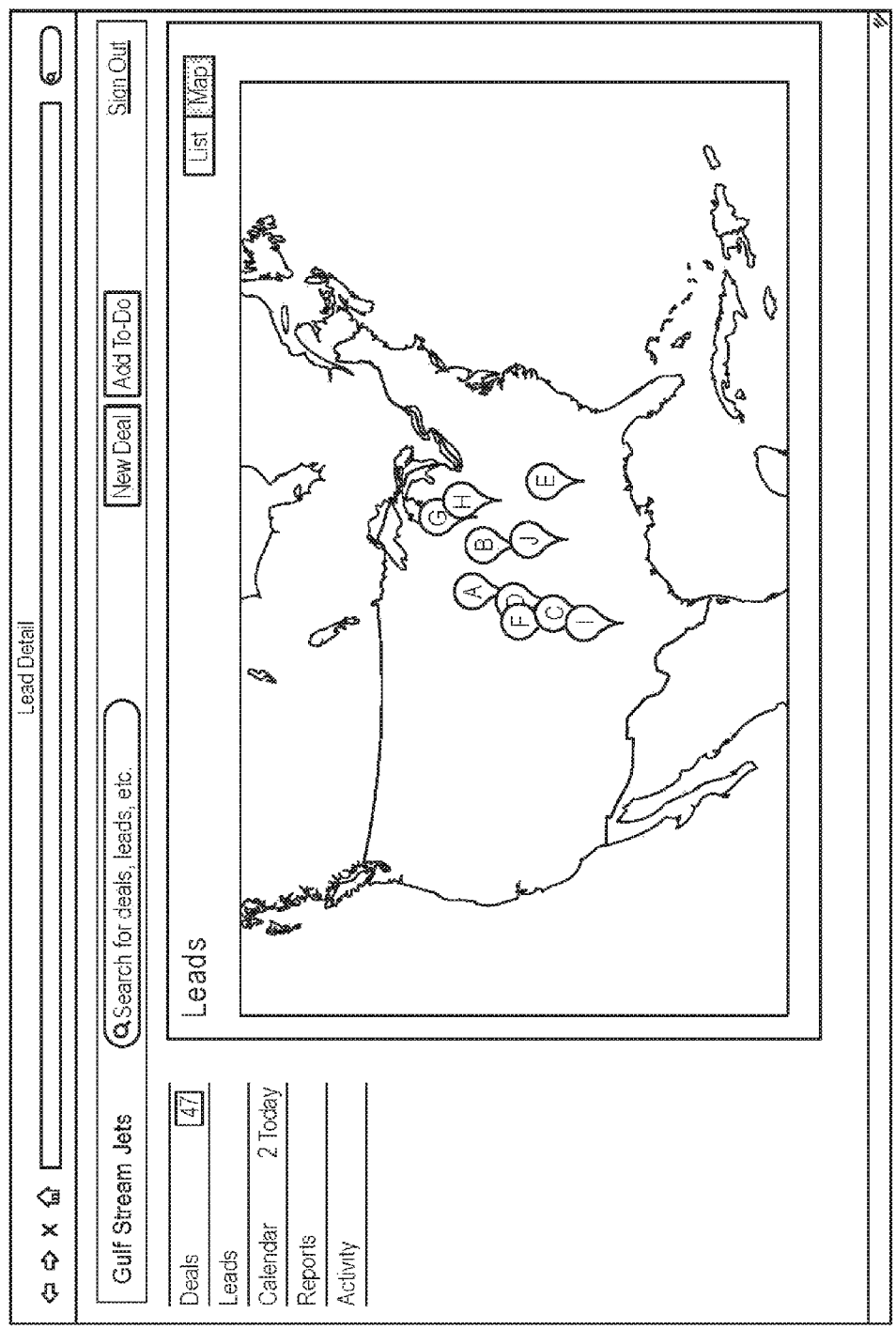
FIG. 27 is an exemplary wireframe diagram depicted on a tablet computer of a sales lead map view page for the third invention embodiment.

Clicking on the block for map view of leads shown in the upper right corner of FIG. 25A takes the user to the map view screen of FIG. 27 which lists the leads, here A through H, by geographical location on a map. Rolling a cursor over any one of the identifying letters for the leads brings up the name of the lead, etc. and is clickable to take the user to the sales lead detail screen of FIG. 26 for the lead selected.

Figure 28A:
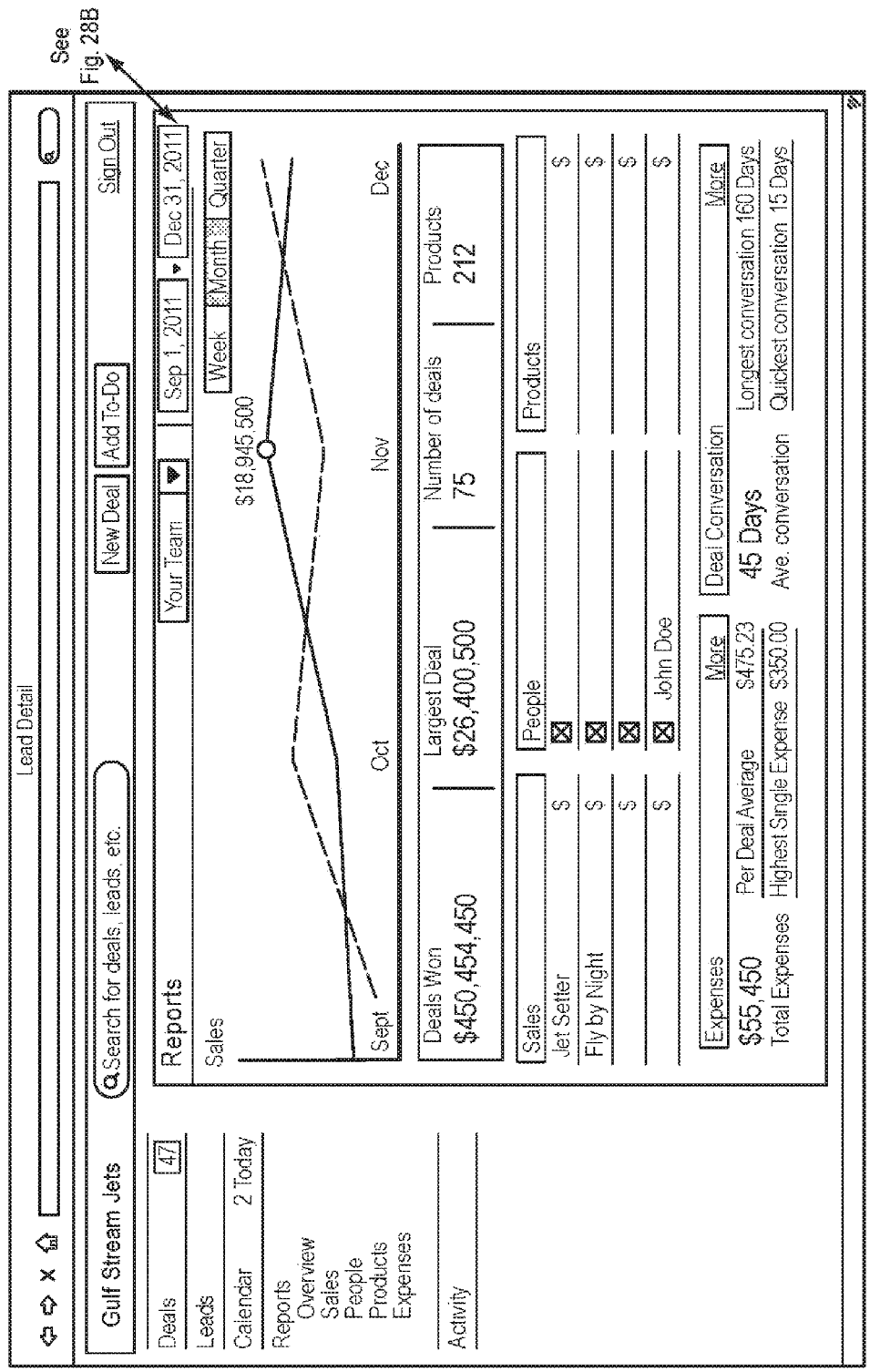
FIGS. 28A and 28B are, respectively, an exemplary wireframe diagram depicted on a tablet computer of a sales reports overview page for the third invention embodiment and a screen modal that opens from FIG. 28A to allow the user to establish certain report parameters.
Figure 28B:
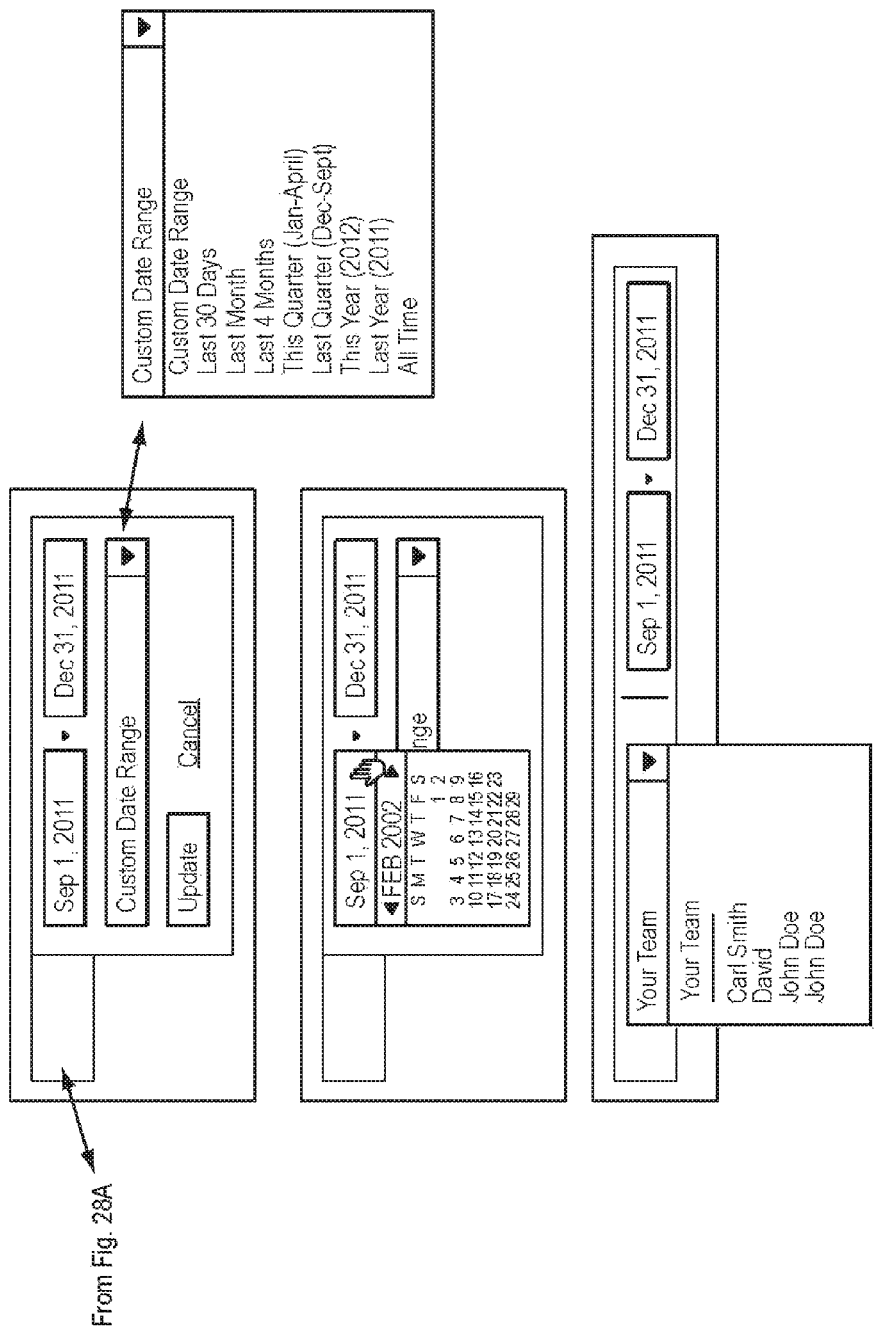

The Sales Reports Overview of FIG. 28A is reached by the user clicking on reports in the navigation bar and then clicking on a desired one of the reports, here Overview. The reports are created as standard reports in conventional fashion and are populated by the aggregate data entered by the individual salespersons within the sales region or sales organization. The modal of FIG. 28B shows selectable elements for customizing the report. As will be seen, the presentation of the sales data in aggregated form and through appropriate views and visualizations provides timely, virtually real time, information on what the sales organization is doing and accomplishing. In FIG. 28A, there is a graph of sales versus time which may be viewed as "your team" for a selectively definable time frame as shown by the boxes in the upper right of the screen and the modal for selecting date ranges that pops up when clicking on a date box in the screen. Clicking on "Your Team" brings up a modal identifying the individual participants of the team whose individual contributions to sales for defined time periods may be viewed in similar graphical form.

Below the graphical report form in FIG. 28A, there is a single line showing deals won in dollar terms, the largest individual deal in dollars, the number of deals and the number of products with averages also stated. Below this line is a tabular listing of the Sales by individual deal name and the dollar amount, the people involved from the team and the products sold by type and dollar amounts. This central window is scrollable to progressively bring up all of the information in the listing.

The lowermost block on FIG. 28A provides in summary form expenses in total, average per deal and highest individual expense. The block to the right provides the aggregated information on Deal Conversions, that is, the average time from initiating a lead to consummating a sale, as well as the longest and shortest times for converting a deal. All of the information in these various reports is simply filtered and organized data aggregated from the individual inputs of the individual salespersons. In many, if not most, organizations there is no capability to generate such reports in a timely manner because the individual salespersons do not capture and record information in a structured, organized and timely fashion. The present invention not only provides mobile tools to aid the salesperson in their day to day work, but as well gathers the information in a way to provides management with highly organized and useful information.

Figure 29:
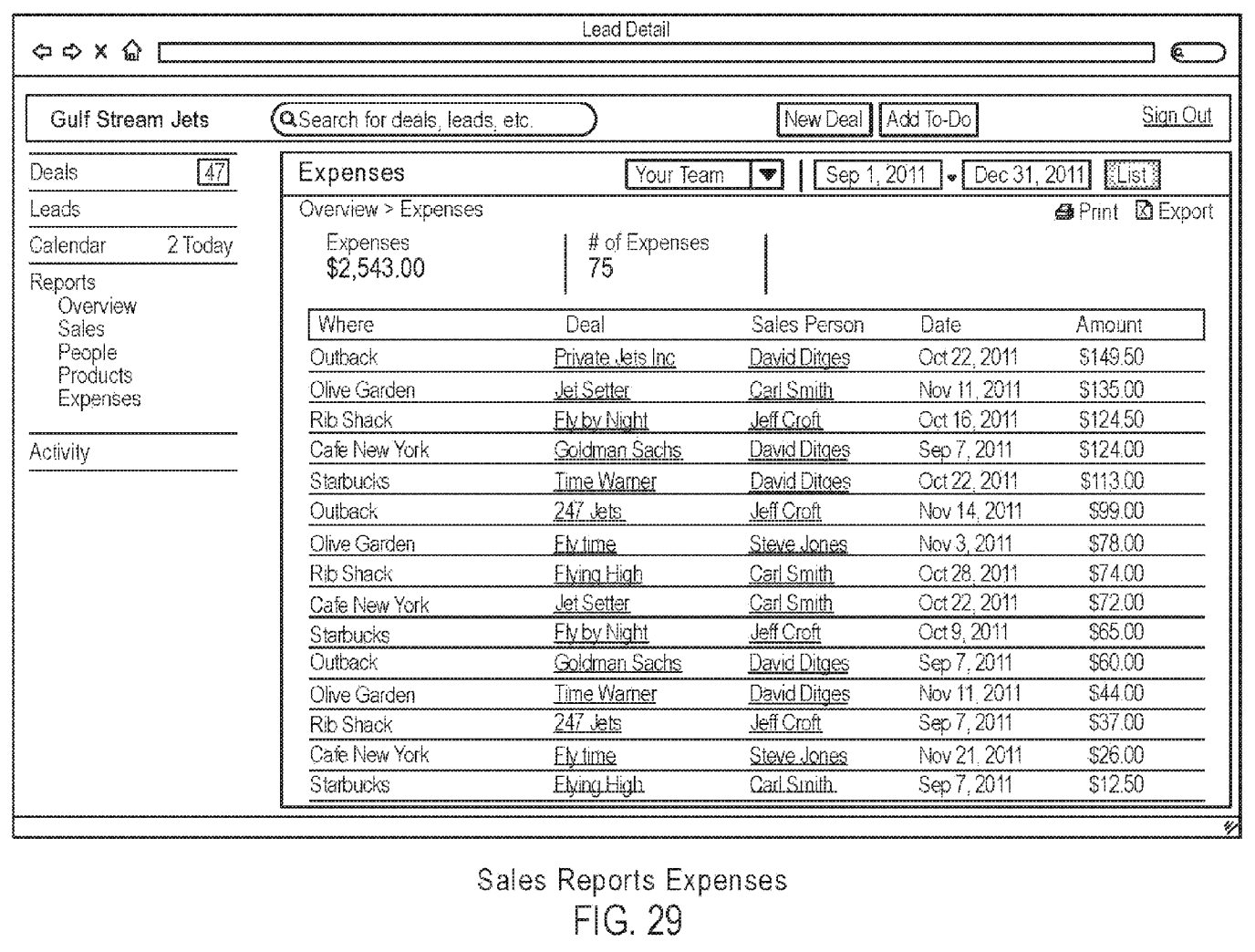
Figure 30:
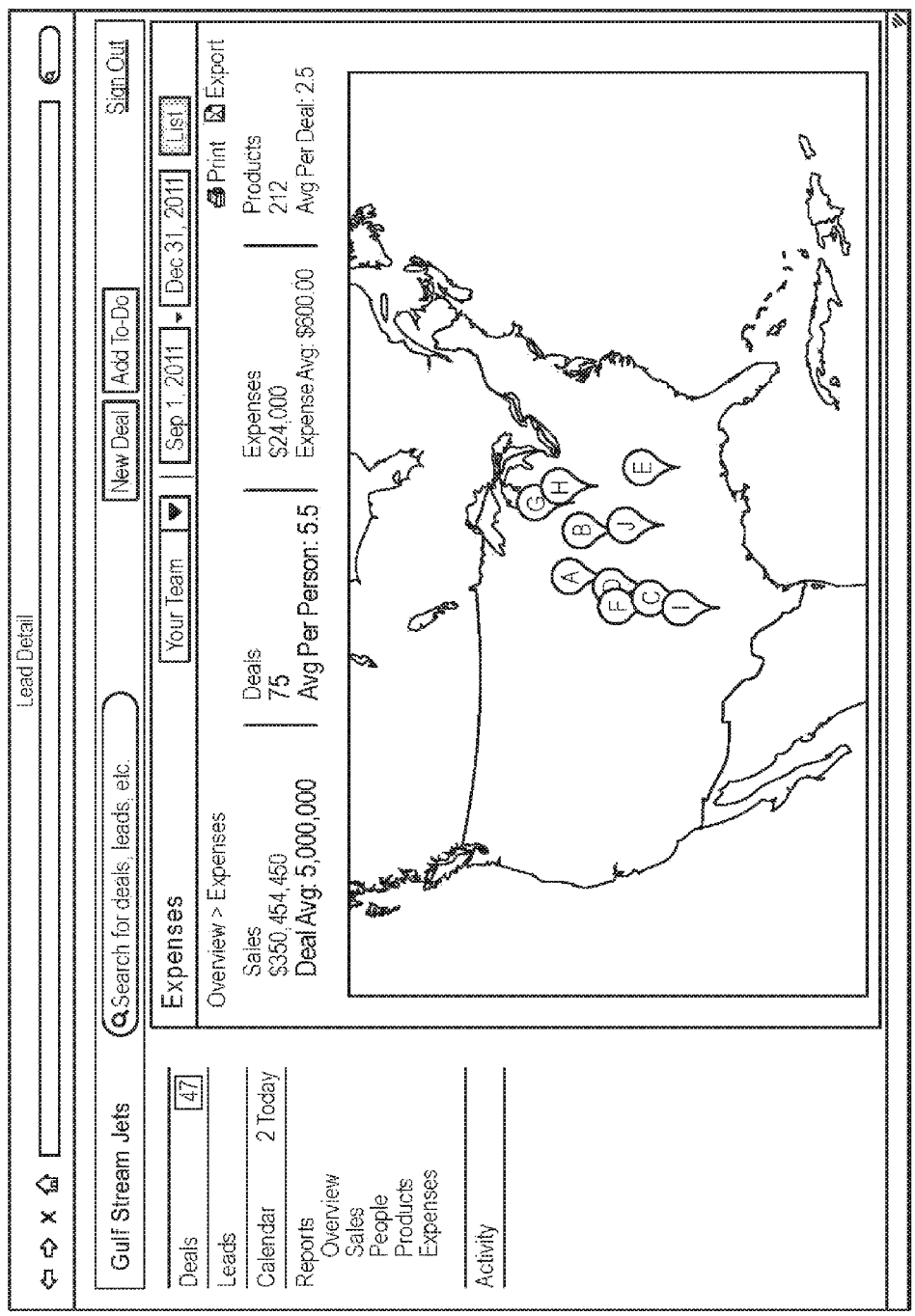
FIG. 30 is an exemplary wireframe diagram depicted on a tablet computer of a sales reports expenses map page for the third invention embodiment.

FIG. 29 is an aggregated sales report for expenses incurred in pursuit of deals reached by tapping on Expenses under Reports in the navigation bar. Similar to the format of earlier reports, FIG. 28 present a summary of expense information at the top of the page followed by an itemized listing of individual expenses in the body of the screen, specifically where the expense was incurred, the deal for which the expense was incurred, the salespersons involved, the date of the expense, the amount and any attachments supporting the expense, such as photos of receipts geotagged to location. This information, like that in other reports, may be selectively presented for the sales organization as a whole, individual members of the sales team, regions or the like and by selectable date ranges. FIG. 30 is a map view of expenses by the location where they were incurred. If the individual salespersons enter the locations where the expenses were incurred or provide a geotagged receipt, the map view is easily generated via Google maps or similar map application. Again rolling a cursor or finger over an individual expense on the map brings up brief information on the expense, while tapping on the selected expense in the map view takes the user to the detailed report on the individual expense as entered by the individual salesperson at the time the expense was incurred.

The FIG. 31 sales report on deals is reached by tapping on Sales under Reports in the navigation bar. Similar to the format of all reports, there is a summary block at the top of the page setting forth sales in dollars, in number of deals, total expenses incurred and the number of products in total; all of these totals have beneath them an average number for each category. The body of the reports lists the deals closed or won by deal name, salesperson involved, date won, deal value and in bar graph percentage format, the amount of money paid on the deal to date by the customer. This report, like the others earlier explained, is sortable by team, team member and date range.

FIG. 32 is a product report screen accessed by tapping or clicking on Products under Reports in the navigation bar. The upper block contains a pie chart of the products sales by type as well as a listing of the percentage of total sales represented by the individual product, and aggregate dollar amount of sales for each product category. The body of the report lists the products, the unit price, the number sold, the dollar total and the percentage of the sales amount paid to date. Again all of this information is sortable by team member and date range as shown at the top of the screen.

Figure 33:
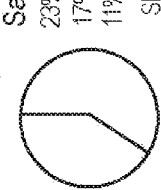
FIG. 33 is an exemplary wireframe diagram depicted on a tablet computer of a sales reports sales people page for the third invention embodiment.

FIG. 33 is a further sales report, this time by salesperson. This screen is selected by tapping on People under Reports in the navigation bar. The report contains a summary report in the block at the top of the page showing sales in dollars and percentage terms for the leading salespersons, with "show more" tappable to bring up sales by other salespersons. There is also a pie chart showing percentage of total sales in dollars by individual salespersons as well as a listing of largest deal, most deals, highest average deal and the highest conversion rate with the amounts and names of the winning salesperson in each category. Again, this information may be presented for individual team members and for various time periods. In the body of the chart, there is a complete listing of all sales by salesperson, deals won, products sold, deal average and total sales. Each of these columns is individually sortable to present the information in any priority chosen. Clicking on the name of each salesperson takes the user to the detailed information on that person and their sales activities.

FIG. 34 is a sales report for a specific salesperson that was reached by clicking on the name of that person in the FIG. 33 report. The format of this report is similar to that used in other reports with a summary of the information for this salesperson at the top of the screen, namely name and photo, sales made in dollars, sales pursuing in dollars, rank of this salesperson in performance in the sales organization (#1 of 32), the largest deal, the smallest deal, the percentage conversion rate and average expense per deal won. The body of the report has separately selectable tabs for deals won, deals lost, current deals, expenses and products, each of which is selectively viewable. In effect, these tabs filter the salespersons data by the stated criteria. Viewable in each tab is a listing of all deals for this salesperson by deal name, date won, expenses incurred for the deal, the products sold in quantity, the deal value in dollars and the percentage of the total sales dollars received to date. This report, again generated from aggregated data entered into the system by individual salespeople in the ordinary day to day performance of their sales duties is the basis for the reports, which are highly beneficial to not only the head of the sales organization but to other senior managers as well. Importantly, there is an assurance that, no matter when the data is viewed, the manager is looking at up to the minute data, not data generated in different forms by different people well after the end of each reporting period.

Figure 35:
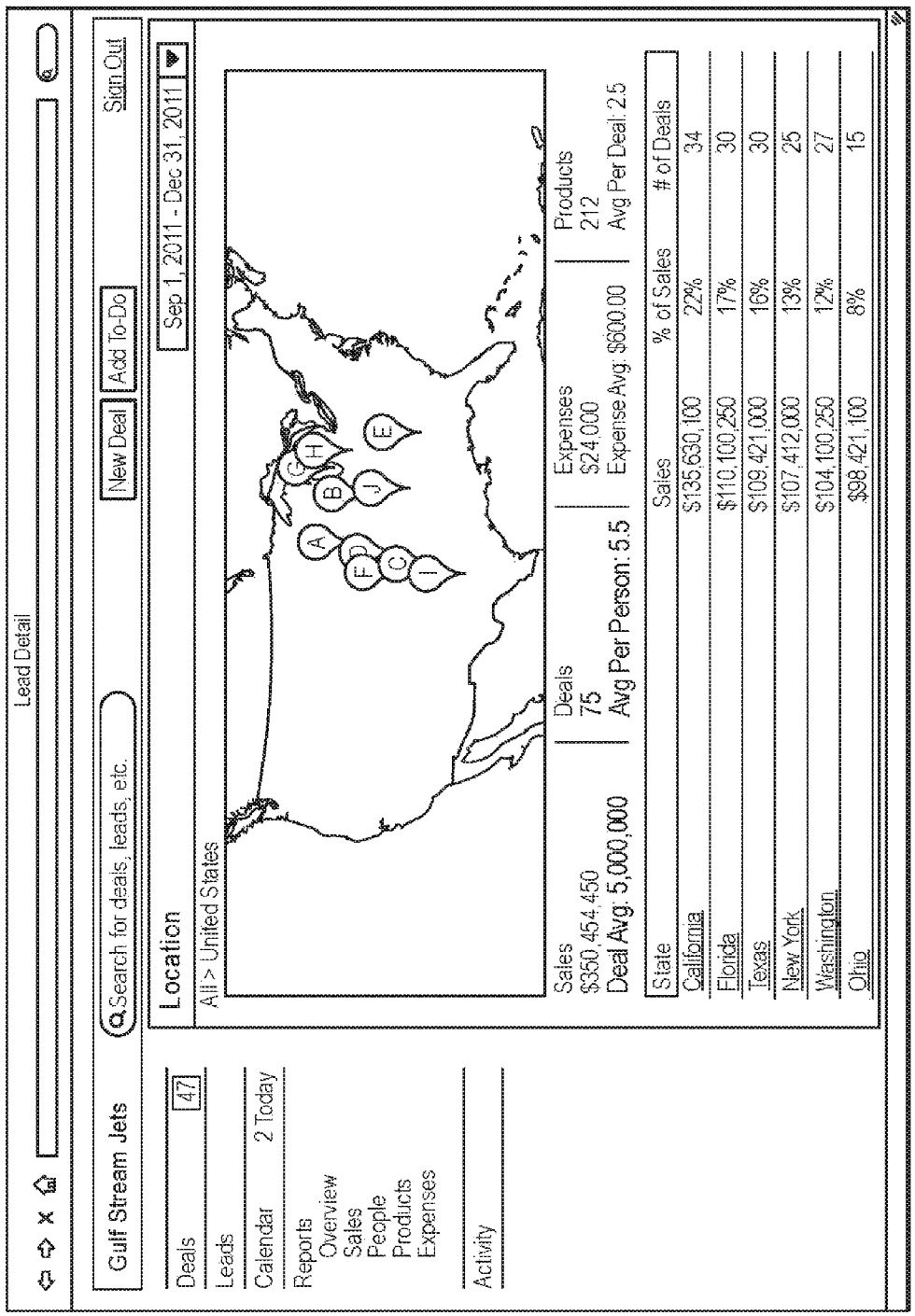
FIG. 35 is an exemplary wireframe diagram depicted on a tablet computer of a sales reports location view 1 page for the third invention embodiment.

FIG. 35 is a sales report by location which may display sales by state as shown, by salesperson location or customer location, as all such information is input into the system by the salesperson in ordinary course. Again, the map has pins at the locations of sales which the viewer may roll over with a cursor or finger to get a preview of the sales information associated with that location or click on the pin to view the detailed information related to that location. Below the map, there is again a summary, here providing the sales in dollars, the number of deals, the expenses per deal and the total number of products sold. In the body of the report is a listing by state, sales for that state, percent of total sales represented by the particular state and the number of deals in that state. The map and the listing are presently by date range via the date range selection box at the top right of the screen.

Figure 36:
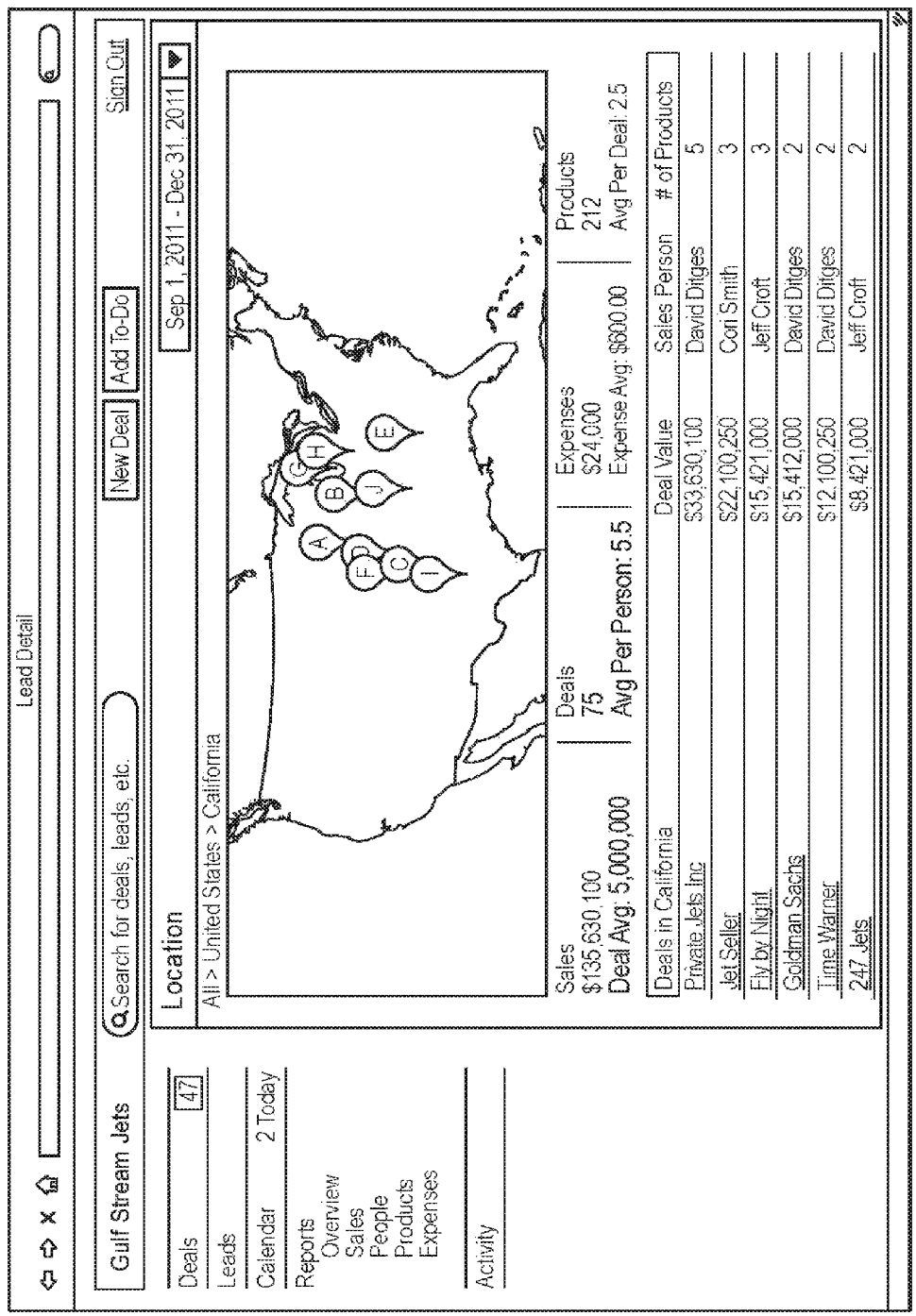
FIG. 36 is an exemplary wireframe diagram depicted on a tablet computer of a sales reports location view 2 page for the third invention embodiment.

FIG. 36 is another sales report by location identical in form to that of FIG. 35 except the FIG. 36 map is intended to depict sales by region, intended as California (although not depicted as such) as indicated by the word "California" at the above left of the map whereas FIG. 35 mapped sales for the entire United States. While each of the individual reports are conventional in format and generated by technology well-known to the art, the reports can not be generated without the individual salespersons having been required to adhere to the use of this third invention embodiment. This invention embodiment, as previously stated, simplifies the work of the salesperson by providing an easy to use environment in which all tasks necessary are performable and performed in the structured environment of the invention, which also makes it possible for managers to access an overview of sales activity as well as drill down as necessary all the way to the detailed activity of a salespersons individual communications to a prospective client, all detail with respect to any expense and so on.

Salespersons operating in such an environment can be assured that their hard work and success will be prominently visible to management, while anyone slacking off will be readily exposed. Thus, credit and recognition are inherent features of the invention as is accountability including a trail of accountability necessarily built by the individual salespersons themselves in the proper performance of their assigned duties. The high visibility to management in real time of the sales organization performance as well as individual regions and individual salespersons creates an environment of ambient accountability, meaning each salesperson and sales manager is subtly prompted to do the right thing and perform at the highest levels because of their knowledge that all of their activity is recorded and easily accessible. Likewise, motivated salespersons will be further incentivized by knowing that their accomplishments are easily visible within the system such that they can reasonably expect to receive credit and recognition for their good work.

Reference is now made to FIGS. 42-74 which depict an exemplary fourth embodiment of the invention, specifically an embodiment having particular utility in the management of pilot, plane, trip and associated expense activity (as well as invoicing, where needed), for general aviation and other aircraft operations. The invention is of great utility across the full spectrum of general aviation operations, including, for example, owners/pilots flying only one small aircraft for personal enjoyment, pilots flying aircraft owned and/or operated by flying clubs or flight instruction businesses, small businesses with only one aircraft and one pilot, large businesses with aircraft fleets and many pilots, aircraft manufacturers with various demonstration aircraft and demonstration pilots, and aircraft charter operations that provide aircraft for hire and bill clients for flight operations. The invention allows all such persons and businesses to, among other things, timely and easily record and track aircraft operations and expenses and as well as the ability, where needed, to invoice for expenses and operations from multiple companies and even to enter such income and expense information into general ledgers of the respective companies.

This fourth embodiment, like the third embodiment earlier described, has two types of tracked objects. In the aviation example, aircraft and aircraft trips are the tracked objects; content associated with the tracked objects is input by aviation professionals on the go and may be made available in varying degrees to other permissioned persons including office administrators. Certain additional inputs, in sophisticated operations, may be made only by administrators and managers and certain screens and functionality may be accessible only to such persons as will presently be explained. This aviation vertical as well as the sales vertical illustrate how the invention may be adapted, with relative ease, to many different environments where expense and activity tracking, and perhaps invoicing, are required, such as in real estate apartment rentals, boat charter operations and home building contractors and subcontractors, to name just a few of the many business and personal activities where the invention is of great utility.

The invention is uniquely designed and implemented in a way such that mobile smart phones provide displays sufficient in viewing area for all needed inputs by the aviation professionals and for their review and reference to previously input information and communications from others. Such small mobile devices are particularly handy for aviation professionals as almost all such persons have these mobile devices for other purposes, such as text messaging, email and phone use. In other words, use of the present invention does not require the purchase of new or specialized devices. All needed inputs to the system are able to be made (and intended to be made) in real or near real time from the small mobile smart phone screens shown in FIGS. 66-74, but the required information also may be input on the go from a small tablet computer, if preferred. In other words, the screens as seen in FIGS. 66-74 are presentable in larger format on a tablet or other computer display as shown in certain of the FIGS. 42-65.

Certain information and a few of the screens among those of FIGS. 42-65 are only useful in more sophisticated operations and may be absent from embodiments made available to less sophisticated or less complex operations. These specialized screens serve to provide information for management and to enable performance of operations as required for business and tax accounting. These specialized screens are made accessible only to authorized managers and qualified administrators, such as bookkeepers and accounting professionals. If the aviation professionals are entering trip and expense information in a timely manner, managers and administrators receive in real time all of the information inputs needed to perform their duties. In larger or more complex operations, it may be desirable to establish account settings that do not allow the aviation professional to change information that has been completed and submitted in the system, although it is always desirable to allow such users to make any changes desired in drafts before completion and submission. The invention provides a management or permissioning system that enables settings to be selectively set for different persons to have different abilities to see, access, change and input information into the system.

Attention is directed now to FIGS. 66-74, the mobile phone version of the fourth embodiment intended for use by aviation professionals on the go. FIG. 66A is the Dashboard screen which, as with prior embodiments, is the information triage center for the user, and may have certain qualities of the River page described in connection with the first invention embodiment. The dashboard screen is reached by tapping on Dashboard in the navigation bar at the bottom of this screen; the navigation bar is visible on all screens to allow immediate navigation from any one page to any other desired page in the navigation bar. The navigation bar includes four destinations as shown: dashboard, expenses, trips and account settings.

Figure 66A:
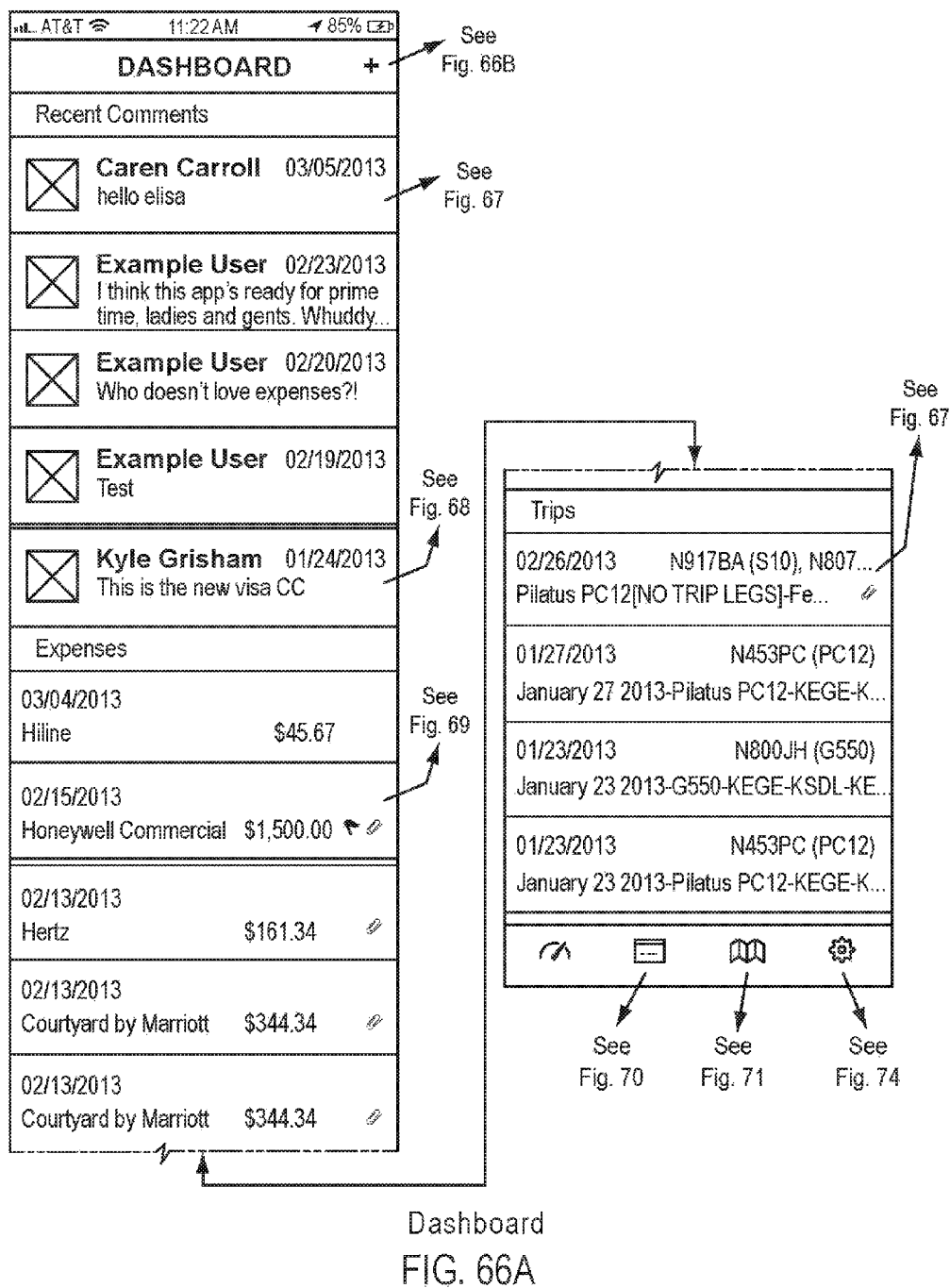
FIG. 66A is a mobile phone version of the dashboard screen of the fourth invention embodiment.

The Dashboard page of FIG. 66A includes three separate and independently scrollable sections, namely, Recent Comments, Expenses and Trips. For convenience of illustration, the three sections are shown in an extended view format in FIG. 66A, although it will be understood that on the small screen smartphone display, the user scrolls through the respective sections to bring them up for viewing. The comments viewable on the user's screen may originate with the user and other permissioned members of the app, such as managers, bookkeepers, aviation mechanics, fellow pilots and so on. The comments once read by the user may be "swiped" off the screen in the manner described in connection with the River of the first embodiment. Comments swiped off the user's mobile screen are not discarded; rather they are kept in association with the expense, aircraft or trip activity with respect to which the comments were made, much like communications swiped from the River are retained in the associated Streams in the first embodiment. In this regard, if desired, the first invention embodiment may be embedded in this fourth embodiment in the same manner as depicted in connection with the earlier described second or project embodiment of the invention thereby to add even greater functionality to the system.

The scrollable Expenses section in FIG. 66A includes expense charges that are in draft form, recent expenses, and expenses that have been flagged by an administrator or the user for further reference. The user may likewise swipe these expenses off the dashboard screen, if the account settings of the organization allow such action, but those expenses "swiped off" the dashboard Expenses section are always accessible from the Expenses page to be discussed. In short, the swiping action, if allowed from this screen, only removes the swiped expense from the user's dashboard thereby to keep only immediately actionable items in front of the user. Alternatively, the account settings may be established such that draft and flagged expenses cannot be removed from the dashboard expenses section until completed in the manner contemplated by the system. In any event, sensible use of the system would commend to the user that items not be removed from the dashboard until they are no longer actionable items.

The scrollable Trips section of the Dashboard in FIG. 66A includes a summary identification of in progress and recently completed aircraft trips by date, aircraft type and tail number identifier, and at least initial trip legs and such other information as may be desirable to include within the summary, such as shown in this figure. In aviation operations, expenses may trail flight operations by days or weeks, such that the trip may be completed but the related expenses may not be complete, which is one reason to keep recently completed trips on the dashboard. The user is always able to access an inprogress trip from this screen and a predetermined number of recent trips, to the extent that the user does not swipe them off the dashboard view. Again, swiping trips off the dashboard screen simply removes them from this information triage page, but does not delete them from the system. Thus, as in the other embodiments earlier described, the dashboard page provides the user with a single convenient place to view all matters of immediate interest and/or requiring near term attention as well as a place from which all necessary actions may be initiated. Like an inbox, it is often most convenient to remove items from the dashboard, once the required action is taken or if for some reason it is necessary to defer action.

Figure 66B:
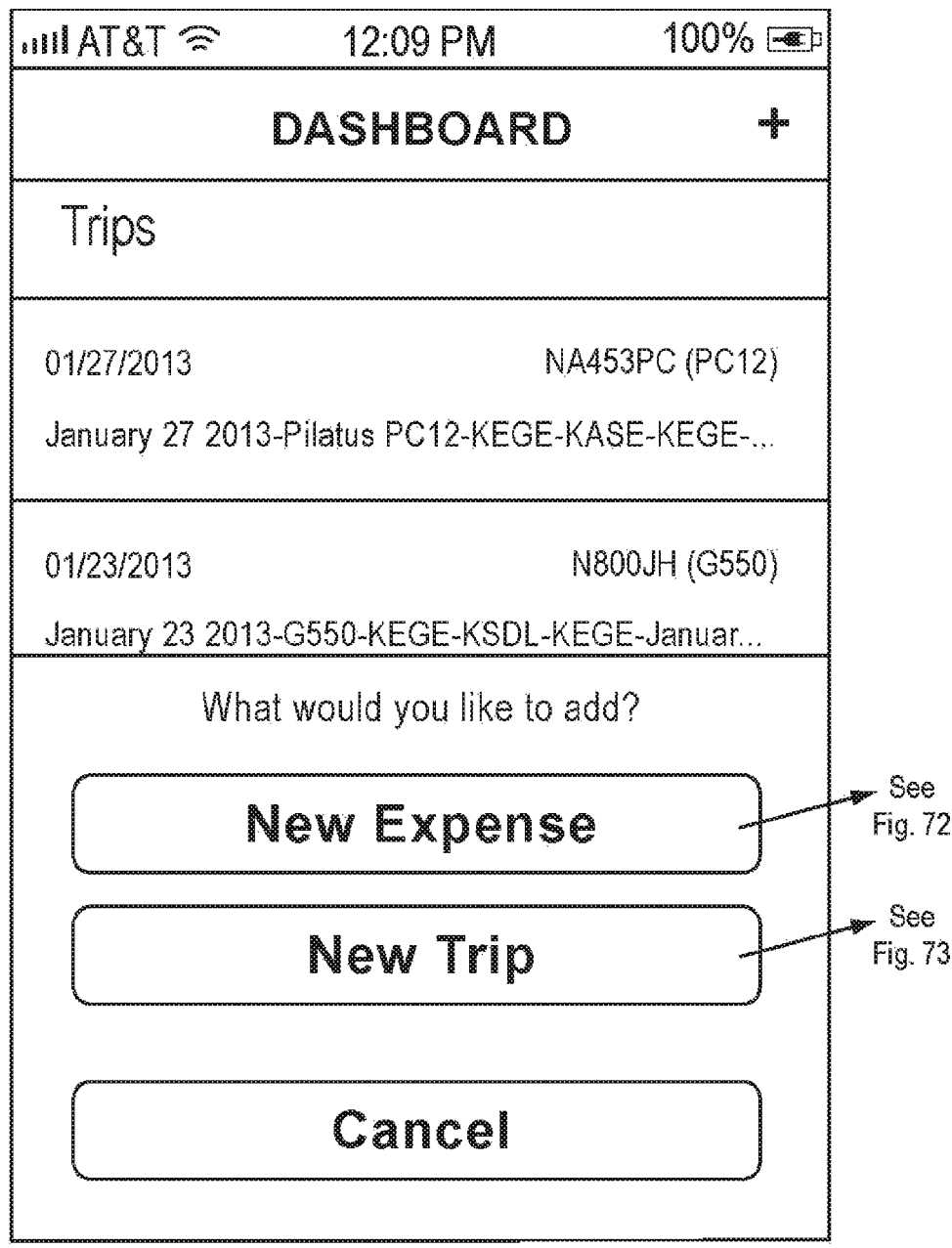
FIG. 66B is a new trip or new expense window accessible from the dashboard screen of FIG. 66A.

The user may initiate a new trip or new expense directly from the dashboard by tapping on the + symbol at the top right of the dashboard screen, which takes the user to the screen of FIG. 66B, as denoted by the arrow between the + symbol and FIG. 66B. As shown in FIG. 66B tapping either on the new expense or new trip box takes the user to the screens of FIG. 72 or 73, presently to be described, where the new expense or new trip may be created.

Figure 67:
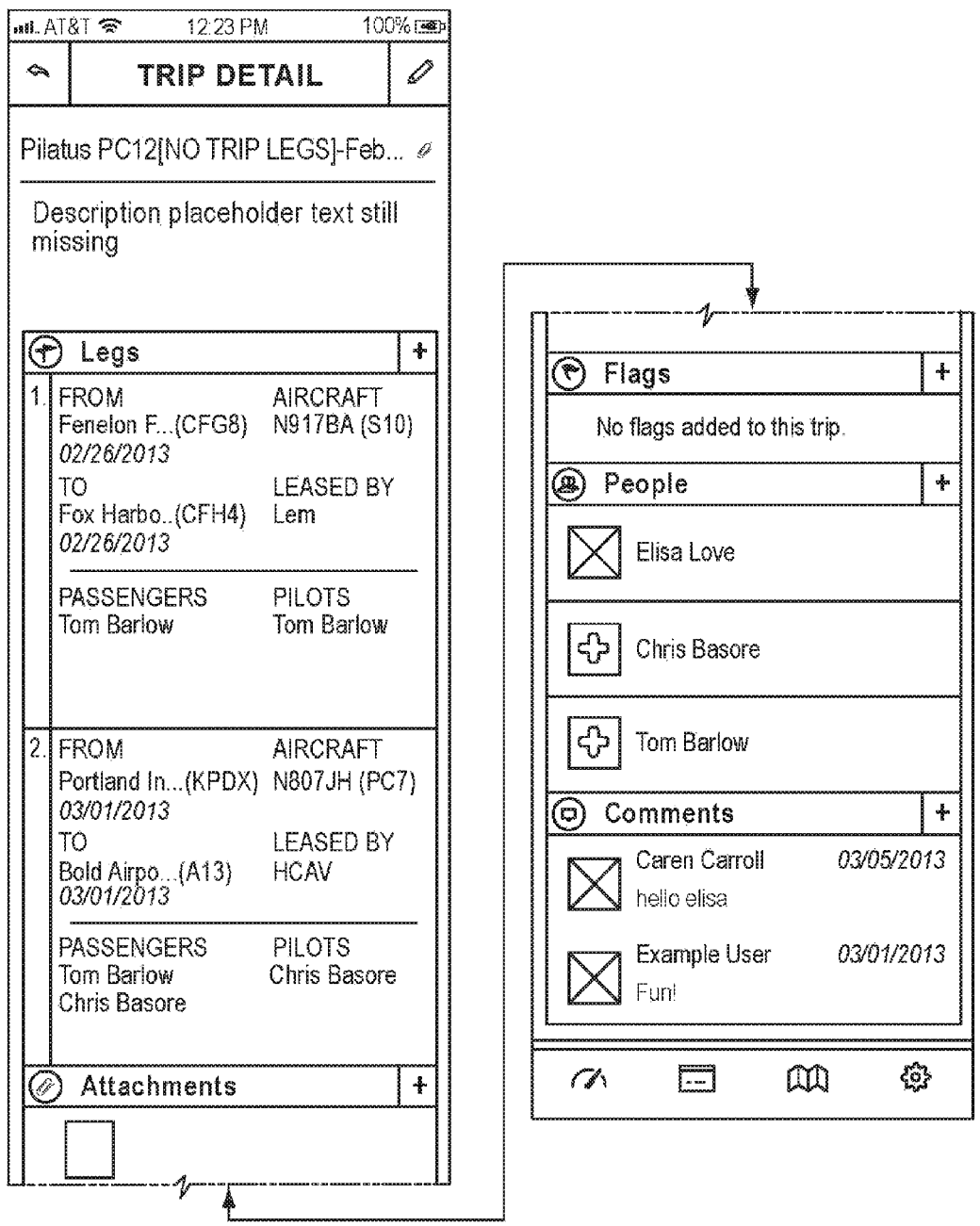
FIG. 67 is a mobile phone version of a trip detail screen for the fourth invention embodiment.
Figure 68:
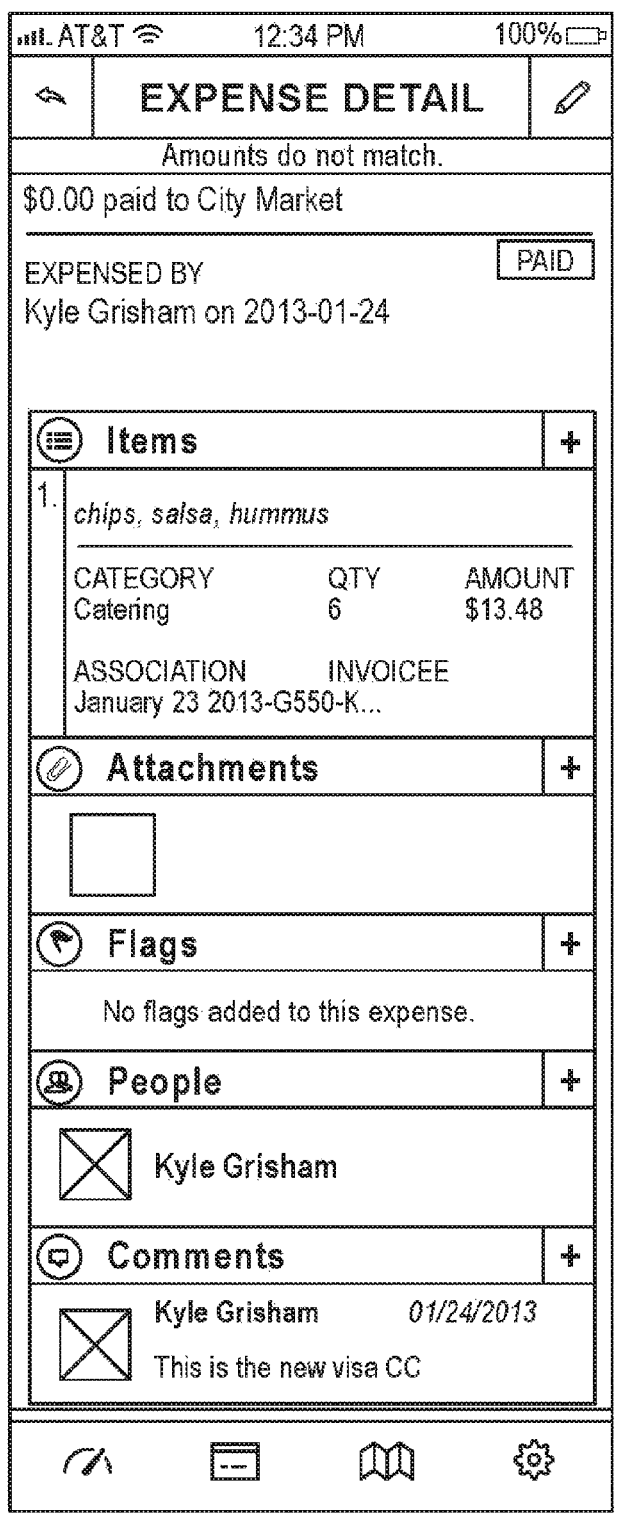
FIG. 68 is a mobile phone version of an expense detail screen for an expense associated with an aircraft trip for the fourth invention embodiment.

Tapping on a particular trip in the dashboard screen, here the first of the listed trips, takes the user to the screen of FIG. 67 where the full detail of the trip is set forth and where the user may take further actions with regard to the trip. As shown in the extended screen view of FIG. 67 used for convenience of explanation, the trip detail shown for the selected trip is fully viewable via scrolling of the screen view. This screen contains five sections, namely, Trip Legs, Attachments, Flags, People and Comments. Adjacent each of these headers there is a + symbol which, if tapped, allows the user to create a new item for the selected section; the + symbol is used throughout as the icon or identifier for creation of a new item. This same screen also happens to be reached when the user taps on the first comment in FIG. 66C since that comment was made in the FIG. 67 trip as seen in the comments section at the bottom of the screen. By tapping on the + symbol adjacent the Comments header in FIG. 67, the user may send a responsive or other comment. The user returns to the prior screen, here the dashboard screen, by tapping on the return curl at the upper left of the FIG. 67 screen. This familiar convention is maintained throughout the application to enable easy return to a prior screen.

The Legs section in FIG. 67 shows for each flight or leg where the plane departed from and where it landed, the aircraft involved, who is operating the aircraft, e.g., leased, and the pilots. For a trip in progress, a pilot will add legs as they are flown to build a complete trip, either a round trip from and to a home base or a trip from one place to one or more other places that are considered the trip end without a round trip being completed. Attachments may be of any relevant kind and in any form, such as photos, videos, voice messages and documents. Flags may be created to remind the user to take some action; flags also may be created by administrators, if any, to remind the pilot to take some action or to respond to a question. The People section identifies those persons having some responsibility with respect to the particular trip, such as the pilots flying the trip, an aircraft mechanic and the administrator. Comments are accessible to all persons involved with a trip. The user may add a new comment in the Comments section for any of a variety of reasons, perhaps to notify the administrators, passengers, people meeting the flight, a car rental service, etc. of some fact, like an anticipated flight delay.

Tapping on the last comment in the FIG. 66C dashboard page takes the user to a page of a different type from the page reached by tapping on the first comment. Specifically, as discussed, tapping on the first comment takes the user to a trip with respect to which the comment was made. Tapping on the last comment takes the user to the screen of FIG. 68, which is a specific expense item. This expense has been associated in this case with a specific trip (expense associations also may be made with aircraft independently of trips), since the comment was made on this specific expense. As shown, the page for a specific expense includes sections to be completed to identify expense items, attachments, flags, people and comments, with new items for each section being created simply by tapping on the + symbol adjacent a particular header. It is usual practice to require the user to take a photo of the receipt at the time and place any expense is incurred so receipts should accompany virtually all expenses, certainly those above a predetermined minimal amount. Photos or other documentation further supporting an expense may be made, for example, a photo of a cut nose wheel tire accompanying a receipt to visually show why the new tire was required. Since photos are geotagged by all modern smart phones, it is a simple matter with the information generated by the invention to create a map showing where expenses were incurred. Map views of expenses, using known technology, are supported by the invention. Tapping on map pins for expenses brings up in well-known fashion a preview or summary view of the expense, while tapping on the pin takes the user to the specific expense. Also, from an administrative standpoint, if expenses are listed as having taken place at a location inconsistent with the geotagged location of the receipt, there is reason to question the legitimacy of the expense. Expenses may also presented in map view by the persons that incurred the expense.

Figure 69:
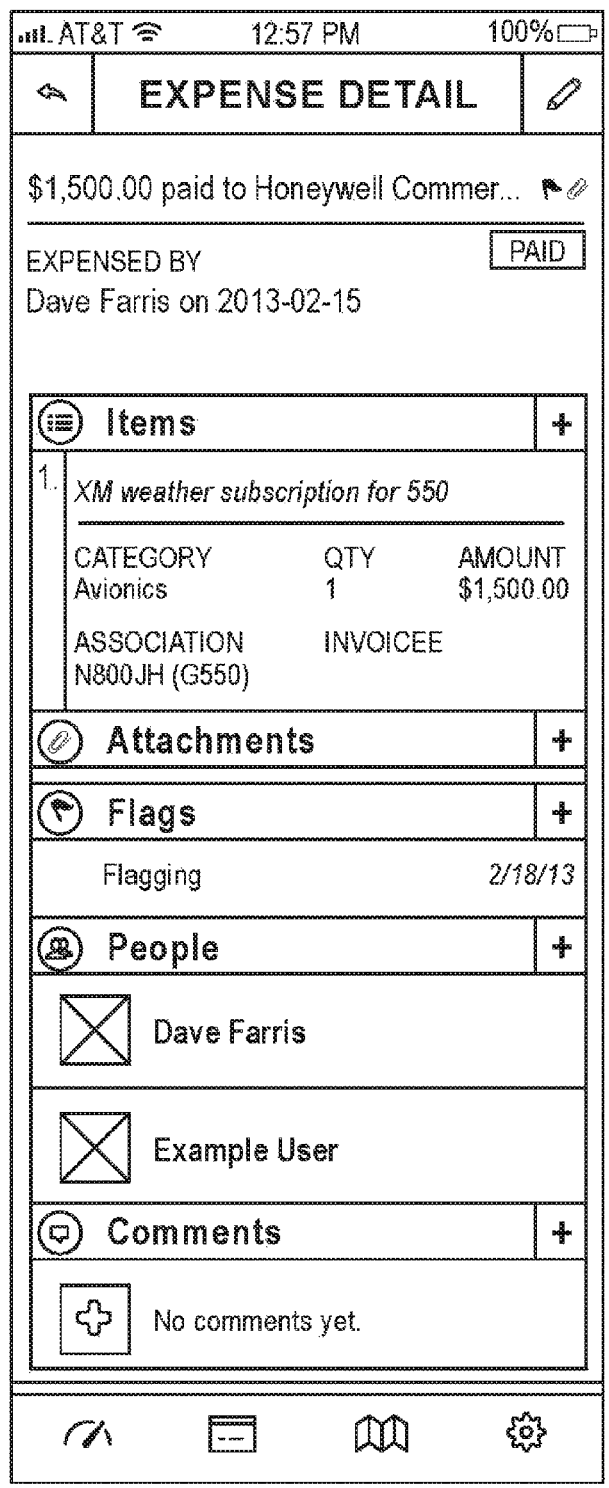
FIG. 69 is a mobile phone version of an expense detail screen for an expense associated with an aircraft for the fourth invention embodiment.

Tapping on any individual expense in FIG. 66C, for example, the "Honeywell Commercial" expense, takes the user to the record for that expense, here the screen of FIG. 69. As with all expenses, the person making the expenditure is the one responsible for documenting the expense details in a standard format as shown thereby to assure that each entry contains all information required and is searchable. This form includes the items expensed with description, the predetermined expense category, here Avionics, the quantity, the dollar amount, the association with a particular aircraft if there is more than one in the operation and an invoicee, if the expense is to be charged to another entity.

Use of expense categories that are standardized and selectable from a drop down menu assures that expenses are categorized in a disciplined manner consistent with best practices; how categories are created will presently be explained. The expense (or at least any expense above a minimum amount) may be required to be supported by a receipt. Such receipt is input into the system by tapping on the + symbol in a new expense form to bring up the phone camera for taking a picture of the receipt and of any additional pertinent documentation. Attachments may be in photo, video, audio or electronic document form. The person(s) making the expenditure must be identified, and there is a section for comments on the individual expense. This structure keeps all matters pertinent to an expense in one place. The mobile platform of the invention allows such expenses to be entered at the time the purchase is made. In short, there is no excuse for the aviation professional not to enter expenses and other required information, like receipts, in near real time, which is the most efficient practice, following which that person's duties are done with respect to that expense. This eliminates the need for the pilot to retain physical receipts and fill out travel forms, a convenience for the pilot and for administrators who receive expense information promptly. No longer is an administrator required to take travel reports from a pilot and input them into the electronic record keeping system.

Figure 70A:
FIG. 70A is a mobile phone version of an expenses list screen for the fourth invention embodiment.

Draft and completed expense items may also be reached directly from the dashboard of FIG. 66C by tapping on the Expenses block at the bottom of the screen, which takes the user to the screen of FIG. 70A. Draft expenses on this screen are shown in red type font or otherwise in a manner to visually emphasize that they are not complete; the system does not allow submission of incomplete expenses, that is, expense forms where information is absent from required fields. Such expenses are not removed from the expense page of FIG. 70A until all required expense fields are completed and, if desired, may be retained as well on the dashboard page. The expense listing access in FIG. 70A may provide access to all expenses, even if in the hundreds or thousands, incurred by the user simply by continued scrolling which prompts download of further expense batches from cloud storage, using technology well-known to the art. Draft and completed expenses are separately grouped in chronological order with draft expenses being at the top of the stack. Draft expenses once completed, submitted and accepted by the system as having all required fields filled in, change to black font in the expense and dashboard pages. Depending on the settings selected by the system administrator, the expense may or may not be automatically removed from the dashboard screen. There is no need for a post trip travel report since the report is built on the fly during the course of the trip by the user in a standardized format that is only accepted by the system when filled out in the required manner, which may be tailored to be different for different persons or organizations.

Best practices commend that purchases be made by credit card or the like. Credit card transactions are morphing to credit transactions done via a mobile phone such as through near field communications and other technologies. Many banks, credit card companies and other organizations are working on various alternatives for the execution of financial transactions through electronic means thereby to eliminate the need for the familiar plastic credit card. The invention is suited to easily integrate with any of these new technologies for executing purchase transactions. For example, credit card companies and banks are already providing near real time downloads of credit transactions to their customers. The expense forms in the present invention may partially and automatically be filled out with the charge amount, location and description (like seen in the conventional monthly credit card statements). All that remains for the user is to fill in the remaining required fields, a plenary description of the expense and where appropriate why it was made and its association with an aircraft and trip and a photo of a receipt. Thus, using such electronic credit or debit payment systems, the user is assured that drafts of all expenses using such a system will automatically appear on his mobile device. The user need only create draft expense forms when cash is used instead of an electronic payment system. If a user has multiple credit, debit or bank cards, services such as Yodlee aggregate the information from all such independent sources and electronically transmit them in predefined fields to the electronic device or computer of the account holder. Thus, draft expenses may be created automatically in accordance with the invention even if the user has multiple payment "cards."

Figure 70B:
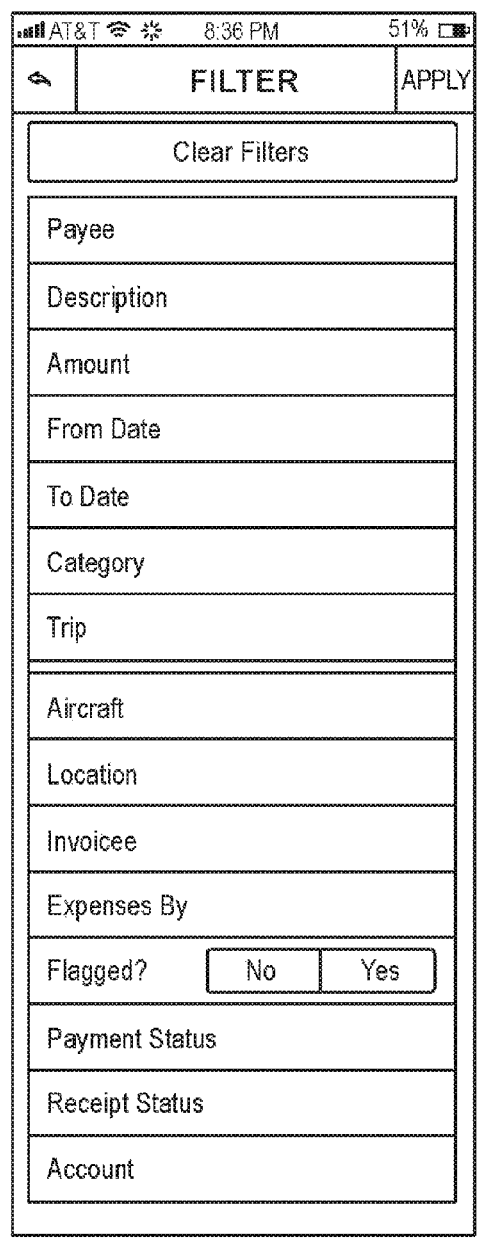
FIG. 70B is an expenses search filter screen for the fourth invention embodiment.

Because of the required discipline for expense entry, expenses may be easily and accurately searched by tapping on the symbol at the upper left of the FIG. 70A screen which opens the screen of FIG. 70B. This screen is a filter that allows the user to search expenses by any one or more of the criteria listed in the filter form. To make a search, the user taps on the desired blocks and enters the information to be searched. Thus, for example, searching by an aircraft tail number or a location brings up all expenses associated with the specific aircraft or the specific location, and if both are selected only expenses for the specified aircraft at the specified location. Filters are cleared by tapping on the "Clear Filters" block at the top of the screen. The user may also scroll through the expenses page to locate visually the expense of interest, and then tap on the expense, such as the Honeywell Commercial expense, which takes the user directly to the expense detail of FIG. 69 for that expense, as was earlier explained.

Figure 71A:
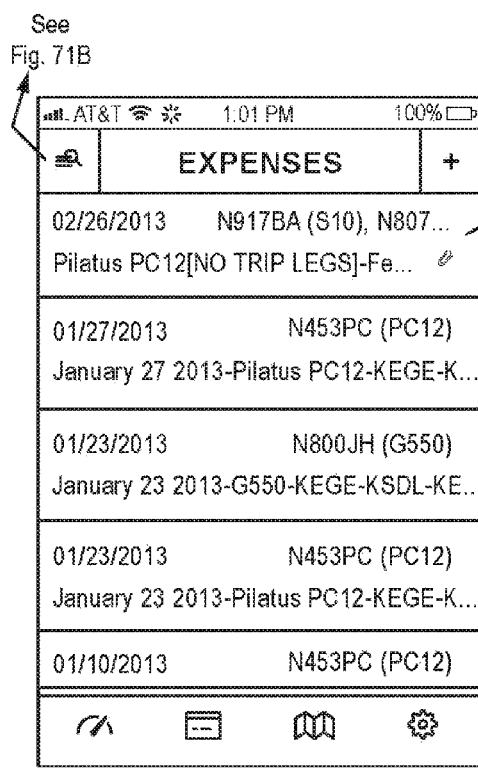
FIG. 71A is a mobile phone version of a trips list for the fourth invention embodiment.
Figure 71B:
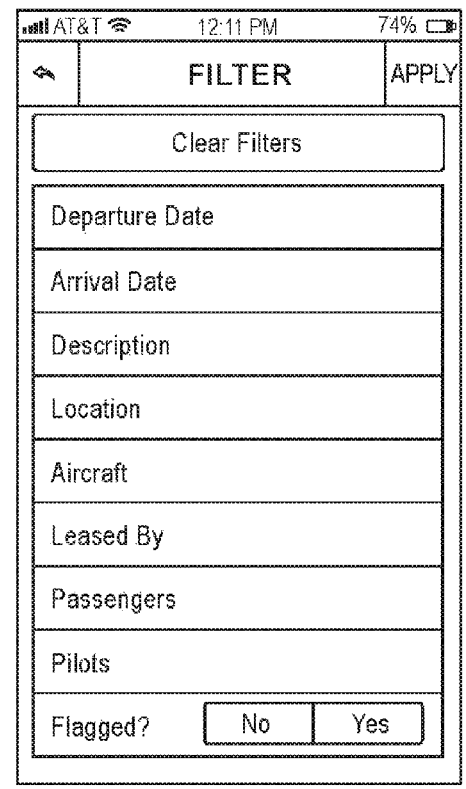
FIG. 71B is the trips search filter screen for the fourth invention embodiment.

Trips may be accessed from the dashboard not only by tapping on the a particular trip, as discussed in connection with FIGS. 66 and 67, but also by tapping on the trips icon in the navigation bar at the bottom of the dashboard which takes the user to the screen of FIG. 71A. FIG. 71A is a scrollable chronological listing of all trips in the system for the user; as is conventional practice, only the most recent trips may be stored locally on the mobile device, but additional trips are downloadable from the cloud in predetermined batches simply by continued scrolling beyond the end of the trips list. Similarly to expenses, trips are listed in chronological sequence, with trips not yet submitted separately listed at the top of the screen in red font or other distinguishing manner to alert the user to such fact. The user may search trips via scrolling of the screen or by tapping on the search icon at the upper left of the FIG. 71A screen which opens the FIG. 71B screen. As shown, the user may search trips via a number of depicted criteria in the same manner as a search is conducted for expenses. These criteria correspond to each of the required fields that the user was required to complete.

A new expense or a new trip may be created by tapping on the + symbol in the FIG. 66A dashboard view to open the FIG. 66B screen from which the user may select either new expense or new trip. Tapping on the New Expense block takes the user to the new expense screen of FIG. 72A. The new expense page contains fields for entry of relevant expense detail which may be easily modified to include fields beyond or different from those shown, if desired. Receipts are added to an expense by tapping on the + symbol adjacent "Receipts" which brings up the FIG. 72B screen from which the user may choose an item from the library on the device or in the cloud, or take a photo using the smartphone camera, all without leaving this application.

Figure 72C:
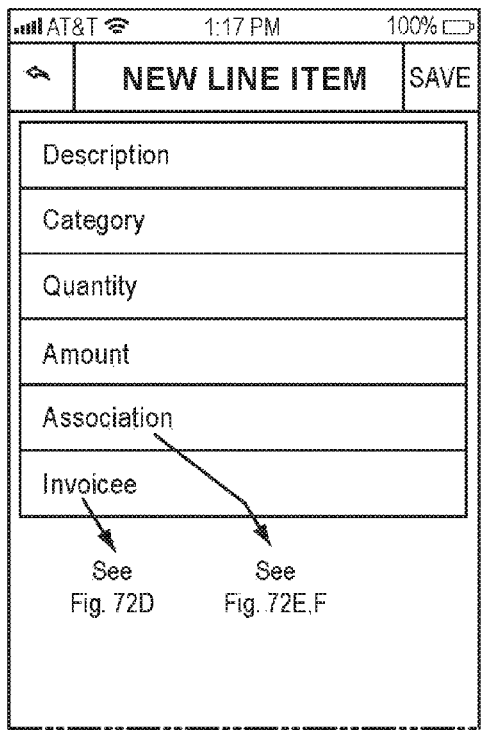
FIG. 72C is a new line item screen.

Line items for an expense, that is, the breakdown of an expense into its constituent items, like a hotel bill that also includes meal charges, are created by tapping on the + symbol adjacent the header "Items" in FIG. 72A which opens the screen of FIG. 72C. The user fills out the line item descriptions as shown in the figure and taps Save when complete. Additional line items for an expense are created by repeating the procedure the required number of times.

Figure 72D:
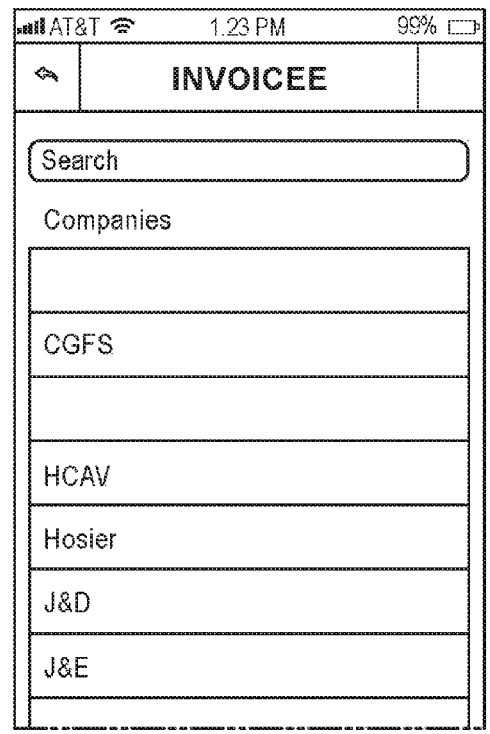
FIG. 72D is an invoicee selection screen, 72E is an association screen (aircraft trips)
Figure 72E:
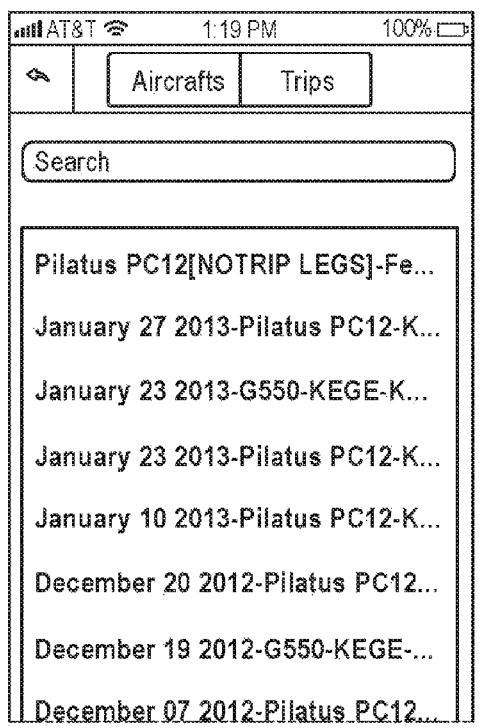
FIG. 72A is a mobile phone version of a new expense screen for the fourth invention embodiment.
FIG. 72B is a choose attachment screen.
FIG. 72F is another association screen (aircraft)
Figure 72F:
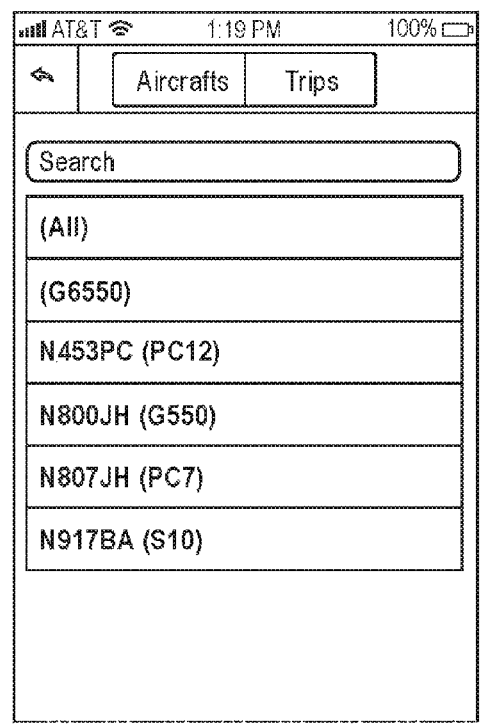

If a line item is to be billed to an invoicee, such as the client of a FAA Part 135 charter flight, tapping on the word in FIG. 72C takes the user to the screen of FIG. 72D where the specific invoicee may be chosen by tapping on it. Likewise the user may associate the line item or total expense with either an aircraft or a trip by tapping on "Association" to open the screen of FIG. 72E. Selecting Trips in the header brings up the existing and in progress trips in chronological order; the user makes the association by tapping on the appropriate trip. Tapping on "Aircraft" in FIG. 72E brings up the screen of FIG. 72F and vice versa; the user makes the association by tapping on the aircraft to which the charge is to be made from those listed in the drop down menu. In this regard, an expense may be associated with an aircraft instead of a trip because, for example, the expense incurred is independent of any specific trip, such as an avionics upgrade package or annual or special maintenance charges unrelated to a specific trip. Trip charges are intended as expenses incurred only by reason of a trip. How the drop down menus of FIGS. 72D and F are created will be explained in connection with later figures.

Figure 73A:
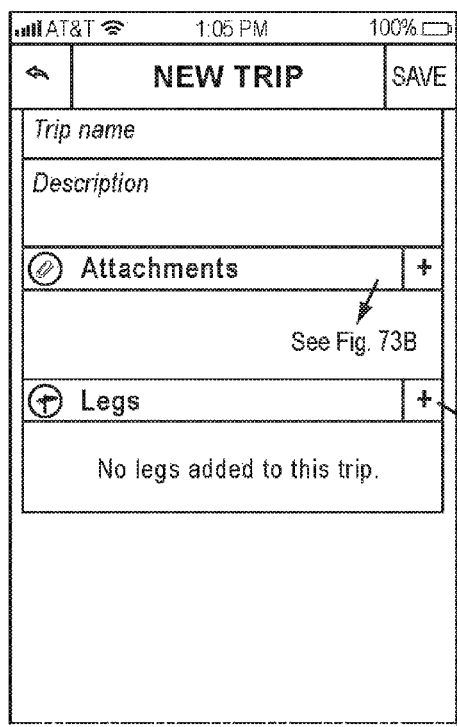
FIG. 73A is a mobile phone version of a new trip screen.
Figure 73B:
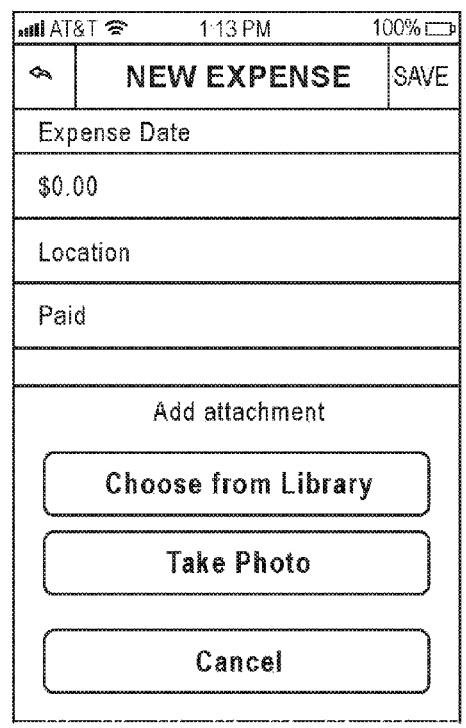
FIG. 73B is a new trip attachments selection screen and FIG. 73C is a new trips, new leg screen.

A new trip may be created directly from the dashboard of FIG. 66A by tapping on the + symbol and then tapping on the New Trip block of FIG. 66B which takes the user to the screen of FIG. 73A. The user assigns a trip name and trip description by filling in the required fields. Pertinent attachments can be added by tapping on the + symbol which brings up the selection screen FIG. 73B with the choice options earlier explained. Legs for a trip are individually created by tapping on the + symbol adjacent Legs in FIG. 72A to bring up the New Leg screen shown in FIG. 73C.

Figure 73C:
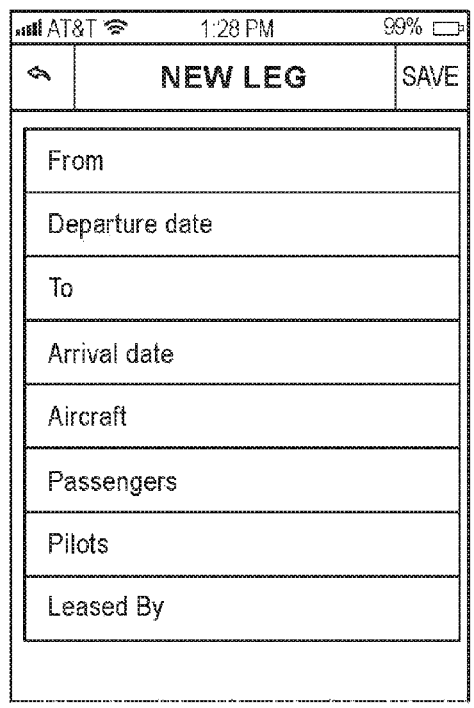

The new leg screen of FIG. 73C may and typically would include in addition to the fields shown, the flight time for a leg, the nautical flight miles flown and the fuel quantity used, plus any other desired trip information. Flight time may be associated both with the specific aircraft and with the pilots flying the trip. In this way, there is kept a log of all flight hours by pilot and plane flown (with the individual trips aggregating to support the totals) as well as an aircraft log of all hours on the specific plane and how they were accumulated on a trip by trip basis. This gives pertinent information, such as the number of takeoffs and landings for each plane, the average flight time and so on. All information in the separate fields of all of the blocks required to be filled out in the screens shown are separately searchable by dates and time frames such that keeping time on flight legs becomes a searchable item by aircraft so as to determine the total flight hours in a given time period and so on. Knowledge for average fuel use on a given leg can assist in flight planning and fuel loading for a future trip.

Figure 74A:
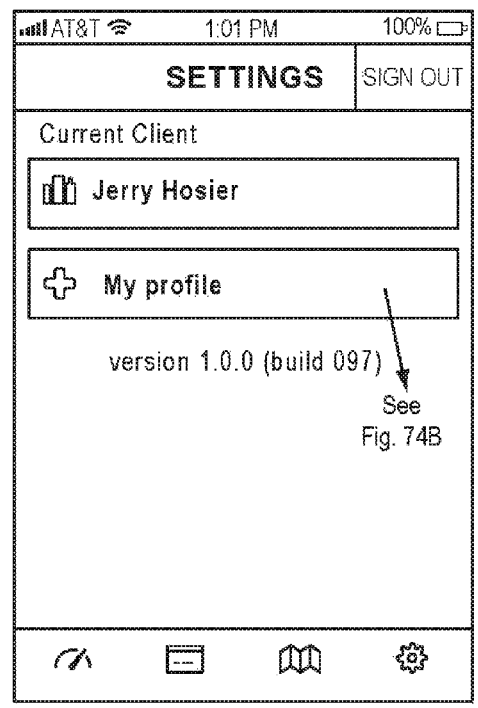
FIG. 74A is a mobile phone version of a settings screen for the fourth invention embodiment.

Tapping on Settings in the navigation bar shown in FIG. 66A takes the user to the account settings page for this account as shown in FIG. 74A. The settings for this account are very simple, but may be as complex and varied as the application demands, all while using technology familiar to those skilled in the art. The account holder is identified at the top of the screen, meaning the person or entity that owns the account. Tapping on the My Profile block, which is the profile for this individual user, takes the user to the screen of FIG. 74B where the user's profile, in this case simply a name and email address, is identified. Tapping on the pencil icon at the top left of this screen takes the user to the screen of FIG. 74C for editing of the profile. The profile as shown is very simple, but may include far more information, such as those discussed in connection with the first embodiment of the invention.

There may be any number of users, administrators and customers under the account of a single account owner. There also may be multiple classes of users, administrators and customers. For example, some users may be able to enter information into the system, but not change it, some users may only be able to view information and so on. Some administrators may be admins for one group of users, another admin may be responsible for a different group of users, and there may be admin layers. The system is flexible enough to handle a wide range of differing permissions and to include additional classifications beyond those shown.

Attention is now directed to FIGS. 42-65 which are shown on a tablet or other computer screen. As will be seen, many of these screens are in most respects, both in layout and functionality, simply larger versions of the mobile phone screens of FIGS. 66-74, and operate in the same way, but the screens here shown are provided with added functionality that typically is not made available to pilots in larger organizations and is not needed by smaller operations, such as the Invoice and Manage functions to be described. In such larger and more sophisticated operations, the large format screens made available to pilots and the other aviation professionals would be identical to the mobile screens with the added functionality only visible on and accessible from the screens of authorized administrators. In smaller operations, this added functionality may be masked from view because it is not needed or materially simplified to match the needs of the smaller organization or single pilot keeping track of his personal aircraft expenses for a small plane owned by him.

Referring to FIG. 42, there is shown a dashboard page that is basically the same as the smartphone dashboard of FIG. 66 except for some additional detail and the "Manage" and "Invoice" selections at the upper right of the page. The Manage selection in simplified form is made available to users in small operations, like a pilot flying his own plane(s), but in larger and more sophisticated operations, it is made available with full capability only to administrators. Invoicing is not needed by most smaller operations. Added detail, not essential to the mobile user on the go, may be included on the larger format screen for pilots.

Actions available from the dashboard of the large format FIG. 42 screen include the same actions as available on the FIG. 66 screen. While the user may handle on the go tasks from either a mobile smartphone or a tablet computer, the large screens are particularly useful for administrators and users that prefer to perform certain operations, like typing, on a large screen, such as to search or review trips, expenses, comments and the like. Other large format screens that include layout and operations essentially the same as those on the mobile device include the Trips page of FIG. 48, the individual trip detail screen of FIG. 49, the single trip Expenses page of FIG. 50, the new trip screen of FIG. 51, the trip filter screen FIG. 52, the active aircraft listing of FIG. 53, the Expenses list page FIG. 56, the expenses filter screen of FIG. 57, the individual expense detail of FIG. 58, the expense attachment screen of FIG. 59, the new expense form of FIG. 60 and the expense association screen of FIG. 61 which allows the user to associate an expense with either an aircraft or a trip, either the entire trip or a particular trip leg. Accordingly, the actions and operations common to the large format screens and the mobile smart phone will not be re-explained. The larger format screens are particularly useful for an office administrator for ease of review, completion of certain additional functions presently to be explained and for conveniently interacting with the aviation professionals that are on the move.

Certain screens, specifically those of FIGS. 43-47, 54-55 and 62-65 may be partly or wholly invisible to the aviation professionals on the go and only visible to administrators including bookkeepers and accountants who are responsible for managing the system, invoicing customers and other non-routine functions, like the creation of new expense categories that become visible to the user in the drop down menus, and the adding of new aircraft to the system that users may also select via drop down menus.

Reference is now made to the "Manage" screens of FIGS. 43-47 which are accessed by clicking or tapping on the word "Manage" located at the top right of these screens and those other screens where the manage function is made available. While the "Manage" selection is here shown on all of the tablet or computer sized screens, the Manage function typically would not be made accessible to aviation professionals in a large organization. Rather, it would only be made available to administrators, bookkeepers, accountants or others needing this functionality. On the other hand, in those environments where "Manage" involves only, for example, an individual handling his or her aircraft, the Manage function would be made available on all screens but would have much simpler functionality than that presently to be described.

Figure 43:
FIG. 43 is an exemplary wireframe diagram depicted on a tablet computer of a manage people screen for the fourth embodiment of the invention.
Figure 49B:
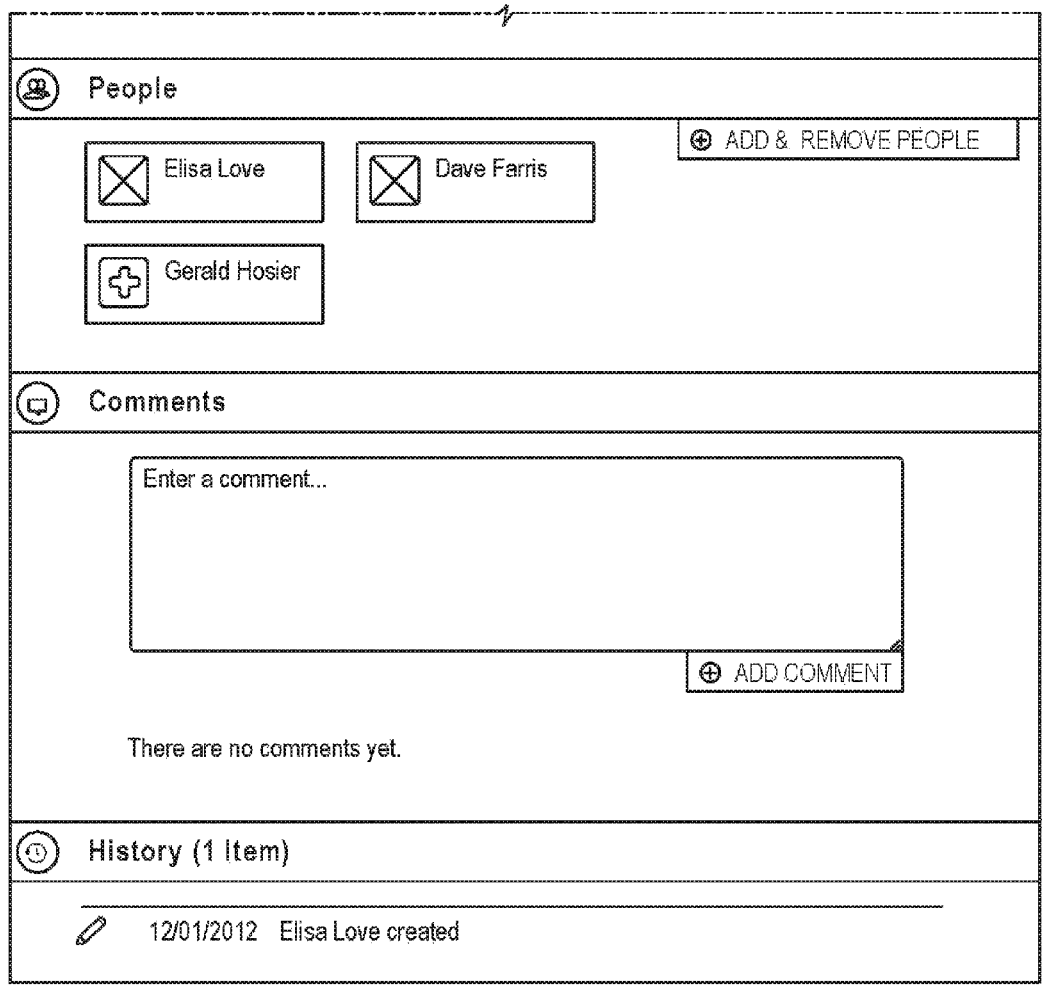

Tapping or clicking on Manage at the top right of any screen available to the administrator or other authorized user will take that person to the screen of FIG. 43 which permits management of Categories, People and Companies, both those companies owned by the operator and those companies external to the organization, such as those that may be invoiced for expenses incurred and for services rendered. Typically, pilots are not involved in such management and invoicing functions so there is no reason in most instances to make such functions available to them. Also, it is rare for a person flying for pleasure or a small operator to need such functionality so the invoice function may be deleted and the manage function simplified for such applications.

FIG. 43 includes in the left navigation panel the items that may be accessed within this page, namely, Categories, People, Companies and External Companies; an item is selected by tapping on its name in the left panel. In FIG. 43, the user has clicked on People thereby to separately open in the body of the screen the identifying information for all authorized administrators, all non-administrator system users, and the names of customers that are in the system and available to be invoiced for expenses and other services associated with them. Clicking on the name of a user, administrator or customer opens the profile for that person; the profiles may be as simple or as complex as needed. Clicking on the ADD button at the upper right of the screen allows administrators, users and customers to be added to the system. Users, administrators and customers may be deactivated so as to deny them continued access to the system. This may be done by, for example, double clicking on the name that is to be deactivated and selecting "deactivate." The prior activity of such administrators, users and customers remains in the system. The identity of inactive, i.e., deactivated, users, administrators and customers may be brought up by tapping on the "Show inactive accounts" legend at the lower right of the screen. Tapping on the legend "Set default expense reviewer" opens a window where the identity of the expense reviewer(s) may be changed; of course, such action may only be done by a properly authorized administrator. Although in FIG. 43 more administrators than users are shown, it is more typically the case for there to be many more users than administrators. The last section identifies customers that may be invoiced for expenses or services. For those account holders that do not have customers, this section may be masked from view.

An account with only one user, such as an aircraft pilot/owner, would typically declare himself or herself the administrator as well as a user. This person might also designate their tax accountant as a user with limited access thereby to make all of the recorded information conveniently available to the accountant for tax or other accounting purposes.

Figure 47B:
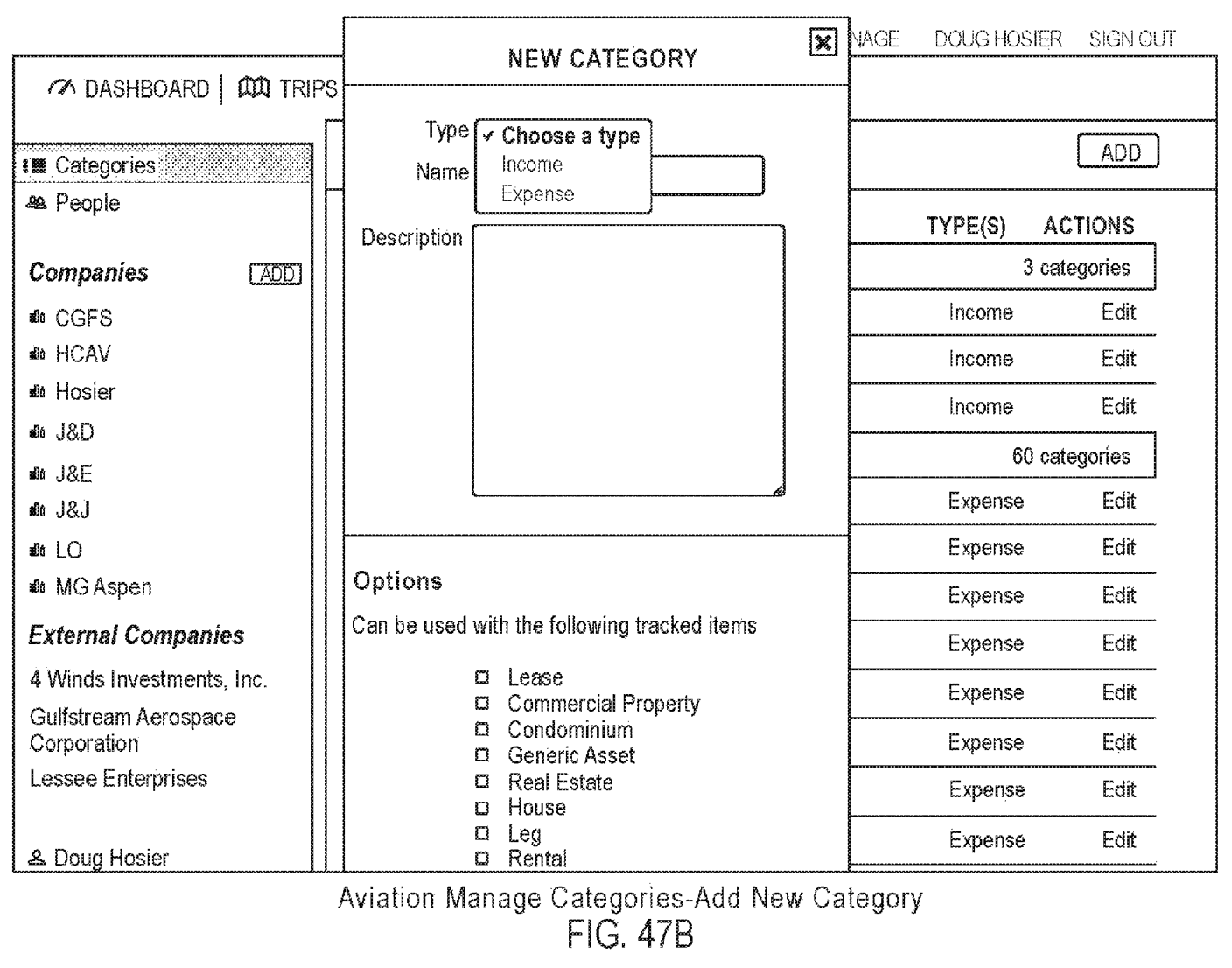

Clicking or tapping on Categories in the navigation panel at the top left of FIG. 43 takes the user to the screen of FIG. 47A. A few exemplary Income and Expense categories are shown in the body of the screen. Both the number and names of income and expense categories may vary from one operation to another and one company to another so freedom is given to the administrator to Add as many new categories as desired and to edit the names of existing categories. Category names are edited by tapping on the "Edit" block at the far right of every category name. New categories are added by tapping on the Add block at the top right of the screen. This action brings up the New Category window of FIG. 47B. The administrator selects the category type, here income or expense, types the category name in the Name box and, if needed, writes a description of the category in the Description window, for example, to make clear what the category includes and excludes. There is an Options section at the bottom of the new category window that is not applicable here, but may find application in a generic version of the invention that may be selectively tailored to different applications, such as real estate management and rental.

The present embodiment includes the ability to assign income and expenses to any desired company, to effect transfer payments between such companies and to link such income and expenses incurred within each company to the general ledger for the company. In the present example, eight separate entities are identified below the Companies header in the left Navigation panel of FIG. 44 and four companies are Identified as External Companies in the navigation panel. Those entities shown under the Companies header may be commonly owned businesses entities related to the aviation activities of a larger organization which has non-aviation sources of income and expense. Some of the companies identified may be for owning and operating different airplanes and others may be companies that employ pilots and mechanics and so on. External Companies typically are independent and unrelated companies that may, for example, be invoiced by one or more of the commonly owned entities for expenses and services rendered.

The general ledgers of each of the aviation entities under Companies may collectively represent one facet of the sources of income and expense of a larger entity that derives income and expenses from one or more non-aviation activities. The general ledger of such larger entity may include line items for each of the aviation companies from which an accountant or principal may drill down all the way through expenses to the trip and/or aircraft associated with the expense and on down to every detail and receipt associated with the expense. Other businesses of the larger entity may likewise use the teachings of the present invention as tailored to different business activities, like ownership and management of rental properties or a sales representative organization (employing the third embodiment of the invention) to enable all facets of the larger entity to have the same accounting linkages as here described so that all expenses and sources of income may be tracked to their origins. The invention provides a paperless system for the handling of income and expense where the responsibility for entering expenses in the system in a manner consistent with organizational protocols is placed on the person who incurs the expense. The invention further provides the ability to link such expenses into the general ledger of the entity that incurred them such that one may simply click on a particular expense and drill down to its origins. In other words, everything to do with an expense is linked to that expense and the same with invoices. The invention also enables the books of individual companies to be linked and for such companies to be incorporated into the general ledger of the common owner or parent company.

Tapping on an exemplary one of these companies, CGFS in FIG. 44, brings up in the present example the balance sheet for this company. In complex organizations such as here shown, pilots may associate expenses with aircraft and trips while administrators may have the responsibility to assign those expenses to accounts of one of the Companies listed or at least verify that the pilot charged the expense to the correct entity. The bookkeeper and accountant may also deal with all aspects of the financial records of each company from this screen by selecting a particular company account and then proceeding with the accounting activity in normal course. One advantage of the invention is that all expenses in the company records may be tracked to their origins in complete detail without the need to resort to other electronic or paper records.

External companies may be invoiced for expenses and services rendered, and transfer payments may be made between companies via an invoice function. The invoice function is accessed by tapping on Invoices in the navigation bar at the top of the screen, such as shown in FIG. 62 where selection of Invoices from the navigation bar is denoted by this word appearing in highlighted font. Tapping on Invoices in the navigation window takes the user to the invoice list screen of FIG. 62 which lists all invoices by status, due date, from, to, amount, paid, balance. Each of these columns may be sorted by tapping on the associated header. New invoices may be added by tapping on the blue colored Add Box at the upper right of the screen. The invoices may be searched by tapping on the magnifying glass to the right of the Add box. The Invoice filter then pops up as shown in FIG. 63. Invoices may be searched according to any of the criteria there specified, which may include information found in any box that must be filled in when creating an invoice. Consistent with double entry accounting, the invoicing function of the system is linked to the expense function so that any expense associated with a trip or lessee creates a draft invoice which appears when viewing the Invoices page. These draft invoices, created automatically by assembling all expenses assigned to a company to be billed, ensure that no expenses may be inadvertently overlooked in making out a new invoice. Draft invoices may be opened and edited or deleted by the administrator. Also consistent with double entry accounting, the system tracks which expenses have or have not been invoiced and allows users with proper permission, to review expenses by this criteria. This aids in balancing the books for each account.

An exemplary invoice is shown in FIG. 64. A summary of the pertinent invoice information is provided at the top of the invoice followed by line item charges automatically populated from expenses associated with the external company to be invoiced. Additional items may be added or removed from the invoice by an authorized administrator. The invoice includes a Comments section and a History section.

Figure 65:
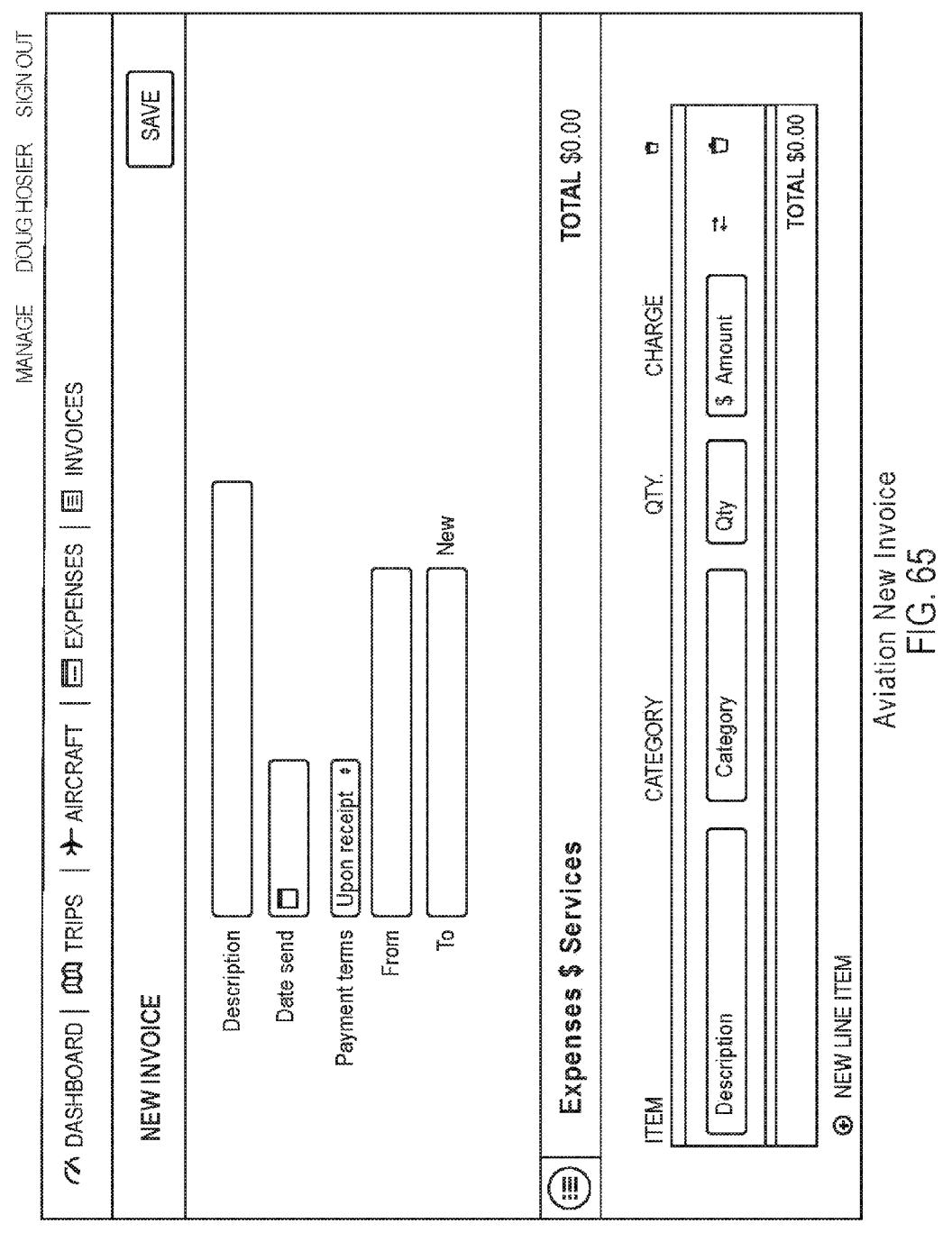

FIG. 65 is a new invoice form which has various required fields at the top that are filled out automatically or by the administrator. Draft invoices with expenses are progressively updated as expenses are incurred, assuming that the expense is associated with a particular company to be billed. Expenses assigned to be billed to an External Company are automatically populated into a draft invoice under the Expenses & Services header. Additional expenses may be added by the administrator as well as charges for services rendered. Indeed, services charges may be created as an expense or similarly to expenses by creating an expense type form that details the services rendered, the time, date and place, hourly or flat charges and the like which is then added to the invoice under Expenses & Services. The system automatically totals the detailed line items. The company billed may be sent a link or otherwise permissioned into the system for the limited purpose of seeing the Invoice and the charges made. The invoicee may, like systems users, drill down on every invoice charge to its origins to verify the bases for the charges made. Providing a client with this ability by way of the invention builds trust, reduces or eliminates time spent to explain billing, reduces the time and effort in creating bills and provides highly detailed easily accessible electronic records of all invoices and the underlying charges.

There have now been described in detail several embodiments of the system with referenced Figures and Diagrams. Following is a review of some of the key features of the system as well as a description of some envisioned uses of the platform compared with the current technology.

The tracked object acts as an anchor or point of reference for content and users. A Tracked Object is an abstract idea, a real event or real object. Described in another way, content in the system is associated with tracked objects as opposed to people, as in other systems. The tracked object is what has permission entitlements to the content. The owner of the tracked object may then provide permission access to that tracked object. The newly entitled or permissioned user then has access to the content associated with that tracked object. This greatly simplifies the process of sharing and managing access to content. In verticals of the system described above, the owner of a tracked object may permission another person as a particular type of pre-defined user giving limited permission to access and input content.

Further, the tracked object functions as an independent element or model in the architecture of the system. In this way new types of tracked objects can be created resulting in a new software platform by only or primarily changing the nature and qualities of the tracked object.

In the examples given above we have illustrated generic tracked objects with the simplest of rules (Hapyn) as well as generic tracked objects with more restrictive rules (Project Awarnys). We have given examples of how tools, widgets and apps can be added to Hapyn to significantly enhance functionality while leaving the core of the system architecture unchanged or virtually unchanged.

Similarly, Project Awarnys represents an enterprise system with a generic tracked object; the Project. However, the Aviation embodiment and the Sales embodiment are two verticals with two separate types of tracked objects each. Each of those tracked objects has unique and specific qualities. For example, an aircraft has a tail number, and fuel capacity, a trip has legs, pilots, passengers and starting and ending dates. A Lead has a name, a telephone number, and an email address, etc.

The architecture of the system is such that it can be adapted to address the needs of a particular business or industry by primarily or only making adjustments to the nature and particular attributes of the tracked objects associated with that business or industry. The examples given above each have two distinct tracked objects; aircraft and trips, and leads and deals, but an embodiment need not be limited to two tracked objects and in fact the system places no limit on the number of types of tracked objects nor the complexity of their relationships to one another.

For example, a business that produces valves for oil refineries may have dozens of models of valves, each highly customizable. Each valve type may be a unique tracked object and may have a series of complex if-then relationships to navigate in order to assemble a specification for that particular valve. Once the valve is customized it may be necessary to match the valve with a power source (another type of tracked object) that has certain qualities that must be matched up with the specific qualities of the custom valve. Finally the valve may require a monitoring device (a third type of tracked object) that is matched to both the valve and the power source. This is an example of a vertical with three or more types of tracked objects with unique and specific relationships to one another.

Because the architecture of the system uses the tracked object as an individual entity, that entity may be adjusted, adapted and customized while allowing the rest of the system to remain the same and be reused in each vertical. An expense, for example comes from an account, has a date, a payee etc. The qualities and attributes of the expense are no different whether the expense is for a oil refinery valve, a jet aircraft, or lunch for a potential customer. If a user is permissioned to see all content associated with a tracked object, that instruction, or rule, is no different whether the tracked object is a Project, an aircraft, or an oil refinery valve.

This modular type system architecture is uniquely suited to allow and in fact encourage third party developers or individual companies with insider knowledge of their businesses or industries to develop highly targeted verticals. Because the known and predictable problems of group and collective action have been built into the system; management of content, permissions, expenses etc., developers do not have to "reinvent the wheel" and may instead focus their attention on addressing the issues unique to their business or industry.

A further benefit of this is that verticals for highly diverse industries will still "talk to each other." That is all expenses, for example, in the system are formatted in the same way. As stated above, it makes no difference whether the expense is for an aircraft or a sales dinner.

This attribute of the system provides for another unique benefit; meta-accounting. In this context meta-accounting refers to the ability to account for expenses in a traditional general ledger and at the same time allows management or a principal to see qualitative data about expenses and income across all companies and accounts. An example of this is given below.

A hypothetical entrepreneur may have an aircraft and use the aviation vertical, she may also have a plumbing business and use the project vertical and she may also have a company selling vitamins with a sales force and use the sales vertical. Each one of these business activities may have numerous companies with each having numerous accounts and numerous employees.

The Awarnys platform allows this person to manage the activity of the employees and collect expense and income information. The expense and income information of all companies may be accessed by an accountant via the manage accounts in order to assemble the balance sheets and profit and loss statements for each company, but also for all companies together in order to prepare taxes for this person or to present an accurate picture of their financial situation in total.

However, this same process of gathering data allows the owner to view her data through other lenses. For example, she may view a map indicating where expenses and income occurred for all companies combined with the ability to drill down to specific instances and see the supporting documentation and correspondence. In this instance the map view may help develop not only business strategy, but aid in preparing state taxes in total, for all companies combined.

Meta accounting refers to the ability to integrate traditional accounting on a company and account basis with the ability to access that same data from a more qualitative business perspective and determine strategy based on seeing information such as which salespeople are most successful; what their methods are compared to those that are less successful; which geographic areas are producing the highest income, the highest costs, and which products are producing the highest profits.

The platform described in herein has many non-obvious applications which accomplish the function of some current technology but with increased benefits due to its flexibility and other inherent features not found in current designs. Some examples of these are given below.

User Created Magazine: Professional pilot, Dave, creates a Hapyning called "Aviation Today." He writes a few opinion pieces and clips some articles from aviation websites and makes comments about them. He then invites all of his pilot friends to his "magazine." His friends can then read his articles and post responses. As members they also have the ability to post their own original content; stories photos, videos and content from other websites. They can invite other users via the invite function to view the content.

Dave decides to make the magazine public, meaning it will be discoverable via common web search engines. He elects to make adding content for members only but allow the public to view the whole site and make comments. Visitors can ask to be members but Dave can revoke their membership if they contribute inappropriate material. Dave can expand this authority to other chosen users so that they share responsibility for policing content and comments. This example describes how the system provides a framework for a user created magazine consisting of both content from other websites and original content from users to create a media outlet that can grow organically.

Filing System: The system acts as an intuitive automatic and inherent filing system for communications and documents. All communications and documents take place within a tracked object which acts as a "file" where the user can revisit and find all records of activity pertaining to that tracked object.

For example the "work group" tracked object will contain all communications and documents related to and shared within the work group. The work group will also contain the shared profile elements of all participating members. These records can be viewed within the conversation records themselves or documents can be searched directly as described above. For example, there may be many documents shared over a long period of time within the workgroup. A user may wish to find a "sales contract" that was stored some time in the past without searching all conversations to find where when and by whom the sales contract was shared. The user may navigate to "documents", search directly for "sales contract" and pull up any document with that description. Note that no explicit "filing" ever took place in this process. The document was added to the tracked object as part of a conversation but was stored with all descriptive information so that it was in effect virtually filed (haystack style) so that it can be retrieved with a minimum effort on the part of the user.

Email: The system may be used as a substitute for email. Communications can be conducted around a tracked object creating an inherent filing system. In the case of email, any filing is not automatic or inherent and the communication is directed at an individual, not a topic or activity, i.e., a tracked object. However, to mimic email a user can direct the system to create a tracked object with themselves and any individual or, for example, all of the individuals in their contact list as members. The result would function similarly to email except for the fact that it would prevent spam in that only those user's permissioned into the group could send messages. Current spam operators can "guess" many millions of email addresses or acquire existing emails in various ways and send unwanted advertisements to those addresses. With the described system such spam would be prevented because the recipient would have to first permission a sender into their tracked object.

Collector Site: A collector may use a tracked object to document all of the items in his collection with photos, videos, sales contracts or receipts or descriptive text. He may choose to make the tracked object public so that it may be discovered by others who may have interest in discussing or purchasing or trading items in his collection. The transaction feature allows others to pay for items within the system if they wish to do so. The collector may discover other collectors who collect similar objects and document them on the system. They may choose to create an association between their tracked objects to create a larger and more attractive destination for other collectors or interested parties. Many collectors may discover one another through the system and elect to join or associate their tracked objects to create a merged destination site with many collectors and their collections.

Area of interest: Users may create a site based upon an area of interest such as "recycling" or "electric vehicles." They may ad web clippings from other sites and post editorials or host conversations. Via search they may discover other tracked objects based on the same area of interest. They may elect to create associations or merge content in order to draw more visitors and to create a super destination around an area of interest comprised of many tracked objects and their related content. They may share resources with other similar tracked objects. For example, members in one tracked object may develop a detailed checklist for the process of getting a community to recycle and be willing or eager to share that checklist with other groups attempting to accomplish the same in their community.

Classified Ads: The system can function as a classified ad system. For example, a user may create a tracked object tagged "classified" and "for sale" and "bike" and "Boulder, Colo." He may upload a picture of his bike and provide a description and price. Any user may then search for public tracked objects tagged "classified" and further refine to location and to find any bikes in Boulder Colo. If the user likes the picture he can communicate with the seller within the tracked object. If they reach an agreement the buyer can make payment through the system and make arrangements to pick up the bike. A motivated seller may elect to use the advertising dashboard described earlier.

Personals: The system may act as a platform for personal ads or a matchmaking site. Users may upload pictures and descriptions of themselves along with tags for search and filter with information such as their age, gender, physical attributes, interests, location, occupation etc. The search and filter function may return to the user other profiles that fit their criteria and present their ad (tracked object) to other user's if their profile meets those users' criteria. The geographical function may alert user's to other user's in their city or in their immediate vicinity who wish to allow themselves to be visible.

Personal Blog/Twitter: The system may function similarly to personal weblogs, or blogs or similar to a Twitter account in that a user may set up a tracked object for the purpose of sharing their thoughts on current topics or any other area of interest. Similarly they may seek to have others "follow" them, or in this case, join or view their tracked object and share it with others.

Social Network and Professional Resume and Job Sites: The system can function in ways similar to current social and work related sites such as Facebook or LinkedIn. For example, a user may have a tracked object that is simply "me." On that tracked object the user may reveal some or all of her profile element; pictures videos, resume, stories etc. and make the tracked object private or public. Creating a private tracked object and inviting a group of friends would be analogous to "friending" someone as on Facebook. Similarly, a user could either create a "professional" profile for a tracked object, i.e., the "professional me" or join a tracked object created to share resumes, contact info and communication about jobs and reveal their professional profile elements on their profile within that tracked object.

House rental: airbnb, vrbo: The system can function similarly to the popular short term house rental sites airbnb and vrbo.com. This is essentially a specialized version of a classified ad. A user can create a tracked object describing their house or apartment and make it public and discoverable. Other users may view the descriptions and photos and contact the owner via the discussions in the tracked object. If the two parties come to an agreement, the party renting the property can make a payment through the system.

Social Activism: The system is a useful tool for social activism. Referencing the previous discussion of Ronald Coase, many worthwhile and socially beneficial activities "don't get done" if the "transaction cost" i.e., the cost of organizing and managing the group is too high. The system dramatically lowers the transaction cost (in both time, effort and complexity and cost) of forming a group and working to accomplish a shared goal.

Business: A business vertical tracked object may have enhanced formatting and functionality to more easily allow owners to put forth targeted discounts or offers to all or specific customers and to allow those customers to respond. Also the business owner may present their offerings to be purchased directly, for example, in the case of a restaurant an owner could present the daily menu on the tracked objects and allow customers to order and pay directly from the web enabled phones.

Distributed Research: The system allows for distributed problem solving, knowledge sharing and research. For example, a tracked object could be created to share research for a particular problem such as an engineering problem or a software development project or research into the causes diagnoses and treatment of a disease. The initial members may be a group of appropriately accredited scientists who limit the membership of their group but make their work public, or available to a wider group of professionals. The members would continue to communicate and share their findings in the tracked object. Outsiders with interest and skill in the topic could observe and comment. The topic may draw the attention of outsiders with skill in the area of investigation who could also be invited into the group and who would be able to invite colleagues of their acquaintance who may have contributions to offer as well. This represents a sort of managed "crowdsourcing" for problem solving and research. It also provides for a record of whose contributions were most valuable in solving the problem. Agreements between sponsoring members and contributors may help address the problem in many circles of researchers not sharing data with one another to avoid others getting credit for their discoveries. A shared, and neutral platform unable to be manipulated by members may help to foster an environment where sharing research is more encouraged.

Business Value: The advantage to the business owner is that they are able to establish a line of communication with their customers by meeting them in the "neutral ground" of the tracked object which exists on a platform that the customer may already use for their own purposes and by giving the customer an incentive to visit their tracked object. It allows for tracking of individual customer activity with no invasion of customer privacy and minimal to no effort on the part of the customer. Absent this neutral ground many customers will opt out due to the effort of joining a program and bookmarking individual websites and the desire to maintain their privacy.

Document Management System: The system functions as a cloud based document management system for an individual or for one or many groups. The system allows the user to provide access to one, many or all of the documents to another user as described below. Any document may given a title, descriptive tags and may also have conversation associated with it where it appears as an attachment or inclusion in the course of a conversation.

These documents (videos, photos, text documents etc.) can be accessed by selecting the document navigation button (see diagram). From the "document" access point the user can view, sort, filter and search the files in numerous ways including chronologically, point of geographical input, geotag on the document (such as on photos), media type i.e., photo, video, pdf etc., user who made the upload, according to tags placed on the document or by way of word search within documents (using optical character recognition) or automated photo pattern recognition such as face recognition or other photo or video pattern or image recognition techniques.

For example image recognition software may identify numerous images with faces and identify which ones are the same face. A family member may view the photos by "face" and give names to each group of faces. Now a family member may view "photos" and "Dave" and the window will show a carousel or slideshow or list of all photos which have been recognized as containing Dave's face.

Individual: The system may work as a personal data and document management system. An individual may create a tracked object such as "my house" and upload all documents, contracts, photos, notes, receipts, user manuals or contact information for service people or companies. This tracked object then acts as a filing and access system for all matters pertaining to the house. In the event that a warrantied item fails, the user may inform the serviceperson who installed it and send them permission to the uploaded receipt as proof of purchase. The user will simply find the image of the receipt in the "house" tracked object and click "share." She will then transmit a link to the service person to see that one single document in her tracked object. This transmission may take the form of a link in an email. She may share other documents as well such as a picture of the broken appliance.

Group: A user may create a tracked object called "family" and upload all of her family photos and videos. She may then invite the other members of her family to the tracked object giving them access to all of her uploaded photos and videos and invite them to upload their family photos and videos as well. This provides a means for storing and sharing an organizing the documents integrated into a social communication platform. Additionally, the voting feature allow for distributed groups to come to group conclusions, make group decisions more easily.

Public: By default any document uploaded to a private tracked object is private; however, any uploaded document may be deemed "public" by the user. The user may also allow or disallow associated uploaded information such as their identity and any descriptive information or tags. This allows users photos to become part of a quickly and easily accessible data trove. This trove of documents can have numerous uses.

For example, if many users upload photos and videos with date and geographic information, any user could choose a date and location, say Paris France, Nov. 3, 2013, and the system will display a virtual photo album with photos and videos from any users in the world that fit that description. Image analysis software could organize and recognize certain features from those photos (for example, the Eiffel Tower) if a user was searching for a particular image.

Another example is that during an important world event any user may use their web enabled device to record pictures or videos and allow them to be public with the time and geographical record attached. In this way other users could search for data with records for that time and place and have real time access to "reports" comprised of all the shared data from users in that area at that time. In effect, all users who participate by sharing their data become part of a virtual reporting corps providing their documentation of events in real time to the rest of the users world wide.

Users who upload documents may attach information identifying themselves or their tracked objects to draw users. For example, a user may have a public tracked object about current events. They may upload photos or videos for public discovery and attach descriptive text saying in effect "visit my tracked object 'here.'"

Personal Financial Management: The "manage accounts and people" aspect of the system may also be used without tracked objects and function as a personal accounting system for an individual or a household or small business. Draft expenses may be uploaded and completed later and a general ledger may be maintained for that household. An "accountant's login" may be created for this or other verticals to allow remote accountants to view the records and make comments or adjustments without the ability to edit data, thus protecting both parties from allegations of fraud.

As stated previously, this system may link directly with financial institutions such as banks or credit card companies or with services such as Yodlee which aggregate all such institutions' data to facilitate record keeping.

Medical Records: The system is well equipped to handle medical records in such a way as to provide privacy of records for individuals while allowing them to selectively share those records with insurance companies or medical professionals, all the while allowing the individual to retain ultimate authority over access.

Construction Projects: Examples above included a plumbing contractor. However the system is equally suited to manage the activity of complex construction projects with many subcontractors.

Property Management: The system is well suited to the purpose of Property Management. In this instance each apartment within a building may be a sub-project for the primary project which is the building itself. All activity with tenants and subcontractors could be handled within the system.

Mobile Telephone Operating System User Interface: In this embodiment the system may be tailored to function as the user interface for a mobile telephone operating system. All activity would be conducted in association with Hapynings or business related tracked objects in various verticals. To address activity that does not apparently relate to any tracked object a tracked object that is simply entitled "me" or "my life" would be the catch-all for activity that has no inherent association.

While the above detailed description has shown, described, and pointed out novel features of the invention as applied to various embodiments, it will be understood that various omissions, substitutions, and changes in the form and details illustrated may be made by those skilled in the art without departing from the invention. This description is in no way meant to be limiting, but rather should be taken as illustrative of the general principles and teachings of the invention. The scope of the invention should be determined with reference to the claims.

I claim:

1. A device in a social application for use with computing/communication devices having user interactive displays and the capability to communicate with other such devices by (i) transmitting information to a cloud computing center for electronic storage, and (ii) receiving information stored at the cloud computing center including information earlier transmitted to the computing center by other such devices, a display screen-device user interface comprising:
   (a) a first screen for providing a device user access to compose at least one editable profile, each editable profile not accessible for alteration by other device users and each editable profile having an associated profile identifier;
   (b) a second screen for creating a social group by (i) specifying certain device users as group members, and (ii) assigning a tracked object identifier to the group;
   (c) a third screen listing the tracked object identifiers for those social groups (i) created by a device user, and (ii) in which the device user is a member;
   (d) a fourth screen for composing content posts to group members associated with a particular tracked object identifier selected from among those listed on the third screen;
   (e) a fifth screen for viewing content posts associated with a particular tracked object identifier selected from among those on the third screen, the fifth screen (i) posts identifying the post creator and not identifying the other group members, and (ii) displaying the particular tracked object identifier in a screen location apart from the associated content posts;
   (f) a sixth screen for listing the profile identifier of at least the creator of the social group associated with the particular tracked object identifier on the fifth screen; and
   (g) a seventh screen for viewing the profile associated with a profile identifier selected from among those profile identifiers listed on the sixth screen, the selected profile able to be edited by its creator and not able to be altered by other device users.

2. The social application/device user interface of claim 1 in which (i) the sixth screen lists profile identifiers for multiple members of the social group, (ii) social group members may selectively view the current profiles of other group members on a seventh screen by selecting the member's profile identifier from the list of profile identifier on the sixth screen, (iii) group members with profile identifiers listed on the sixth screen may initiate from the seventh screen editing of only that member's profile, and (iv) only the most recently edited profile of a group member is accessible on the seventh screen for viewing by other group members.

3. The social application/device user interface of claim 1 in which (i) the social group creator may create a profile about the social group including photos, videos, web links and websites as well as reference and other material pertinent to the group, (ii) the group creator may periodically edit the profile about the group, and (iii) group members are able to view only the most current version of the profile about the group by selecting an associated about profile identifier accessible from at least one of the screens three through seven inclusive.

4. The social application/device user interface of claim 1 and further including a new posts screen for viewing at least portions of only new, unread content posts from user selected ones of the social groups listed on the third screen by their respective tracked object identifiers, each new, unread post on the new posts screen identifying the member making the post, the date and time the post was made, the social group in which the post was made and at least a portion of the post content and further in which the device user may selectively remove posts from the new posts screen while such removed posts remain for viewing on the fifth screen and further in which the device user may select on the new posts screen to initiate a response to a new, unread post and further in which a post to which the user responds is automatically removed from the new posts screen while such posts remain for viewing on the fifth screen.

5. The social application/device user interface of claim 1 in which a device user may initiate from the first screen the creation of different profiles and in which a device user may select different profiles for different social groups and in which the device user may edit each of the device user's own profiles and may not edit any profile of any other device user.

6. The social application/device user interface of claim 5 and further including screens for a device user to create individual profile elements which the user may mix and match to create a multiplicity of different profiles for selectively use in different social groups.

7. The social application/device user interface of claim 1 in which at least the social group creator may attach files to individual posts and further including a files screen associated with each social group tracked object identifier for enabling social group members to view files associated with a social group separately from social group posts.

8. The social application/device user interface of claim 1 in which the computing/communication devices comprise mobile phones with gesture sensitive displays and in which for such mobile phones (i) the third screen lists the tracked object identifiers in separate gesture sensitive blocks in a scrollable screen format, (ii) selection of a particular tracked object block on the third screen by a gesture opens the fifth screen for the viewing of the tracked object posts in a scrollable screen format, (iii) a post to a tracked object may be initiated from the fifth screen by gesture, and (iv) the sixth screen lists the profile identifiers of at least some members of the social group in separate gesture sensitive blocks.

9. The social application/device user interface of claim 1 in which the social group creator on creating the group may selectively apply predetermined rules to the group including at least one of (i) whether group members other than the group creator are allowed to post to the group, (ii) whether the creator may delete members from the group, (iii) whether group members other than the group creator may add members to the group, (iv) whether the creator may designate the group as semi-public or public thereby enabling non-group mobile device users to discover the group and at least passively view postings in the group, (v) whether the creator may appoint group monitors with the same authority as the creator, (vi) whether members may delete or edit their own posts, and (vii) whether non-group members are allowed to post advertisements to the group.

10. The social application/device user interface of claim 1 in which (i) at least the group creator may change the name of the tracked object identifier, (ii) new members may be added to the group, (iii) existing members may leave the group, and (iv) members may edit their own profiles associated with the group while in the group, all the while the group continues with existing content posts unchanged independently of changes in the name of the tracked object identifier, the addition or deletion of members and the editing of member profiles.

11. The social application/device user interface of claim 1 in which advertising is (i) directed to a user's device from the cloud computing center based on keywords used in social group content posts and not on information compromising the personal privacy of individual device users, and (ii) accessible to a device user for viewing only upon a device user's affirmative selection of an advertising icon located on one or more screens.

12. The social application/device user interface of claim 11 in which advertisers may specify limiting criteria for their advertisements including at least one of (i) business category, (ii) discount products and services, (iii) geographic range, (iv) zip code, (v) last post in a group thereby to avoid advertising to inactive groups, and (vi) time period the advertisement is available for viewing by device users.

13. The social application/device user interface of claim 1 and further including (i) a preferences screen for a device user to select the kinds of advertisements the user's device will accept from the cloud computing center; and (ii) an icon selectable from at least one of screens three, five, six and seven for enabling the device user to view those kinds of advertisements selected on the preferences screen, such advertisements being inaccessible for viewing absent affirmative selection of said icon.

14. The social application/device user interface of claim 1 and further including (a) an advertising composition screen for a device user to compose advertisements; and (ii) a user selected icon for initiating transmission of the advertisement to the cloud computing center.

15. The social application/device user interface of claim 1 and further including a discount deal icon on at least one of the screens three, five, six and seven, affirmative selection of which enables user access to discount deal advertisement transmitted to the user's device from the cloud computing center.

16. A device in a social application for use with computing/communication devices having user interactive displays and the capability to communicate with other such devices by (i) transmitting information to a cloud computing center for electronic storage, and (ii) receiving information stored at the cloud computing center including information earlier transmitted to the computing center by other such devices, a display screen-device user interface comprising:

(a) a first screen for providing a device user access to (i) compose at least one editable profile having an associated profile identifier, and (ii) initiate transmission of each editable profile and an associated profile identifier to the cloud computing center for electronic storage in a manner that such stored profiles and profile identifiers are not accessible for alteration by other device users;

(b) a second screen for creating a social group by (i) specifying certain device users as members of the group, and (ii) assigning a tracked object identifier to the group, and (iii) initiating transmission of the information (b)(i) and (b)(ii) to the cloud computing center for electronic storage in association with one another and in association with a creator profile and an associated profile identifier;

(c) a third screen for selectively listing those tracked object identifiers stored at the cloud computing center in association with the social groups (i) created by the device user, and (ii) in which the device user is a member;

(d) a fourth screen for (i) composing content posts to group members associated with a particular tracked object identifier selected from among those listed on the third screen, and (ii) initiating transmission of composed content posts to the cloud computing center for storage in association with the particular tracked object identifier, the associated creator profile and the date and time of the post;

(e) a fifth screen for viewing those content posts electronically stored at the cloud computing center in association with a particular tracked object identifier selected from among those listed on the third screen, the fifth screen (i) posts identifying the post creator and the time and date of the post, and (ii) displaying the particular tracked object identifier in a location apart from the associated content posts;

(f) a sixth screen for selectively listing profile identifiers of the particular tracked object group members electronically stored at the cloud computing center, the profile identifier list displaying at least the profile identifier of the social group creator; and (g) a seventh screen, accessed by selecting a profile identifier from among those profile identifiers listed on the sixth screen, for viewing the profile stored at the cloud computing center in association with the selected profile identifier, such stored profile able to be edited by its creator and not able to be altered by other device users.

17. The application/device user interface of claim 16 and further including (i) an advertising preferences screen for a device user to set criteria on the kinds of advertisements the user is willing to accept from the cloud computing center and for initiating transmission of such advertising preferences for storage at the cloud computing center in association with the identity of the device user, and (ii) a user selectable advertising identifier icon for enabling the device user to selectively view only those advertisements at the cloud computing center that conform to the user selected preferences.

18. A method to be performed at a host cloud computing center in electronic communication with numerous, geographically dispersed computing/communication devices permissioned by the host computing center to participate in a community of permissioned devices, the steps comprising:

(a) receiving from permissioned device users and storing at the cloud computing center information sufficient to uniquely identify each permissioned device user within the community;
(b) prohibiting non-permissioned device users from participating in the community;
(c) receiving from device users, and storing at the computing center in association with information sufficient to uniquely identify each permissioned device user, at least one profile composed by the device user;
(d) receiving, from device users in the community, electronic requests to create social groups, each request including information sufficient for the cloud computing center to (i) identify the affinity group creator, (ii) identify the other group members as designated by the group creator, and (iii) assign a tracked object identifier to the group;
(e) storing separately, in association with one another, the received information (d)(i), (d)(ii), (d)(iii) and at least a group creator profile;
(f) receiving periodically, from at least the social group creator, content posts for particular social groups and storing the received content posts in association with the stored information (d)(i), (d)(ii) and (d)(iii) for the particular social group;
(g) authorizing members of social groups to access at the computing center and view on their devices for each social group of which they are a member the associated (i) tracked object identifier, (ii) content posts, and (iii) profile of at least the group creator, and (iv) a member's own profile;
(h) authorizing each device user to edit a user's own stored profile and prohibiting a device user from editing profiles of other device users.

19. The method of claim 18 and further including the steps of (i) receiving and storing multiple profiles for a single device user, and (ii) receiving from a device user, and storing, information sufficient to identify the particular one of the multiple profiles to be associated with each of the user's social groups.

20. The method of claim 18 and further including the steps of receiving, and storing, instructions from a social group creator as to the rules to be applied at the computing center to a particular social group including at least one of (i) whether only the creator profile is available for viewing by members of the social group, (ii) whether all members profiles are available for viewing by other group members, (iii) whether members other than the group creator may add additional members, (iv) whether a member may alter or delete their own previously posted content, (v) whether advertising or discount offers may be made selectively accessible to a particular social group, (vi) whether a particular social group is private, semi-public or public, and (vii) whether device user profiles may be made public and available for discovery by search.

21. The method of claim 18 and further including the steps of (i) receiving, and storing, in association with the device user's identity, user selected preferences for the kinds of advertisements the user is willing to accept from the cloud computing center, (ii) matching advertisements received at the cloud computing center with the advertising preferences of device users, and (iii) authorizing for viewing by a device user only those advertisements conforming to a device user's advertising preferences.

* * * * *